United States Patent
Kitamura et al.

(10) Patent No.: US 7,817,844 B2
(45) Date of Patent: Oct. 19, 2010

(54) PATTERN INSPECTION APPARATUS AND METHOD

(75) Inventors: Tadashi Kitamura, Kawasaki (JP);
 Kazufumi Kubota, Kawasaki (JP);
 Shinichi Nakazawa, Kawasaki (JP);
 Neeti Vohra, Kawasaki (JP); Masahiro Yamamoto, Kawasaki (JP)

(73) Assignee: NanoGeometry Research Inc., Tokyo (JP)

( * ) Notice: Subject to any disclaimer, the term of this patent is extended or adjusted under 35 U.S.C. 154(b) by 1606 days.

(21) Appl. No.: 11/058,616

(22) Filed: Feb. 16, 2005

(65) Prior Publication Data

US 2005/0146714 A1 Jul. 7, 2005

Related U.S. Application Data

(63) Continuation-in-part of application No. 10/689,021, filed on Oct. 21, 2003, now abandoned, which is a continuation-in-part of application No. 09/648,372, filed on Aug. 25, 2000, now Pat. No. 6,868,175.

(30) Foreign Application Priority Data

| Aug. 26, 1999 | (JP) | ............................ 11-239586 |
| Mar. 21, 2000 | (JP) | ............................ 2000-078847 |
| Oct. 22, 2002 | (JP) | ............................ 2002-307406 |
| Feb. 23, 2004 | (JP) | ............................ 2004-047098 |

(51) Int. Cl.
 *G06K 9/00* (2006.01)
 *G06K 9/48* (2006.01)
 *G06K 9/62* (2006.01)

(52) U.S. Cl. .................. 382/141; 382/199; 382/209; 348/86; 348/125; 356/237.1

(58) Field of Classification Search ......... 382/141–152, 382/199, 203, 209–223; 348/86–95, 125–134; 356/237.1–237.6
See application file for complete search history.

(56) References Cited

U.S. PATENT DOCUMENTS 4,583,854 A * 4/1986 Lozar ...................... 356/237.1

(Continued)

FOREIGN PATENT DOCUMENTS

DE 19803021 A1 7/1998

(Continued)

OTHER PUBLICATIONS

"Automatic Failure Part Tracing Method for a Logic LSI Using an Electron Beam Tester", NEC Technical Report, vol. 50, No. 6, 1997, pp. 20-31 (partial English translation).

(Continued)

*Primary Examiner*—Aaron W Carter
(74) *Attorney, Agent, or Firm*—Lathrop & Gage LLP

(57) ABSTRACT

A pattern inspection apparatus is used for inspecting a pattern, such as semiconductor integrated circuit (LSI), liquid crystal panel, and a photomask by using an image of the pattern to-be-inspected and design data for fabricating the pattern to-be-inspected. The pattern inspection apparatus includes a reference pattern generation device for generating a reference pattern represented by one or more lines from design data, an image generation device for generating the image of the pattern to-be-inspected, a detecting device for detecting an edge of the image of the pattern to-be-inspected, and an inspection device for inspecting the pattern to-be-inspected by comparing the edge of the image of the pattern to-be-inspected with the one or more lines of the reference pattern.

32 Claims, 123 Drawing Sheets

U.S. PATENT DOCUMENTS

| | | | |
|---|---|---|---|
| 4,589,139 A * | 5/1986 | Hada et al. | 382/144 |
| 4,805,123 A | 2/1989 | Specht et al. | |
| 5,046,109 A * | 9/1991 | Fujimori et al. | 382/144 |
| 5,046,113 A * | 9/1991 | Hoki | 382/147 |
| 5,051,585 A * | 9/1991 | Koshishiba et al. | 850/9 |
| 5,129,009 A | 7/1992 | LeBeau | |
| 5,137,362 A | 8/1992 | LeBeau | |
| 5,270,796 A * | 12/1993 | Tokui et al. | 356/394 |
| 5,379,350 A | 1/1995 | Shimazu et al. | |
| 5,398,292 A | 3/1995 | Aoyama | |
| 5,479,537 A | 12/1995 | Hamashima et al. | |
| 5,533,144 A * | 7/1996 | Fan | 382/135 |
| 5,563,702 A | 10/1996 | Emery et al. | |
| 5,574,800 A * | 11/1996 | Inoue et al. | 382/149 |
| 5,600,734 A * | 2/1997 | Okubo et al. | 382/147 |
| 5,764,793 A * | 6/1998 | Omae et al. | 382/149 |
| 5,796,868 A * | 8/1998 | Dutta-Choudhury | 382/199 |
| 5,801,965 A * | 9/1998 | Takagi et al. | 702/35 |
| 6,023,530 A | 2/2000 | Wilson | |
| 6,040,911 A * | 3/2000 | Nozaki et al. | 356/394 |
| 6,047,083 A | 4/2000 | Mizuno | |
| 6,049,895 A * | 4/2000 | Sugimoto | 714/46 |
| 6,222,935 B1 * | 4/2001 | Okamoto | 382/149 |
| 6,356,300 B1 * | 3/2002 | Shiba | 348/130 |
| 6,399,953 B1 * | 6/2002 | Kitamura | 250/491.1 |
| 6,400,839 B1 * | 6/2002 | Takayama | 382/145 |
| 6,504,947 B1 * | 1/2003 | Nozaki et al. | 382/148 |
| 6,535,621 B1 * | 3/2003 | Fujita | 382/112 |
| 6,539,106 B1 * | 3/2003 | Gallarda et al. | 382/149 |
| 6,546,308 B2 * | 4/2003 | Takagi et al. | 700/121 |
| 6,868,175 B1 | 3/2005 | Yamamoto et al. | |
| 7,181,059 B2 | 2/2007 | Duvdevani et al. | |
| 7,206,443 B1 | 4/2007 | Duvdevani et al. | |
| 7,388,978 B2 | 6/2008 | Duvdevani et al. | |
| 2004/0120571 A1 | 6/2004 | Duvdevani et al. | |
| 2004/0126005 A1 | 7/2004 | Duvdevani et al. | |

FOREIGN PATENT DOCUMENTS

| | | |
|---|---|---|
| EP | 0930499 | 7/1999 |
| JP | 63-88682 | 4/1988 |
| JP | 63088682 | 4/1988 |
| JP | 4-194702 | 7/1992 |
| JP | 02299481 | 9/1992 |
| JP | 8-76359 | 3/1996 |
| JP | 08110305 | 4/1996 |
| JP | 10307917 | 11/1998 |
| JP | 10312461 | 11/1998 |
| JP | 10037364 | 8/1999 |
| JP | 2001-338304 | 12/2001 |

OTHER PUBLICATIONS

Robert M. Haralick et al., "Digital Step Edges from Zero Crossing of Second Directional Derivatives", IEEE Transactions on Pattern Analysis and Machine Intelligence, vol. PAMI-6, No. 1, Jan. 1984, pp. 58-68.

Carsten Steger et al., "An Unbiased Detector of Curvilinear Structures", IEEE Transactions on Pattern Analysis and Machine Intelligence, vol. 20, No. 2, Feb. 1998, pp. 113-125.

Theodosios Pavlidis et al., "Segmentation of Plane Curves", IEEE Transactions on Computers, vol. C-23, No. 8, Aug. 1974, pp. 860-870.

M. Hashimoto et al., "High-Speed Template Matching Algorithm Using Information of Contour Points," Systems and Computers in Japan, Vo. 23, No. 9, pp. 78-87, 1992.

Official Notice of Rejection, Japanese Patent Office, dated Feb. 21, 2003, for Patent Appln. No. 2000-258234, with English Translation.

U.S. Appl. No. 11/044,159, Notice of Allowance dated Sep. 25, 2009, 9 pages.

U.S. Appl. No. 11/044,159, Terminal Disclaimer dated Aug. 11, 2009, 3 pages.

U.S. Appl. No. 11/044,159, Response to Office Action dated Jul. 31, 2009, 13 pages.

U.S. Appl. No. 11/044,159, Office Action dated Jun. 12, 2009, 22 pages.

U.S. Appl. No. 11/044,159, Response to Office Action dated Mar. 25, 2009, 16 pages.

U.S. Appl. No. 11/044,159, Office Action dated Dec. 11, 2008, 20 pages.

U.S. Appl. No. 11/044,159, Response to Office Action dated Aug. 29, 2008, 16 pages.

U.S. Appl. No. 11/044,159, Office Action dated Apr. 30, 2008, 11 pages.

U.S. Appl. No. 09/648,372, Notice of Allowance dated Oct. 28, 2004, 7 pages.

U.S. Appl. No. 09/648,372, Response and Amendment dated Sep. 3, 2004, 14 pages.

U.S. Appl. No. 09/648,372, Office Action dated Jun. 3, 2004, 7 pages.

U.S. Appl. No. 09/648,372, Preliminary Amendment and Response to Restriction Requirement dated Mar. 18, 2004, 15 pages.

U.S. Appl. No. 09/648,372, Restriction Requirement dated Feb. 19, 2004, 5 pages.

U.S. Appl. No. 09/648,372, Response to Office Action dated Dec. 12, 2003, 31 pages.

U.S. Appl. No. 09/648,372, Office Action dated Aug. 13, 2003, 7 pages.

U.S. Appl. No. 11/434,797, Office Action mailed Aug. 17, 2009, 18 pages.

U.S. Appl. No. 11/434,797, Response to Office Action filed Nov. 9, 2009, 18 pages.

U.S. Appl. No. 11/434,797 Office Action mailed Jan. 15, 2010, 7 pages.

U.S. Appl. No. 11/434,797 Response to Office Action filed Apr. 14, 2010, 16 pages.

U.S. Appl. No. 11/987,766 Office Action mailed Jan. 15, 2010, 12 pages.

U.S. Appl. No. 11/987,766 Response to Office Action filed Apr. 14, 2010, 23 pages.

U.S. Appl. No. 11/434,797 Notice of Allowance mailed May 10, 2010, 7 pages.

U.S. Appl. No. 11/987,766 Restriction Requirement mailed May 20, 2010, 9 pages.

U.S. Appl. No. 11/987,766 Response to Restriction Requirement filed Jun. 10, 2010, 21 pages.

* cited by examiner

F I G. 7
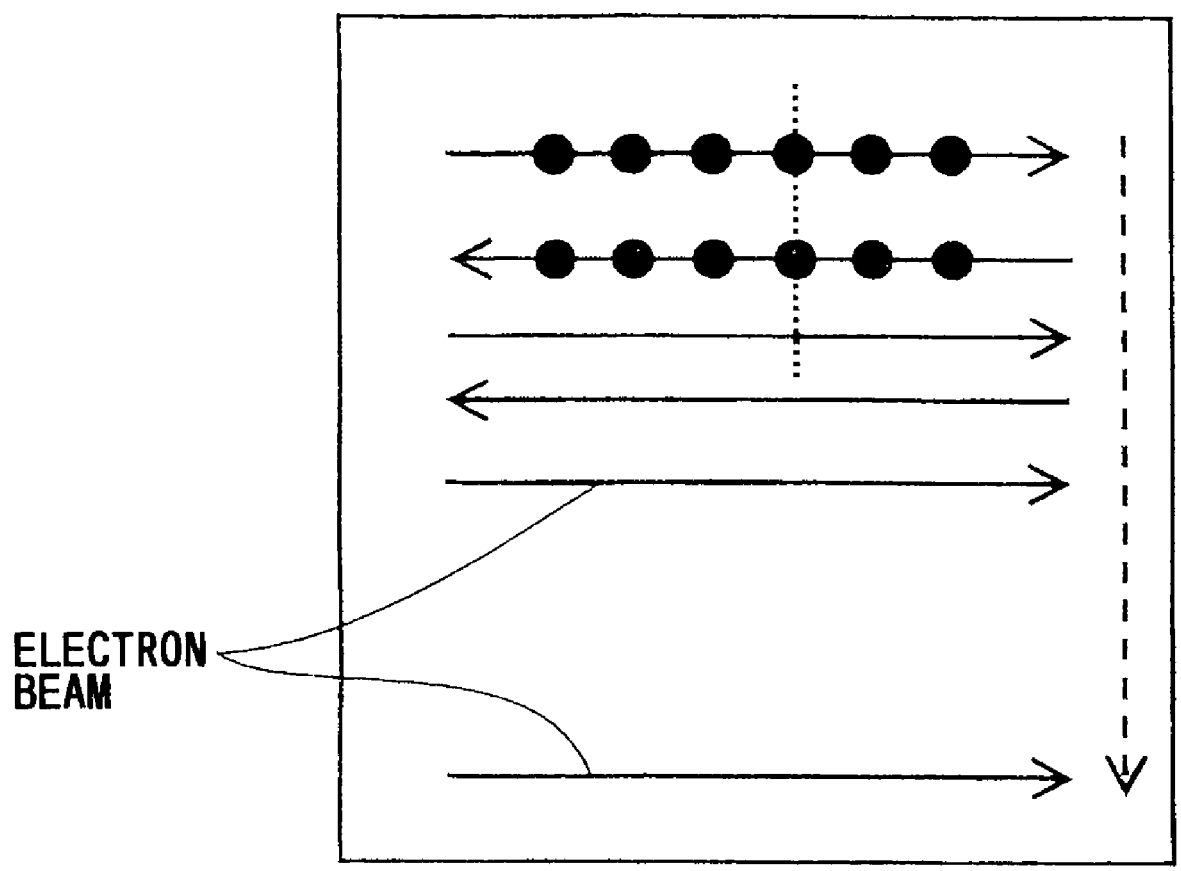

FIG. 8A
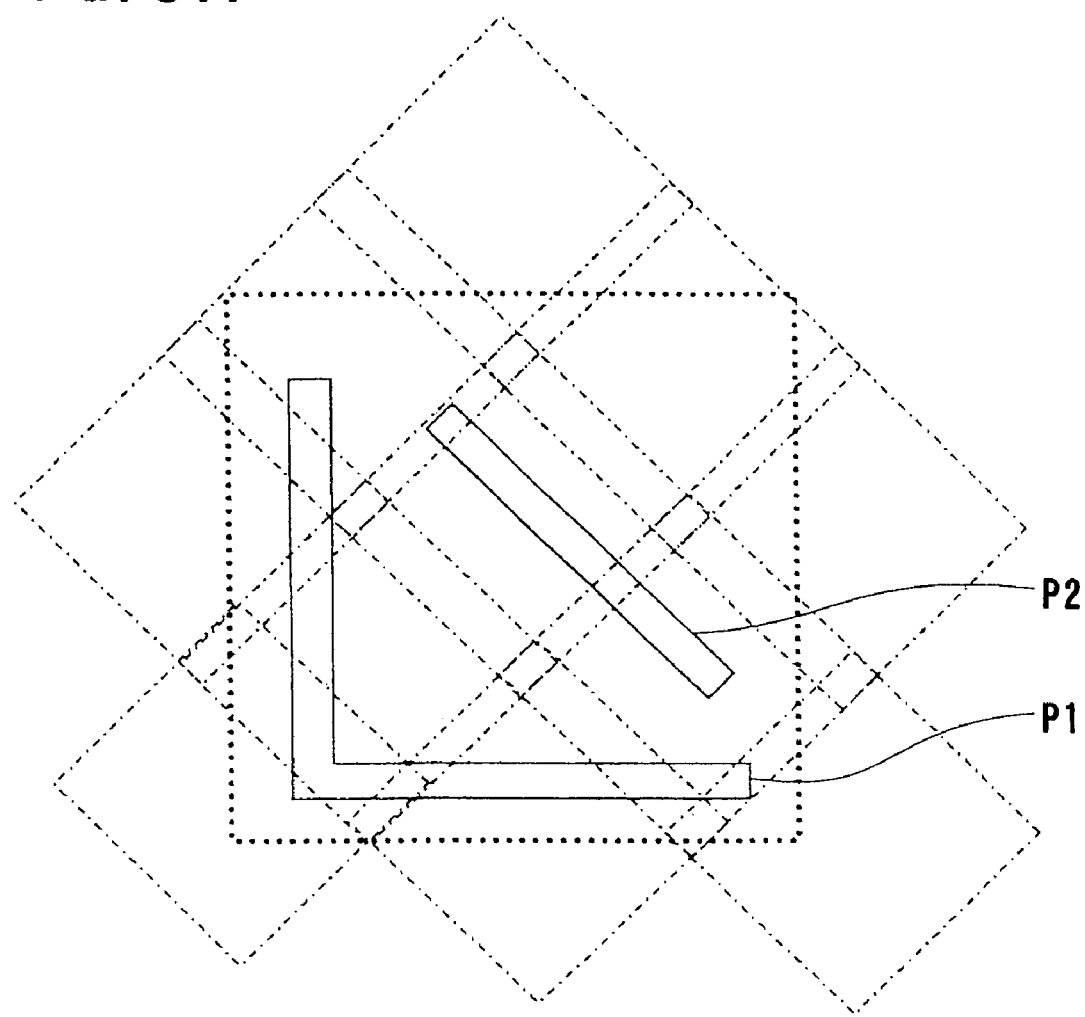
FIG. 8B
FIG. 8C
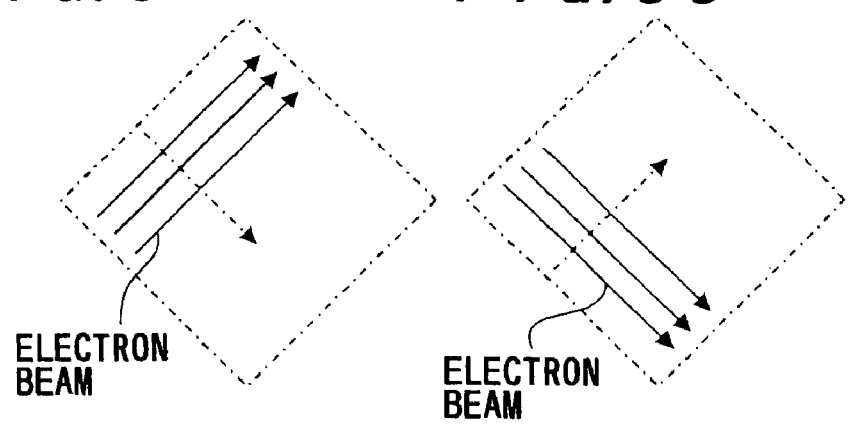

FIG. 13
45 DEGREE INCLINATION
SCANNING METHOD
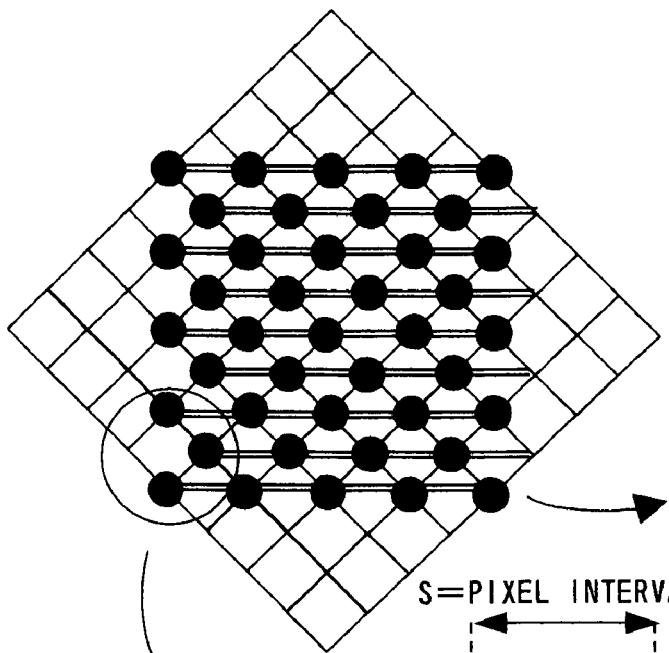
45 DEGREE INCLINATION
IMAGE
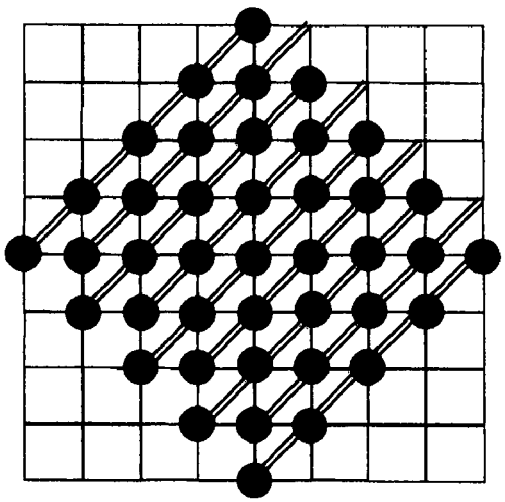
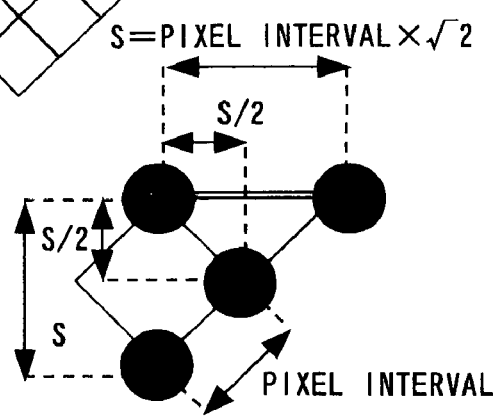

FIG. 14
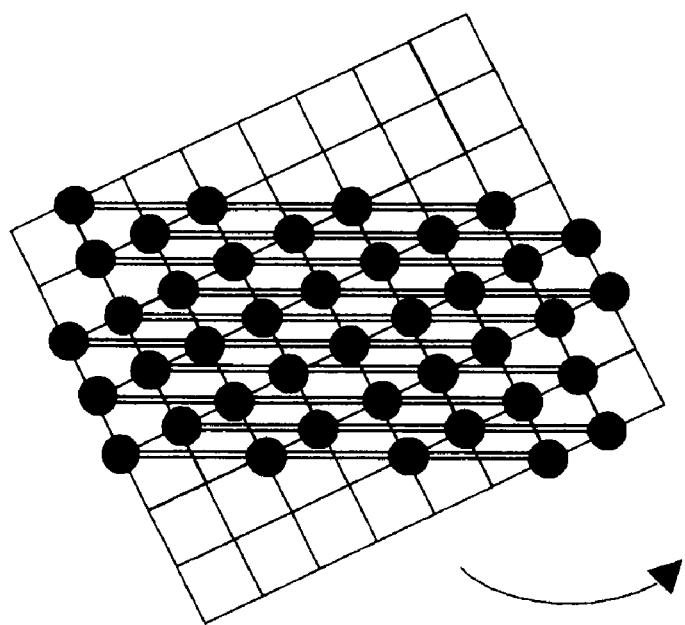
ARCTANGENT(2) INCLINATION SCANNING METHOD
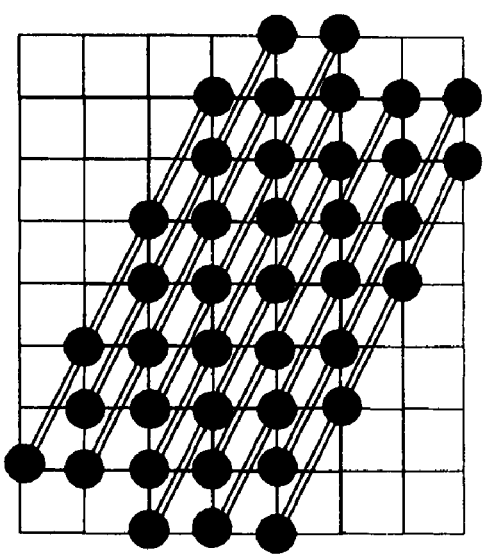
ARCTANGENT(2) ROTATED IMAGE F I G . 1 5
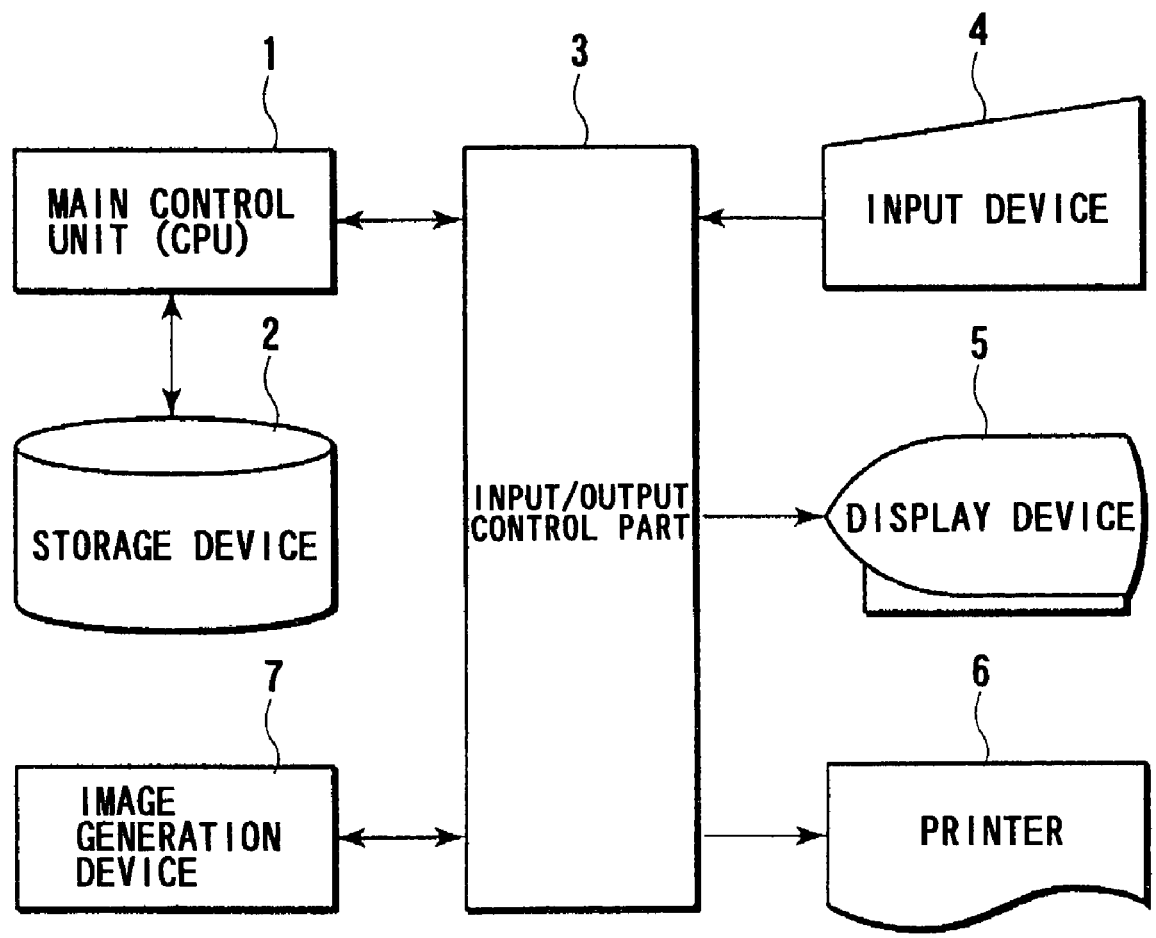

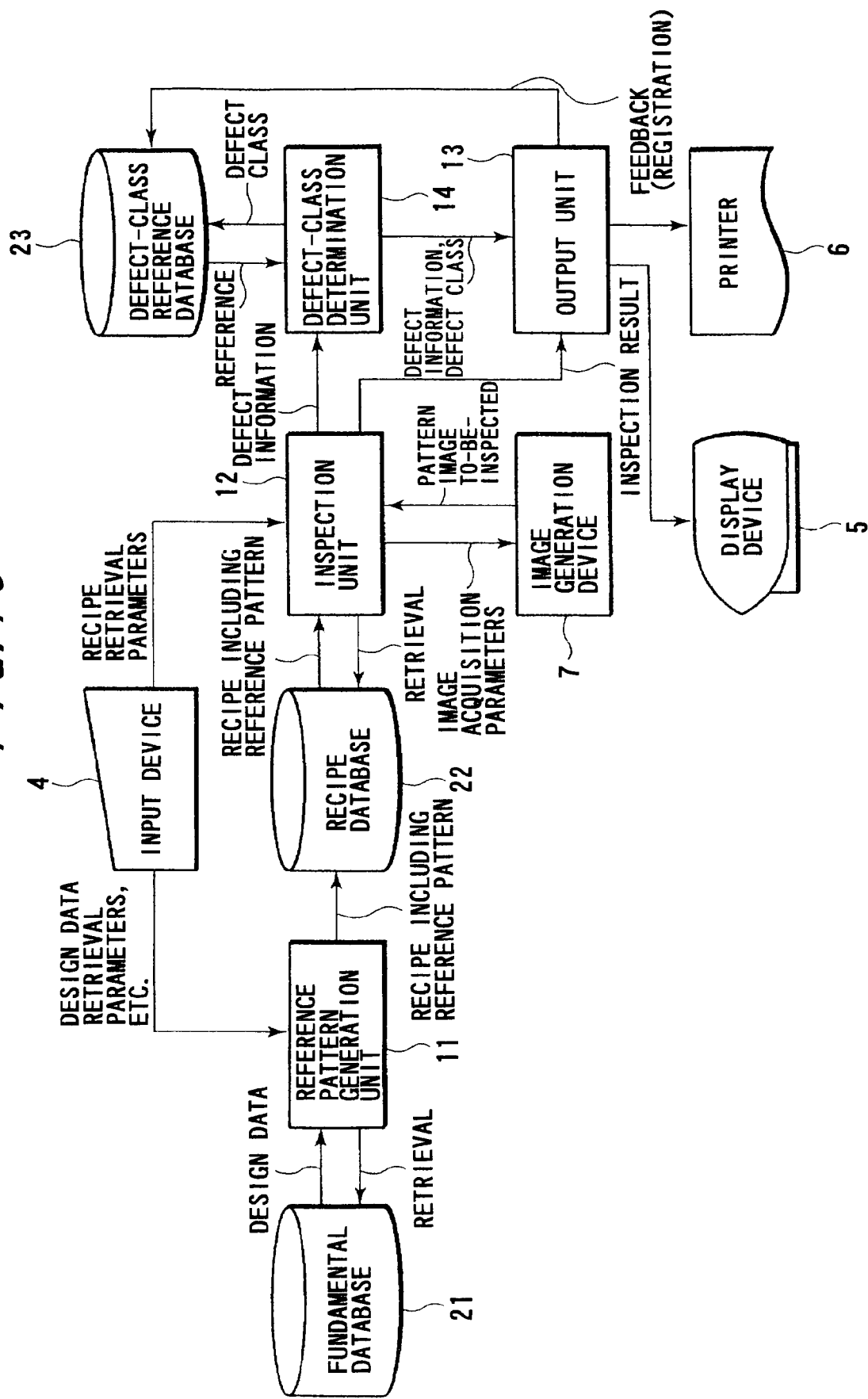

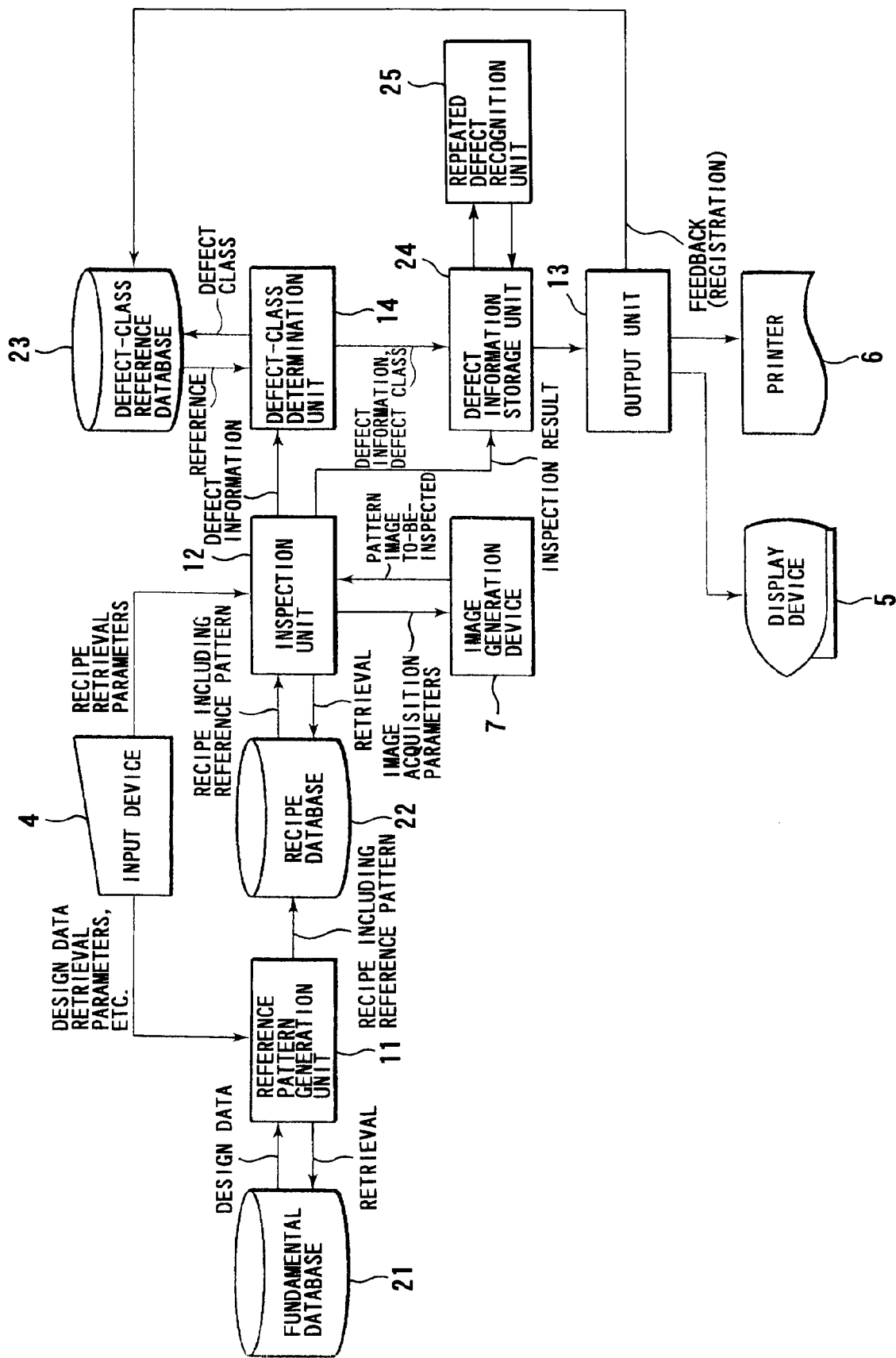

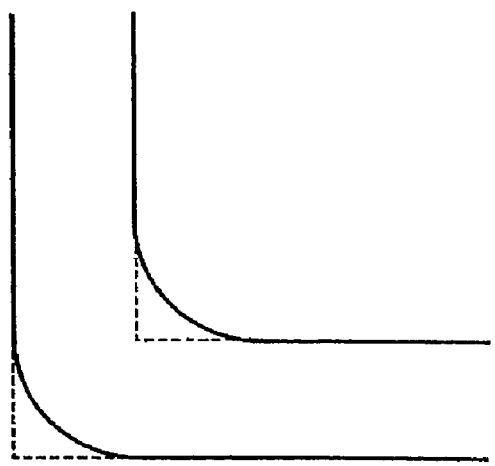
F I G. 1 8

REFERENCE PATTERN S

F I G. 24
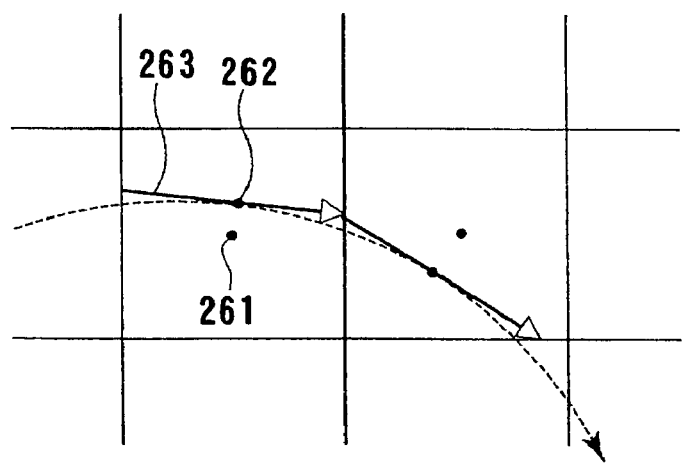

FIG. 28

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 80 | 60 | 40 | 20 | 0 | 0 | 0 | 0 |
| 100 | 100 | 100 | 80 | 60 | 40 | 20 | 0 |
| 100 | 100 | 100 | 100 | 100 | 100 | 80 | 60 |
| 100 | 100 | 100 | 100 | 100 | 100 | 100 | 100 |
| 100 | 100 | 100 | 100 | 100 | 100 | 100 | 100 |

FIG. 30

| 0 | 0 | 0 | 0 | 0 | 0 | 0 | 0 |
|---|---|---|---|---|---|---|---|
| 15 | 0 | 0 | 0 | 0 | 0 | 0 | 0 |
| 85 | 55 | 45 | 15 | 0 | 0 | 0 | 0 |
| 85 | 100 | 100 | 85 | 55 | 40 | 20 | 0 |
| 15 | 45 | 55 | 85 | 100 | 100 | 60 | 50 |
| 0 | 0 | 0 | 15 | 45 | 60 | 90 | 100 |
| 0 | 0 | 0 | 0 | 0 | 0 | 30 | 50 |
| 0 | 0 | 0 | 0 | 0 | 0 | 0 | 0 |

F I G. 3 1
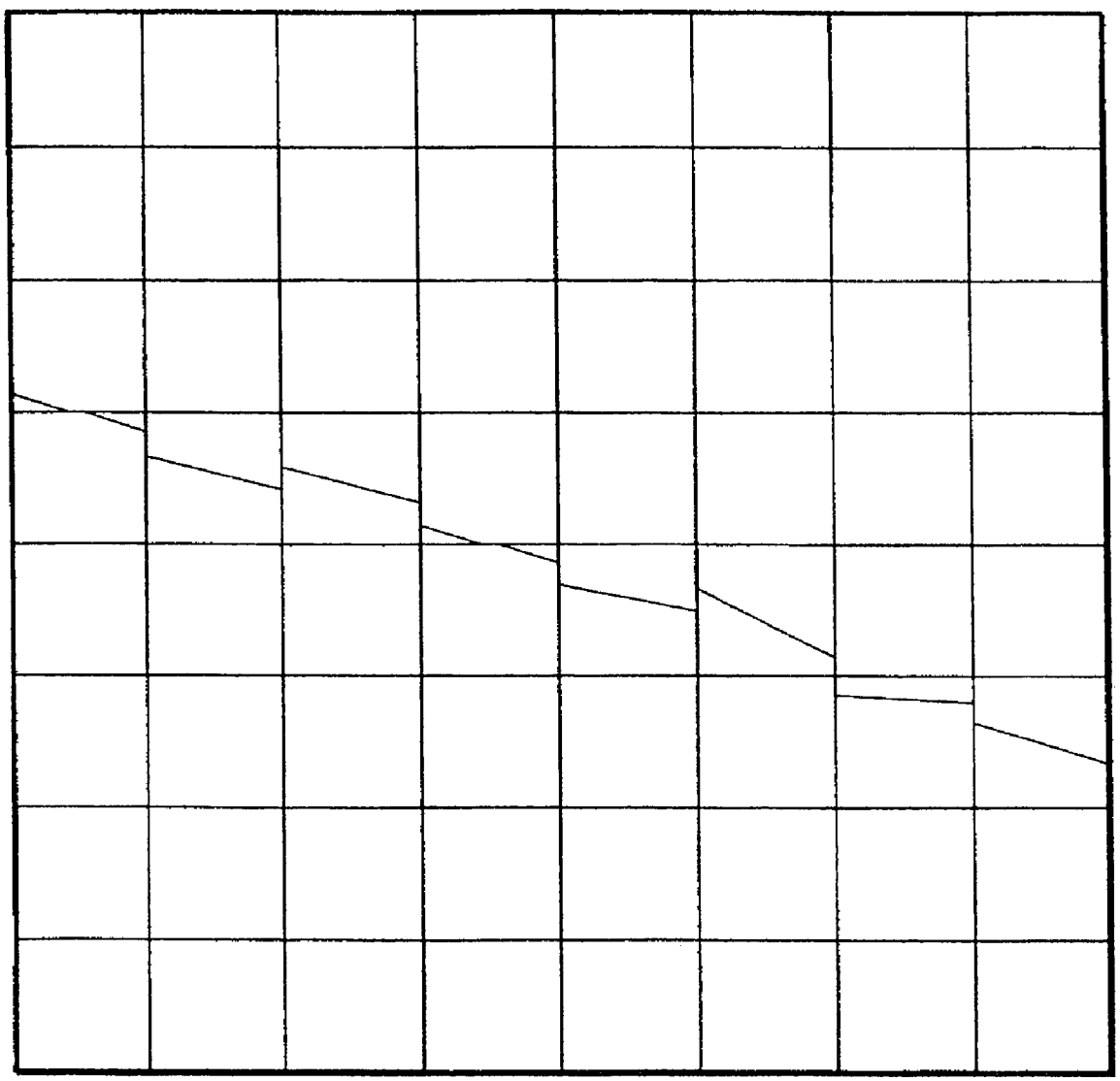

F I G. 3 2

| 0 | 0 | 0 | 20 | 0 | 0 | 0 | 0 | 0 | 0 | 20 | 0 | 0 | 0 | 0 |
|---|---|---|----|---|---|---|---|---|---|----|---|---|---|---|

F I G. 3 3

| 0 | 20 | 20 | 20 | 20 | 20 | 0 | 0 | 20 | 20 | 20 | 20 | 20 | 0 | 0 |
|---|----|----|----|----|----|---|---|----|----|----|----|----|---|---|

F I G. 3 4

| 0 | 0 | 0 | 1 | 0 | 0 | 0 | 0 | 0 | 0 | 1 | 0 | 0 | 0 | 0 |
|---|---|---|---|---|---|---|---|---|---|---|---|---|---|---|

F I G. 35

| 0 | 10 | 15 | 20 | 15 | 10 | 0 | 0 | 10 | 15 | 20 | 15 | 10 | 0 | 0 |

F I G. 36

| 0 | 0 | 1 | 0 | 0 | 0 | 0 | 0 | 0 | 0 | 0 | 1 | 0 | 0 | 0 |

F I G. 37

| 0 | 10 | 18 | 20 | 18 | 10 | 0 | 0 | 10 | 18 | 20 | 18 | 10 | 0 | 0 |

F I G. 38

| 0.5 | 0.9 | 1.0 | 0.9 | 0.5 |

| (0,0) | (0,0) | (0,0) | (20,0) | (0,0) | (0,0) | (0,0) |
|---|---|---|---|---|---|---|
| (0,0) | (0,0) | (0,0) | (20,0) | (0,0) | (0,0) | (0,0) |
| (0,0) | (0,0) | (0,0) | (20,0) | (0,0) | (0,0) | (0,0) |
| (0,0) | (0,0) | (0,0) | (0,0) | (14,14) | (0,20) | (0,20) |
| (0,0) | (0,0) | (0,0) | (0,0) | (0,0) | (0,0) | (0,0) |
| (0,0) | (0,0) | (0,0) | (0,0) | (0,0) | (0,0) | (0,0) |
| (0,0) | (0,0) | (0,0) | (0,0) | (0,0) | (0,0) | (0,0) |

| (0,0) | (0,0) | (0,0) | (0,0) | (0,0) | (0,0) | (0,0) |
|---|---|---|---|---|---|---|
| (0,0) | (0,0) | (14,14) | (14,20) | (14,20) | (14,20) | (14,20) |
| (20,0) | (20,0) | (20,14) | (20,20) | (20,20) | (20,20) | (14,20) |
| (20,0) | (20,0) | (20,14) | (20,20) | (20,20) | (20,20) | (14,20) |
| (20,0) | (20,0) | (20,14) | (20,20) | (20,20) | (20,20) | (14,20) |
| (20,0) | (20,0) | (20,14) | (20,20) | (20,20) | (20,20) | (14,20) |
| (0,0) | (20,0) | (20,0) | (20,0) | (20,0) | (20,0) | (0,0) |

251

F I G. 44
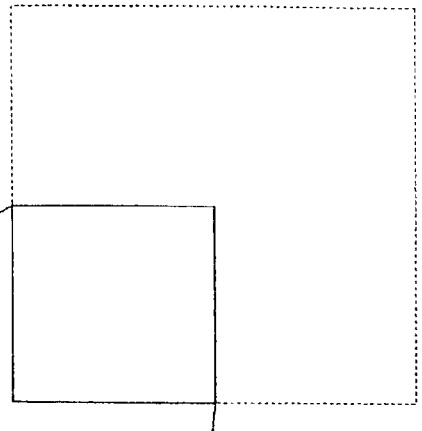
| (0,0) | (10,0) | (18,0) | (20,0) | (18,0) | (10,0) | (0,0) |
| (0,0) | (9,0) | (17,1) | (19,3) | (18,6) | (10,8) | (1,10) |
| (0,0) | (6,0) | (13,2) | (16,5) | (15,10) | (9,14) | (2,17) |
| (0,0) | (4,0) | (9,2) | (11,6) | (10,11) | (7,16) | (2,19) |
| (0,0) | (1,0) | (4,2) | (6,5) | (6,10) | (4,14) | (2,17) |
| (0,0) | (0,0) | (1,1) | (2,3) | (2,6) | (2,8) | (1,10) |
| (0,0) | (0,0) | (0,0) | (0,0) | (0,0) | (0,0) | (0,0) |

NEGATIVE PATTERN — PATTERN IMAGE TO-BE-INSPECTED
UNIQUE PATTERN

PROJECTION DATA OF UPWARD LINE SEGMENTS ONTO THE VERTICAL AXIS

PROJECTION DATA OF UPWARD LINE SEGMENTS ONTO THE HORIZONTAL AXIS

PROJECTION DATA OF UPWARD EDGE VECTORS ONTO THE VERTICAL AXIS

PROJECTION DATA OF UPWARD EDGE VECTORS ONTO THE HORIZONTAL AXIS

PATTERN IMAGE TO-BE-INSPECTED

EVALUATION VALUE

F I G. 6 0
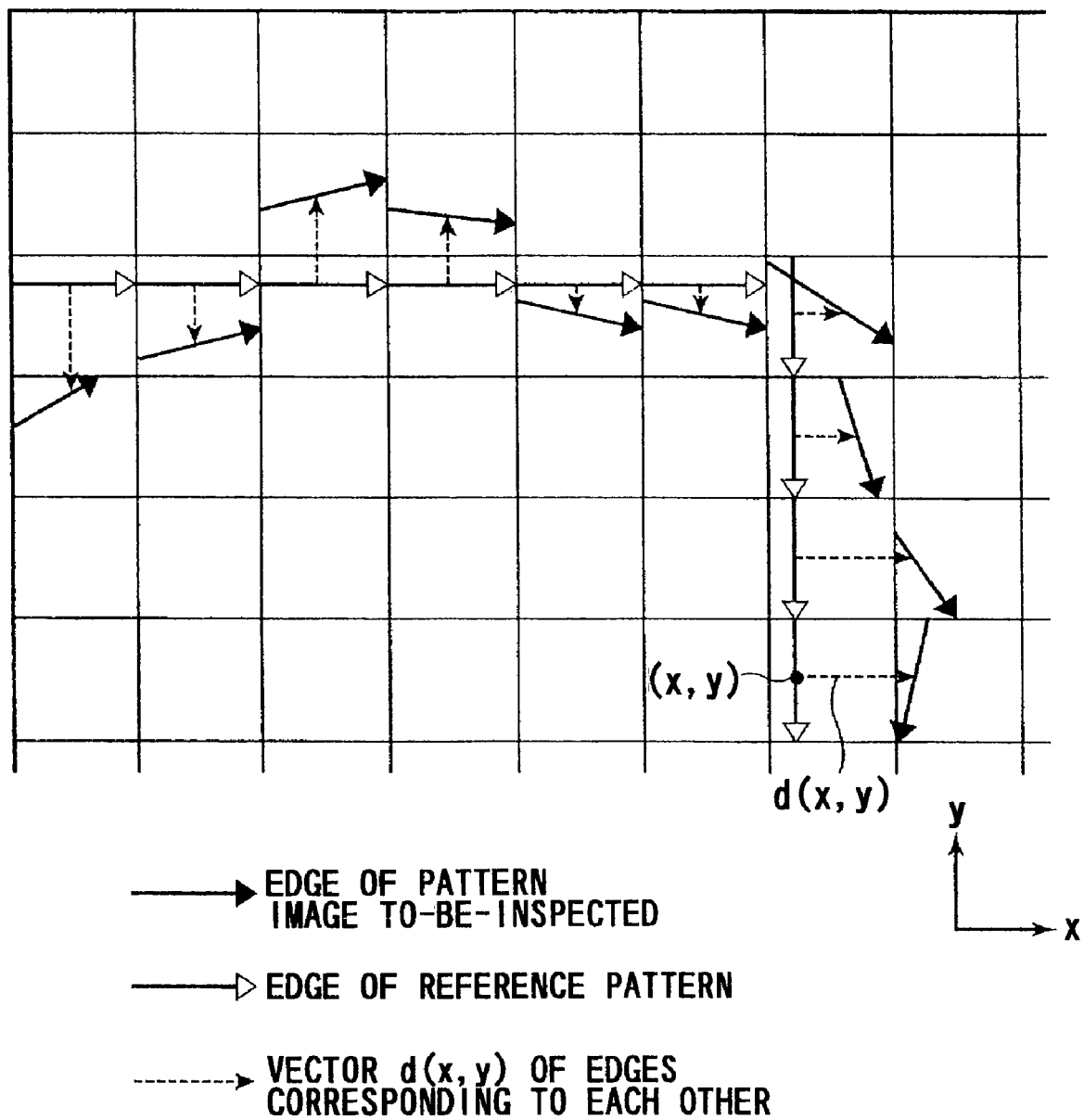

F I G. 6 1 A
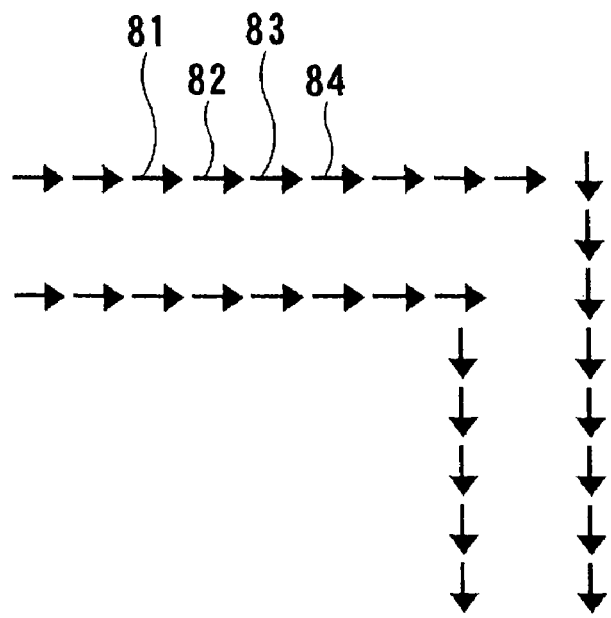
F I G. 6 1 B
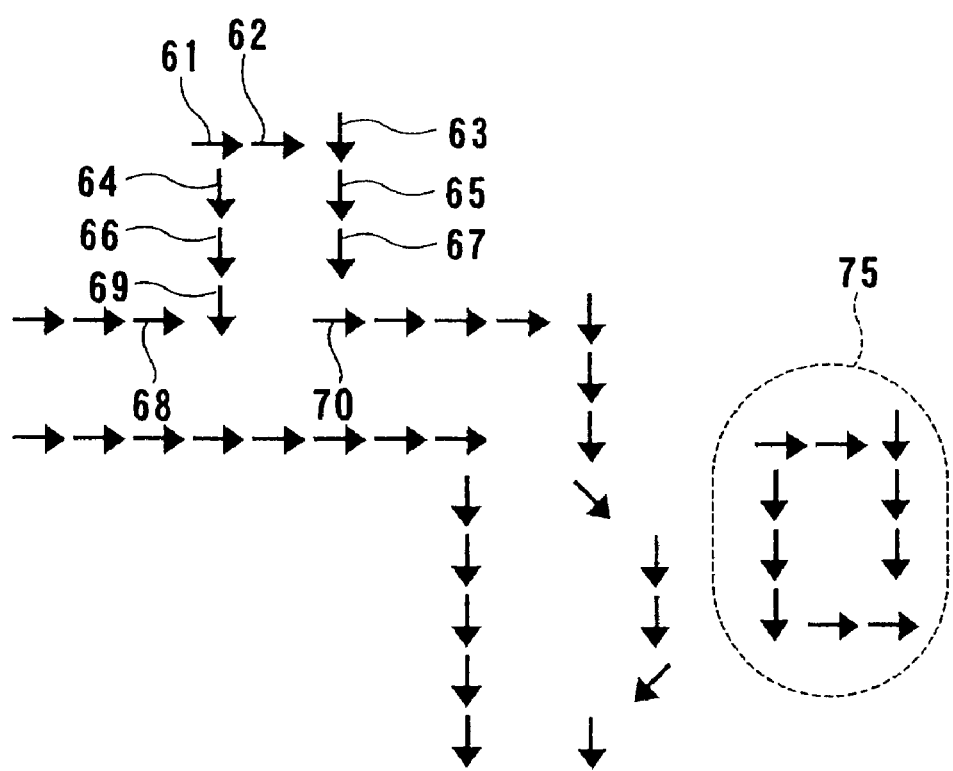

F I G. 6 3 A
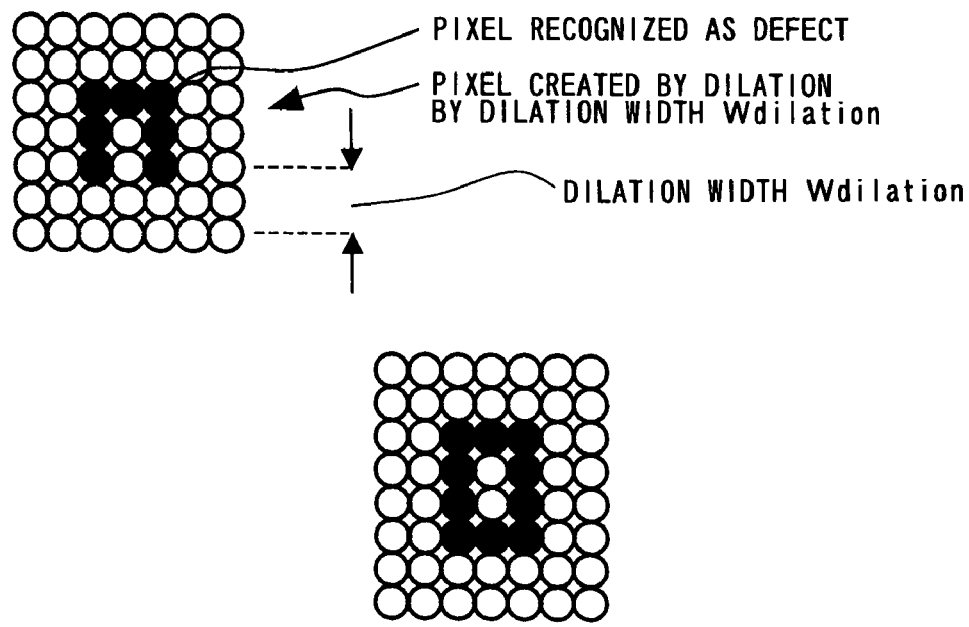
F I G. 6 3 B
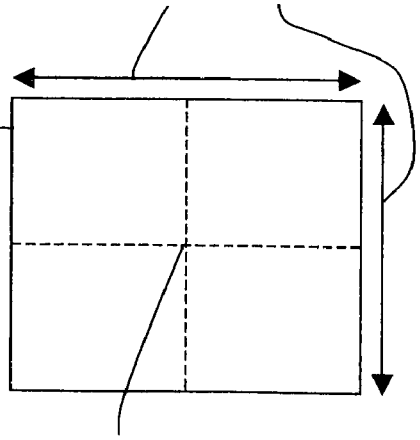

F I G. 6 6 A
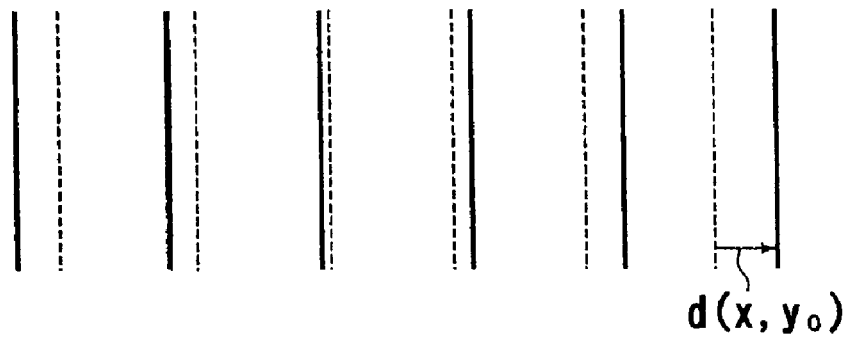
F I G. 6 6 B
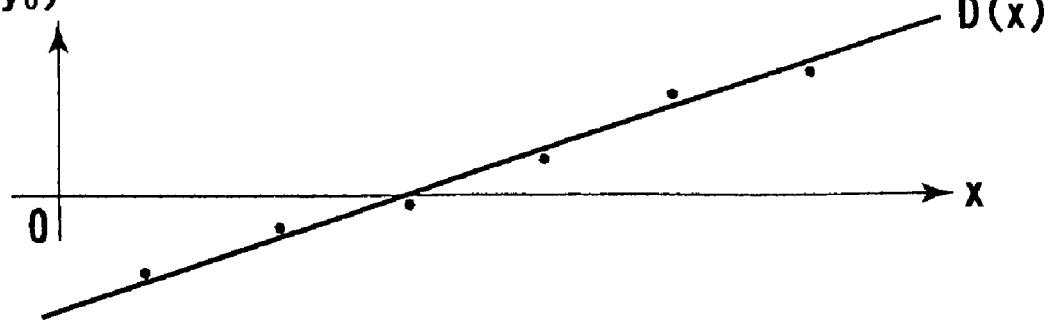

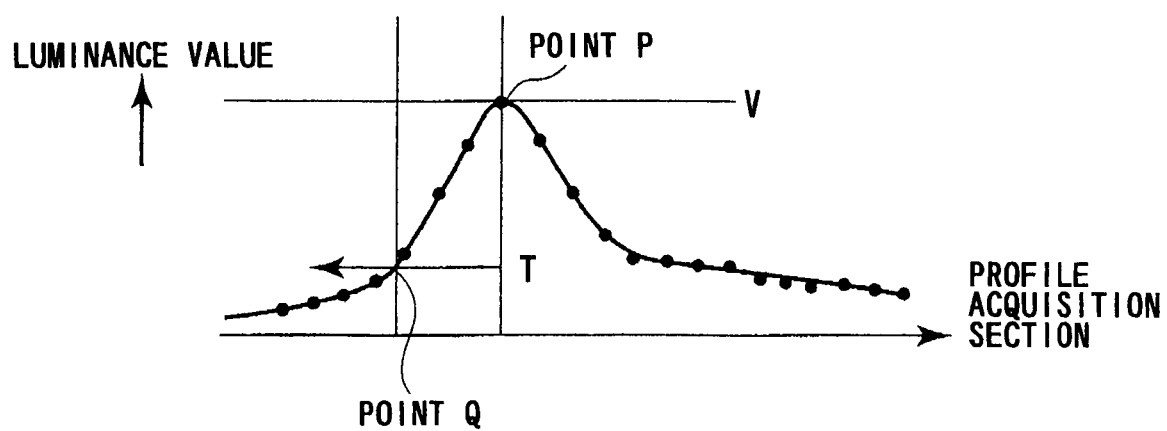
F I G. 76

PROFILE ACQUISITION SECTION

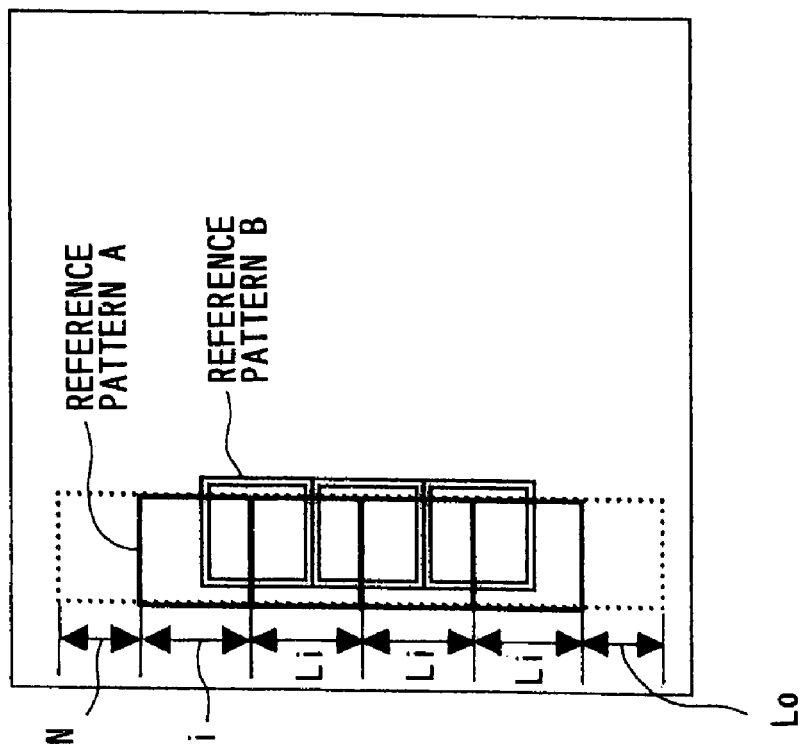
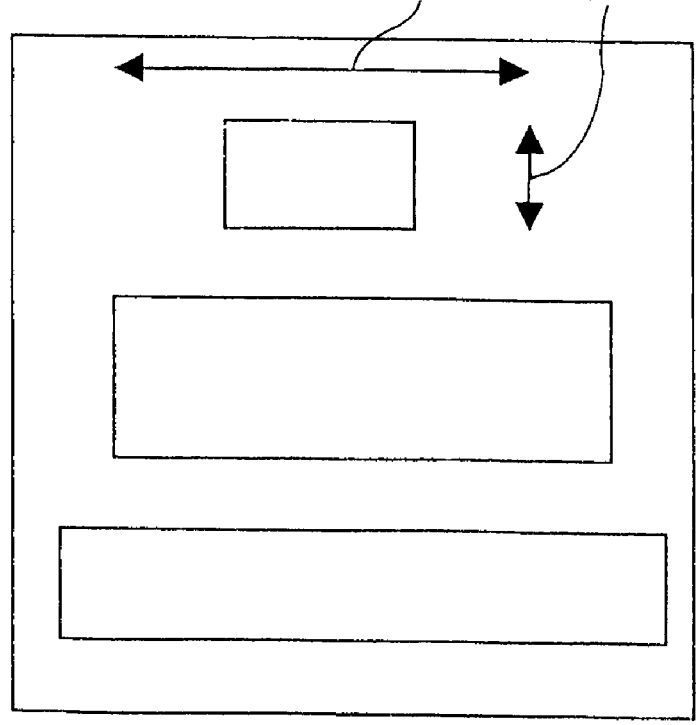
FIG. 82

L-SHAPED PATTERN

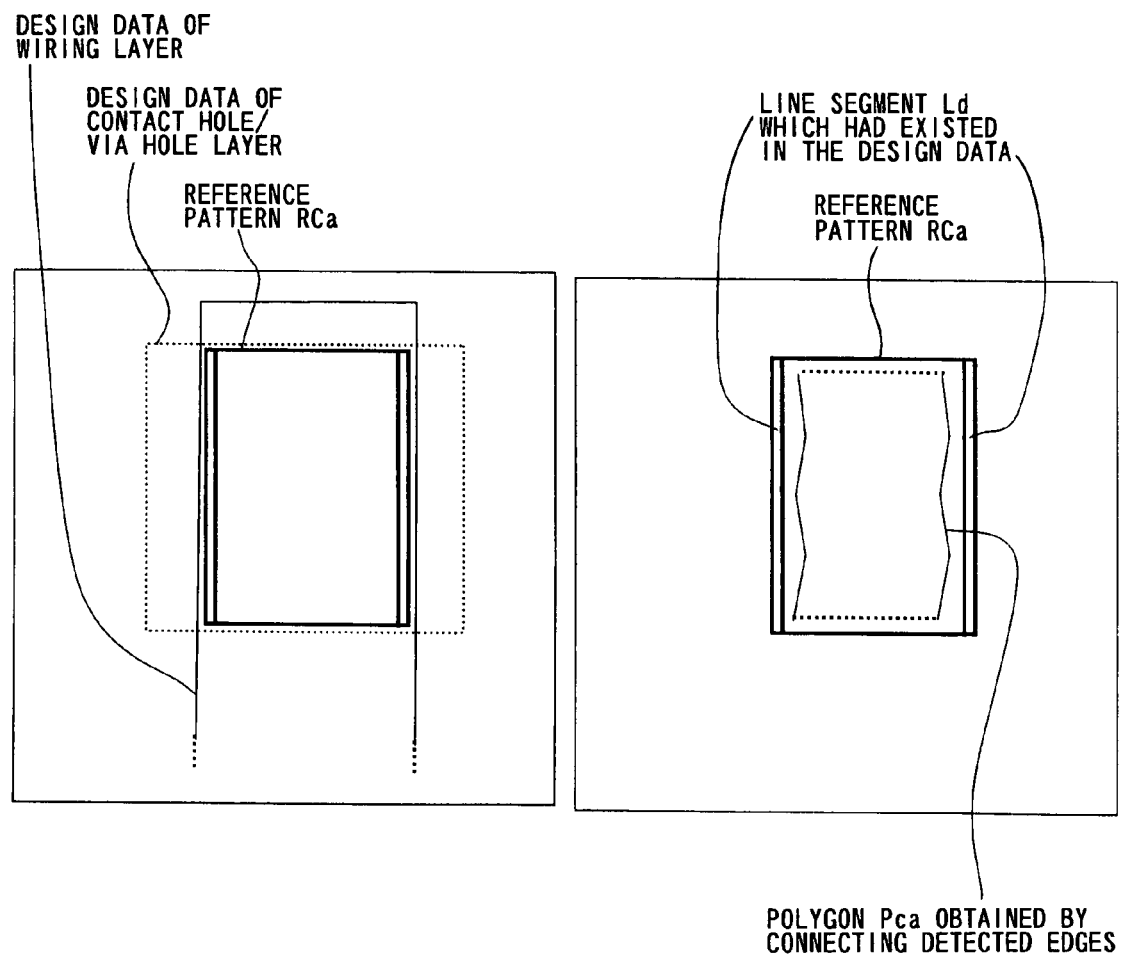

F I G. 94A
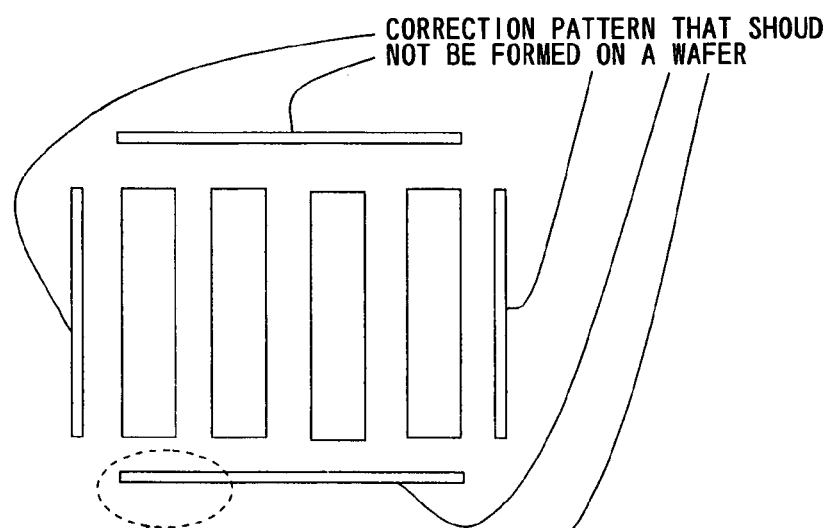
F I G. 94B
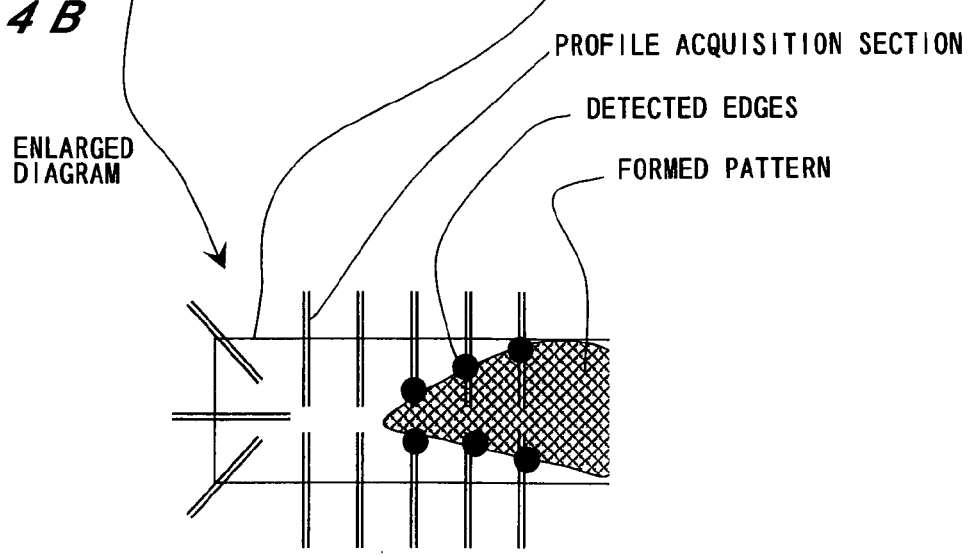

FIG. 95
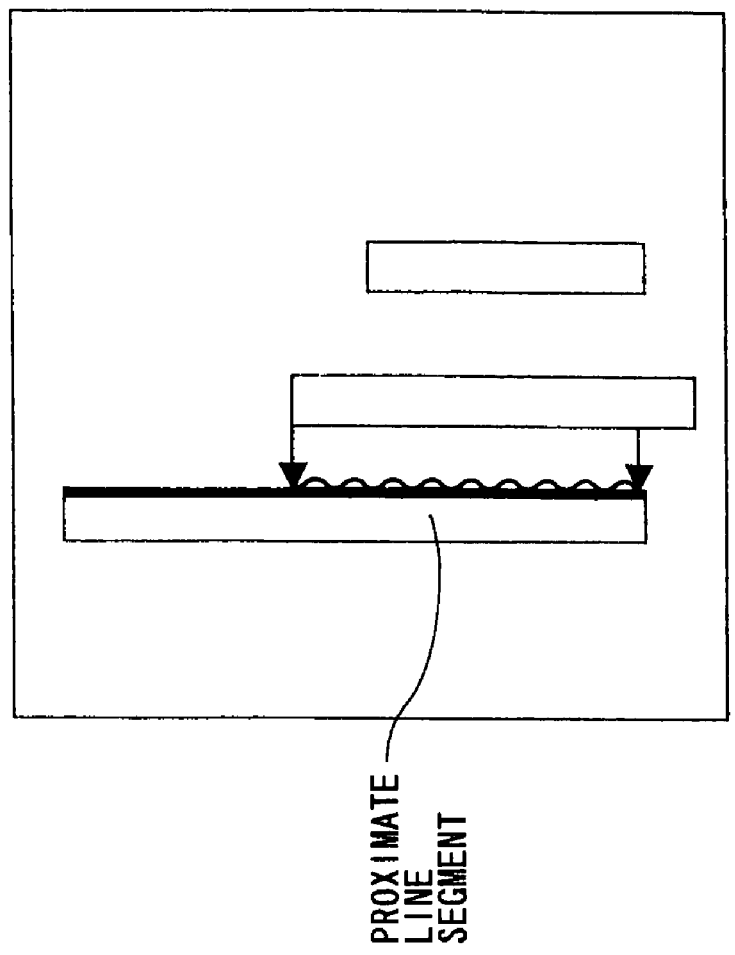
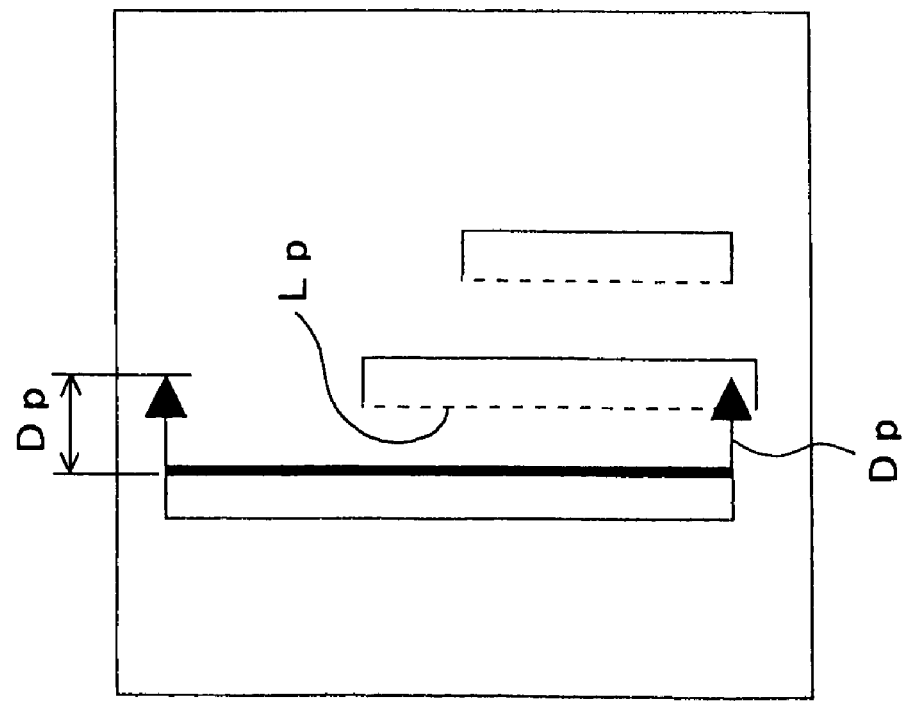

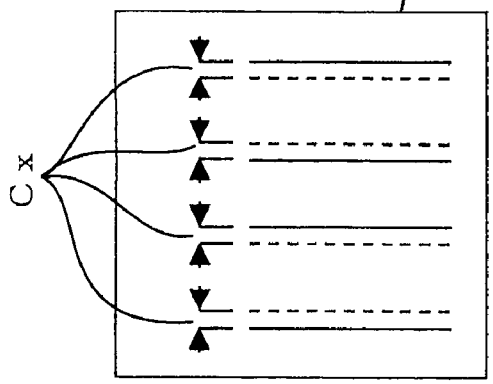
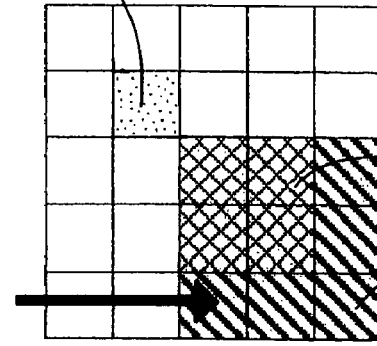
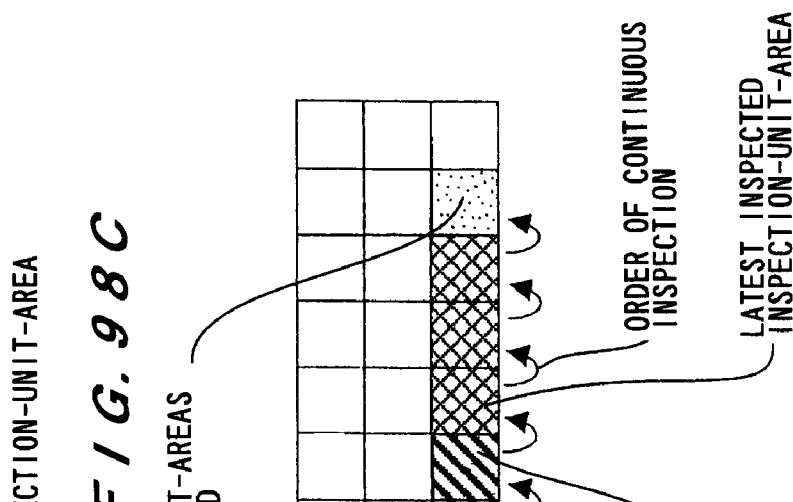
FIG. 98A
FIG. 98B
FIG. 98C

F I G. 1 0 5
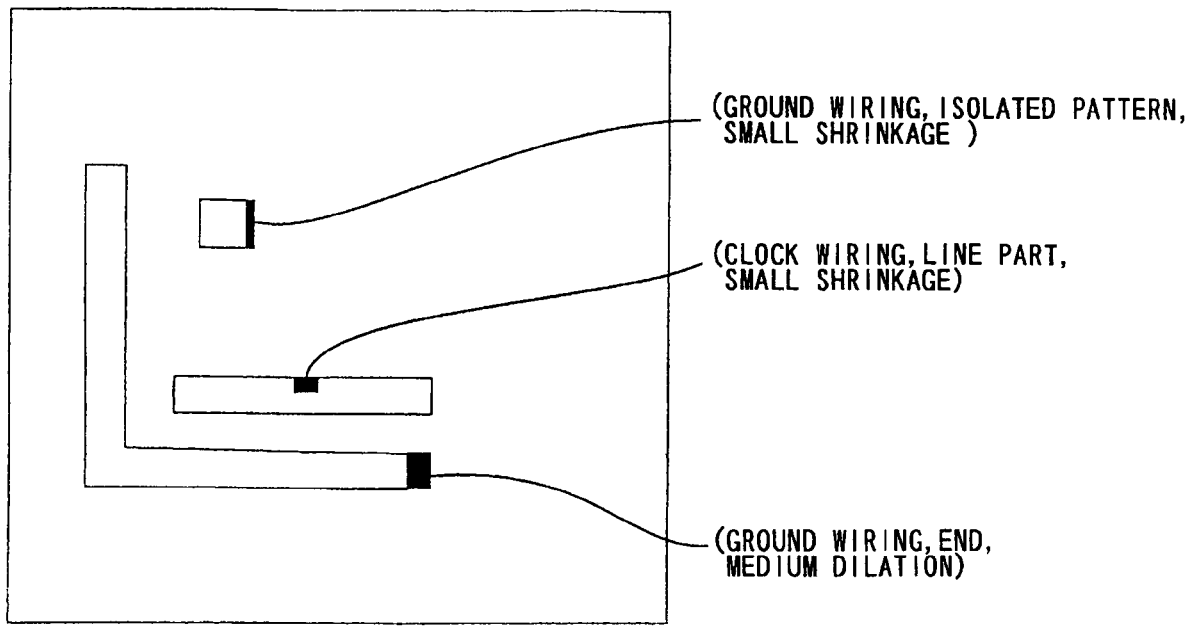

FIG. 108
TWO 100nm UPWARD
LINE-SHAPED POLYGONS
ONE 100nm SHORT
HORIZONTAL
LINE-SHAPED POLYGON
ONE 100nm UPWARD
LINE-SHAPED POLYGON
ONE 100nm DOWNWARD
LINE-SHAPED POLYGON
ONE 100nm SHORT
HORIZONTAL
LINE-SHAPED POLYGON
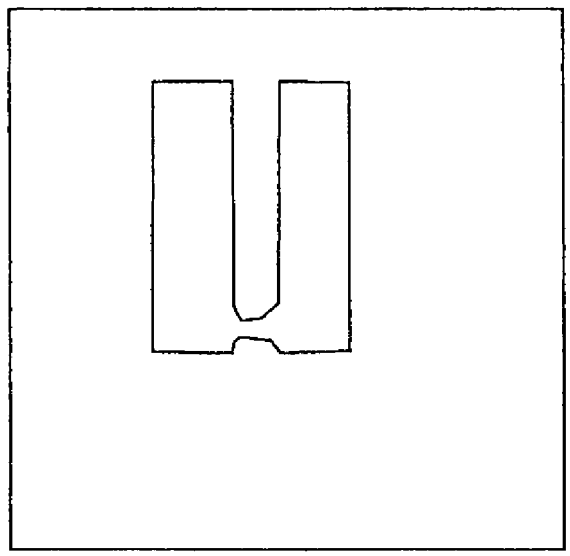
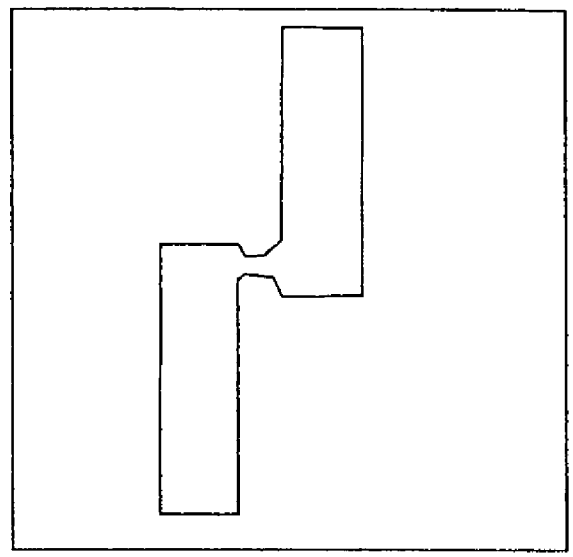

DEFECT
DISTRIBUTION DIAGRAM

P2
P1

ELECTRON BEAM

F I G. 1 1 4
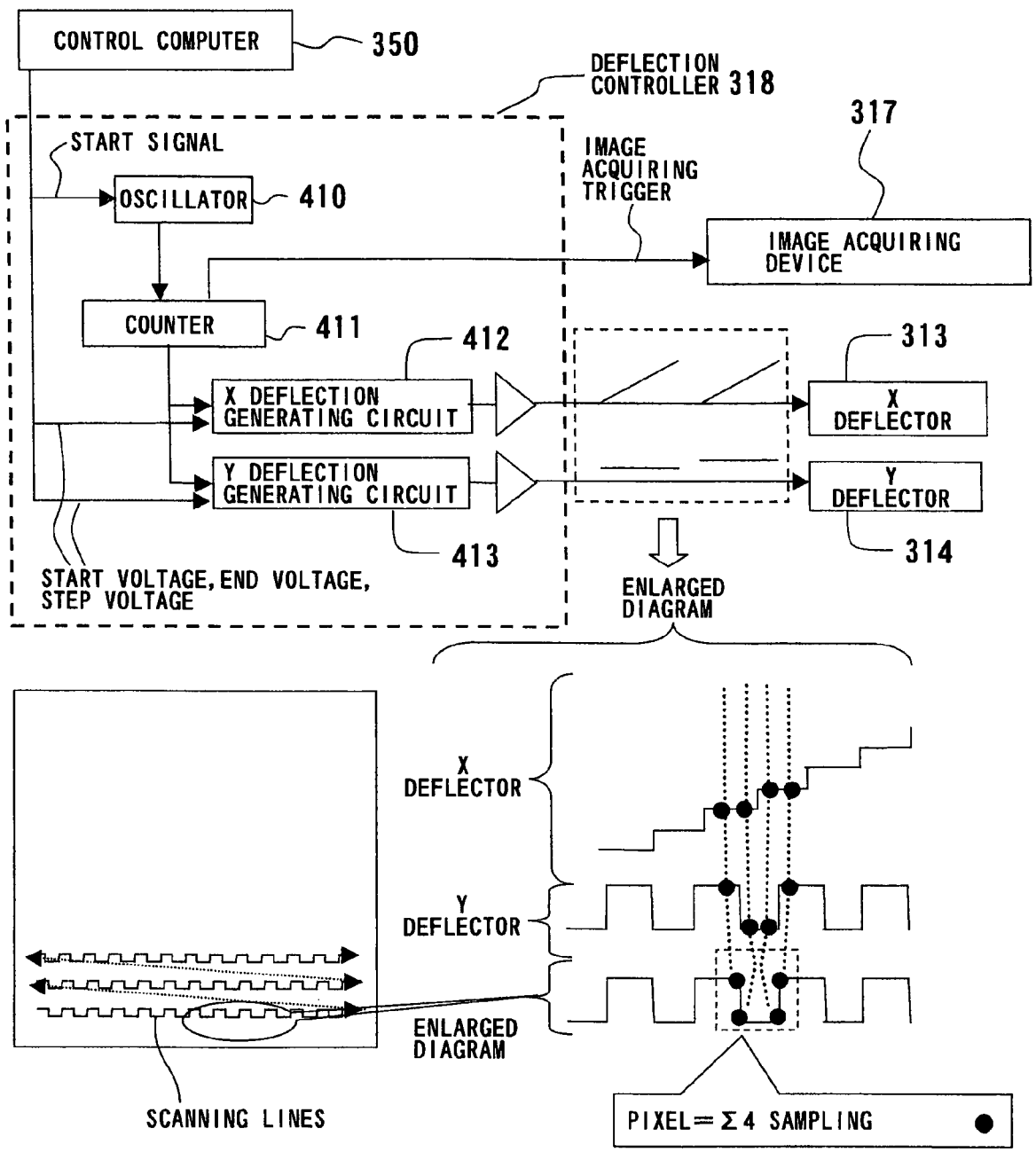

F I G. 1 1 5
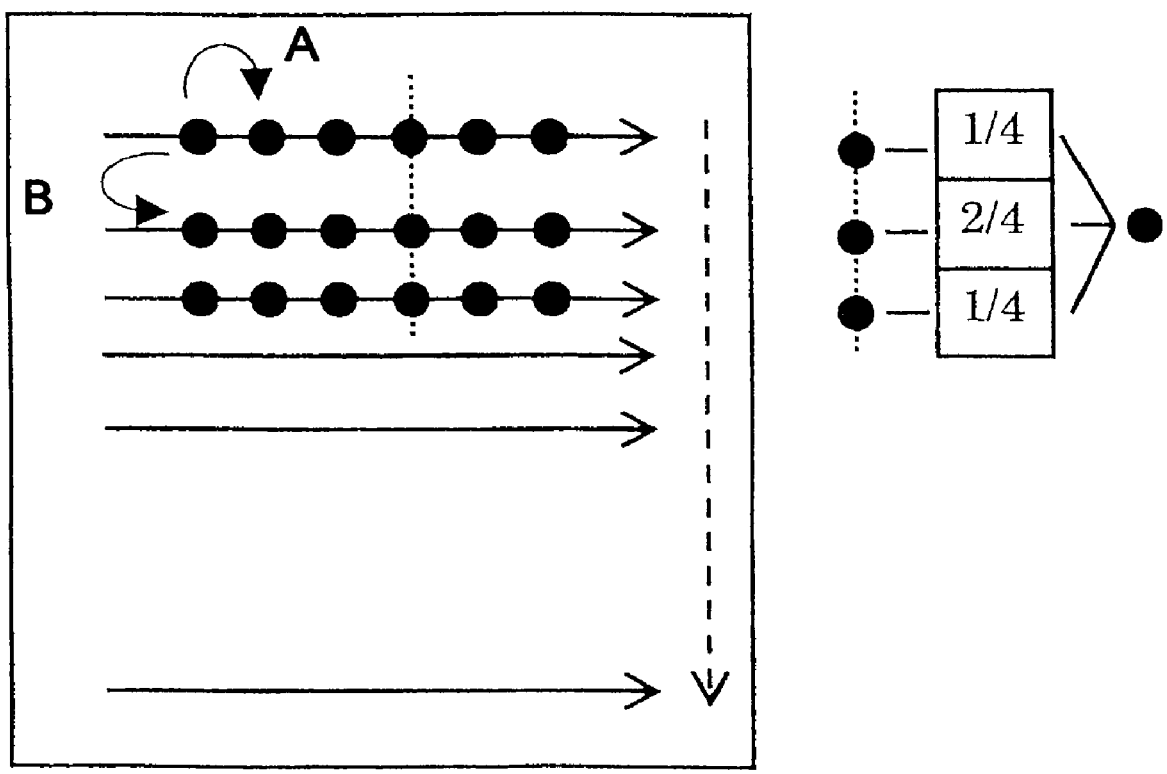

FIG. 116
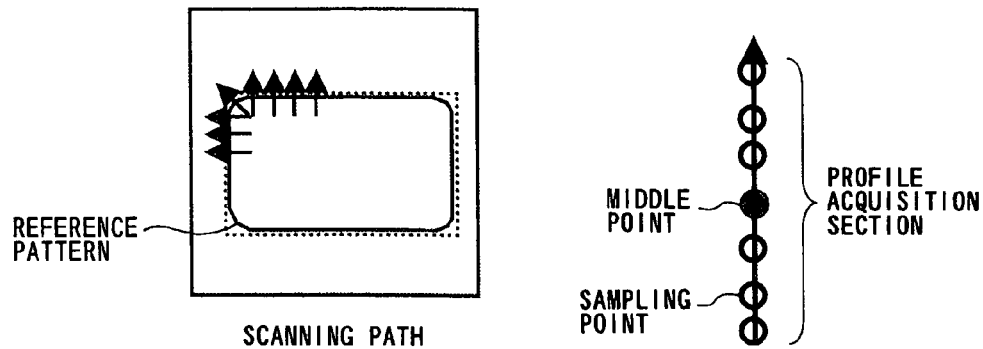
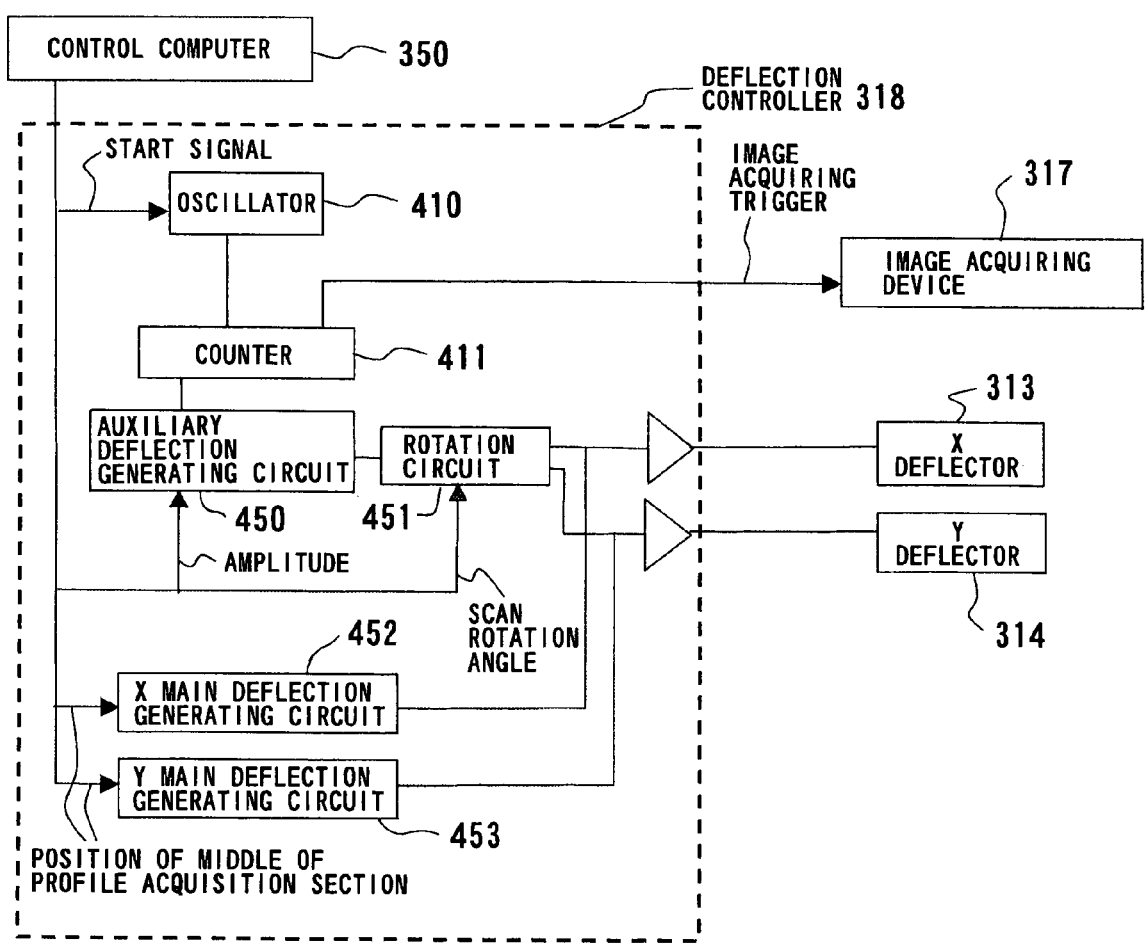

SKIPPING 2

RANDOM NUMBERS

REFERENCE PATTERN K SUITABLE FOR LINE WIDTH INSPECTION

PARTIAL REGION Sa
PARTIAL REGION Sb
LENGTH L OF PROFILE ACQUISITION SECTION

THE MINIMUM RECTANGULAR R INCLUDING REFERENCE PATTERN K
PARTIAL REGION Sc

F I G. 1 2 0
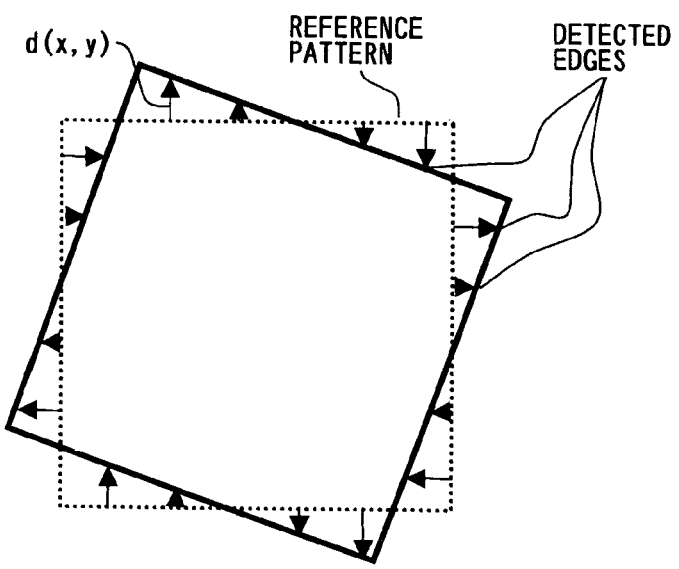
F I G. 1 2 1
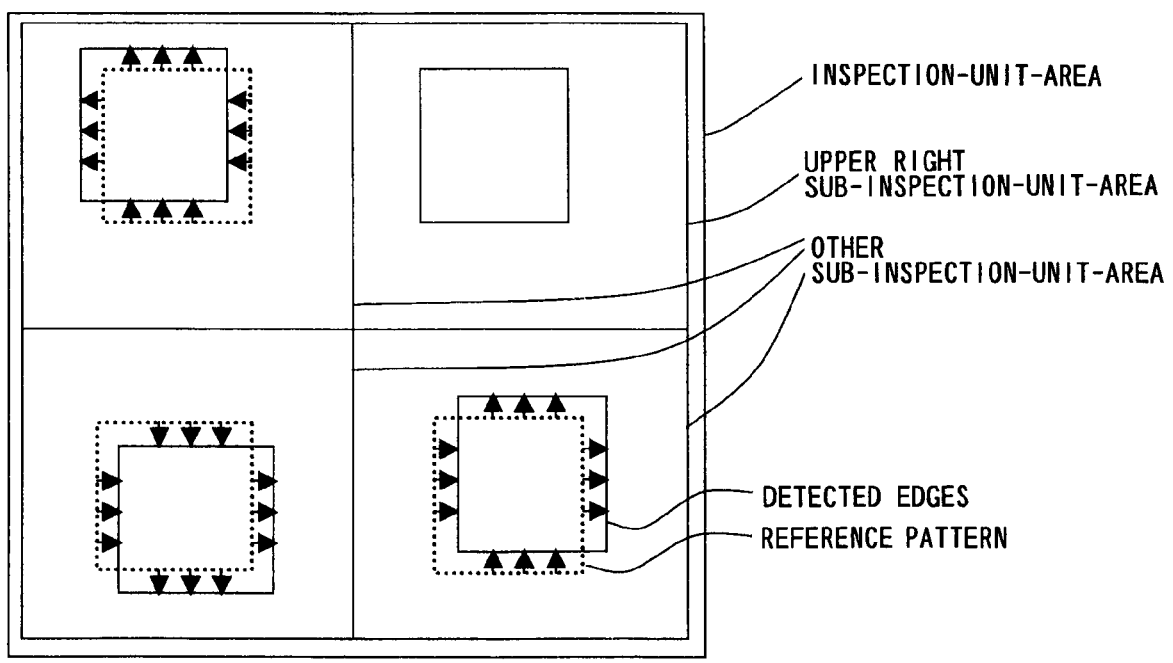

FIG. 122
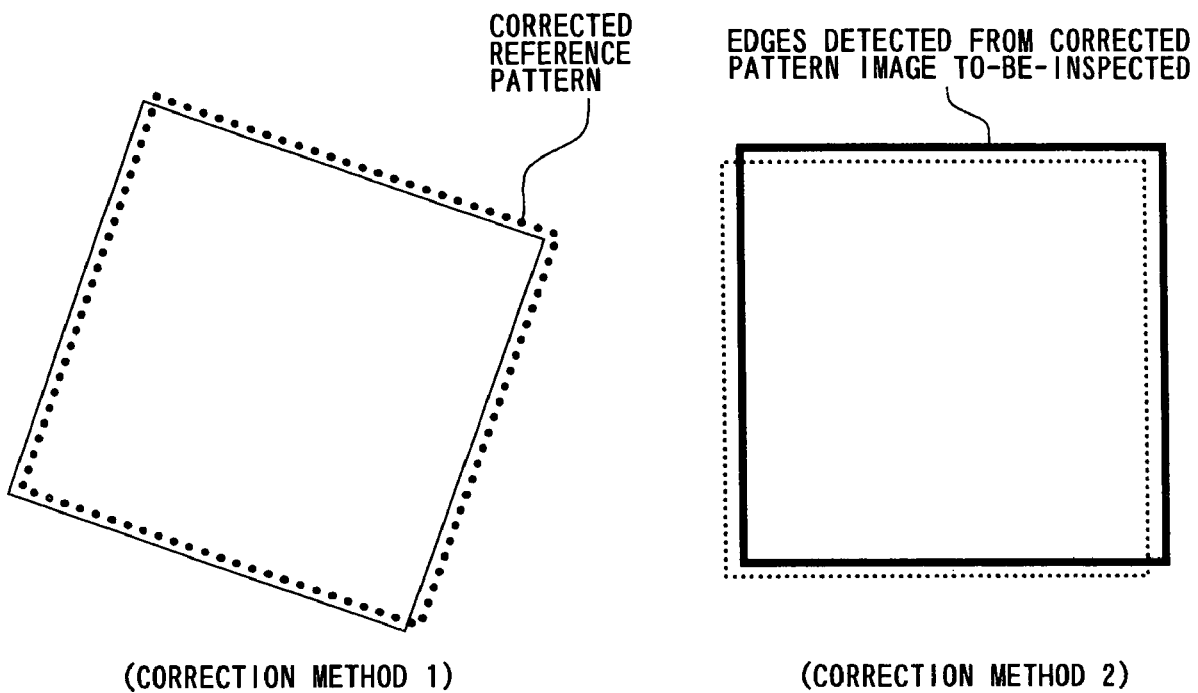
(CORRECTION METHOD 1)
(CORRECTION METHOD 2)
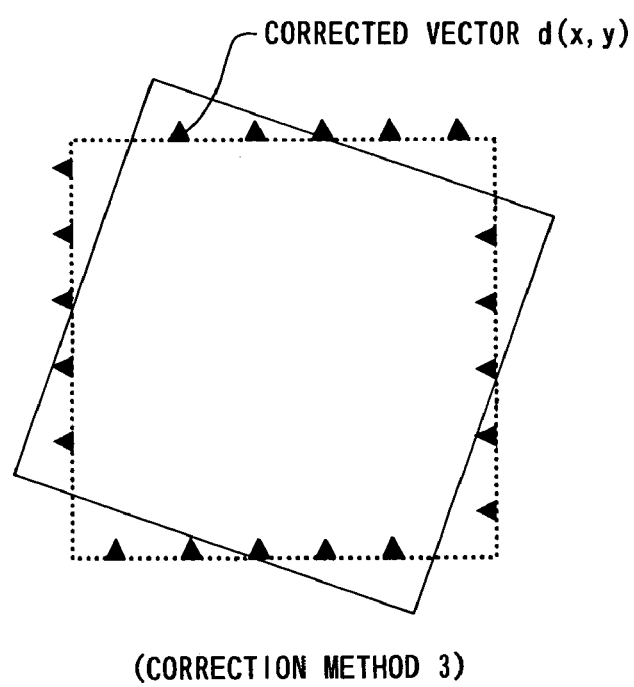
(CORRECTION METHOD 3)

F I G. 1 2 5
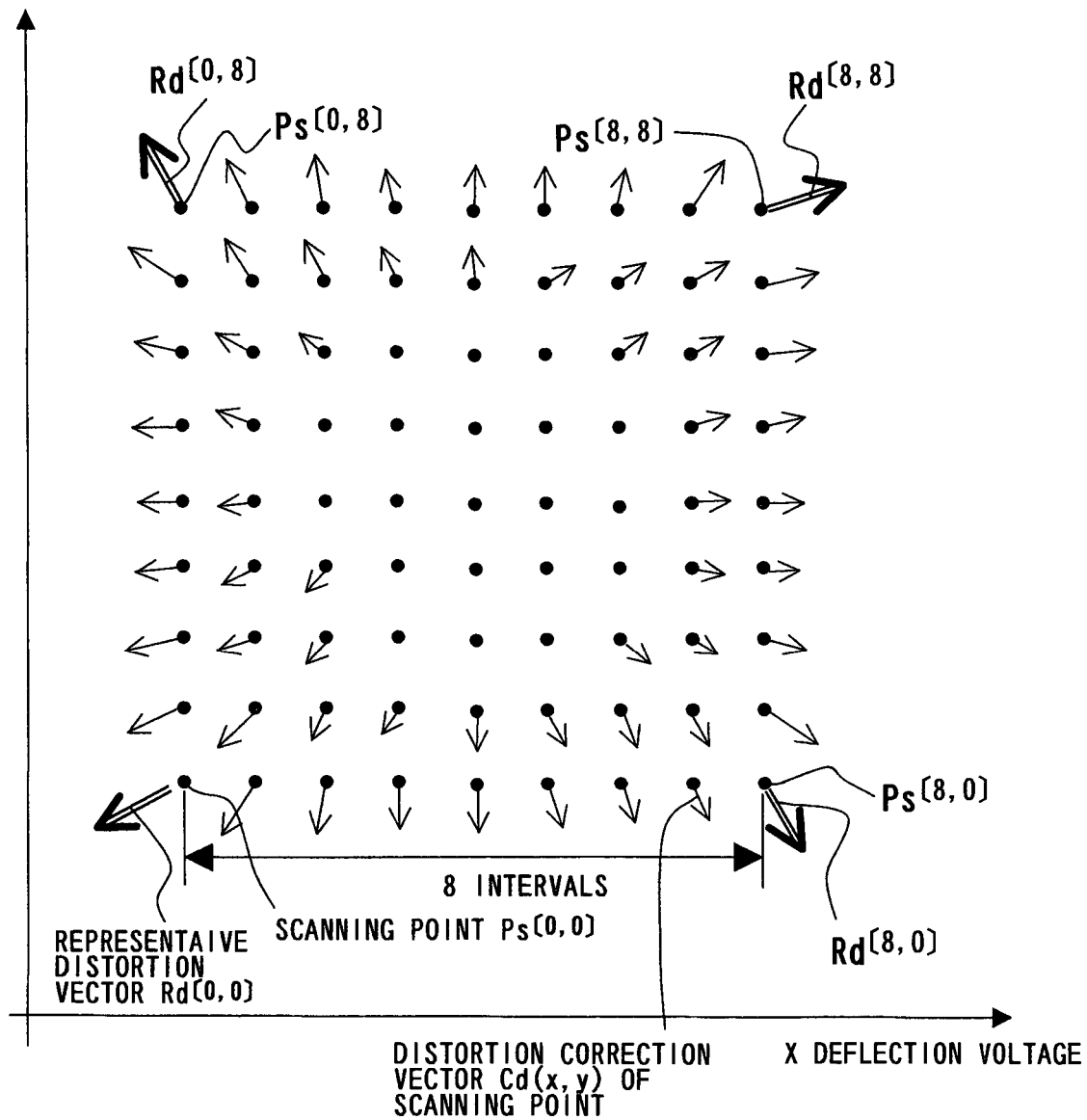

F I G. 1 2 8 A
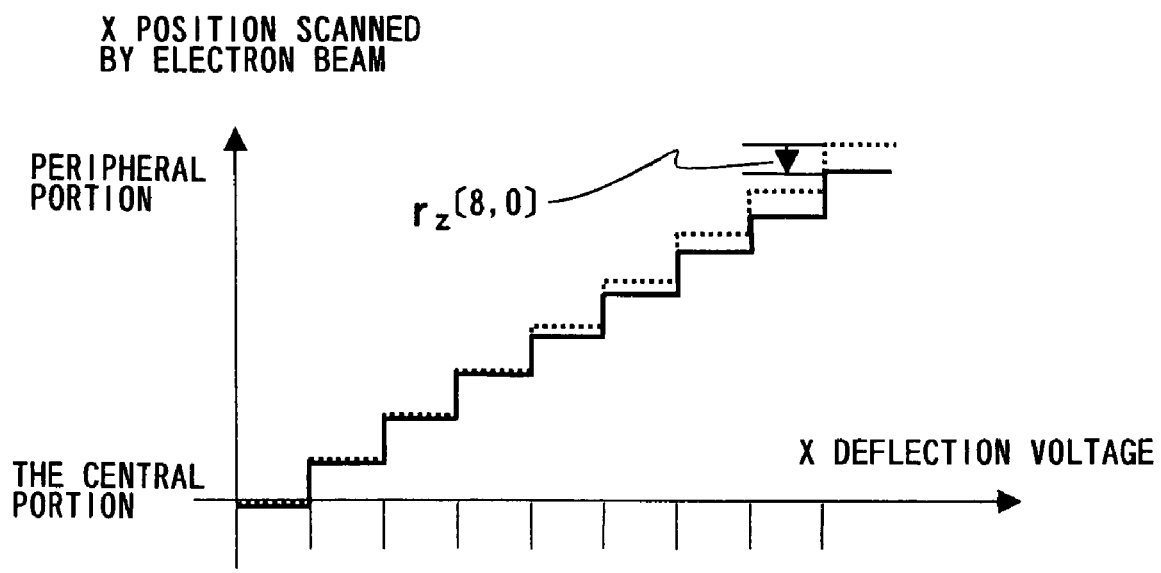
F I G. 1 2 8 B
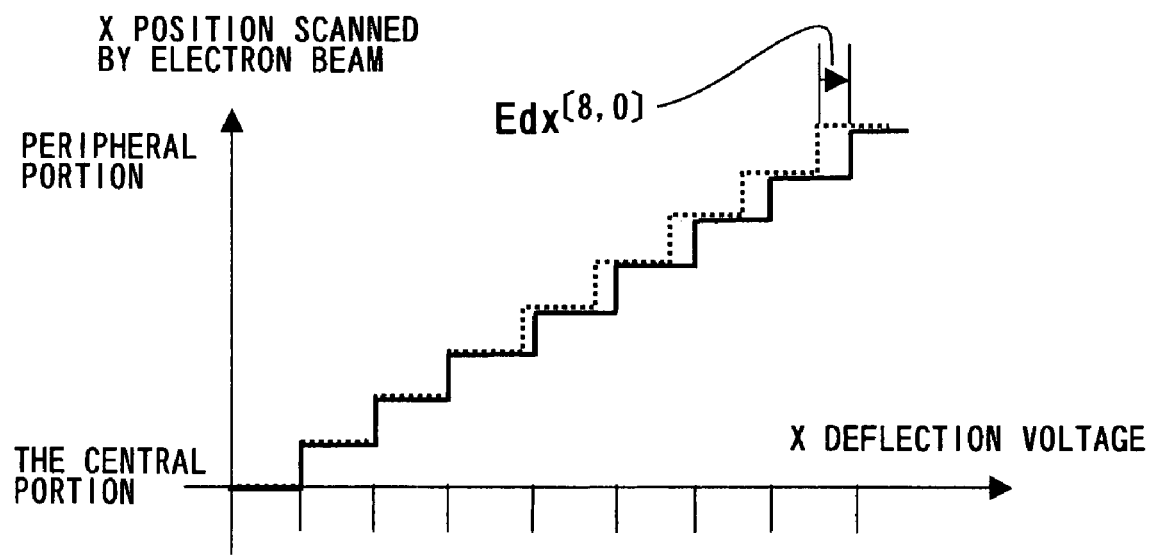

F I G. 1 3 1
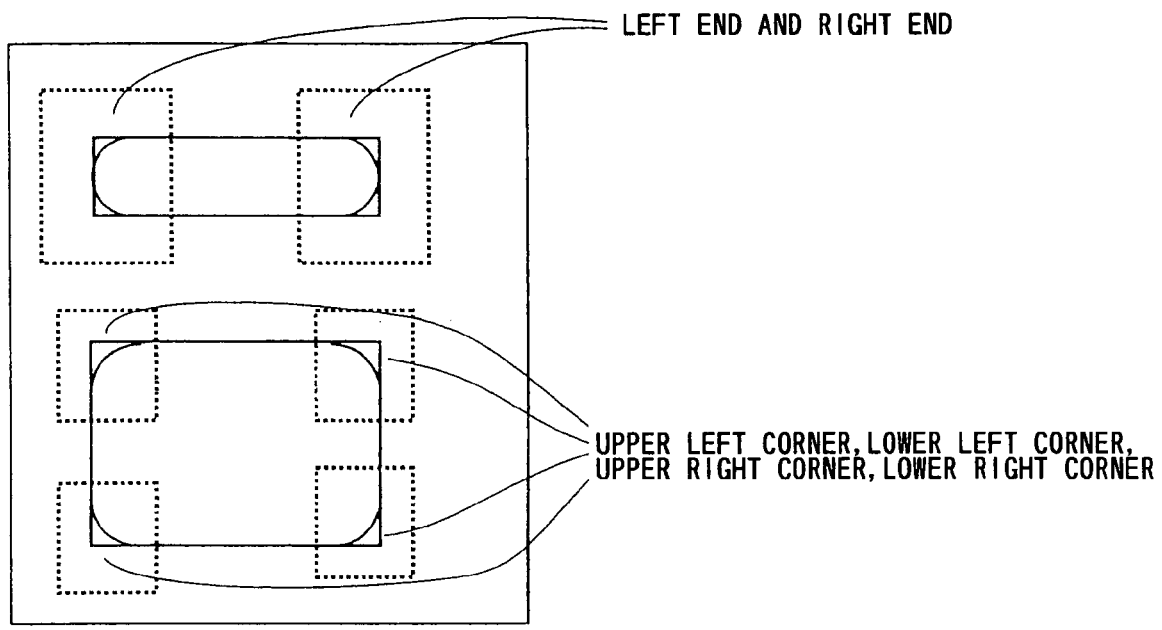

F I G. 1 3 3
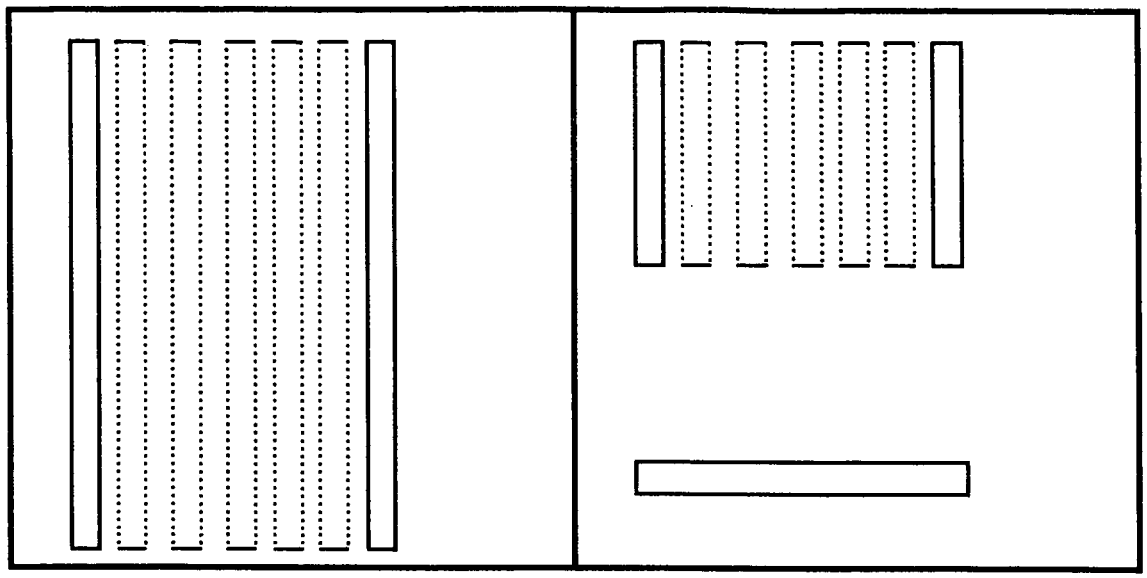

F I G. 1 3 5
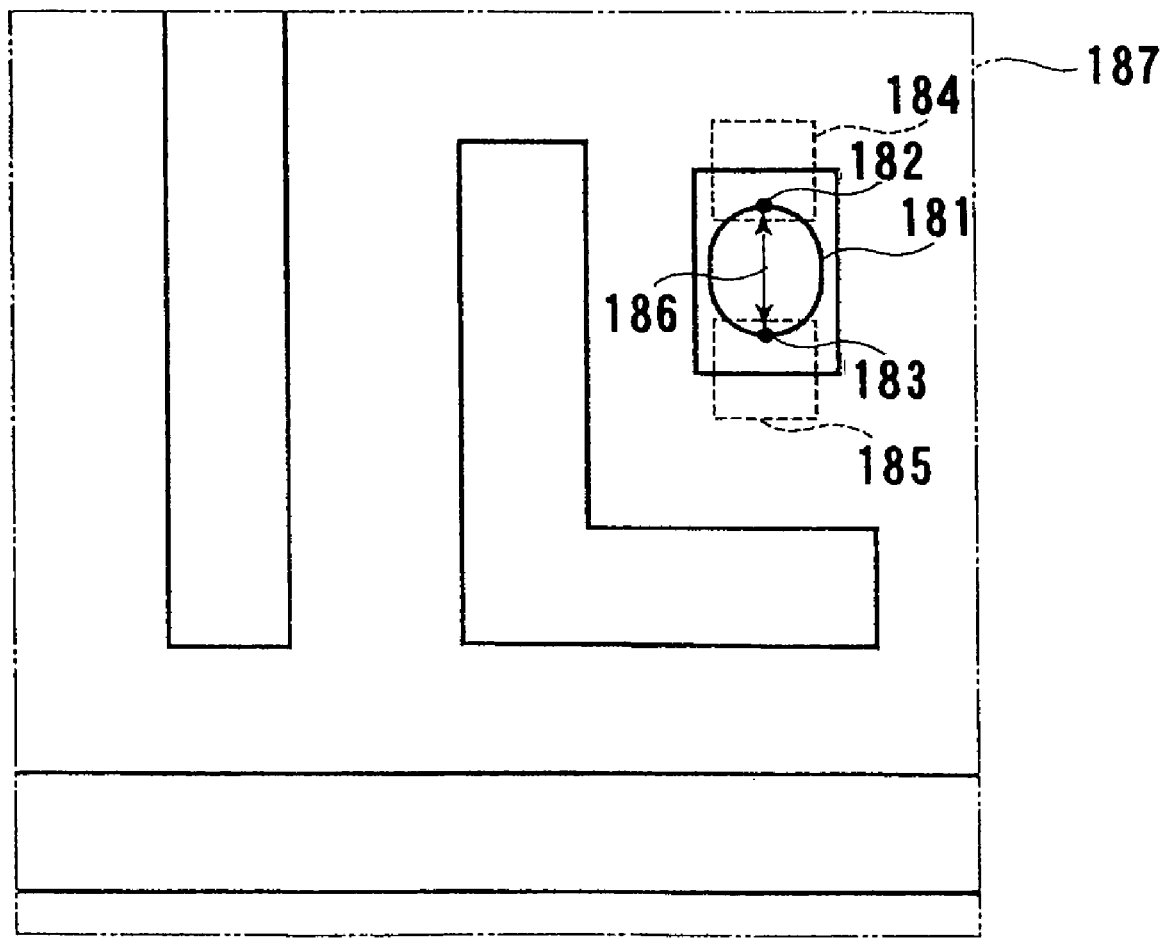

F I G. 1 3 6
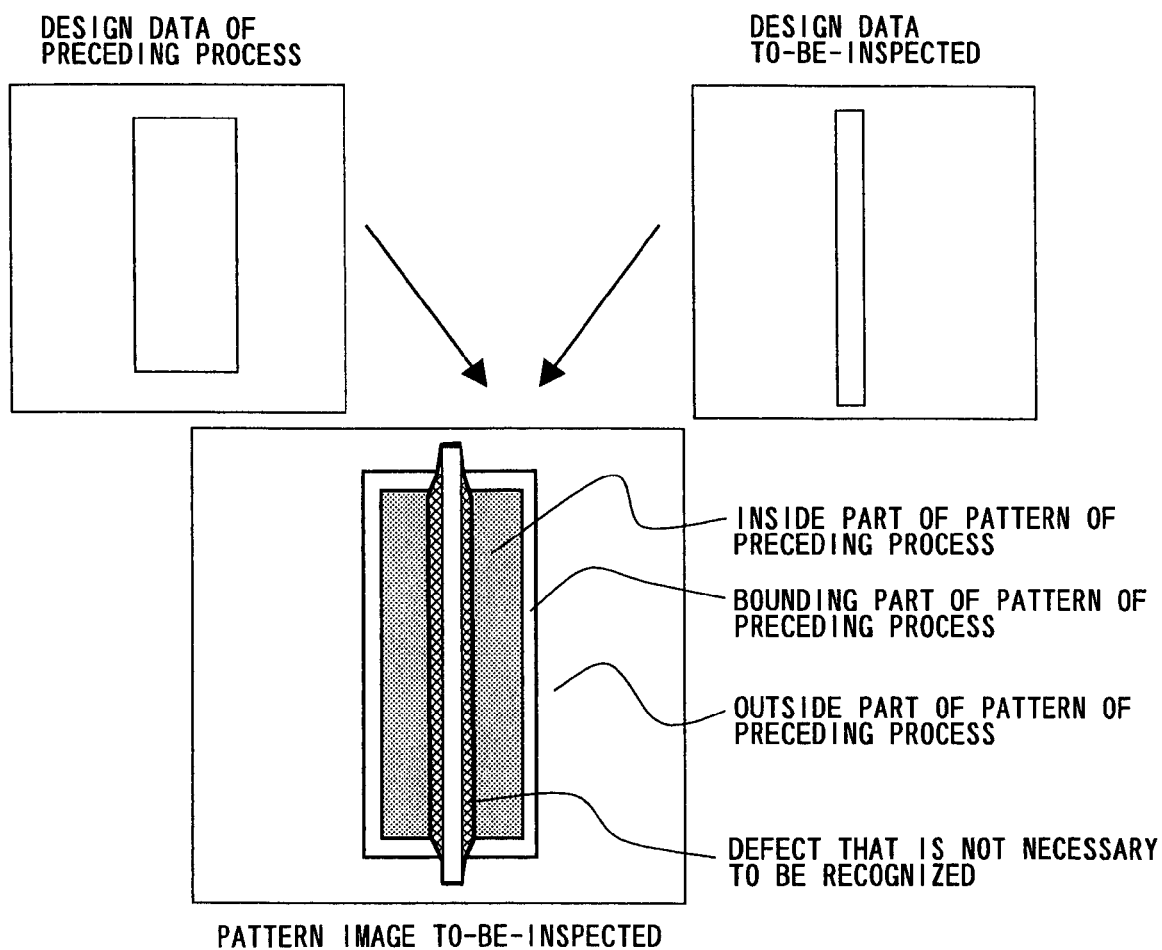

F I G. 1 3 7
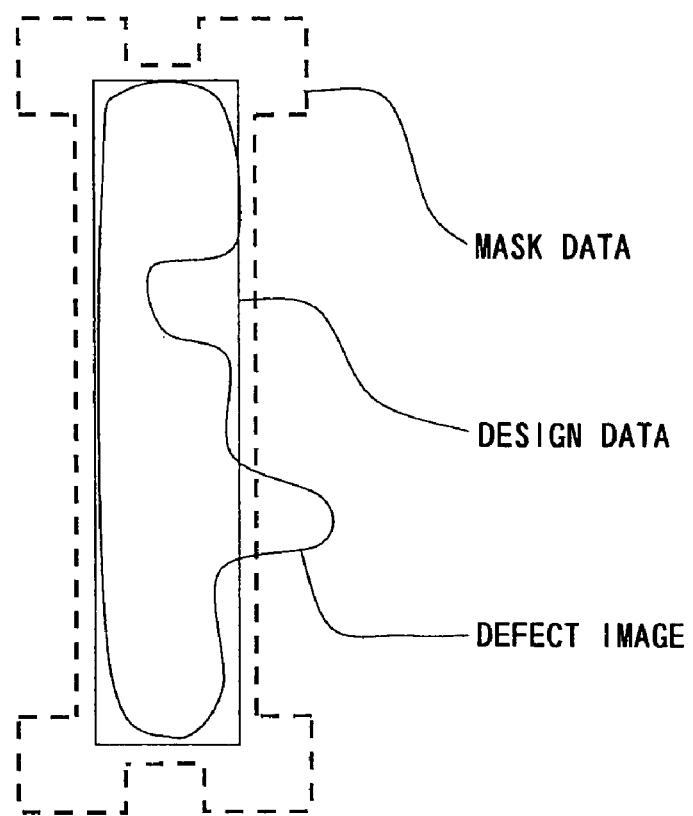

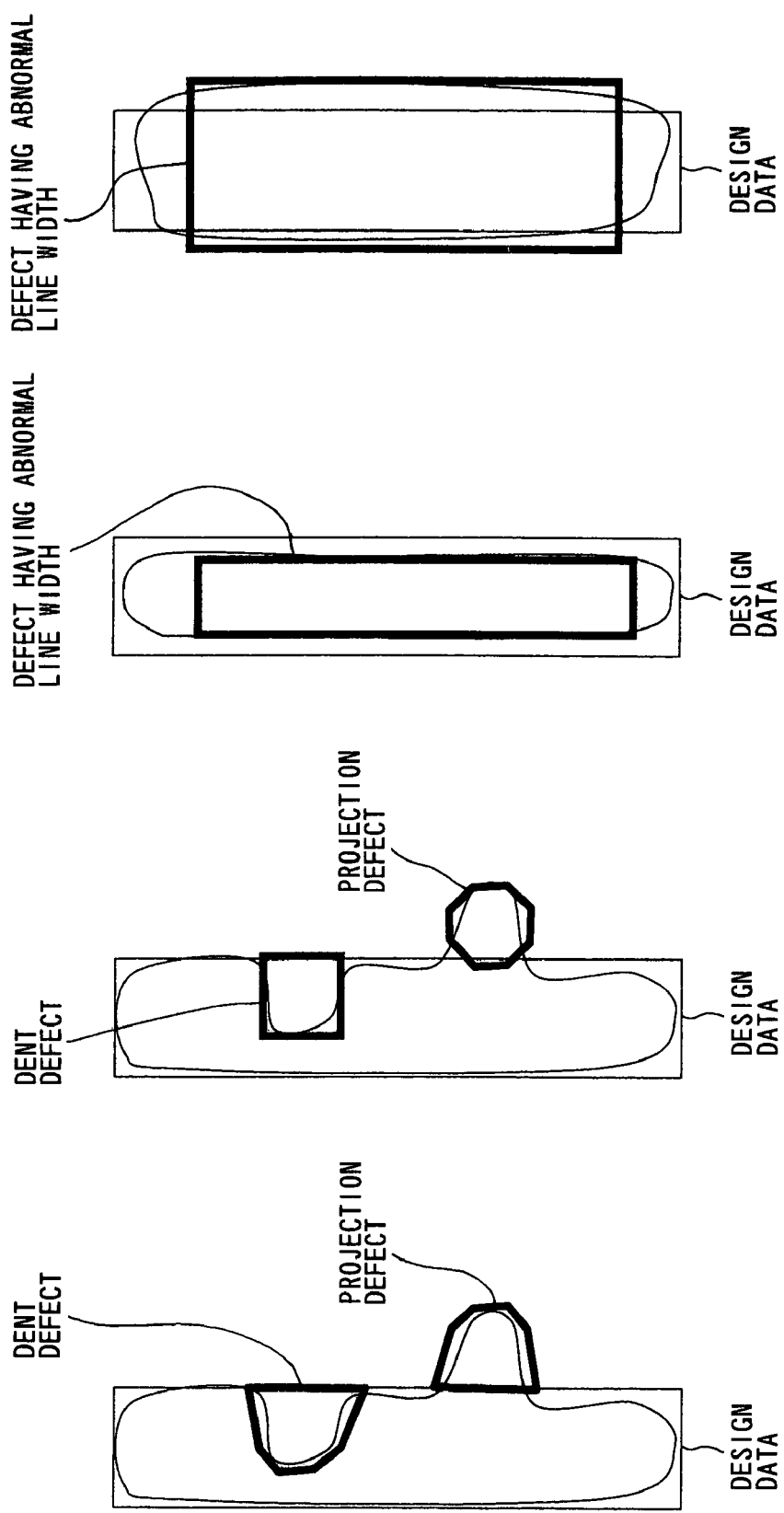

FIG. 140A THERMAL OXIDATION
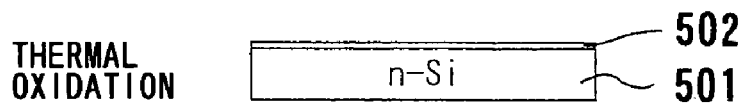
FIG. 140B RESIST COAT
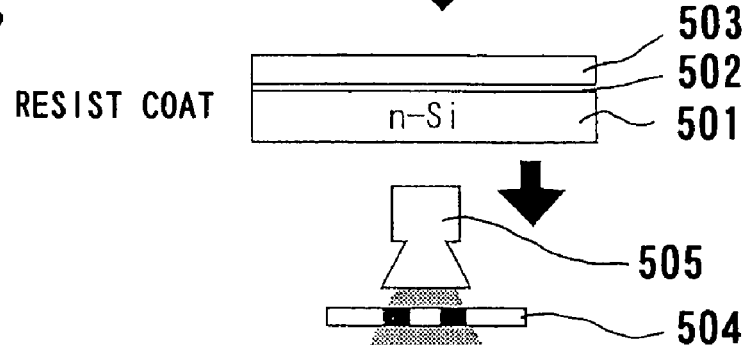
FIG. 140C EXPOSURE
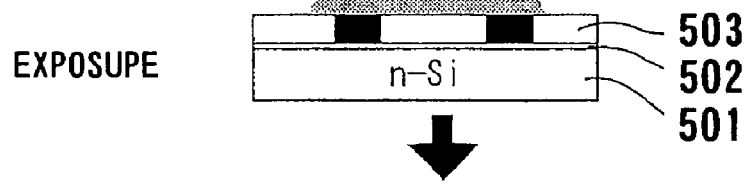
FIG. 140D DEVELOPMENT
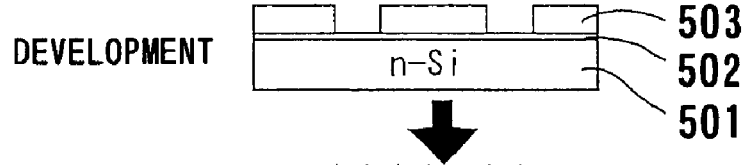
FIG. 140E ETCHING
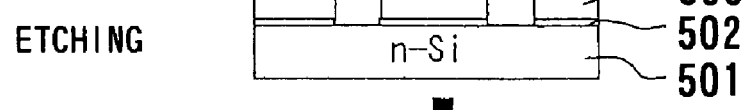
FIG. 140F RESIST STRIPPING (ASHING)
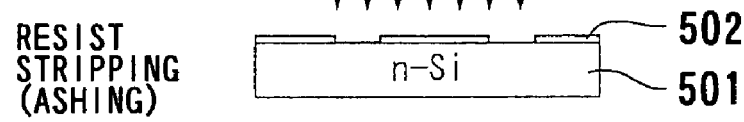

F I G. 1 4 1
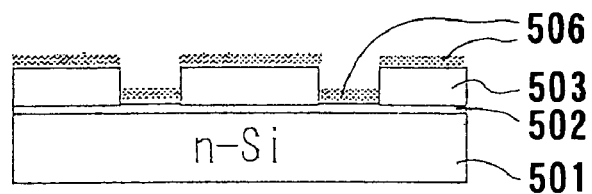

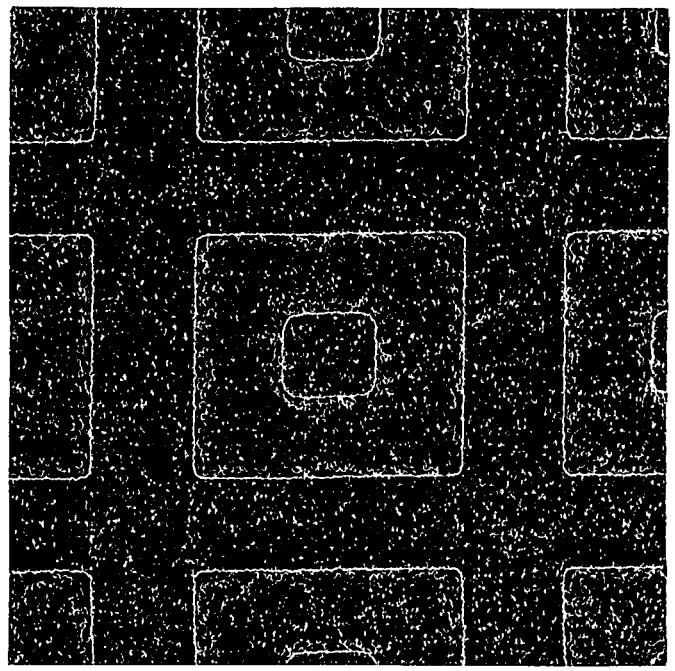
*F I G. 1 4 3 B*
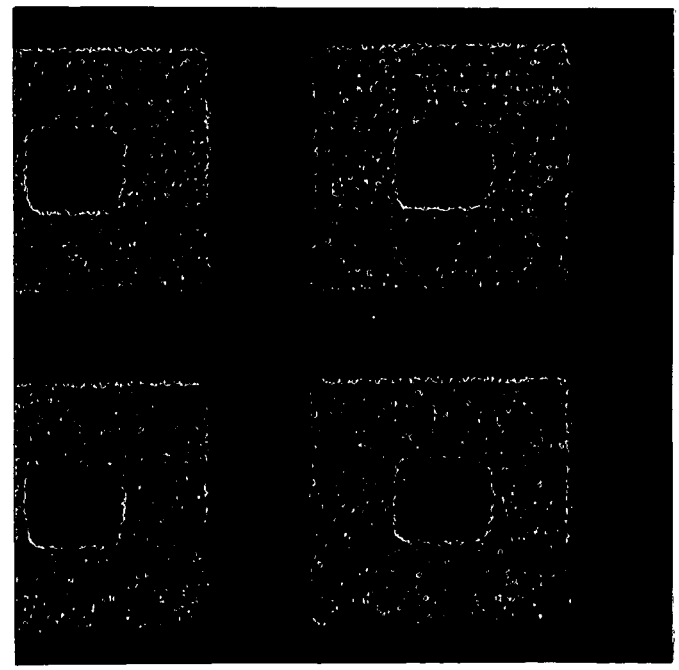
*F I G. 1 4 3 A*

PATTERN INSPECTION APPARATUS AND METHOD

This is a continuation-in-part application of U.S. application Ser. No. 10/689,021 filed Oct. 21, 2003 now abandoned, which is a continuation-in-part application of U.S. application Ser. No. 09/648,372 filed Aug. 25, 2000, now U.S. Pat. No. 6,868,175.

BACKGROUND OF THE INVENTION

1. Field of the Invention

The present invention relates to a pattern inspection apparatus and a method, and more particularly to a pattern inspection apparatus and a method of inspecting a fine pattern, such as a semiconductor integrated circuit (LSI), a liquid crystal panel, and a photomask (reticle) for the semiconductor or the liquid crystal panel, which are fabricated based on design data.

2. Description of the Related Art

For the pattern inspection of a wafer in fabricating process of semiconductor integrated circuit or the pattern inspection of a photomask for pattern formation thereof, an optical pattern inspection apparatus that uses the die-to-die comparison method has been used. In the die-to-die comparison method, a defect is detected by comparing an image obtained from a die to-be-inspected and an image obtained from the equivalent position of a die adjacent to the die to-be-inspected. In this case, the die means a semiconductor device.

On the other hand, for the inspection of a photomask (reticle) where no adjacent die exists, a die-to-database comparison method has been used. In the die-to-database comparison method, mask data is converted into an image. Then the image is used for a substitution of the image of the adjacent dies, and inspection is performed in the same manner as the above. Here, the mask data is data obtained by applying photomask correction to the design data. The technology concerned is disclosed, for example, in U.S. Pat. No. 5,563,702, "Automated photomask inspection apparatus and method."

However, by using the die-to-database comparison method for wafer inspection, corner roundness of a pattern formed on a wafer or the like is likely to be detected as a defect. In order to solve this problem, a pretreatment, which adds corner roundness to the image converted from the mask data by applying a smoothing filter, has been used. However, corner roundness added by the pretreatment may be different from corner roundness of each pattern actually formed on the wafer. Therefore, an allowable deformation quantity should be set in order to ignore the above difference. As a result, a problem in which a fine defect locating in a place except a corner cannot be detected has happened.

The above problem is not severe for the die-to-database comparison photomask inspection, because the photomask should correspond to the mask data as much as possible. Thus, presently, the die-to-database comparison photomask inspection has put into practical use. However, the above problem is severe for the die-to-database comparison wafer inspection, because a pattern formed on the wafer is allowed to be deformed as long as an electrical characteristic is guaranteed. This allowable deformation quantity is considerably large. Actually, pattern deformation occurs due to a difference of stepper exposure condition, or the like. Therefore, the die-to-database comparison wafer inspection has not been put into practical use.

From a viewpoint of problems in semiconductor integrated circuit fabrication, a repeated defect (systematic defect) is more important issue than a random defect caused by a particle or the like. The repeated defect is defined as a defect that occurs repeatedly over all the dies on the wafer caused by the photomask failure, or the like. Because the repeated defects occur in the die to-be-inspected and in the adjacent dies that are to be compared with the die to-be-inspected, the die-to-die comparison wafer inspection cannot detect the repeated defects. Therefore, the die-to-database comparison wafer inspection has been demanded.

Although it has not been put into practical use because of calculation cost or the like, there has been proposed an inspection method using the design data and the wafer image. This inspection method is disclosed in, for example, a literature: "Automatic failure part tracing method of a logic LSI using an electron beam tester," NEC Technical Report, vol. 50, No. 6, 1997. In this literature, the following methods are disclosed: a method using a projection of wiring edges on the X- and Y-axes; a method in which wiring corners are focused on; and a method in which a genetic algorithm is applied. Moreover, as a method used in this literature, a matching method in which after edges are approximated by straight lines, closed areas are extracted, and the closed areas are used for inspection is described. However, these methods fail to realize an inspection speed that is usable in high-speed inspection, and fail to perform the matching while detecting a pattern deformation quantity.

Further, presently, the auto defect classification (ADC) method using an image of a die having a defect has been used. However, the method cannot classify whether a killer defect or not, because it is not recognized which part of a circuit is destroyed by the defect.

Moreover, position of a defect detected by the die-to-die comparison inspection has an error caused by precision of a stage and an optical system of an inspection apparatus, and such error is approximately ten or more times larger than a wiring pattern. Due to the error, even if a defect position is related with the design data, relationship between the defect position and the design data cannot be recognized.

Recently, a line width of semiconductor integrated circuits is far shorter than wavelength used in a lithography process. In the lithography process, a method of adding OPC (Optical Proximity Correction) patterns has been used. In the method, by using a photomask fabricated by mask data that is created by adding OPC pattern to the design data, a pattern formed on a wafer fabricated by the photomask can be consistent with the design data as much as possible. Adding OPC patterns is one of the most important techniques for photomask correction.

If the OPC pattern does not effectively correct a pattern formed on a wafer, repeated defect occurs. However, the die-to-die comparison wafer inspection cannot detect the repeated defect. In order to solve this problem, it is necessary to provide a method in which the pattern formed on the wafer is inspected based on the design data with considering an allowable pattern deformation quantity.

In addition, in a multi-product/small-volume fabricating process, e.g. a system-on-a-chip (SoC) fabricating process, a short delivery time is required. In the fabricating process, when a repeated defect is detected in electric inspection as a final inspection, a short delivery time cannot be achieved. In order to solve this problem, it is necessary to provide an inspection method that inspects a difference between a pattern formed on a wafer and the design data for each lithography process. In the inspection method, it is required that an allowable pattern deformation quantity that does not affect an electrical characteristic is set, and a deformation quantity that exceeds the allowable deformation quantity should be detected.

Further, a lithography simulator checks the design data and an OPC pattern in order to evaluate the OPC pattern. Although the entire device can be verified by the lithography simulator, a simulated pattern cannot be necessarily the same as an actual pattern. Moreover, a defect except for a defect caused by the OPC pattern cannot be detected. A random defect existing on a photomask, a stepper aberration, or the like is an example of the defect.

Moreover, for verifying the simulation, it is necessary to provide a method in which a simulation pattern outputted from the lithography simulator is verified with an image of the pattern actually formed on the wafer. Moreover, it becomes increasingly important to improve the technology for circuit design by setting the allowable deformation quantity to the design data precisely and in detail.

A CD-SEM (Critical Dimension Scanning Electron Microscope) has been used for controlling a line width of a wafer in a fabricating process of semiconductor integrated circuits. The CD-SEM automatically measures a line width of a line-shaped pattern in a specified position using a line profile. Several positions in several shots on several pieces of the wafers for each lot are measured in order to control stepper exposure condition by using the CD-SEM.

As control items of the circuit pattern, end shrinkage of a wiring, a position of an isolated pattern, and the like are also important besides the line width, but the automatic measuring function of the CD-SEM allows only one-dimensional measurement. Specifically, the CD-SEM can measure only a length such as a line width. Thus, those two-dimensional shapes are inspected by an operator using an image obtained by the CD-SEM or other microscopes manually.

Generally, OPC pattern plays an important role not only to guarantee a gate line width, but also to form shapes of a corner and an isolated pattern. Furthermore, because of improvement of a processor frequency, control of a shape of an end or base of a gate pattern, which is called an end-cap or a field extension, respectively, also becomes important in addition to the gate line width.

The above inspections of two-dimensional patterns are essential both in sampling inspection in a fabricating process and in a R&D fabricating process. Especially, in the R&D fabricating process, it is necessary to inspect all patterns formed on the wafer. However, in a present situation, the control of the two-dimensional shape is performed by a human work, and is not perfectly performed. In order to solve this problem, automated die-to-database comparison wafer inspection is required.

As concrete subjects for automatization, the following subjects are enumerated:

1. In order to detect repeated defects in each semiconductor device, it is practically difficult to check whether there are defects at the same location by comparing huge defect information.

2. In order to control a semiconductor device process, it is necessary to provide automatic inspection of a line width of a line-shaped pattern, an average line width of a line-shaped pattern, a space width of a line-shaped pattern, and an average space width of a line-shaped pattern. Although complex calculation is required, it is also necessary to provide automatic inspection of a line width of a curvilinear-shaped pattern such as a corner part, an average line width of a curvilinear-shaped pattern, a space width of a curvilinear-shaped pattern, and an average space width of a curvilinear-shaped pattern.

Especially, the inspection of all the gate widths of the entire semiconductor is important for performance improvement. However, huge labor cost is required, because it is necessary that overlapping part of a polycrystalline silicon layer and an active layer (preceding process layer of the polycrystalline silicon layer) should be extracted.

In addition, in order to obtain information as to an open or bridge, which is more important than other defects, as a kind of defect-class, it is necessary to inspect an image again by an operator. Further, it is necessary to strengthen recognition capability of the open or bridge defect that is observed as a weak contrast.

As other request, it is necessary to shorten an image-acquiring time by using a method in which only parts corresponding to areas for the above inspection are scanned.

3. It is necessary to provide an inspection method of controlling a contact-area of a contact hole/via hole with an end of a wiring layer. In the method, an allowable deformation quantity for controlling shrinkage of the end should be automatically determined by judging whether the end and the contact hole/via hole have enough margin or not. Moreover, it is necessary to provide an inspection method that uses a contact-area as an evaluation value.

4. A correction pattern as a kind of OPC pattern is added to mask data in order to correct a pattern. The correction pattern is located adjacent to the pattern to-be-inspected, and should not be formed on a wafer. However, the correction pattern might be formed as a defect. A method of inspecting such defect is required.

5. It is necessary for a pattern inspection apparatus to have a method of converting a huge inspection result into information suitable for evaluation of a pattern deformation quantity in an entire semiconductor device or evaluation of stepper aberration or the like, and a method of displaying the converted information.

6. A rotation of a specimen caused by stage moving or the like may cause a rotation of a pattern image to-be-inspected. Moreover, the electrification phenomenon of the specimen or the like may cause deformation such as a rotation including a skew or a variation of magnification or the like. Because of the above image distortion, a smaller defect than the above distortion quantities cannot be detected. The above distortion occurs sporadically, and the distortion cannot be predicted. Therefore, it is necessary to detect the above distortion quantities, and correct the above image distortion every time when an image is acquired.

7. It is necessary that methods of correcting image distortions held by the image generation device generating an image with the large field of view can be provided. The image distortions include a nonlinear image distortion and a variation of a line width depending on a position in the image. It is desired that the correction methods can perform automatically and accurately in a short time.

8. Because results of defect inspection are huge, it is necessary for a pattern inspection apparatus to have a method of reducing the number of defects and detecting important defects reliably by dividing a pattern deformation quantity into a global deformation quantity and a local deformation quantity.

9. In the case of long-term inspection, a beam spot size may be varied gradually. The wider beam spot size is, the wider measurement values of a line width is. Thus, it is necessary to correct a variation of a measurement value of a line width caused by the variation of the beam spot size.

10. In order to recognize tendencies for defects to be generated, it is necessary to classify huge defects using defect-classes that are determined by geometrical information of a reference pattern, information of the design data, or information of data related to the design data.

11. If many of the defects belong to the same defect-class and one or some of the defects belong to another or other defect-classes, an image or some images of the latter defect(s) cannot be registered.

12. The defects having the same defect-class that are occasionally generated are reinspected less adequately than the defects having the same defect-class that are frequently generated.

13. It is necessary to recognize tendencies for defects to be generated easily by separating defects into defects generated in thin and dense parts and defects generated in rough parts.

14. If a distance between two line segments that face each other closest together is shorter than a predetermined distance, the two line segments require signal intensity correction for canceling effects of phenomena caused by a variation of generation rate and capture rate of secondary charged particles. In addition, if a distance between two line segments that face each other closest together is longer than another predetermined distance, the two line segments require signal intensity correction. Therefore, it is necessary to correct the signal intensity.

15. A region suitable for image adjustment has been determined experimentally by an operator. There has been a demand for automatic extraction method of recognizing a region suitable for image adjustment using geometrical information of line segments of the design data or using relationship between line segments of the design data that are connected or are located closely. Further, if part of an image is used for image adjustment, automatic adjustment may be performed more accurately. However, conventionally, there has been only a method of using the whole image.

16. The design data is mostly composed of horizontal lines and vertical lines. By using this characteristic of the design data, it is necessary to perform matching at high speed using projection data obtained by projecting an edge of a reference pattern on the horizontal and vertical axes, and projection data obtained by projecting an edge of an image of a pattern to-be-inspected on the horizontal and vertical axes.

17. It is difficult to perform matching of a boundary between a region where the same patterns are periodically arranged and other regions. Thus, it is necessary to solve this problem.

18. A calculation time for matching of hole patterns or island patterns is longer than a calculation time for matching of line-shaped patterns, because the hole patterns or the island patterns are smaller and more numerous than line-shaped patterns. In order to solve this problem, it is necessary to provide a method of calculating at high speed.

19. Image brightness of hole patterns or island patterns may be non-uniform depending on an image position due to electrification phenomenon and the like. Thus, it is necessary to provide a matching method that can perform matching even if the image brightness of the hole pattern or the island pattern is non-uniform.

20. In the case where an inspection-unit-area is divided into sub-inspection-unit-areas, it is necessary to provide a method in which matching is performed by using a sub-inspection-unit-area which is the most suitable for matching.

21. In the case where there is a pattern of a lower layer formed in the preceding process beneath a pattern to-be-inspected, part of a pattern to-be-inspected where there is a pattern of the lower layer formed in the preceding process and part of a pattern to-be-inspected where there is no pattern of the lower layer formed in the preceding process have different shapes, and are sometimes observed differently. In order to solve this problem, it is necessary to provide a method in which inspection is performed by using different inspection parameters according to part of the pattern to-be-inspected where there is a pattern of the lower layer formed in the preceding process and part of the pattern to-be-inspected where there is no pattern of the lower layer formed in the preceding process.

22. If one of the design data, mask data (data created by adding OPC pattern to the design data), a feature obtained from simulation using the design data, and data related to the design data is related to the inspection result, and the related information and the inspection result are displayed together, it becomes easy to recognize tendencies for defects to be generated. Therefore, it is necessary to provide a method of displaying the related information and the inspection result together.

23. In a lithography process, patterns formed in a resist film on a silicon substrate are inspected. In this case, if the patterns formed in the resist film are inspected using an electron beam (charged particle beam), the electrification phenomenon occurs, because the resist is generally composed of high polymer which is insulation. Therefore, a shape of the pattern in a pattern image to-be-inspected is deformed by the electrification phenomenon, because the electron beam is deflected by a top surface of the resist film that is partially charged, and the electron beam is applied to an inaccurate position. Therefore, it is necessary to prevent the electrification phenomenon from occurring to obtain a pattern image having no deformation.

24. There has been practiced a process of using a scanning electron microscope and making automatic measurements by keeping all scanning directions for an electron beam (charged particle beam) constant in the scanning electron microscope. However, the process is problematic in that it causes a measurement error depending on the direction of beam segments. Therefore, it is necessary to provide a method that can automatically set various measuring conditions based on reference data by utilizing a reference pattern.

The present invention has been made in view of the above problems. Therefore, it is an object of the present invention to provide a pattern inspection apparatus and method, which use information of the design data.

SUMMARY OF THE INVENTION

To achieve the above object, according to a first aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve; an image generation device configured to generate the image of the pattern to-be-inspected; a detecting device configured to detect an edge of the image of the pattern to-be-inspected; an inspection device configured to inspect the pattern to-be-inspected by comparing the edge of the image of the pattern to-be-inspected with the one or more lines of the reference pattern; and a repeated defect recognition device configured to recognize repeated defects from defect information obtained by the inspection device from the same inspection area with respect to a plurality of semiconductor devices fabricated based on the same design data.

In a preferred aspect of the present invention, the defect information is obtained from the entire inspection area in at least one of semiconductor devices, and then the defect information is obtained by inspecting a location in another semiconductor device corresponding to a location of the defect information obtained from the inspected semiconductor device and its neighborhood.

According to a second aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve; an image generation device configured to generate the image of the pattern to-be-inspected; a detecting device configured to detect an edge of the image of the pattern to-be-inspected; and an inspection device configured to inspect the pattern to-be-inspected by comparing the edge of the image of the pattern to-be-inspected with the one or more lines of the reference pattern; wherein in the reference pattern generation device, the reference pattern suitable for inspection using a plurality of the edges is extracted by using at least one of geometrical information of line segments constituting the design data, and relationship between line segments, constituting the design data that contact with each other or are located closely to each other.

In a preferred aspect of the present invention, the inspection using a plurality of the edges includes at least one of: inspection of a line width of a line-shaped pattern; inspection of an average line width of a line-shaped pattern; inspection of a space width of a line-shaped pattern, inspection of an average space width of a line-shaped pattern; inspection of a line width of a curvilinear-shaped pattern; inspection of an average line width of a curvilinear-shaped pattern; inspection of a space width of a curvilinear-shaped pattern; inspection of an average space width of a curvilinear-shaped pattern; and inspection of open or bridge defect.

In a preferred aspect of the present invention, extraction of the reference pattern from the design data is performed by using a result of the Boolean operations on a polygon in a layer to-be-inspected of the design data and a polygon in a layer related to the layer.

In a preferred aspect of the present invention, whether a defect is an open or bridge defect is inspected by detecting an edge in a direction different from a direction of the edge of the image of the pattern to-be-inspected.

In a preferred aspect of the present invention, the image generation device comprises a scanning microscope which scans only a neighboring portion corresponding to the reference pattern suitable for inspection using the plurality of the edges.

According to a third aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve; an image generation device configured to generate the image of the pattern to-be-inspected; a detecting device configured to detect an edge of the image of the pattern to-be-inspected; and an inspection device configured to inspect the pattern to-be-inspected by comparing the edge of the image of the pattern to-be-inspected with the one or more lines of the reference pattern; wherein one of an inspection parameter and an inspection evaluation value is obtained by using a result of the Boolean operations on a polygon in a layer to-be-inspected of the design data and a polygon in a layer related to the layer.

According to a fourth aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve, the reference pattern being generated from a correction pattern added to the design data; an image generation device configured to generate the image of the pattern to-be-inspected; a detecting device configured to detect an edge of the image of the pattern to-be-inspected; and an inspection device configured to inspect the pattern to-be-inspected by comparing the edge of the image of the pattern to-be-inspected with the one or more lines of the reference pattern; wherein the inspection device establishes correspondence of the reference pattern generated from the correction pattern that should not be formed on a specimen to the edge of the image of the pattern to-be-inspected, the pattern to-be-inspected being formed on the specimen.

According to a fifth aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve; an image generation device configured to generate the image of the pattern to-be-inspected; a detecting device configured to detect an edge of the image of the pattern to-be-inspected; and an inspection device configured to inspect the pattern to-be-inspected by comparing the edge of the image of the pattern to-be-inspected with the one or more lines of the reference pattern; wherein an inspection area inspected by the inspection device is divided into a plurality of divided inspection areas, a statistic is obtained from each divided inspection area, and the obtained statistic is displayed as a distribution diagram.

According to a sixth aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve; an image generation device configured to generate the image of the pattern to-be-inspected; a detecting device configured to detect an edge of the image of the pattern to-be-inspected; and an inspection device configured to inspect the pattern to-be-inspected by comparing the edge of the image of the pattern to-be-inspected with the one or more lines of the reference pattern; wherein at least one of the reference pattern and the image of the pattern to-be-inspected is corrected by detecting a distortion quantity of the image of the pattern to-be-inspected immediately after acquiring the image of the pattern to-be-inspected, the distortion quantity being calculated from pattern deformation quantities obtained by the inspection device.

According to a seventh aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve; an image generation device configured to generate the image of the pattern to-be-inspected; a detecting device configured to detect an edge of the image of the pattern to-be-inspected; and an inspection device configured to inspect the pattern to-be-inspected by comparing the edge of the image of the pattern to-be-inspected with the one or more lines of the reference pattern; wherein an image distortion quantity of the image generation device is obtained beforehand, and the image of the pattern to-be-inspected is corrected by using the image distortion quantity.

In a preferred aspect of the present invention, the image distortion quantity includes at least one of a nonlinear image distortion, and a variation of a line width depending on a position in the image of the pattern to-be-inspected.

According to an eighth aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve; an image generation device configured to generate the image of the pattern to-be-inspected; a detecting device configured to detect an edge of the image of the pattern to-be-inspected; and an inspection device configured to inspect the pattern to-be-inspected by comparing the edge of the image of the pattern to-be-inspected with the one or more lines of the reference pattern; wherein pattern deformation quantities are separated into global pattern deformation quantities and local pattern deformation quantities.

According to a ninth aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve; an image generation device configured to generate the image of the pattern to-be-inspected; a detecting device configured to detect an edge of the image of the pattern to-be-inspected; and an inspection device configured to inspect the pattern to-be-inspected by comparing the edge of the image of the pattern to-be-inspected with the one or more lines of the reference pattern; wherein a divided inspection area which is to be inspected any number of times is determined, and the divided inspection area is inspected to obtain inspection result beforehand, and the divided inspection area is inspected to obtain inspection result again during inspection timely, and then a time-dependence variation of the image generation device is corrected by using the inspection result obtained beforehand and the inspection result obtained again.

According to a tenth aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve; an image generation device configured to generate the image of the pattern to-be-inspected; a detecting device configured to detect an edge of the image of the pattern to-be-inspected; an inspection device configured to inspect the pattern to-be-inspected by comparing the edge of the image of the pattern to-be-inspected with the one or more lines of the reference pattern; and a defect classification device configured to determine defect-classes based on defect information obtained by the inspection device using at least one of geometrical information of the reference pattern, information of the design data, and information of data related to the design data.

According to an eleventh aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve; an image generation device configured to generate the image of the pattern to-be-inspected; a detecting device configured to detect an edge of the image of the pattern to-be-inspected; an inspection device configured to inspect the pattern to-be-inspected by comparing the edge of the image of the pattern to-be-inspected with the one or more lines of the reference pattern; and a storage device configured to register defect images obtained by the inspection device; wherein the maximum number of defect images to be registered for each defect-class is determined, and in the case where a new defect image is obtained, the new defect image is registered until the number of registered defect images becomes equal to the maximum number of defect images to be registered, and if the number of the registered defect images exceeds the maximum number of defect images to be registered, whether the new defect image should be registered is determined.

According to a twelfth aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve; an image generation device configured to generate the image of the pattern to-be-inspected; a detecting device configured to detect an edge of the image of the pattern to-be-inspected; an inspection device configured to inspect the pattern to-be-inspected by comparing the edge of the image of the pattern to-be-inspected with the one or more lines of the reference pattern; and a storage device configured to register defect images obtained by the inspection device; wherein the maximum number of defects to-be-reinspected for each defect-class is determined, and defects to-be-reinspected are selected using the maximum number of defects to-be-reinspected.

According to a thirteenth aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve; an image generation device configured to generate the image of the pattern to-be-inspected; a detecting device configured to detect an edge of the image of the pattern to-be-inspected; and an inspection device configured to inspect the pattern to-be-inspected by comparing the edge of the image of the pattern to-be-inspected with the one or more lines of the reference pattern; wherein defects detected by the inspection device are grouped based on a feature of the reference pattern corresponding to the defect and its neighborhood.

According to a fourteenth aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve; an image generation device configured to generate the image of the pattern to-be-inspected; a detecting device configured to detect an edge of the image of the pattern to-be-inspected; and an inspection device configured to inspect the pattern to-be-inspected by comparing the edge of the image of the pattern to-be-inspected with the one or more lines of the reference pattern; wherein a line segment that requires signal intensity correction is extracted from the reference pattern, and at least one of a position of the line segment and an allowable deformation quantity of the line segment is corrected based on a quantity of the signal intensity correction.

In a preferred aspect of the present invention, the line segments that require signal intensity correction are two line segments that face each other closest together with a distance between the two line segments being shorter than a predetermined distance or being longer than another predetermined distance.

According to a fifteenth aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve; an image generation device configured to generate the image of the pattern to-be-inspected; a detecting device configured to detect an edge of the image of the pattern to-be-inspected; and an inspection device configured to inspect the pattern to-be-inspected by comparing the edge of the image of the pattern to-be-inspected with the one or more lines of the reference pattern; wherein an area suitable for image adjustment performed by the image generation device is extracted using at least one of geometrical information of line segments of the reference pattern, and relationship between line segments of the reference pattern that connect or are located closely.

According to a sixteenth aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve; an image generation device configured to generate the image of the pattern to-be-inspected; a detecting device configured to detect an edge of the image of the pattern to-be-inspected; and an inspection device configured to inspect the pattern to-be-inspected by comparing the edge of the image of the pattern to-be-inspected with the one or more lines of the reference pattern; wherein matching is performed by the inspection device using projection data obtained by projecting the edge of the reference pattern and projection data obtained by projecting the edge of the pattern image to-be-inspected.

According to a seventeenth aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate reference patterns represented by one or more lines from the design data, each of the one or more lines comprising one of a line segment and a curve; an image generation device configured to generate the image of the pattern to-be-inspected; a detecting device configured to detect an edge of the image of the pattern to-be-inspected; and an inspection device configured to inspect the pattern to-be-inspected by comparing the edge of the image of the pattern to-be-inspected with the one or more lines of the reference pattern; wherein one of the reference patterns which exists on the boundary of periodical patterns is recognized as a unique pattern, the unique pattern is shifted by one period, in the case where there is no reference pattern in the neighborhood of the shifted unique pattern, the shifted unique pattern is recognized as a negative pattern, and matching is performed by the inspection device by using at least one of the unique pattern and the negative pattern.

According to an eighteenth aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve; an image generation device configured to generate the image of the pattern to-be-inspected; a detecting device configured to detect edges of the image of the pattern to-be-inspected; and an inspection device configured to inspect the pattern to-be-inspected by comparing the edge of the image of the pattern to-be-inspected with the one or more lines of the reference pattern; wherein matching is performed by the inspection device using geometrical information obtained from the reference pattern, and geometrical information obtained from the edges detected from the pattern image to-be-inspected.

According to a nineteenth aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve; an image generation device configured to generate the image of the pattern to-be-inspected; a detecting device configured to detect an edge of the image of the pattern to-be-inspected; and an inspection device configured to inspect the pattern to-be-inspected by comparing the edge of the image of the pattern to-be-inspected with the one or more lines of the reference pattern; wherein matching is performed by the inspection device by comparing a statistic calculated from part of the pattern image to-be-inspected corresponding to the inside of the reference pattern and a statistic calculated from part of the pattern image to-be-inspected corresponding to the outside of the reference pattern.

According to a twentieth aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate reference patterns represented by one or more lines from the design data, each of the one or more lines comprising one of a line segment and a curve; an image generation device configured to generate the images of the pattern to-be-inspected; a detecting device configured to detect an edge of the image of the pattern to-be-inspected; and an inspection device configured to inspect the pattern to-be-inspected by comparing the edge of the image of the pattern to-be-inspected with the one or more lines of the reference pattern; wherein the pattern image to-be-inspected is divided, and the reference patterns corresponding to the divided pattern images to-be-inspected are obtained, and the corresponding reference patterns which are the most suitable for matching are selected and matching is performed by the inspection device by using the selected reference patterns and the divided pattern images to-be-inspected corresponding to the selected reference patterns.

According to a twenty-first aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve; an image generation device configured to generate the image of the pattern to-be-inspected; a detecting device configured to detect an edge of the image of the pattern to-be-inspected; and an inspection device configured to inspect the pattern to-be-inspected by comparing the edge of the image of the pattern to-be-inspected with the one or more lines of the reference pattern; wherein inspection is performed by the inspection device using different inspection parameters according to part of the pattern to-be-inspected which is affected by the preceding process and part of the pattern to-be-inspected which is not affected by the preceding process.

According to a twenty-second aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve; an image generation device configured to generate the image of the pattern to-be-inspected; a detecting device configured to detect an edge of the image of the pattern to-be-inspected; an inspection device configured to inspect the pattern to-be-inspected by comparing the edge of the image of the pattern to-be-inspected with the one or more lines of the reference pattern; and an output device for outputting a result of the inspection of the pattern to-be-inspected; wherein as the result of the inspection, information of the design data is attached, and correspondence between one of the design data, the design data to which correction patterns are added, patterns obtained from simulation using the design data, and another information related to the design data, to the result of the inspection is established by using the information of the design data.

According to a twenty-third aspect of the present invention, there is provided a method of inspecting a pattern to-be-inspected on a specimen liable to cause the electrification phenomenon by using an image of the pattern to-be-inspected on the specimen and design data for fabricating the pattern to-be-inspected on the specimen, the pattern inspection method comprising: generating a reference pattern represented by one or more lines from the design data, each of the one or more lines comprising one of a line segment and a curve; coating carbon on the pattern to-be-inspected on the specimen; scanning a charged particle beam on the carbon-coated pattern to-be-inspected on the specimen to generate the image of the pattern to-be-inspected on the specimen; detecting an edge of the image of the carbon-coated pattern to-be-inspected on the specimen; and inspecting the carbon-coated pattern to-be-inspected on the specimen by comparing the edge of the image of the carbon-coated pattern to-be-inspected on the specimen with the one or more lines of the reference pattern.

According to a twenty-fourth aspect of the present invention, there is provided a method of inspecting a pattern to-be-inspected on a specimen liable to cause the electrification phenomenon by using an image of the pattern to-be-inspected on the specimen and design data for fabricating the pattern to-be-inspected on the specimen, the pattern inspection method comprising: generating a reference pattern represented by one or more lines from the design data, each of the one or more lines comprising one of a line segment and a curve; scanning a charged particle beam on a wider area than an area at a time to be acquired of the specimen to generate the image of the pattern to-be-inspected on the specimen; detecting an edge of the image of the pattern to-be-inspected on the specimen; inspecting the pattern to-be-inspected on the specimen by comparing the edge of the image of the pattern to-be-inspected on the specimen with the one or more lines of the reference pattern; obtaining inspection results from a plurality of semiconductor devices fabricated based on the same design data; and obtaining a merged inspection result by merging the inspection results.

According to a twenty-fifth aspect of the present invention, there is provided a pattern inspection apparatus for inspecting a pattern-to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve; an image generation device configured to scan the pattern to-be-inspected with a charged particle beam to generate the image of the pattern to-be-inspected; a detecting device configured to detect an edge of the image of the pattern to-be-inspected; and an inspection device configured to inspect the pattern to-be-inspected by comparing the edge of the image of the pattern to-be-inspected with the one or more lines of the reference pattern; wherein the image generation device sets a scanning direction for the charged particle beam based on the reference pattern.

In a preferred aspect of the present invention, the scanning direction for the charged particle beam is determined so as to be more perpendicular to the edges of all patterns to-be-inspected.

In a preferred aspect of the present invention, the scanning direction for the charged particle beam comprises a scanning direction that is ±90 degrees with respect to the direction which is determined so as to be more perpendicular to the patterns to-be-inspected.

In a preferred aspect of the present invention, the scanning direction for the charged particle beam is determined so as to be more perpendicular to most frequent directions of patterns to-be-inspected.

In a preferred aspect of the present invention, the scanning direction for the charged particle beam comprises a scanning direction that is ±90 degrees with respect to the direction which is determined so as to be more perpendicular to the patterns to-be-inspected.

In a preferred aspect of the present invention, a rotated image is acquired by replacing the position of pixels.

According to a twenty-sixth aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve; an image generation device configured to scan the pattern to-be-inspected with a charged particle beam to generate the image of the pattern to-be-inspected; a detecting device configured to detect an edge of the image of the pattern to-be-inspected; and an inspection device configured to inspect the pattern to-be-inspected by comparing the edge of the image of the pattern to-be-inspected with the one or more lines of the reference pattern; wherein the image generation device scans a wider area of the pattern to-be-inspected by imparting a vertical amplitude to a scanning direction for the charged particle beam.

According to a twenty-seventh aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve; an image generation device configured to generate the image of the pattern to-be-inspected; a detecting device configured to detect an edge of the image of the pattern to-be-inspected; and an inspection device configured to inspect the pattern to-be-inspected by comparing the edge of the image of the pattern to-be-inspected with the one or more lines of the reference pattern; wherein the image generation device scans only a pattern portion to-be-inspected.

In a preferred aspect of the present invention, the image generation device scans only the pattern portion to-be-inspected to reduce a deformation of a profile due to the electrification phenomenon of a specimen, the pattern to-be-inspected being formed on the specimen.

According to a twenty-eighth aspect of the present invention, there is provided a pattern inspection apparatus for inspecting a pattern to-be-inspected by using an image of the pattern to-be-inspected and design data for fabricating the pattern to-be-inspected, the pattern inspection apparatus comprising: a reference pattern generation device configured to generate a reference pattern represented by one or more lines from the design data, each of the one or more lines comprising one of a line segment and a curve; an image generation device configured to scan the pattern to-be-inspected with a charged particle beam to generate the image of the pattern to-be-inspected; a detecting device configured to detect an edge of the image of the pattern to-be-inspected; and an inspection device configured to inspect the pattern to-be-inspected by comparing the edge of the image of the pattern to-be-inspected with the one or more lines of the reference pattern; wherein the image generation device scans a given area of the pattern to-be-inspected to generate a hexagonal image thereof, scans an area, adjacent to the given area, of the pattern to-be-inspected to generate a next hexagonal image thereof, and repeatedly scans successive areas of the pattern to-be-inspected to generate a single image of a wide area of the pattern to-be-inspected.

According to a twenty-ninth aspect of the present invention, there is provided a method of inspecting a pattern to-be-inspected by using an image of the pattern to-be-inspected and design data for fabricating the pattern to-be-inspected, the pattern inspection method comprising: generating a reference pattern represented by one or more lines from the design data, each of the one or more lines comprising one of a line segment and a curve; generating the image of the pattern to-be-inspected; detecting an edge of the image of the pattern to-be-inspected; inspecting the pattern to-be-inspected by comparing the edge of the image of the pattern to-be-inspected with the one or more lines of the reference pattern; and recognizing repeated defects from defect information obtained from the same inspection area with respect to a plurality of semiconductor devices fabricated based on the same design data.

According to a thirtieth aspect of the present invention, there is provided a method of inspecting a pattern to-be-inspected by using an image of the pattern to-be-inspected and design data for fabricating the pattern to-be-inspected, the pattern inspection method comprising: generating a reference pattern represented by one or more lines from the design data, each of the one or more lines comprising one of a line segment and a curve; generating the image of the pattern to-be-inspected; detecting an edge of the image of the pattern to-be-inspected; and inspecting the pattern to-be-inspected by comparing the edge of the image of the pattern to-be-inspected with the one or more lines of the reference pattern; wherein the reference pattern suitable for inspection using a plurality of the edges is extracted by using at least one of geometrical information of line segments constituting the design data, and relationship between line segments, constituting the design data, that contact with each other or are located closely to each other.

According to a thirty-first aspect of the present invention, there is provided a method of inspecting a pattern to-be-inspected by using an image of the pattern to-be-inspected and design data for fabricating the pattern to-be-inspected, the pattern inspection method comprising: generating a reference pattern represented by one or more lines from the design data, each of the one or more lines comprising one of a line segment and a curve; generating the image of the pattern to-be-inspected; detecting an edge of the image of the pattern to-be-inspected; inspecting image of the pattern to-be-inspected with the one or more lines of the reference pattern; and determining defect-classes based on defect information obtained using at least one of geometrical information of the reference pattern, information of the design data, and information of data related to the design data.

According to a thirty-second aspect of the present invention, there is provided a method of inspecting a pattern to-be-inspected by using an image of the pattern to-be-inspected and design data for fabricating the pattern to-be-inspected, the pattern inspection method comprising: generating a reference pattern represented by one or more lines from the design data, each of the one or more lines comprising one of a line segment and a curve; generating the image of the pattern to-be-inspected; detecting an edge of the image of the pattern to-be-inspected; and inspecting the pattern to-be-inspected by comparing the edge of the image of the pattern to-be-inspected with the one or more lines of the reference pattern; wherein defects detected by the inspecting are grouped based on a feature of the reference pattern corresponding to the defect and its neighborhood.

According to a thirty-third aspect of the present invention, there is provided a method of inspecting a pattern to-be-inspected by using an image of the pattern to-be-inspected and design data for fabricating the pattern to-be-inspected, the pattern inspection method comprising: generating a reference pattern represented by one or more lines from the design data, each of the one or more lines comprising one of a line segment and a curve; generating the image of the pattern to-be-inspected; detecting an edge of the image of the pattern to-be-inspected; and inspecting the pattern to-be-inspected by comparing the edge of the image of the pattern to-be-inspected with the one or more lines of the reference pattern; and outputting a result of the inspection of the pattern to-be-inspected; wherein as the result of the inspection, information of the design data is attached, and correspondence between one of the design data, the design data to which correction patterns are added, patterns obtained from simulation using the design data, and another information related to the design data, to the result of the inspection is established by using the information of the design data.

BRIEF DESCRIPTION OF THE DRAWINGS

FIG. 7 is a schematic view showing a method in which a pattern is scanned bidirectionally;

FIGS. 8A, 8B, and 8C are schematic views showing methods in which a scanning direction for an electron beam is 45 degrees and −45 degrees;

FIG. 13 is a view showing a method in which a rotated image is acquired only by replacing positions of pixels;

FIG. 14 is a view showing another method in which the rotated image is acquired only by replacing the positions of pixels;

FIG. 15 is a diagram showing an example of basic arrangement of the pattern inspection apparatus according to the embodiment of the present invention;

FIG. 16 is a functional block diagram of the pattern inspection apparatus according to the embodiment of the present invention;

FIG. 17 is a functional block diagram of the pattern inspection apparatus according to another embodiment of the present invention;

FIG. 18 is a diagram showing an example of correction of a reference pattern;

FIG. 24 is a diagram showing an example in which the reference pattern including a curve is converted into edge vectors;

FIG. 28 is a diagram showing an example of an image (pattern image to-be-inspected) having a contrast between the inside of the pattern and the grounding;

FIG. 30 is a diagram showing an example of an image having bright edges and having no contrast between the inside of the pattern and the grounding;

FIG. 31 is a diagram showing edges detected from the image of FIG. 30;

FIG. 32 is a diagram showing an example of magnitudes of edges of a one-dimensional pattern image to-be-inspected;

FIG. 33 is a diagram showing an example in which the edges of FIG. 32 are dilated;

FIG. 34 is a diagram showing an example of edges of a one-dimensional reference pattern;

FIG. 35 is a diagram showing another example in which the edges of FIG. 32 are dilated;

FIG. 36 is a diagram showing another example of edges of the one-dimensional reference pattern;

FIG. 37 is a diagram showing another example in which the edges of FIG. 32 are dilated;

FIG. 38 is a diagram showing an example of a smoothing filter;

FIG. 44 is a diagram showing another example in which the edge vectors of FIG. 42 are dilated;

FIG. 60 is a diagram showing an example of establishing of correspondence between an edge of the pattern image to-be-inspected and an edge of the reference pattern;

FIG. 61A is a diagram showing an example of the edges of the reference pattern;

FIG. 61B is a diagram showing an example of the edges of the pattern image to-be-inspected;

FIGS. 63A and 63B are schematic views showing a method of recognizing a defect having abnormal pattern deformation quantity;

FIG. 66A is a diagram showing an example of edges of a reference pattern and edges of a pattern image to-be-inspected;

FIG. 66B is a diagram showing an example in which X components of the vectors $d(x,y_0)$ at $y=y_0$ between two edges shown in FIG. 66A are approximated by a regression line $D(x)$;

FIG. 76 is a diagram showing an example of a profile;

FIG. 82 is a schematic view showing a rule for automatically extracting reference patterns suitable for line width inspection from the design data;

FIGS. 93A and 93B are schematic views showing a method of calculating a contact-area;

FIG. 94A is a diagram showing an example of a correction pattern that should not be formed on a wafer;

FIG. 94B is a schematic view showing a method of a correction pattern that should not be formed on a wafer;

FIG. 95 is a schematic view showing a method of extracting proximate line segments, which are defined as line segments which face each other closest together with a distance between them shorter than a predetermined distance, from reference patterns;

FIGS. 98A, 98B and 98C are views, showing an example of the first method that obtains a global deformation quantity of an average line width using inspected inspection-unit-areas;

FIG. 105 is a schematic view showing sub-indexes of defect-class that are used in combination;

FIG. 108 is a schematic view showing an example of other feature quantities used in the feature quantity space of FIG. 107;

FIG. 113 is a schematic view showing a scanning path for an electron beam;

FIG. 114 is a schematic view showing another scanning path for an electron beam;

FIG. 115 is a schematic view showing the filtering of a vertical scan;

FIG. 116 is a schematic view showing a method in which only a neighboring portion of an edge is scanned;

FIG. 117 is a flowchart of the method in which only a neighboring portion of an edge is scanned;

FIGS. 118A and 118B are diagrams illustrative of processes of sequencing acquisition of measured data when only a neighboring portion of an edge is scanned;

FIGS. 119A, 119B and 119C are schematic views showing a method of obtaining neighboring portions corresponding to regions for the region inspection method;

FIG. 120 is a schematic view showing an image of a pattern to-be-inspected having distortion;

FIG. 121 is a schematic view showing a matching method performed by using a sub-inspection-unit-area;

FIG. 122 is a schematic view showing methods of correcting distortion quantities of an image of a pattern to-be-inspected;

FIG. 123 is a schematic view showing an example of non-linear image distortion;

FIG. 124 is a schematic view showing an example of construction of a deflection controller;

Figure 126A:
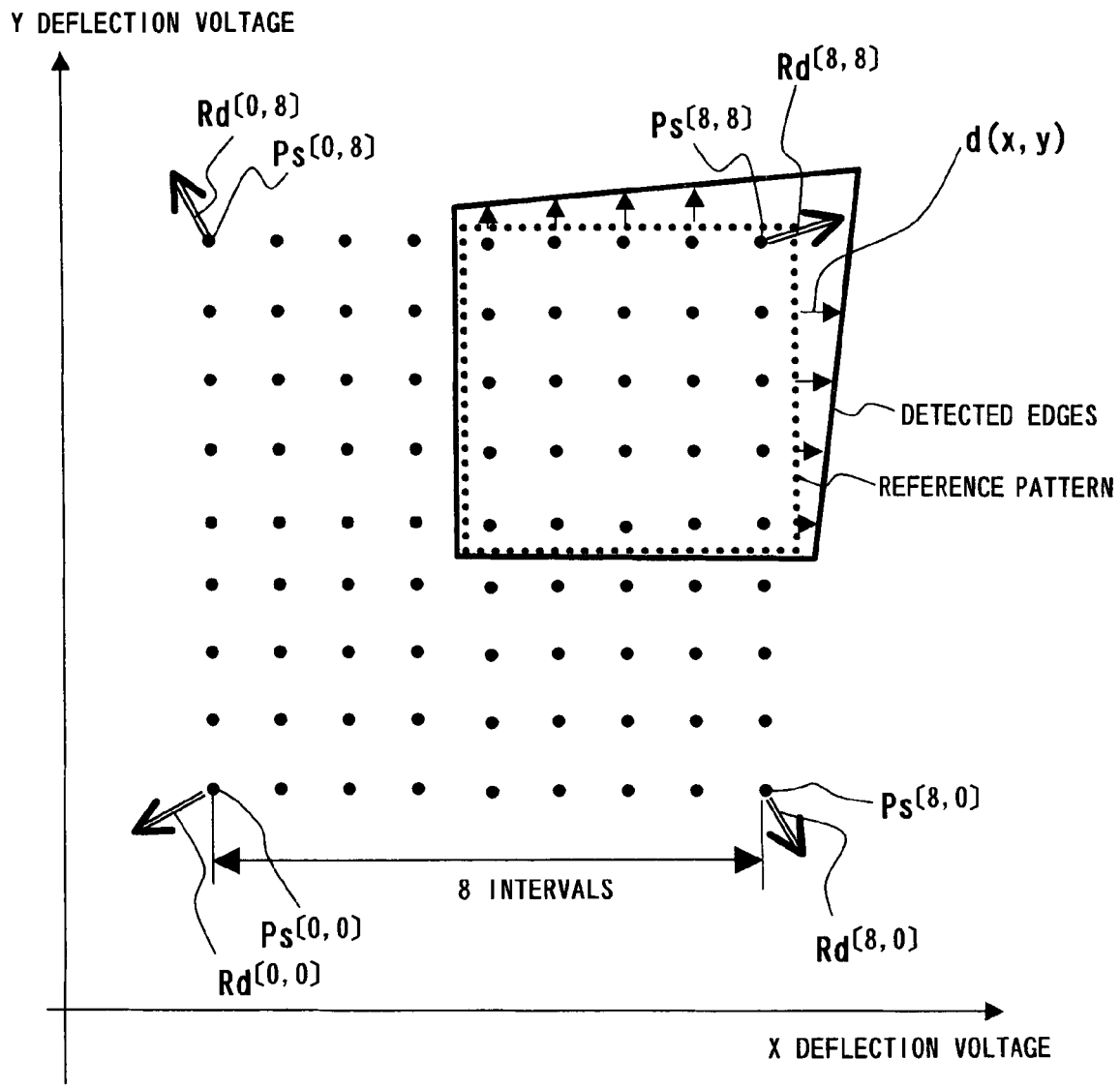
Figure 126B:
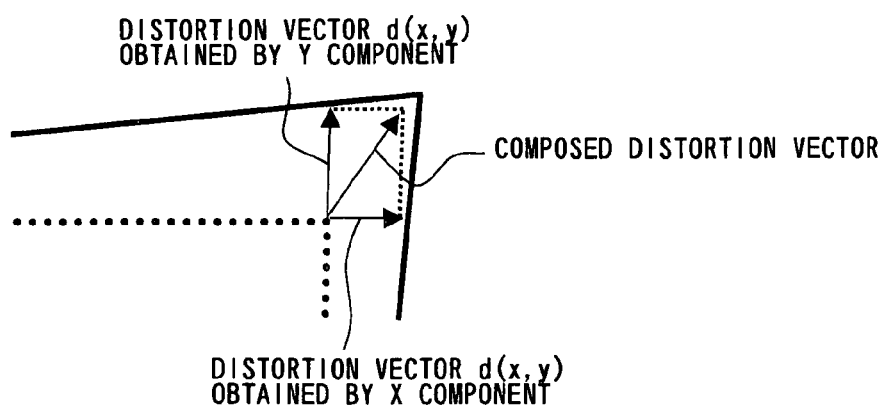
Figure 127:
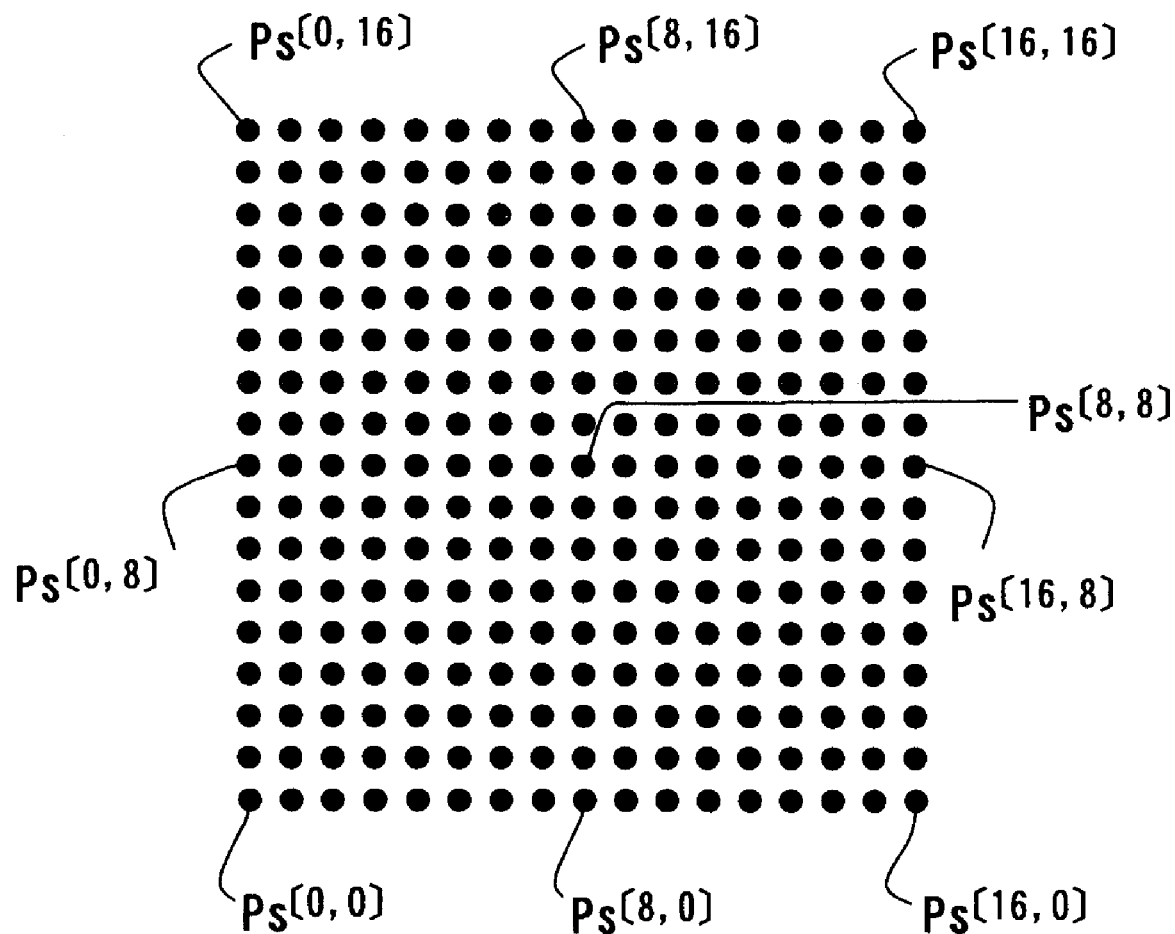
Figure 129:
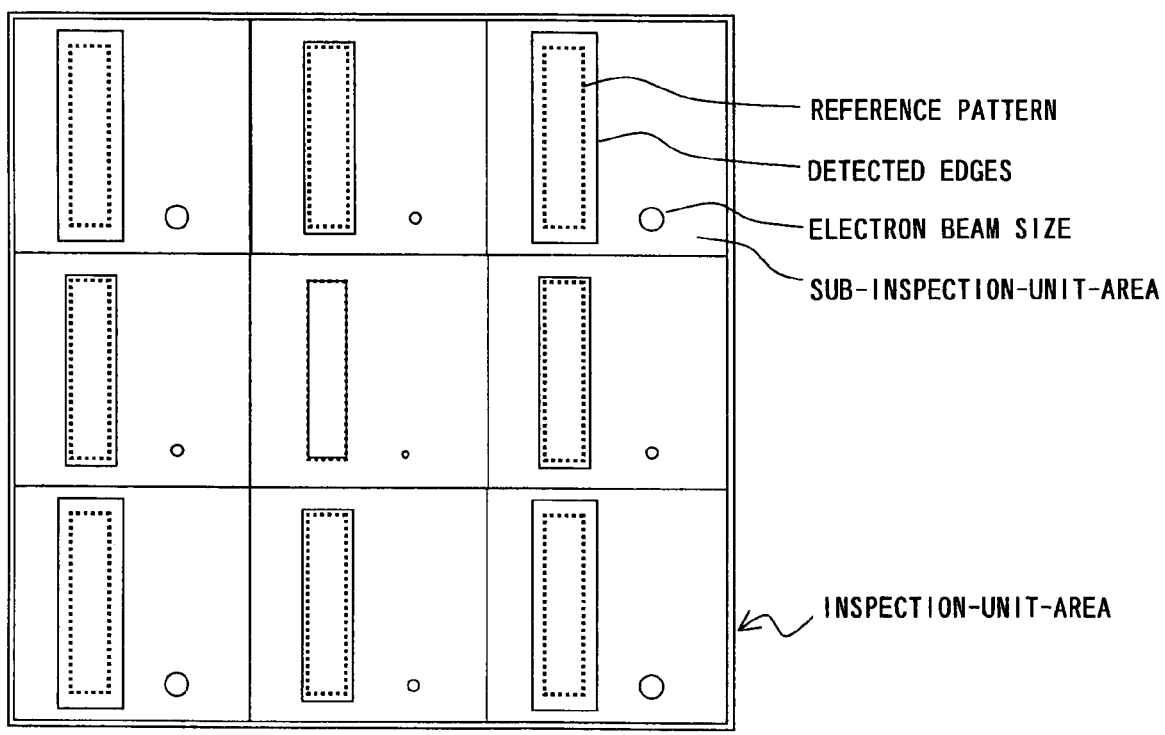
Figure 130:
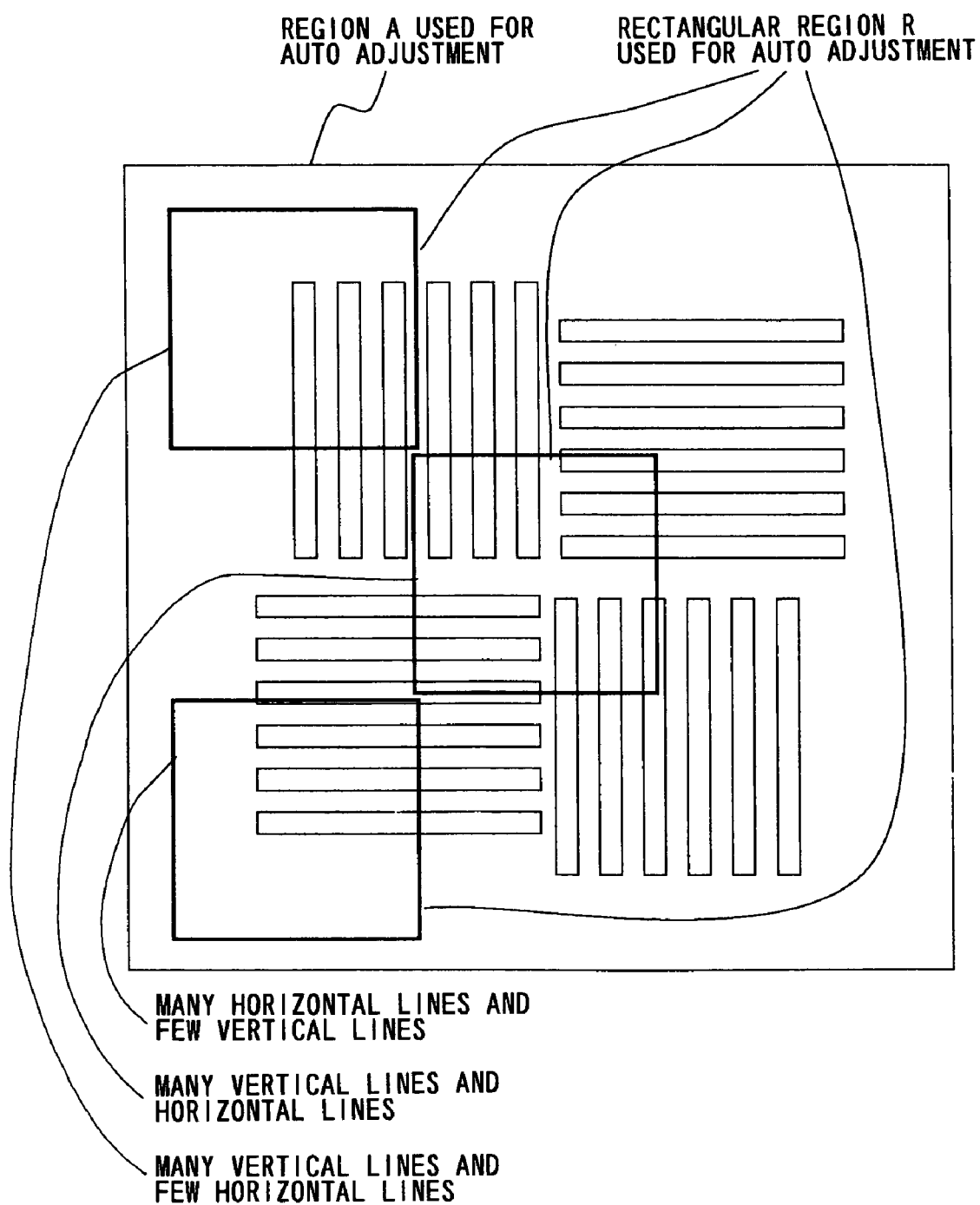
Figure 132:
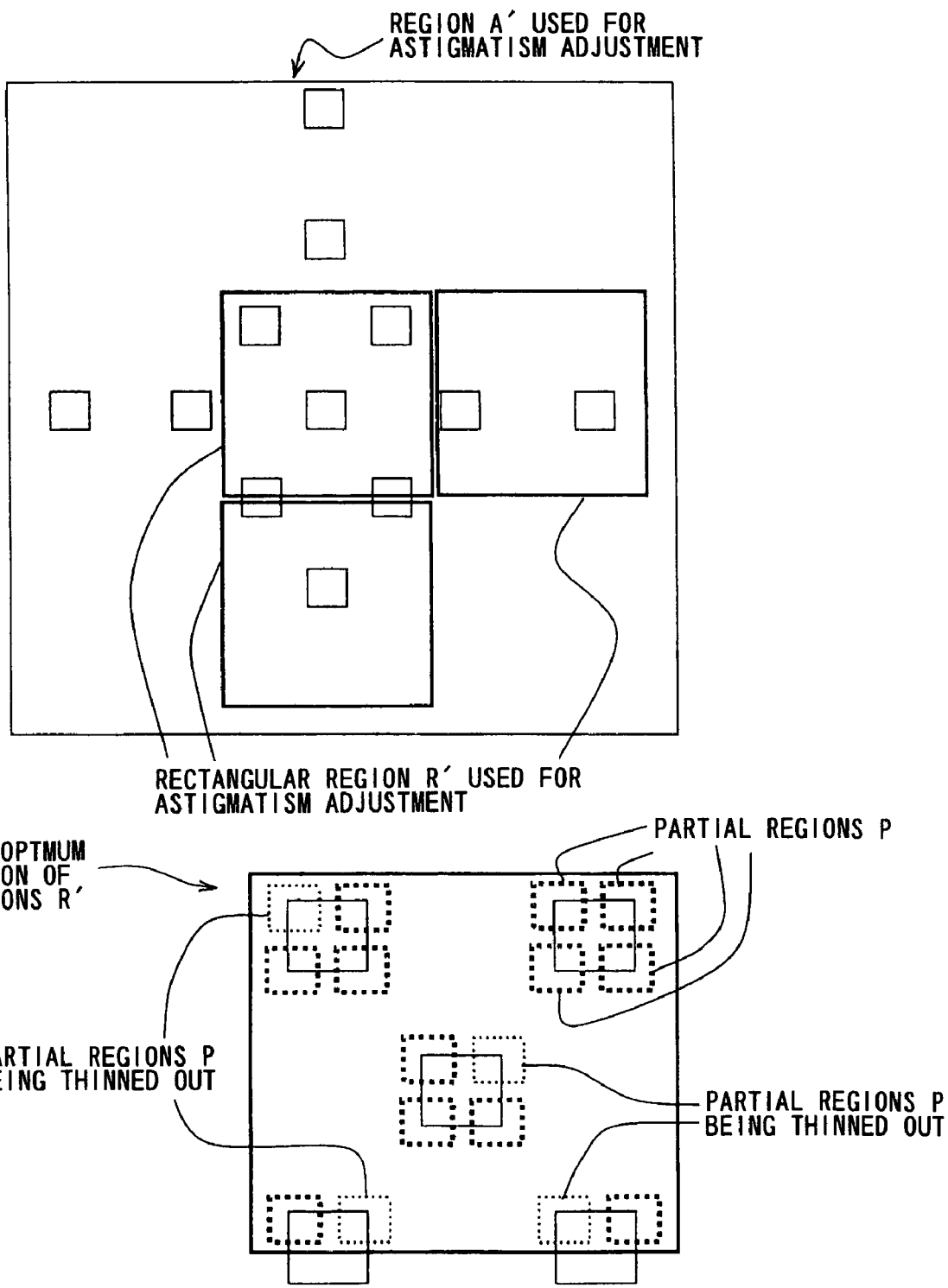
Figure 134:
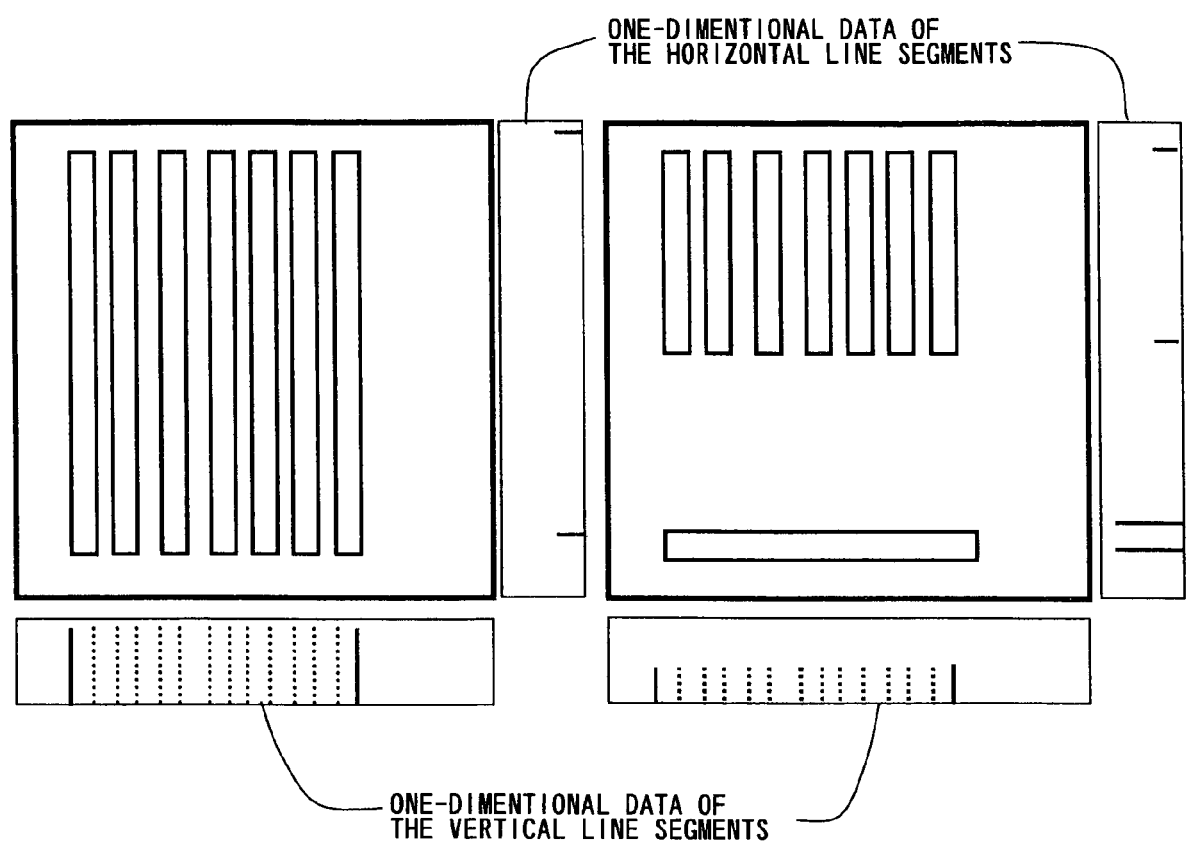
Figure 139:
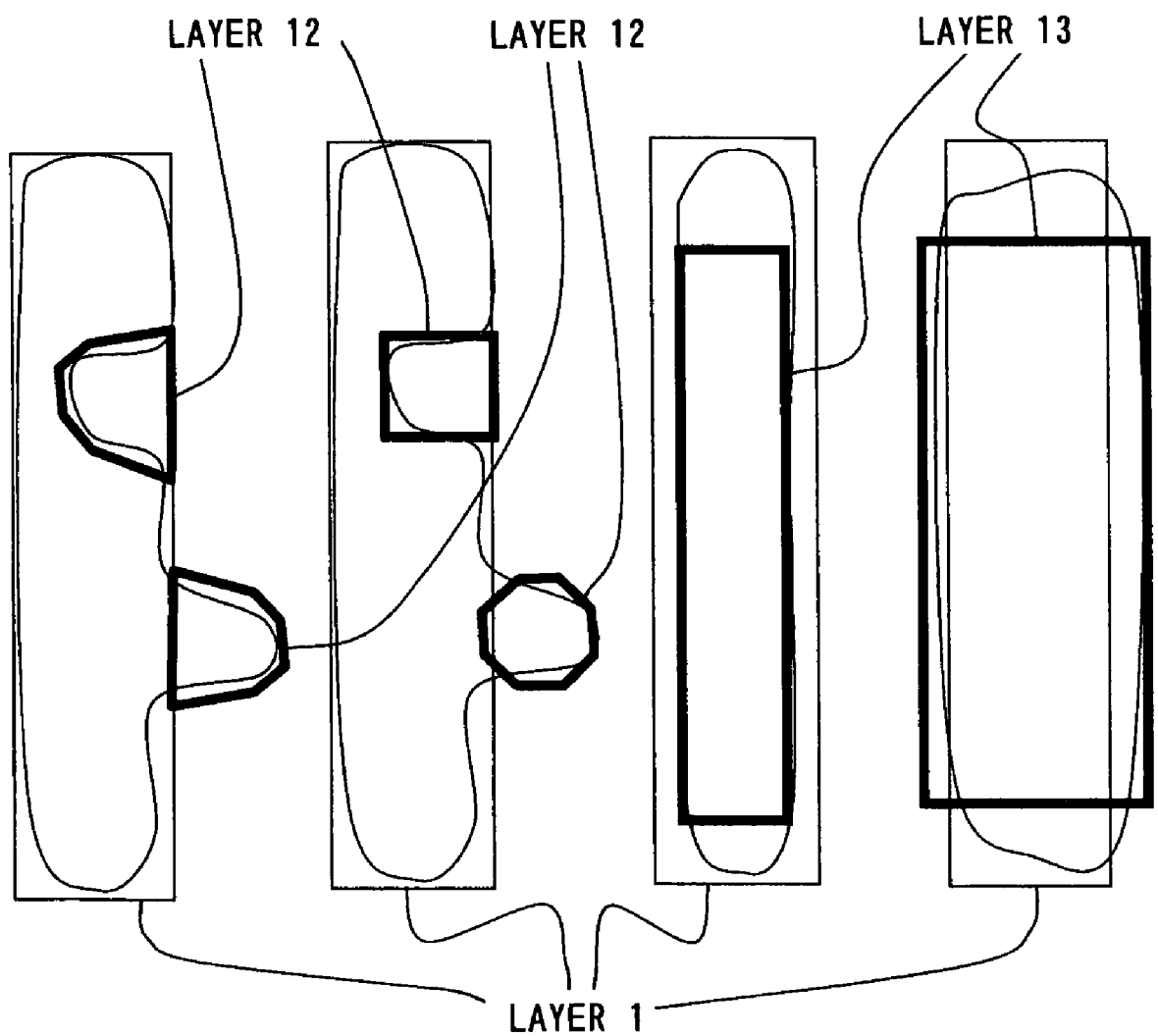
Figure 142:
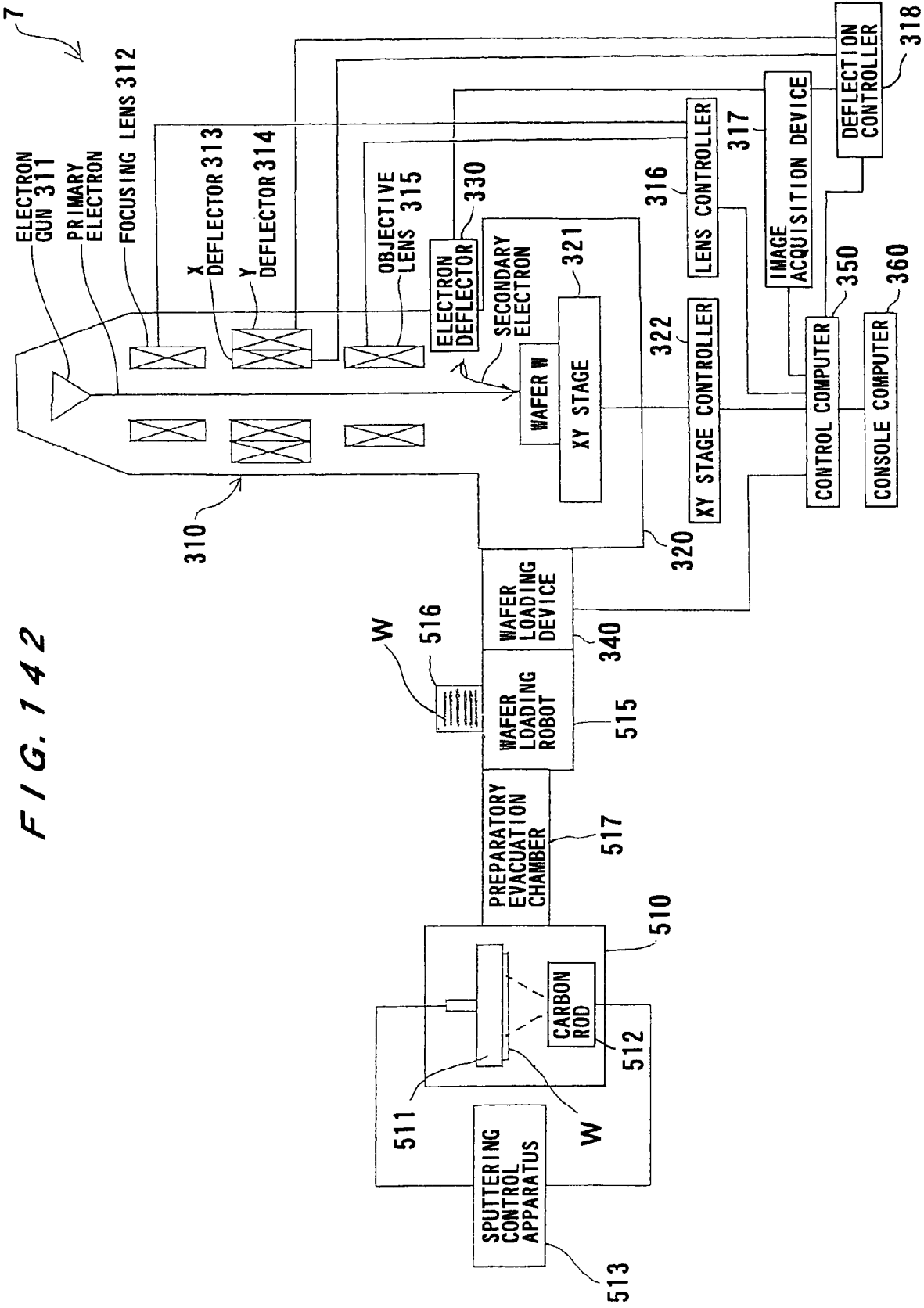
Figure 144:
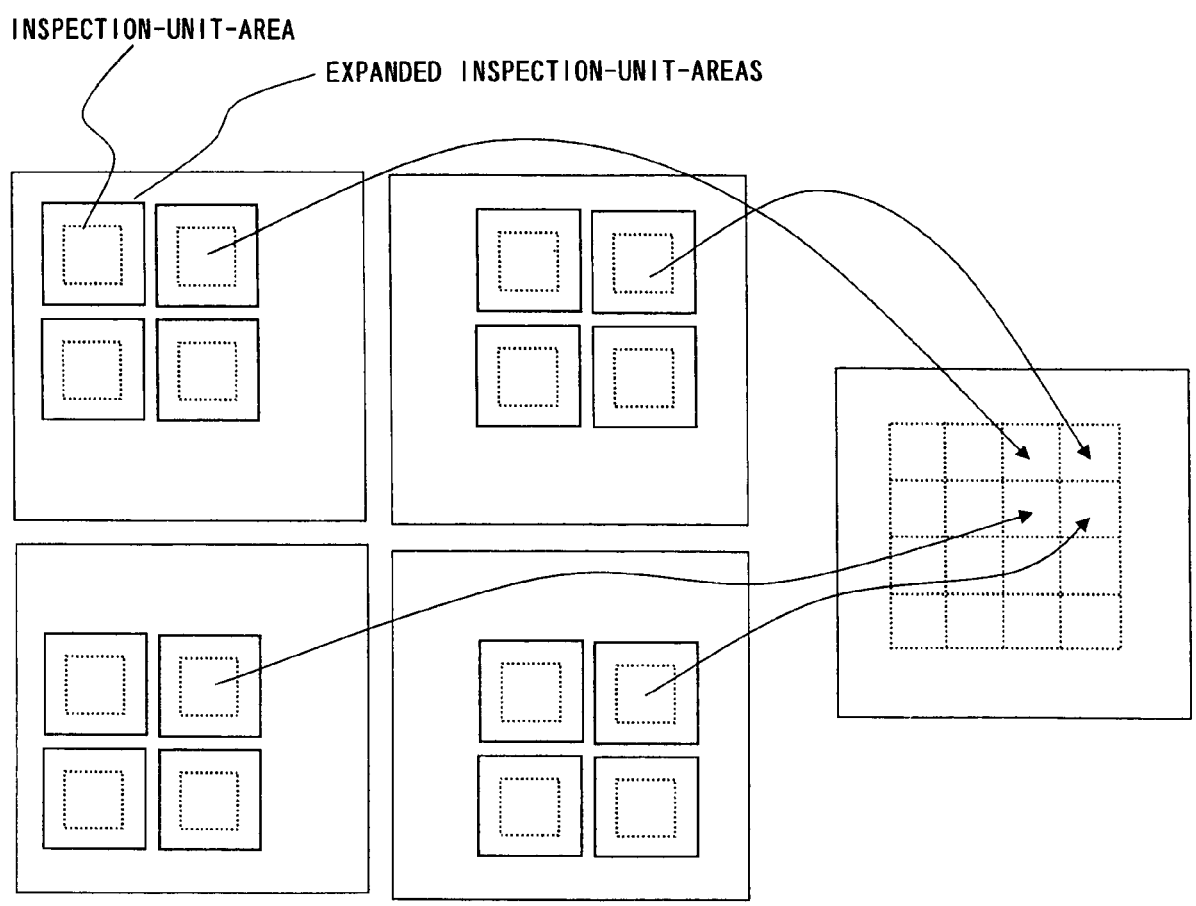

FIG. 125 is a schematic view showing a method in which the distortion correction vector calculation circuit calculates a distortion correction vector using representative distortion vectors;

FIG. 126A is schematic view showing a method in which representative distortion vectors are calculated from distortion vectors in a rectangle;

FIG. 126B is schematic view showing a composed distortion vector;

FIG. 127 is a schematic view showing a method in which the representative distortion vectors are calculated from distortion vectors in a plurality of rectangular regions;

FIGS. 128A and 128B are schematic views showing a method in which the distortion correction vector calculation circuit converts the distortion correction vector into a deflection voltage;

FIG. 129 is a schematic view showing a method in which a line width in a pattern image to-be-inspected is corrected by using detected line widths of an image beforehand;

FIG. 130 is a schematic view showing a method of obtaining a region suitable for auto contrast brightness adjustment and auto focus adjustment;

FIG. 131 is a schematic view showing examples of a region suitable for auto astigmatism adjustment;

FIG. 132 is a schematic view showing a method of obtaining a region suitable for auto astigmatism adjustment;

FIG. 133 is a schematic view showing two sub-inspection-unit-areas;

FIG. 134 is a schematic view showing a method of selecting the most suitable sub-inspection-unit-area for matching;

FIG. 135 is a diagram showing an example of inspection using a high-magnification image and a low-magnification image;

FIG. 136 is a schematic view showing the case where there is a pattern of a lower layer formed in the preceding process beneath a pattern to-be-inspected;

FIG. 137 is a schematic view showing an example of a display of superimposing the design data and mask data on a defect image;

FIGS. 138A, 138B, 138C, and 138D are schematic views showing examples of displaying detected defects as diagrams;

FIG. 139 is a schematic view showing a method in which defects are converted into the design data, and are displayed;

FIGS. 140A, 140B, 140C, 140D, 140E and 140F are schematic views showing a lithography process of a semiconductor device;

FIG. 141 is a schematic view showing a carbon film is coated on a resist film and an exposed oxide film formed by removing the resist film;

FIG. 142 is a schematic view showing a semiconductor wafer inspection system that integrates the apparatus for pattern inspection according to the present invention and a carbon sputtering coating apparatus;

FIG. 143A is a view showing an actual pattern image in the case where there is no carbon film on a specimen;

FIG. 143B is a view showing an actual pattern image in the case where the carbon film is coated onto the same specimen as shown in FIG. 143A; and FIG. 144 is a schematic view showing an inspection method of using only a center part of an image.

DETAILED DESCRIPTION OF THE PREFERRED EMBODIMENTS

Contents

1. Overview
2. Hardware configuration
2.1 Basic arrangement of image generation device
2.2 Scan methods of image generation device
2.2.1 Scan method 1
2.2.2 Scan method 2
2.2.3 Scan method 3
2.3 Basic arrangement of pattern inspection apparatus
2.4 Functional block diagram
3. Explanations of terms
3.1 Edge
3.2 Reference pattern
3.3 Recipe data
3.4 Inspection-unit-area
3.5 Inspection result
4. Basic Inspection processing
4.1 The first edge detection
4.1.1 The first edge detection method 1
4.1.2 The first edge detection method 2
4.2 Line-shaped pattern matching method
4.2.1 Matching method using unique pattern
4.2.2 Matching method using negative pattern
4.2.3 Matching method using projection data obtained by projecting edge on the horizontal and vertical axes
4.3 Matching method using geometrical information for hole pattern and island pattern
4.4 Matching method of using statistic values for hole pattern and island pattern
4.5 Post-matching processing
4.6 The first inspection
4.6.1 Method of recognizing defect having abnormal pattern deformation quantity
4.6.2 Method of recognizing defect using luminance distribution of pixels
4.7 Defect-classes based on feature quantity obtained from image
4.8 Pattern deformation quantities obtained from the whole inspection-unit-area
4.9 Method of detecting defect with regard to attribute of pattern
4.9.1 Defect of end having displacement error
4.9.2 Defects of line part and corner having displacement error
4.9.3 Defects of isolated pattern having displacement error
4.9.4 Other defects of isolated pattern
4.9.5 Defect of corner having abnormal curvature
4.10 Extraction rules for pattern attributes
4.11 The second edge detection
4.12 The second inspection
5. Application inspection processing
5.1 Method of recognizing repeated defect
5.2 Region inspection method
5.2.1 Methods of inspecting line width, average line width, space width, and average space width of line-shaped pattern
5.2.2 Methods of inspecting line width, average line width, space width, and average space width of curvilinear-shaped pattern
5.2.3 Method of inspecting part that is liable to cause open or bridge defect
5.3 Inspection methods using result of the Boolean operation
5.3.1 Method of inspecting gate line width
5.3.2 Method of inspecting end-cap
5.3.3 Method of adaptive setting of allowable deformation quantity of end
5.3.4 Method of inspecting contact-area
5.4 Method of inspecting correction pattern that should not be formed on wafer
5.5 Method of inspecting patterns requiring signal intensity correction
5.6 Method of separating pattern deformation quantities into global pattern deformation quantities and local pattern deformation quantities
5.6.1 Method of correcting time-dependence variation of measurement value of line width
5.7 Defect-classes based on geometrical information of reference pattern, information of design data, or information of data related to design data
5.8 Method of grouping defects based on feature of reference pattern
5.9 Method of selecting defect image to-be-registered
5.10 Method of selecting defect to-be-reinspected
5.11 Method of displaying distribution diagram of pattern deformation quantities
6. Other scan methods of image generation device
6.1 Method of scanning electron beam in 18 degrees, Method of scanning hexagonal block, and Method of automatically determining scanning conditions based on reference pattern
6.2 Scanning paths of electron beam
6.3 Method of scanning only neighboring portion of edges
6.4 Method of scanning only neighboring portion corresponding to region for region inspection method
7. Method of correcting image of pattern to-be-inspected
7.1 Method of correcting at least one of reference pattern and image of pattern to-be-inspected by detecting distortion quantities of image 7.2 Method of correcting nonlinear image distortion 7.3 Method of correcting variation of line width depending on image position in pattern image to-be-inspected 8. Other methods 8.1 Method of extracting region suitable for image adjustment 8.2 Method of selecting the most suitable sub-inspection-unit-area for matching 8.3 Inspection method using high-magnification image and low-magnification image 8.4 Inspection method of pattern to-be-inspected affected by pattern of preceding process 8.5 Display method of superimposing defect information on information corresponding to it 9. Inspection methods of specimen liable to cause the electrification phenomenon 9.1 Method of coating resist specimen with carbon film 9.2 Inspection method of using only central part of image 10. Modifications of embodiments of present invention 1. Overview A pattern inspection apparatus according to this embodiment performs the inspection by comparing a pattern image to-be-inspected obtained from an image generation device 7 shown in FIG. 1 with a reference pattern.

Figure 9:
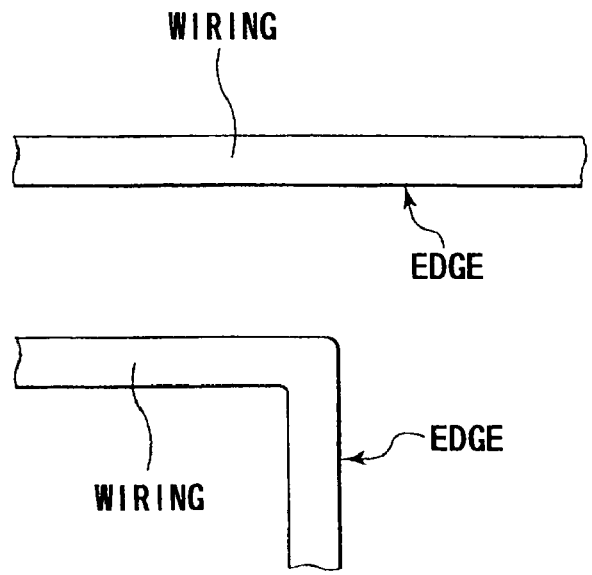
FIG. 9 is a diagram showing an example of reference patterns obtained from design data.
Figure 10:
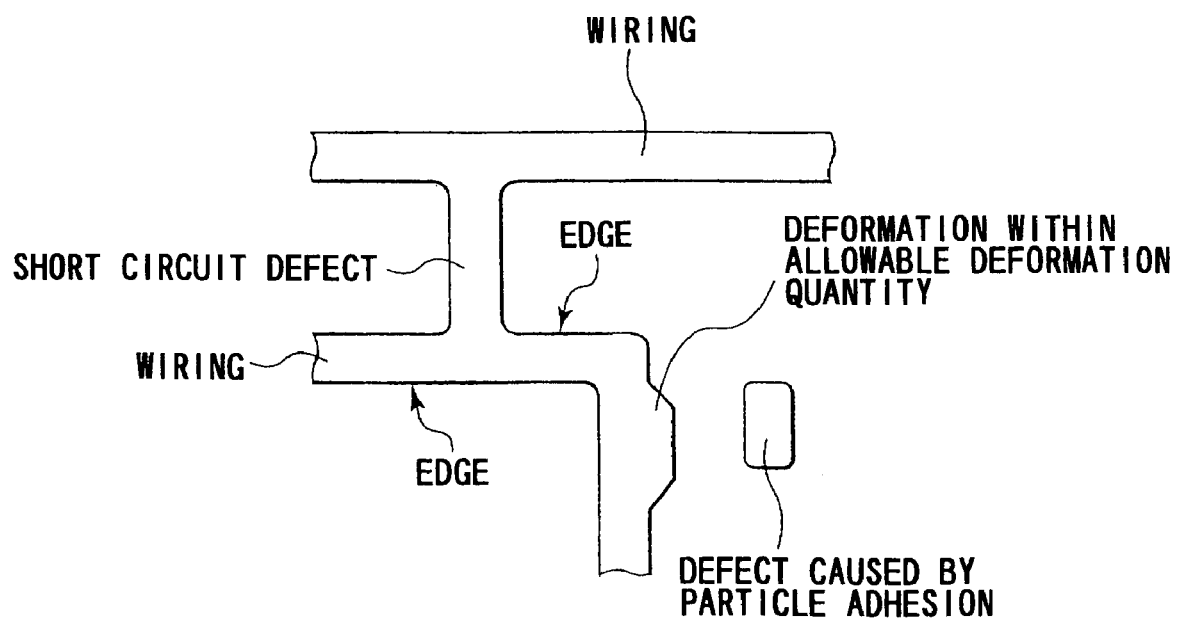
FIG. 10 is a diagram showing an example of a pattern image to-be-inspected fabricated based on the design data.

FIG. 9 is a diagram showing an example of reference patterns obtained from design data, and FIG. 10 is a diagram showing an example of a pattern image to-be-inspected fabricated based on the design data. As shown in FIG. 10, the pattern image to-be-inspected may have a bridge defect, a particle defect, and a deformation within an allowable pattern deformation quantity. Especially, corners have big corner roundness. Therefore, the pattern image to-be-inspected is rather different from the reference patterns.

Figure 11:
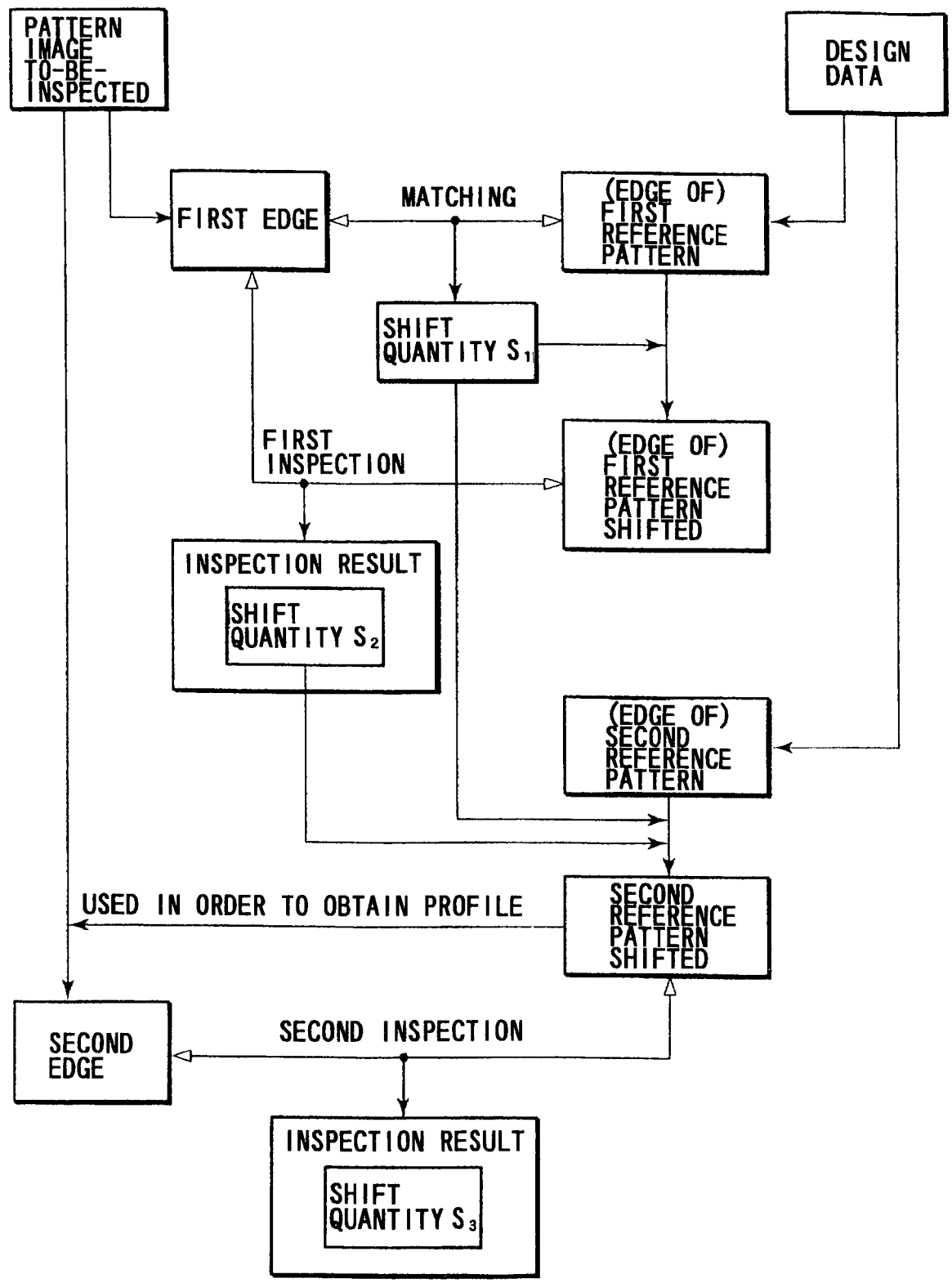
FIG. 11 is a diagram showing an outline of inspection processing that the pattern inspection apparatus according to this embodiment performs.

FIG. 11 is a diagram showing an outline of inspection processing that the pattern inspection apparatus according to this embodiment performs. In the first inspection processing, the first edges are detected from the pattern image to-be-inspected. Then, by comparing the detected first edges with edges of the first reference pattern, the matching between the pattern image to-be-inspected and the reference pattern is performed. As a result of the matching, the shift quantity $S_1$ is obtained, and the first reference pattern is shifted by the shift quantity $S_1$. Next, by comparing the detected first edges with the first reference pattern shifted, the pattern to-be-inspected is inspected. In the first inspection, pattern deformation quantities are obtained by comparing the detected first edges with the edges of the first reference pattern, and then a defect is detected from the pattern deformation quantities. The shift quantity $S_2$ is obtained as one of the pattern deformation quantities.

Then, in order to detect the second edges from the pattern image to-be-inspected, the corresponding second reference pattern is shifted by the shift quantity $S_1+S_2$. Using the second reference pattern shifted, profiles are obtained from the pattern image to-be-inspected and the second edges are detected. Then, by comparing the detected second edges with the edges of the second reference pattern shifted, the pattern to-be-inspected is inspected. Also in the second inspection, pattern deformation quantities are obtained by comparing the detected second edges with the edges of the second reference pattern, and then a defect is detected from the pattern deformation quantities. The shift quantity $S_3$ is obtained as one of the pattern deformation quantities.

By using the above method, the bridge defect, the particle defect, and the pattern deformation quantities can be detected from the pattern image to-be-inspected, and the defects or the pattern deformation quantities can be classified from attributes that the design data has.

2. Hardware Configuration 2.1 Basic Arrangement of Image Generation Device

Figure 1:
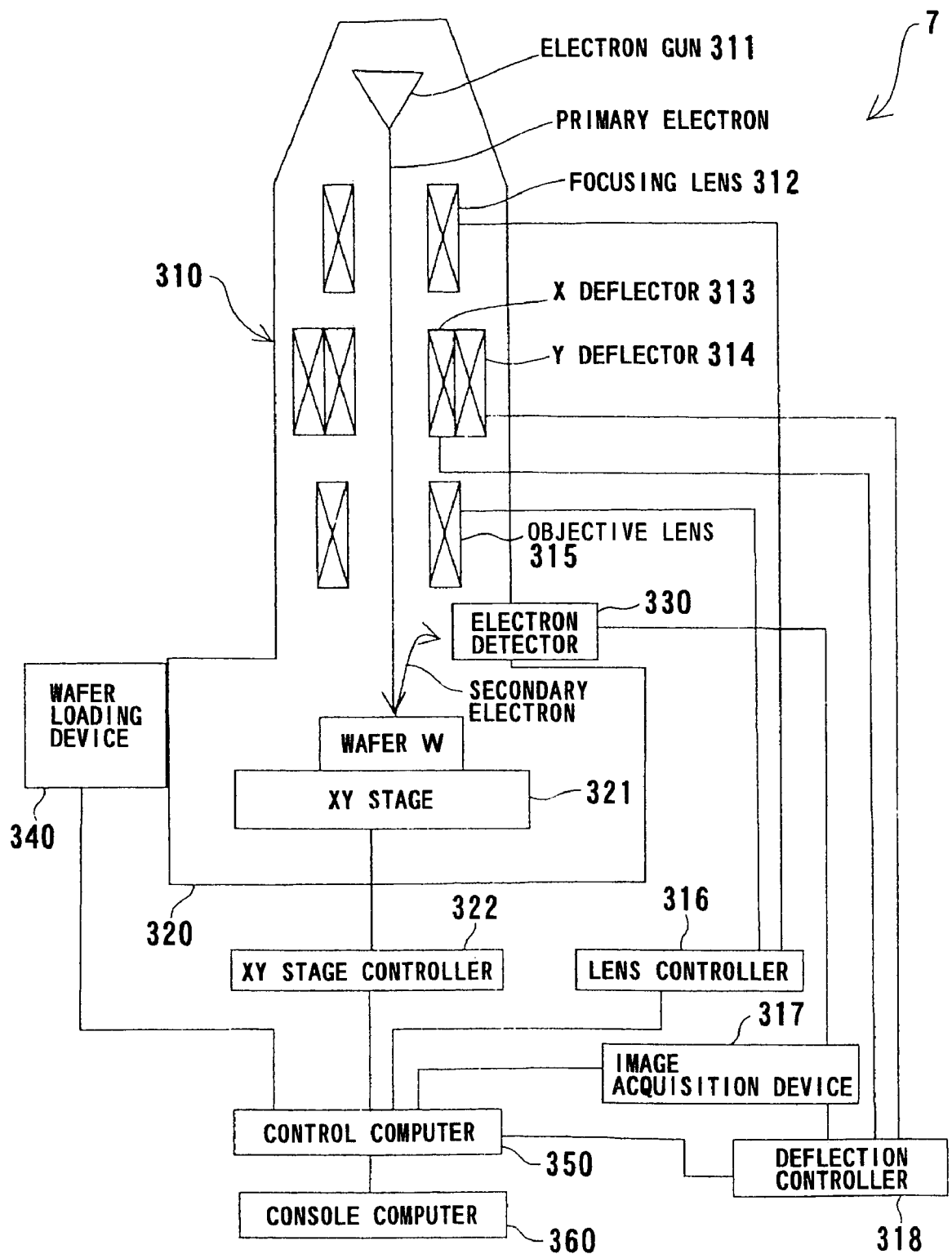
FIG. 1 is a schematic view, partly in block form, showing a basic arrangement of an image generation device in a pattern inspection apparatus according to an embodiment of the present invention.

FIG. 1 is a schematic view, partly in block form, a basic arrangement of the image generation device 7 in a pattern inspection apparatus according to an embodiment of the present invention. As shown in FIG. 1, the image generation device 7 generally comprises an irradiation system 310, a specimen chamber 320, and a secondary electron detector 330.

The irradiation system 310 comprises an electron gun 311, a focusing lens 312 for focusing primary electrons emitted from the electron gun 311, an X deflector 313 and a Y deflector 314 for deflecting an electron beam (charged particle beam) in the X and Y directions, respectively, and an objective lens 315. The specimen chamber 320 has an XY stage 321 movable in the X and Y directions. A wafer W as a specimen can be loaded into and unloaded from the specimen chamber 320 by a wafer-loading device 340.

In the irradiation system 310, primary electrons emitted from the electron gun 311 are focused by the focusing lens 312, deflected by the X deflector 313 and the Y deflector 314, and focused and applied by the objective lens 315 to the surface of the wafer W.

When the primary electrons are applied to the wafer W, the wafer W emits secondary electrons, which are detected by the secondary electron detector 330. The focusing lens 312 and the objective lens 315 are connected to a lens controller 316 that is connected to a control computer 350. The secondary electron detector 330 is connected to an image acquisition device 317 that is also connected to the control computer 350. The X deflector 313 and the Y deflector 314 are connected to a deflection controller 318 that is also connected to the control computer 350. The XY stage 321 is connected to an XY stage controller 322 that is also connected to the control computer 350. The wafer-loading device 340 is also connected to the control computer 350. The control computer 350 is connected to a console computer 360.

2.2 Scan Methods of Image Generation Device

Figure 2:
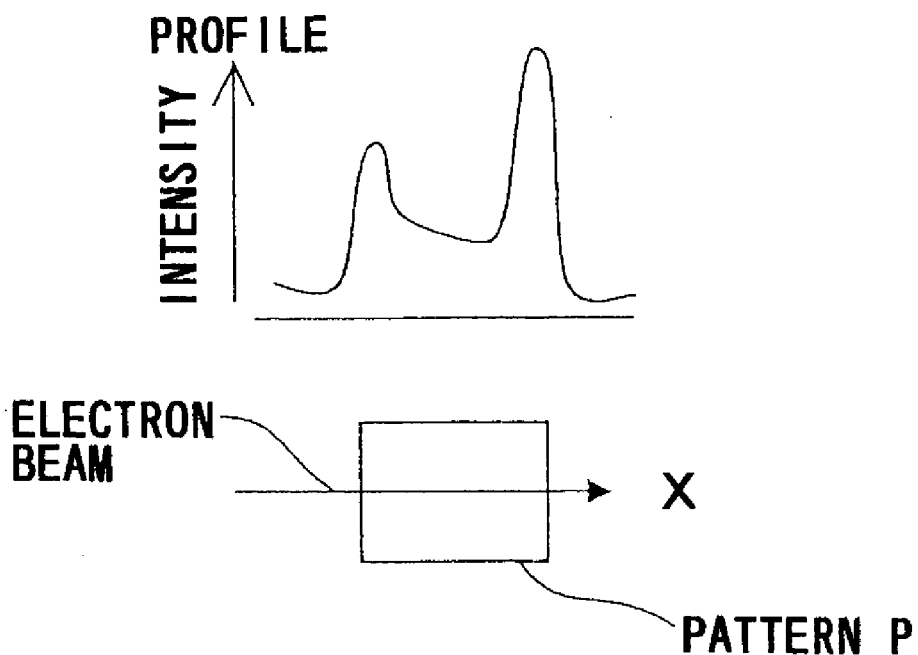
FIG. 2 is a schematic view showing intensity of secondary electrons detected by a secondary electron detector in the image generation device shown in FIG. 1.

FIG. 2 is a schematic view showing intensity of secondary electrons detected by the secondary electron detector 330 shown in FIG. 1. Specifically, FIG. 2 shows the intensity of the secondary electrons that are detected by the secondary electron detector 330 when a pattern P is scanned by the one electron beam in the X direction. As shown in FIG. 2, the intensity of the secondary electrons is stronger at edges of the pattern P due to the edge effect and weaker at a central area of the pattern P. The intensity of the secondary electrons is not symmetrical horizontally across the pattern P, but is observed with a lower level at the edge (left edge) where the electron beam starts scanning the pattern P than at the opposite edge (right edge) where the electron beam leaves the pattern P.

Figure 3:
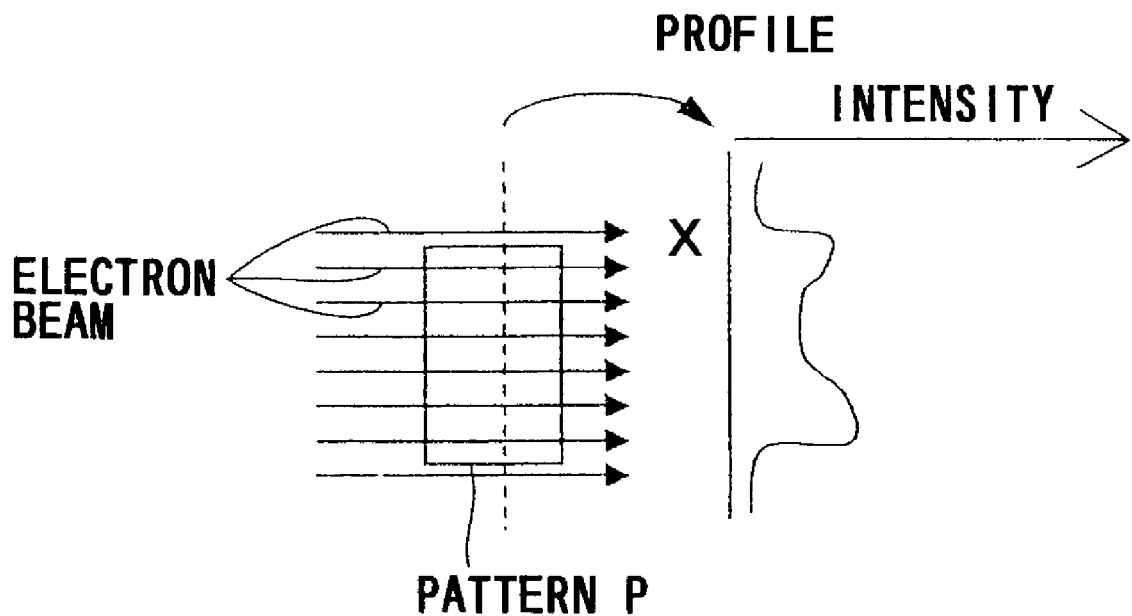
FIG. 3 is a schematic view showing intensity of the secondary electrons in the case where the pattern P shown in FIG. 2 is turned 90 degrees and profiles of the pattern P are obtained.

FIG. 3 is a schematic view showing intensity of the secondary electrons in the case where the pattern P shown in FIG. 2 is turned 90 degrees and profiles of the pattern P are obtained. Specifically, FIG. 3 shows the intensity of the secondary electrons that are detected by the secondary electron detector 330 when the pattern P is scanned by a plurality of electron beams in the X direction. As shown in FIG. 3, it is difficult to obtain the edge effect at edges of the pattern P parallel to the scanning direction, compared with the intensity of the secondary electrons shown in FIG. 2.

Figure 4:
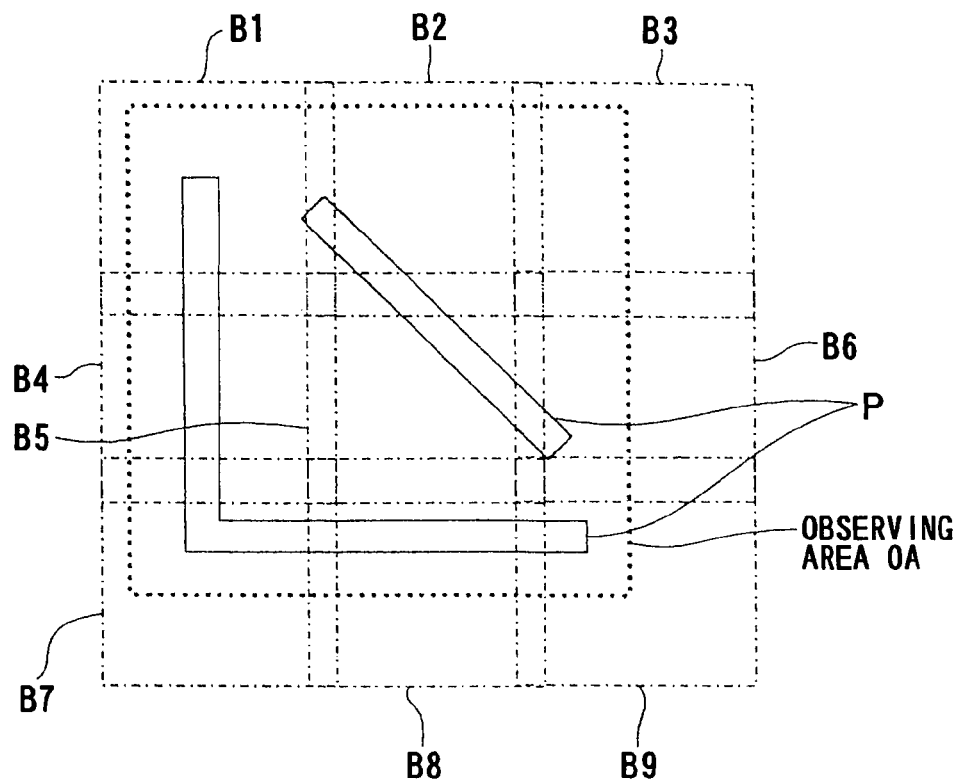
FIG. 4 is a schematic view showing a scanning area used when patterns are inspected by the pattern inspection apparatus according to the embodiment of the present invention.

FIG. 4 is a schematic view showing a scanning area used when patterns are inspected by the pattern inspection apparatus according to the embodiment of the present invention. In FIG. 4, patterns P to-be-inspected are shown by the solid lines. A square block shown by dot-and-dash lines represents an area (scanning area) which is obtained by a single scanning process. In FIG. 4, the square block comprises nine blocks B1 through B9 arranged in a matrix of three vertical columns and three horizontal rows. An observing area OA is shown by dotted lines.

Figure 5:
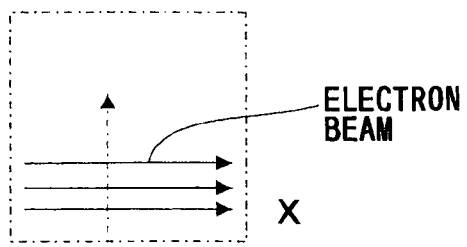
FIG. 5 is a schematic view illustrative of inspection accuracy that is obtained when a pattern is scanned horizontally.

FIG. 5 is a schematic view illustrative of inspection accuracy that is obtained when a pattern is scanned horizontally (in the X direction). As shown in FIG. 5, when a pattern is scanned horizontally, inspection accuracy with respect to a vertical line is as high as inspection accuracy shown in FIG. 2. However, inspection accuracy with respect to a horizontal line is low.

Figure 6:
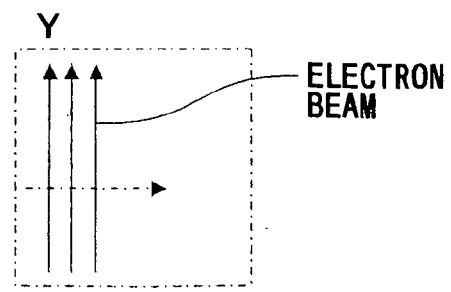
FIG. 6 is a schematic view illustrative of inspection accuracy that is obtained when a pattern is scanned vertically in an upward direction.

FIG. 6 is a schematic view illustrative of inspection accuracy that is obtained when a pattern is scanned vertically in an upward direction (in the Y direction). As shown in FIG. 6, when a pattern is scanned vertically, inspection accuracy is high with respect to a horizontal line, but is low with respect to a vertical line.

In a lower left block B7 of FIG. 4 where there are both horizontal and vertical patterns, if inspection accuracy with respect to both horizontal and vertical lines needs to be high, two scans including the horizontal scan shown in FIG. 5 and the vertical scan shown in FIG. 6 are required. In a block B8 which is to the right of the block B7 where there is only a horizontal pattern, inspection accuracy is high when only the vertical scan shown in FIG. 6 is performed. In a middle left block B4 where there is only a vertical pattern, inspection accuracy is high when only the horizontal scan shown in FIG. 5 is performed. Therefore, by selectively performing the horizontal scan, the vertical scan, or the two horizontal and vertical scans, a desired image of a pattern is obtained under the scan control.

If the scanning direction is 0 degree (the X direction), accuracy of detecting edges of a pattern extending in the X direction (horizontal) is low. If the scanning direction is 90 degrees (the Y direction), accuracy of detecting edges of a pattern extending in the Y direction (vertical) is low. Therefore, for achieving a high level of accuracy of detecting edges of a pattern, it is necessary to scan the pattern in two directions, i.e., at 0 degree and 90 degrees. Because most of the patterns on semiconductor integrated circuits (LSI) and liquid crystal panels comprise patterns extending horizontally (in the X direction) and patterns extending vertically (in the Y direction), those patterns need to be scanned in two directions, i.e., the X direction (0 degree) and the Y direction (90 degrees), for detecting the patterns with high accuracy.

FIG. 7 is a schematic view showing a method in which a pattern is scanned bidirectionally. As described using FIGS. 2 through 6, if the scanning direction is not perpendicular to the edges, inspection accuracy is low, because sufficient luminance due to an edge effect is not prominent. Further, inspection accuracy at the edge (left edge in FIG. 2) at which the scanning line goes into the pattern tends to be lower than inspection accuracy at the opposite edge (right edge in FIG. 2) at which the scanning line leaves from the pattern. In view of these observations, an image is acquired by scanning the pattern in alternately opposite directions as shown in FIG. 7. Specifically, the image is acquired by scanning the pattern alternately in leftward direction scan and rightward direction scan. Edges of the pattern at which the scanning line goes into the pattern are inspected using the image acquired by the leftward direction scan, and the opposite edges of the pattern are inspected using the image acquired by the rightward direction scan. As a result, high inspection accuracy can be achieved at both the edges of the pattern.

FIGS. 8A, 8B, and 8C are schematic views showing methods in which a scanning direction is 45 degrees and −45 degrees. If the scanning direction is 0 degree and 90 degrees, then it is necessary almost certainly to perform two scans. According to the present process, a pattern P1 composed of only horizontal and vertical lines as shown in FIG. 8A may be scanned once at 45 degrees as shown in FIG. 8B, or at −45 degrees as shown in FIG. 8C to achieve desired inspection accuracy for the horizontal and vertical lines.

If there is a line P2 at 45 degrees as shown in FIG. 8A, the patterns need to be scanned twice at 45 degrees and −45 degrees. However, it is expected that the frequency of requiring only one scan is relatively large compared with the pattern P1 composed of only horizontal and vertical lines. Therefore, scanning at 45 degrees or −45 degrees is efficient for achieving high inspection accuracy by one scanning.

Next, the case where scanning at 45 degrees and −45 degrees are performed will be described. In FIG. 8B, the desired inspection accuracy for a pattern that is inclined downwardly to the right like the pattern P2 is achieved when the pattern is scanned in the direction at 45 degrees. However, the desired inspection accuracy for a pattern that is inclined upwardly to the right cannot be achieved when the pattern is scanned in the direction at 45 degrees because the scanning direction and direction of edges are parallel. The pattern is inspected by using an image acquired by the pattern scanned at −45 degrees as shown in FIG. 8C is used. It is expected that the frequency of performing scanning at 45 degrees and −45 degrees is smaller than the frequency of performing scanning at 0 degree and 90 degrees.

As described above with reference to FIGS. 2 through 8, the image generation device 7 generates an image of a pattern to-be-inspected according to one of the following three scanning methods:

2.2.1 Scan Method 1

Unidirectional scan at 0 degree, 90 degrees, 45 degree, or −45 degrees;

2.2.2 Scan Method 2

Alternate scan at 0 degree and 180 degrees; and 2.2.3 Scan Method 3

Bidirectional scan at 0 degree and 90 degrees or bidirectional scan at 45 degrees and −45 degrees.

Here, a coordinate system has the X-axis extending in the rightward direction and the Y-axis extending in the upward direction, with most frequent directions of the pattern to-be-inspected being rightward (0 degree). A direction of the edge is defined as a direction in which the interior of the pattern is located on the right-hand side. In the block B4 in FIG. 4, there are two edges extending vertically, a direction of the left side edge is determined as 90 degrees, and a direction of the right side edge is determined as 270 degrees.

As described later in 4.1 The first edge detection, the first edge is detected from a local image. A direction of the first edge is determined at a time of detection. A method in which the first edge is detected from the image of the pattern to-be-inspected acquired by the above-mentioned Scan method 1 through Scan method 3 will be described.

According to the unidirectional scan of the above-mentioned Scan method 1, and the alternate scan of the above-mentioned Scan method 2, an edge is detected from a single image. According to the bidirectional scan of the above-mentioned Scan method 3, edges are detected from two images, and the detected edge information is merged. Specifically, according to the bidirectional scan at 0 degree and 90 degrees, only an edge having an angle from 45 degrees to 135 degrees and an angle from 225 degrees to −45 degrees is detected from an image scanned at 0 degree, and only an edge having an angle from 135 degrees to 225 degrees and an angle from −45 degrees to 45 degrees is detected from an image scanned at 90 degrees, and all edges are combined into total edges that are handled as edges detected from a single image.

According to the bidirectional scan at 45 degrees and −45 degrees, only an edge having an angle from 90 degrees to 180 degrees and an angle from 270 degrees to 360 degrees is extracted from an image scanned at 45 degrees, and only an edge having an angle from 0 degree to 90 degrees and an angle from 180 degrees to 270 degrees is extracted from an image scanned at −45 degrees, and all edges are combined into total edges that are handled as edges detected from a single image.

As described later in 4.11 The second edge detection, the second edge is detected from a profile (one-dimensional data). A direction of the second edge is determined at a time of setting the profile. A method in which the second edge is detected from the profile obtained by the above-mentioned Scan method 1 through Scan method 3 will be described.

According to the unidirectional scan of the above-mentioned Scan method 1, a profile is determined from one image.

According to the alternate scan at 0 degree and 180 degrees of the above-mentioned Scan method 2, a profile for detecting a right edge (an edge at an angle from 180 degrees through 360 degrees) is obtained from an image scanned at 0 degree, and a profile for detecting a left edge (an edge at an angle from 0 degree through 180 degrees) is obtained from an image scanned at 180 degrees.

According to the bidirectional scan of the above-mentioned Scan method 3, a profile for detecting an edge having an angle from 45 degrees to 135 degrees and an angle from 225 degrees to −45 degrees is obtained from an image scanned at 0 degree, and a profile for detecting an edge having an angle from 135 degrees to 225 degrees and an angle from −45 degrees to 45 degrees is obtained from an image scanned at 90 degrees.

Figure 12:
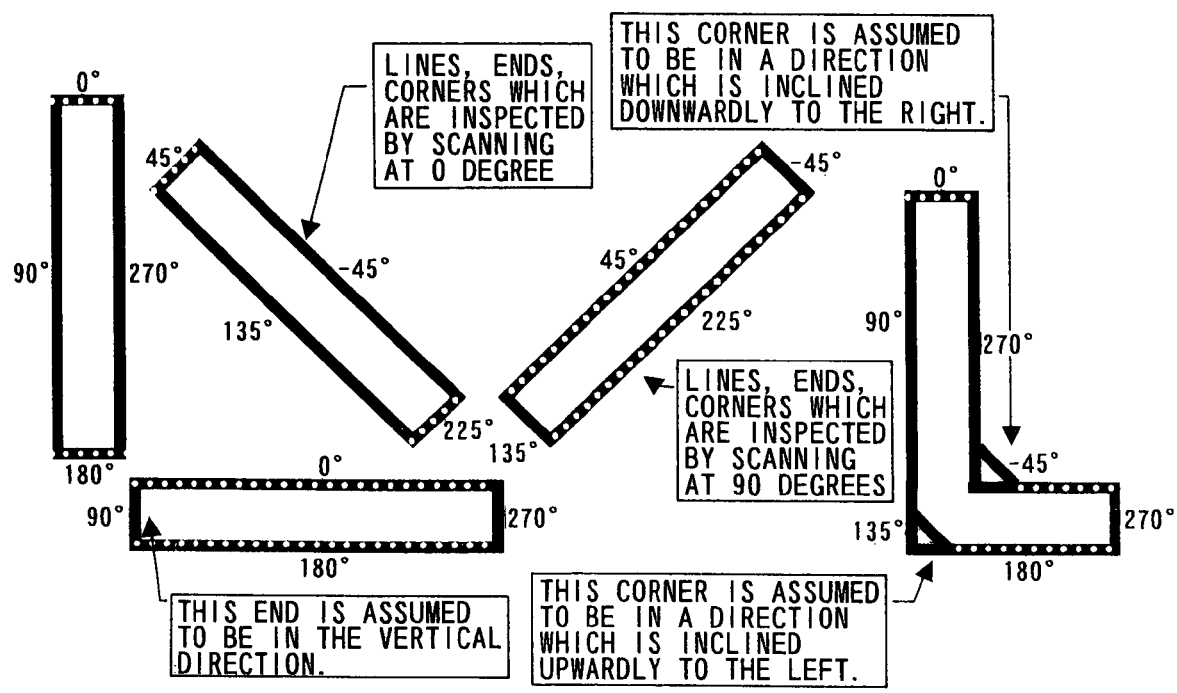
FIG. 12 is a schematic view showing examples of line segments, which should be inspected by using either the image scanned at 0 degree or the image scanned at 90 degrees.

FIG. 12 is a schematic view showing examples of line segments, which should be inspected by using either the image scanned at 0 degree or the image scanned at 90 degrees. As shown FIG. 12, line segments of line parts, ends, and corners that have the vertical direction (90 degree or 270 degrees), a direction that is inclined upwardly to the left (135 degrees), and a direction that is inclined downwardly to the right (−45 degrees) should be inspected by using an image scanned at 0 degree. Further, line segments of line parts, ends, and corners that have the horizontal direction (0 degree or 180 degrees), a direction that is inclined upwardly to the right (45 degrees), and a direction that is inclined downwardly to the left (225 degrees) should be inspected by using an image scanned at 90 degrees.

According to the bidirectional scan at 45 degrees and −45 degrees, a profile for detecting an edge between an angle from 90 degrees through 180 degrees and an angle from 270 degrees through 360 degrees is obtained from an image scanned at 45 degrees, and a profile for detecting an edge between an angle from 0 degree through 90 degrees and an angle from 180 degrees through 270 degrees is obtained from an image scanned at −45 degrees.

In the case where the image is acquired by scanning at 45 degrees or −45 degrees, there is rotation between the acquired image and the reference pattern, and hence it is necessary to compensate for such rotation. According to one method, the reference pattern is rotated. However, because the reference pattern is rotated, the inclined image becomes final output image, and hence such image is difficult to see. Therefore, a method in which the image is rotated is used. However, in the case where scanning is made in order to perform sampling uniformly in the X and Y directions, if the acquired image is rotated, interpolated values between pixels must be used as values of the rotated image. In this case, an acquired image may be unsharp by interpolation, and hence in this embodiment, the rotated image is acquired only by replacing positions of pixels without using interpolation. In the case of using this embodiment, it is necessary to use the following scanning method.

FIG. 13 is a schematic view showing a method in which a rotated image is acquired only by replacing positions of pixels. The 45 degree inclination scanning method in the left part of FIG. 13 and the 45 degree inclination image in the right part of FIG. 13 are the same object which are shown by rotation of 45 degrees. The final image to be acquired is the image on the right-hand side of FIG. 13. In FIG. 13, grid points of a chessboard show the positions of images to be acquired by uniform sampling in the X and Y directions. Solid circles (●) correspond to data of actual sampling. In parts where there is no solid circle, pixel values cannot be acquired. In order to acquire the image on the right-hand side of FIG. 13, the scanning method on the left-hand side of FIG. 13 is performed.

In this case, sampling intervals S in the X direction are the same for each scanning line, but sampling intervals in the Y direction are half of the sampling interval S in the X direction. Between odd-numbered lines and even-numbered lines, the sampling interval is shifted by half of the sampling interval S in the X direction. This sampling interval S is obtained by multiplying the pixel interval on the right-hand side of FIG. 13 by √2. In this manner, a desired image can be obtained only by rotating of the left side view. In this case, it is necessary to put values in the order different from the actual sampling order.

Although FIG. 13 shows the case in which scanning is performed at 45 degrees, FIG. 14 shows the case in which scanning is performed at arctangent(2) and the rotated image.

According to this embodiment, the pattern may be scanned with a minimum electron beam (charged particle beam), and hence image of the pattern to-be-inspected can be obtained in a minimum time. In addition, the rotated image can be acquired without lowering of image quality due to interpolation, and hence the detection accuracy of the edge can be prevented from being lowered. Moreover, the difference between the image qualities in the X and Y directions can be reduced to the utmost by making scans twice, and scan can be performed at a high speed.

2.3 Basic Arrangement of Pattern Inspection Apparatus

FIG. 15 is a diagram showing a basic arrangement of the pattern inspection apparatus in this embodiment. The pattern inspection apparatus according to this embodiment comprises a main control unit 1, a storage device 2, an input/output control unit 3, an input device 4, a display device 5, a printer 6, and an image generation device 7 shown in FIG. 1.

The main control unit 1 comprises a CPU (Central Processing Unit) or the like, and manages and controls the whole apparatus. The main control unit 1 is connected to the storage device 2. The storage device 2 can take a form of a hard disk drive, a flexible disk drive, an optical disc drive, and the like. Further, the input device 4 such as a keyboard or a mouse, the display device 5 such as a display for displaying the input data, calculation results, and the like, and the printer 6 for printing the calculation results and the like are connected to the main control unit 1 through the input/output control unit 3.

The main control unit 1 has a control program such as an OS (Operating System), a program for the pattern inspection, and an internal memory (internal storage device) for storing necessary data and the like, and realizes the pattern inspection with these programs and the like. These programs can be initially stored in a flexible disk, a CD-ROM disc, and the like, read and stored in a memory, a hard disk, and the like before execution, and then executed.

2.4 Functional Block Diagram

FIG. 16 is a diagram showing a functional block diagram of the pattern inspection apparatus in this embodiment. A reference pattern generation unit (reference pattern generation device) 11, an inspection unit (inspection device) 12, an output unit 13, and a defect-class determination unit (defect classification device) 14 are all realized by programs. A fundamental database 21, a recipe database 22, and a defect-class reference database 23 are provided in the storage device 2. The inspection unit (inspection device) 12 includes a detecting device for detecting the first edge and the second edge of an image of the pattern to-be-inspected.

Alternatively, the fundamental database 21 may be provided outside the storage device 2 and the pattern inspection apparatus may access the fundamental database 21 through the LAN (Local Area Network).

FIG. 17 is a diagram showing the functional block diagram of the pattern inspection apparatus according to another embodiment of the present invention. FIG. 17 shows a structure having a function for recognizing repeated defects. In the example of FIG. 17, a defect information storage unit 24 and a repeated defect recognition unit (repeated defect recognition device) 25 are added to the functional block of FIG. 16.

3. Explanations of Terms

3.1 Edge

An edge means a boundary between the inside of a pattern to-be-inspected and a grounding. As the edge, an edge of pattern image to-be-inspected and an edge of a reference pattern are used as shown in FIG. 60. The edge of the pattern image to-be-inspected is detected by edge detection methods, and the edge of the reference pattern is obtained by dividing the reference pattern pixel by pixel.

The edge is represented by a vector that has information of a starting point (with sub pixel accuracy), a direction, and a magnitude for each pixel. In the case of the edge of the pattern image to-be-inspected, the magnitude is a length of vector multiplied by sharpness of the edge, where sharpness is defined as a probability of being a real edge. In the case of the edge of the reference pattern, the magnitude is a length of vector multiplied by a degree of contribution to matching.

3.2 Reference Pattern

A reference pattern is represented by one or more lines, and is compared with a pattern image to-be-inspected. Each of the one or more lines comprises one of a line segment or a curve. The design data can be used as the most suitable data for the reference pattern. As the design data, data obtained by modifying layout data that is represented by the GDSII (Graphic Design System II) data stream format through layer merging or fracturing can be used.

First, the design data is modified in order to be optimum for positions of the edges that are detected from the pattern image to-be-inspected by performing shrink processing (processing in which the magnification of the pattern image is altered), size processing (processing in which the line width is altered), and the like, on the design data. Furthermore, because the position of the edge to-be-detected is generally different in the first edge detection and in the second edge detection, two kinds of the reference patterns are prepared for the first edge detection and for the second edge detection.

Next, polygons obtained by the above processing are clipped by a rectangular area whose one side is equal to the side of the field of view plus an error of the stage and the maximum deformation quantity of a pattern to-be-inspected.

Next, the corners of the obtained polygons are rounded off. As shown in FIG. 18, normally the design data consists of polygons having acute angles (dotted lines in FIG. 18). On the other hand, circuit patterns actually formed have rounded corners. In order to cancel this difference, the corners are corrected to be close to the actual patterns by applying a circle, an ellipse, a straight line, or a curve described by other method to the corner parts.

Finally, results obtained by the above are stored in the recipe database 22 beforehand. If the error of the stage can be neglected compared to the maximum deformation quantity of a pattern to-be-inspected, the absolute coordinate values of the pattern deformation can be measured. In this embodiment, the reference pattern is set to be larger than the pattern image to-be-inspected in consideration of the error of the stage and the maximum deformation quantity of a pattern to-be-inspected to perform the processing. Alternatively, the pattern image to-be-inspected may be set to be larger than the reference pattern to perform the processing.

If the design data is used as the reference pattern, defect inspection in which a pattern formed on a wafer is compared with the design data can be performed. In this case, an allowable quantity that does not affect the electrical characteristic is set. This pattern deformation quantity may be set for each attribute of the wiring, and furthermore may be altered for a portion where the patterns are crowded and for a portion where the patterns are not crowded.

If a curve (solid lines in FIG. 73), representing a contour of an exposed pattern obtained by a lithography simulator is used as a reference pattern, verification of the simulation capability can be performed. Output data of the lithography simulator is a light intensity distribution obtained by optical simulation. The curves of the shape are obtained from the distribution. In this case, for an allowable pattern deformation quantity, an error that is allowed in the simulation is set.

In this embodiment, a method in which the design data is used as the reference pattern will be described.

Figure 22:
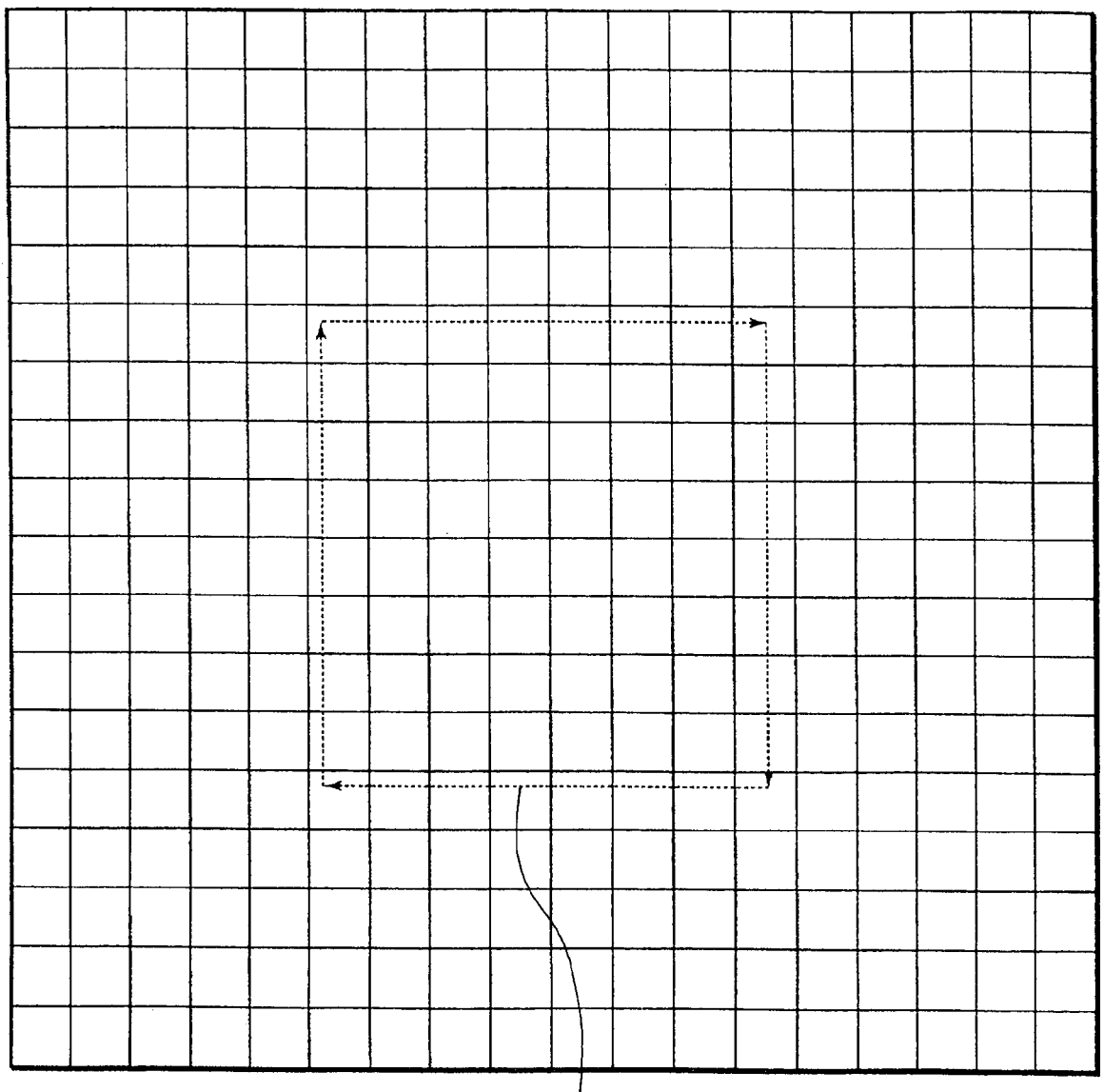
FIG. 22 is a diagram showing an example of a reference pattern.
Figure 23:
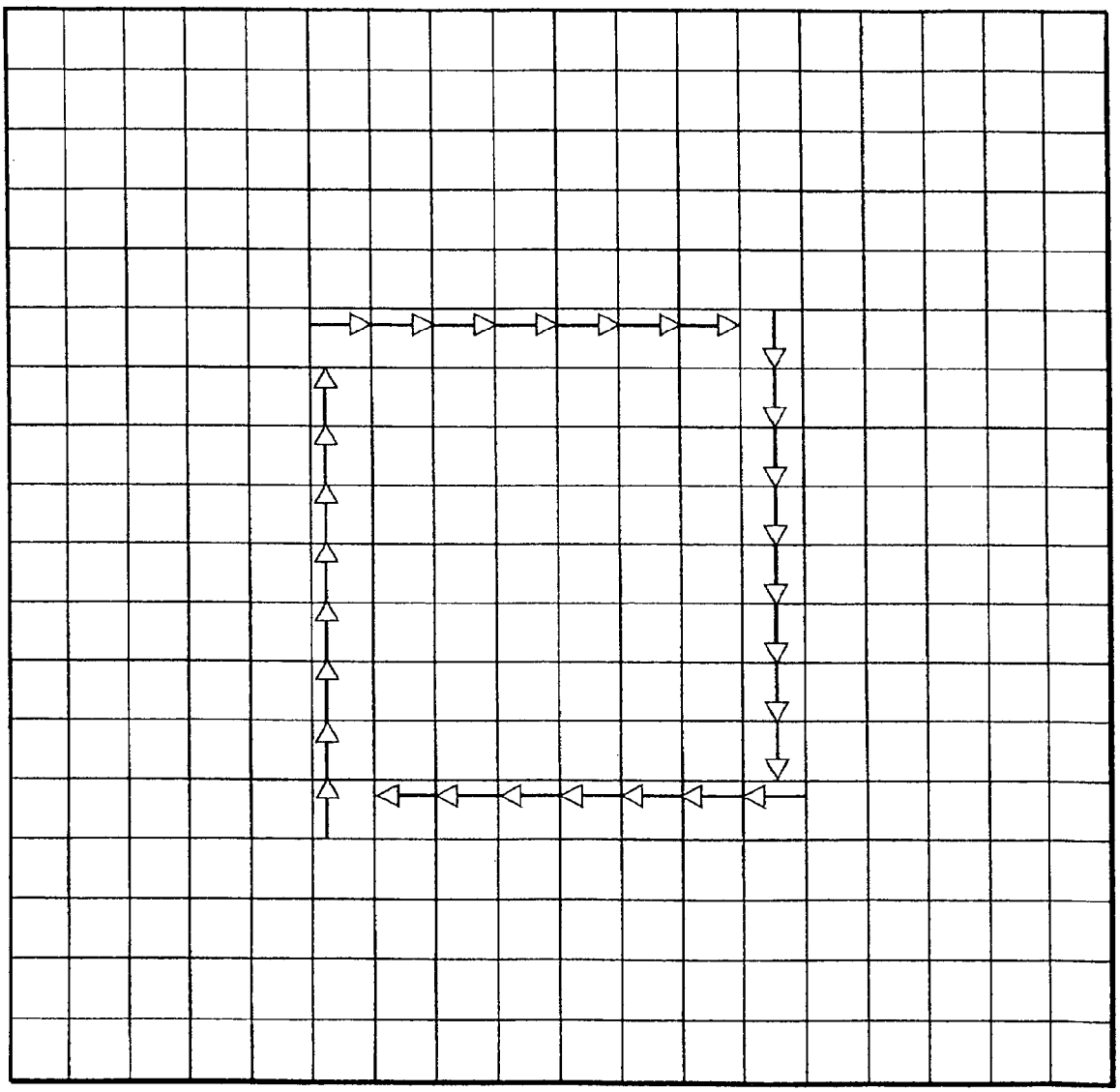
FIG. 23 is a diagram showing an example in which the reference pattern of FIG. 22 is converted into edges for respective pixels.

FIG. 22 is a diagram showing an example of the reference pattern, and FIG. 23 is a diagram showing an example in which the reference pattern S of FIG. 22 is converted into the edges for respective pixels. In FIG. 22, the reference pattern S (dotted lines) is shown with sub pixel accuracy. Normally, edge direction of the reference pattern is parallel to the horizontal direction (X-direction) or the vertical direction (Y-direction) of the pixel. The edge of the reference pattern, as with the edge of the pattern image to-be-inspected, has information of a starting point (with sub pixel accuracy), a direction, and the magnitude for each pixel. In this embodiment, the edge magnitude of the reference pattern is set to unity, i.e. 1 for all pixels except for 4.2.1 Matching method using unique pattern and 4.2.2 Matching method using negative pattern described later.

As shown in FIG. 24, the reference pattern may include a curve. For converting a curvilinear part of the reference pattern into an edge of the reference pattern, a tangent line 263 at a point 262 that is on the reference pattern and is closest to the center 261 of the pixel is generated.

3.3 Recipe Data

Before the inspection, a set of inspection parameters called recipe data is set. As operator input parameters of the recipe data, design data retrieval parameters, image acquisition parameters, and edge detection/inspection parameters are set. As output data of the recipe data, a reference pattern generation unit 11 generates a reference pattern.

As the design data retrieval parameters, a device name and a process name with regard to a wafer (specimen) to-be-inspected are set. As the image acquisition parameters, a slot number for specifying a wafer, condition-setting parameters for a irradiation system 310, a pixel size, the number of pixels and an inspection area are set.

The pixel size means a distance on the wafer corresponding to an interval between the pixels of the pattern image to-be-inspected. For the number of pixels, 1024×1024, 8192×8192, or the like is set. The pixel size is multiplied by the number of pixels, and the obtained product is a size on the wafer corresponding to a size of the pattern image to-be-inspected. Hereafter, the size is called a field of view. For example, in the case where the pixel size is 9 nm and the number of pixels is 8192×819, the field of view is approximately 70 μm×70 μm.

As the edge detection/inspection parameters, the following parameters are set:

1. Pattern deformation quantities to be inspected
   A shift quantity of an edge;
   A deformation quantity of a line width;
   The minimum line width;
   A deformation quantity of a space width;
   The minimum space width;
   A contact-area inspection ratio;
   A shift quantity of the centroid of a pattern, a deformation quantity of a diameter, and the like, in the case of a hole pattern and island pattern; and
   A defect judgment coefficient of a correction pattern that should not be formed on a wafer.

2. Limit values of the negative side and the positive side of the allowable pattern deformation quantities, which are corresponding to the above pattern deformation quantities, and a limit of the allowable directional difference between edges.

These pattern deformation quantities are set for each attribute of a pattern.

3. Parameters for detecting the first edge, which are empirically determined from an image.
   The first edge detection method;
   Coefficients of filter for edge dilation;
   A threshold used in binarization of edges of a pattern image to-be-inspected; and
   A p-tile coefficient used in binarization of edges of a pattern image to-be-inspected.

4. Parameters used in extraction rules for determining attributes of reference pattern (line part, corner, end, isolated pattern, and the like).
   The attributes of the reference pattern are used for specifying part or whole of the reference pattern. Typically, there are three kinds of attributes of reference pattern, and one of the attributes of the reference pattern is an end (line part corresponding to an end of the reference pattern) or a line part (line part except for an end of the reference pattern), another of the attributes of the reference pattern is a corner (portion having a vertex which does not contact the line part having the attribute of an end), and the other of the attributes of the reference pattern is an isolated pattern (pattern isolated from the other).

5. Parameters used in extraction rules for a region suitable for a region inspection.
   The maximum line width, the minimum line length, and a termination shortening length of a reference pattern suitable for line width inspection
   The maximum line width, the minimum line length, and a termination shortening length of a reference pattern suitable for space width inspection
   The maximum line width of a part that is liable to cause an open defect;
   The maximum line length of a part that is liable to cause an open defect;
   The maximum space width of a part that is liable to cause a bridge defect; and
   The maximum space length of a part that is liable to cause a bridge defect.

6. Parameters for detecting the second edge, which are empirically determined from an image.
   A length of a profile acquisition section;
   An interval between profile acquisition sections;
   An interval between sampling points in a profile acquisition section;
   A method of detecting an edge from a profile (the threshold method and the like); and
   A flag for indicating whether profile acquisition sections are set at the time of setting recipe data, or are set after detecting the first edges.

7. The minimum size and the maximum size of a hole pattern, and safety factors.

8. The number of inspection-unit-areas in order to obtain a global deformation quantity.

9. The number of maximum registrations of defect images.

10. The number of maximum registrations of defects to-be-reinspected.

11. A region suitable for auto contrast brightness adjustment, auto focus adjustment, and auto astigmatism adjustment.

12. An interval of representative distortion vectors held by a distortion correction vector calculation circuit 414.

The recipe data is managed by using the device name, the process name, and an inspection mode as a key. The inspection mode is a generic term for the image acquisition parameters, and the edge detection/inspection parameters.

Figure 19:
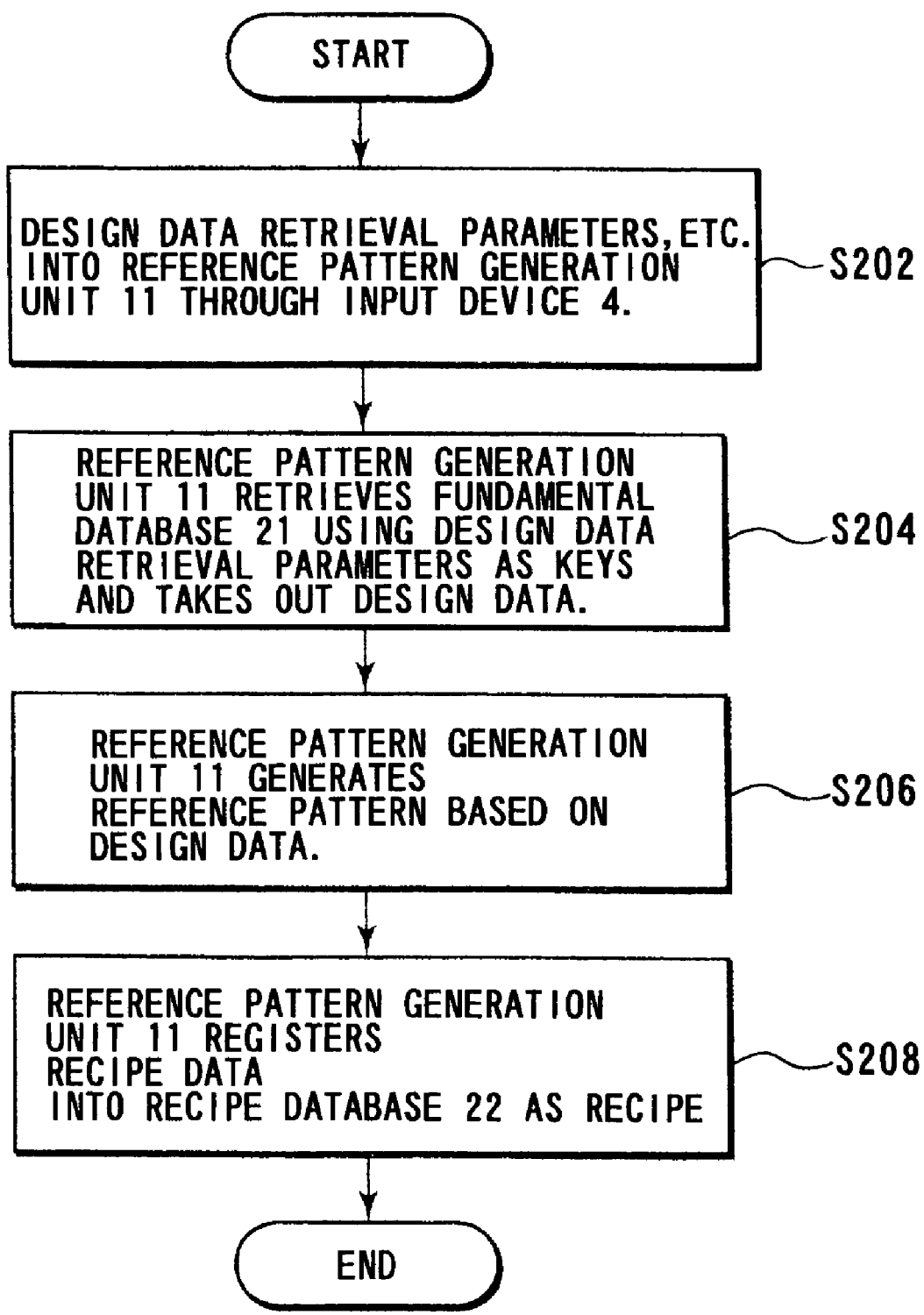
FIG. 19 is a flowchart showing an example of recipe registration processing according to the embodiment of the present invention.

FIG. 19 is a flowchart showing an example of recipe registration processing in this embodiment. First, the operator inputs the operator input parameters (the design data retrieval parameters, and the like) into the reference pattern generation unit 11 via the input device (step S202).

The reference pattern generation unit 11 retrieves the fundamental database 21 using design data retrieval parameters (a device name and a process name) as a key and takes out the design data (step S204). The fundamental database 21 serves as a database that stores the design data corresponding to the pattern image to-be-inspected. Next, the reference pattern generation unit 11 generates the reference pattern based on the design data (step S206).

Finally, the reference pattern generation unit 11 sets the recipe data (the reference pattern and the operator input parameters) into the recipe database 22 (step S208).

3.4 Inspection-Unit-Area

Because inspection is performed for each inspection-unit-area that is obtained by dividing an inputted area to-be-inspected by an field of view, a reference pattern is created corresponding to the inspection-unit-area. The inspection includes a sequential inspection or a random inspection.

Figure 20:
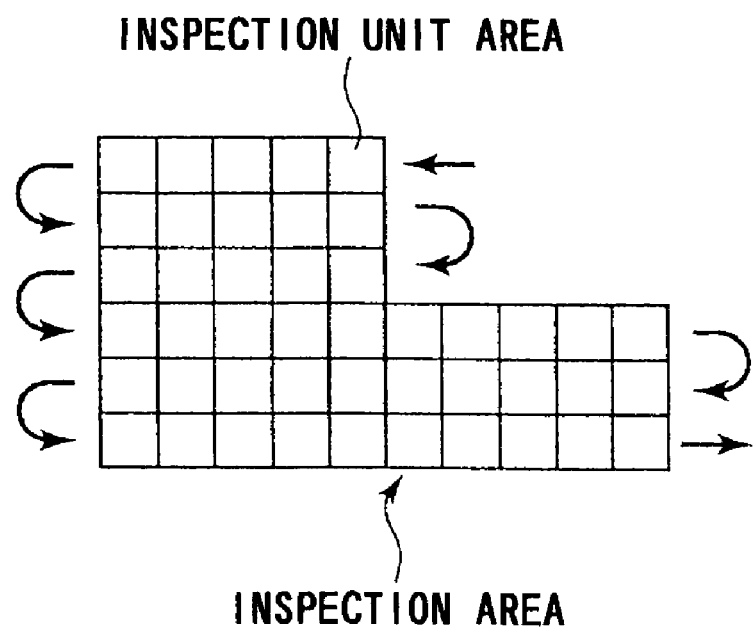
FIG. 20 is a diagram for explaining a sequential inspection.

FIG. 20 is a diagram for explaining the sequential inspection. The inspection area is not set on the whole wafer, but is set on a plurality of areas that are specified by rectangles (the upper short rectangle, the lower long rectangle, and the like as shown in FIG. 20), and each inspection-unit-area is scanned sequentially in order to inspect the areas at high speed. The reference pattern is created for each inspection-unit-area.

Figure 21:
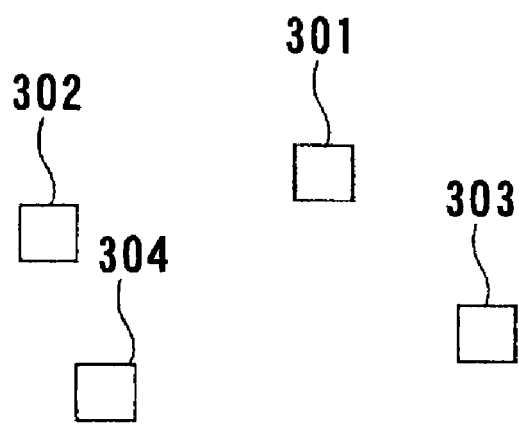
FIG. 21 is a diagram for explaining a random inspection.

FIG. 21 is a diagram for explaining the random inspection. In the random inspection, a certain area is not inspected sequentially, but limited areas are inspected. In FIG. 21, only the inspection-unit-areas 301 to 304 are inspected.

3.5 Inspection Result

Results of inspection include the following basic information:

1. Information of a defect having an abnormal pattern deformation quantity
2. Information of a defect recognized using luminance distribution of pixels
3. Pattern deformation quantities obtained from the whole inspection-unit-area The results of inspection include the following information that uses pattern deformation quantities with regard to attribute of pattern:

4. Information of a defect detected with regard to attribute of pattern

The results of inspection include the following information that uses edges facing each other:

5. Information of a defect detected by the region inspection

4. Basic Inspection Processing

Figure 25:
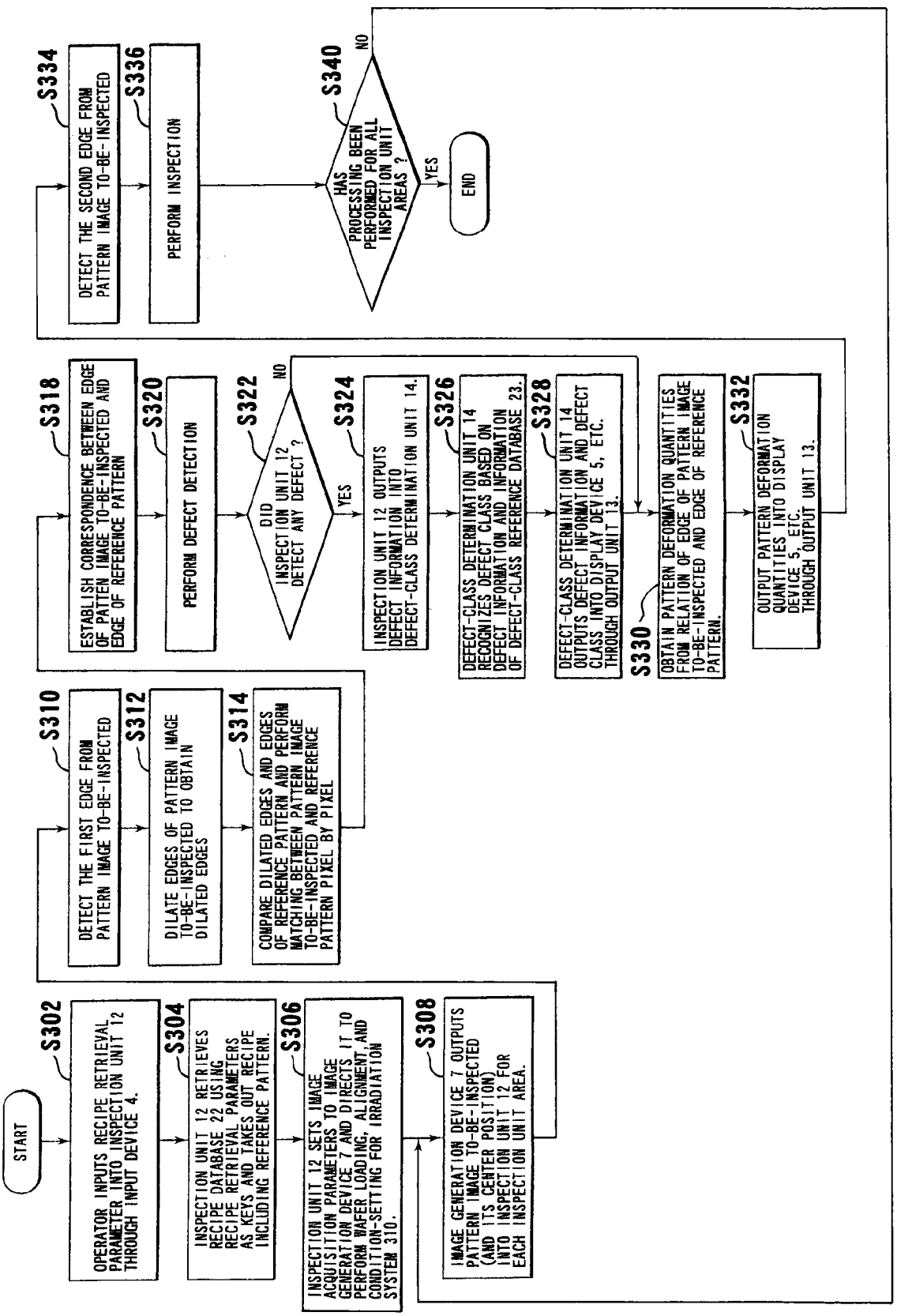
FIG. 25 is a flowchart showing an example of basic inspection processing according to the embodiment of the present invention.
Figure 26:
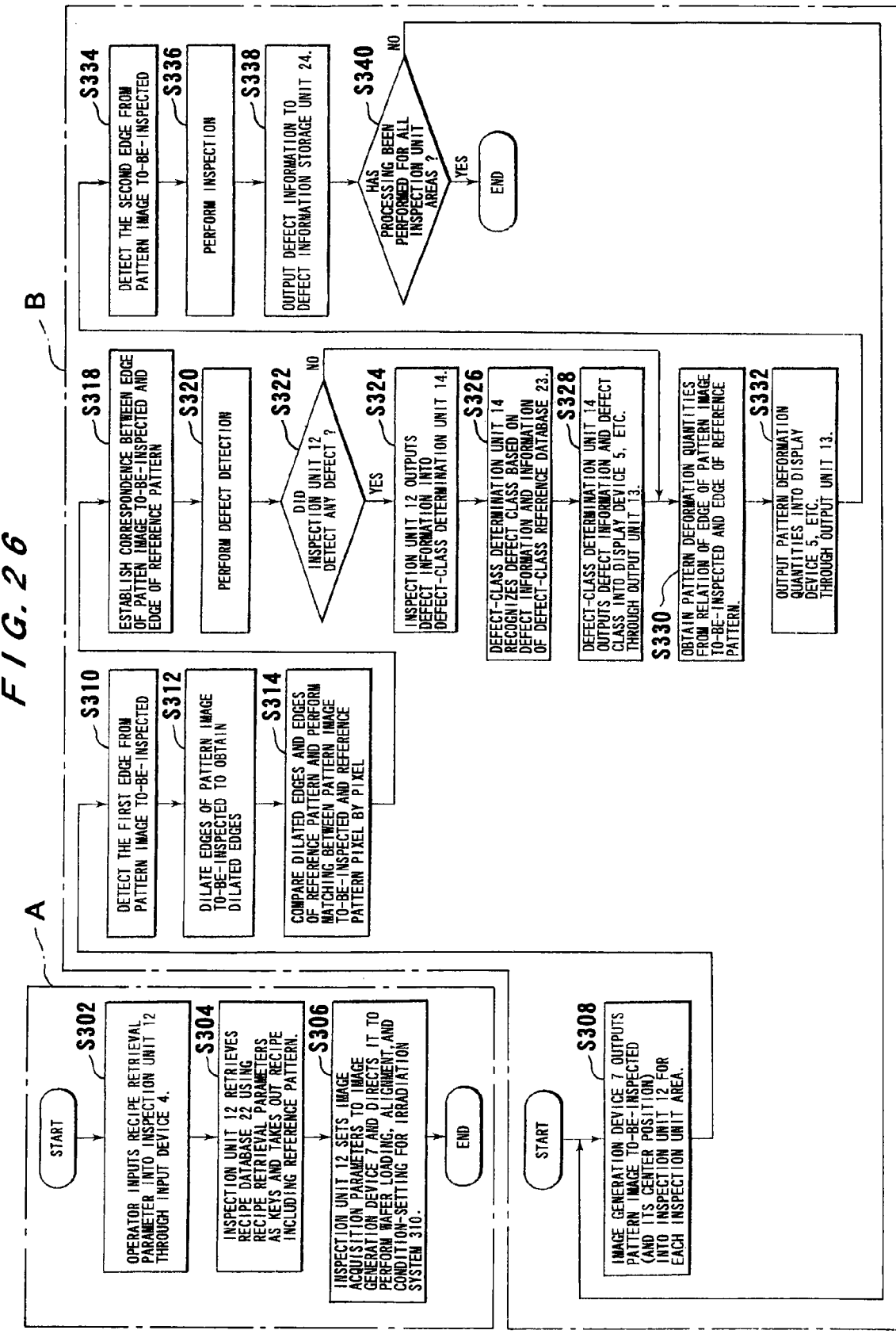
FIG. 26 is a sub-block of a flowchart showing an example of inspection processing for recognizing repeated defects.
Figure 27:
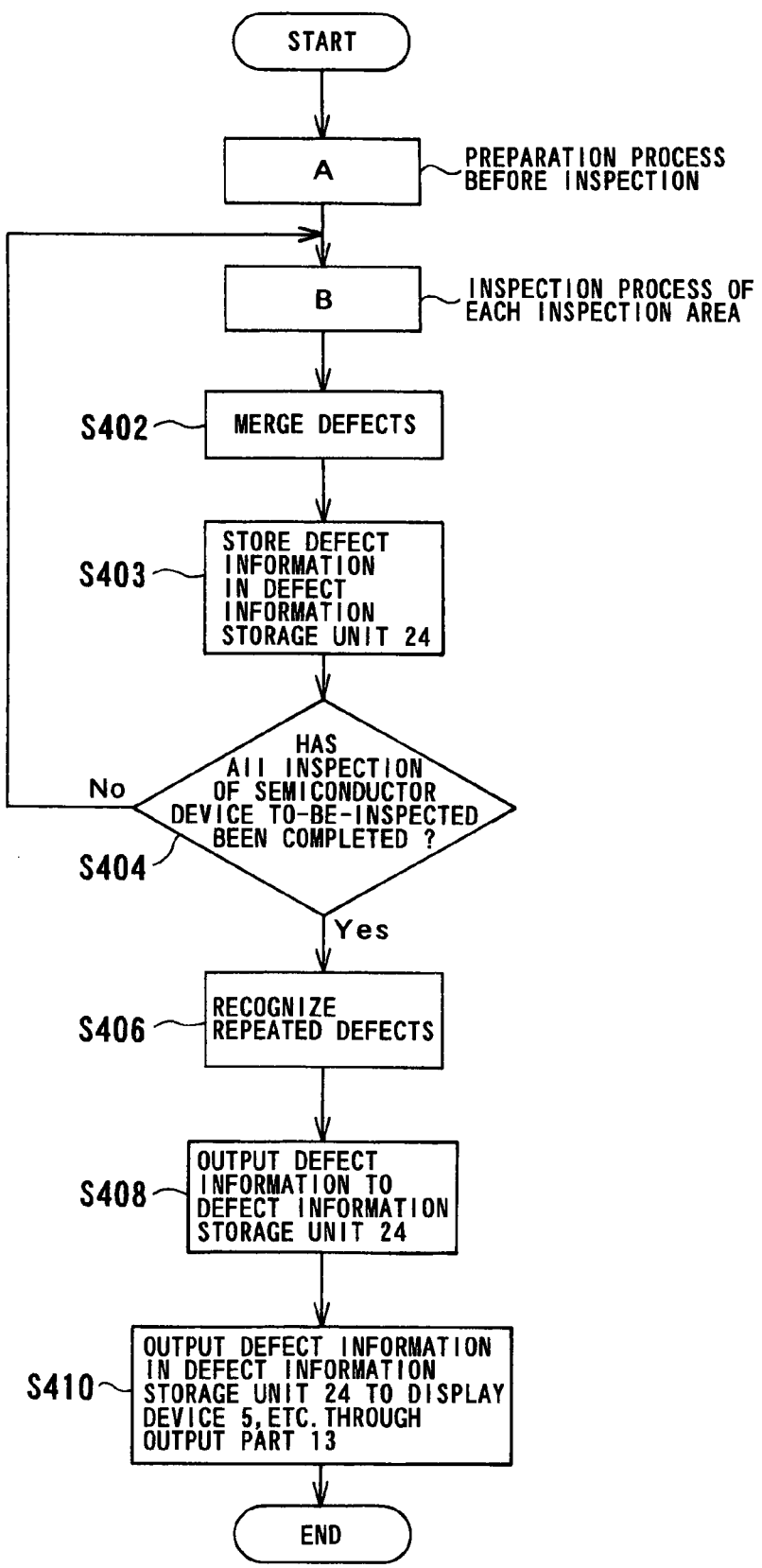
FIG. 27 is a main block of a flowchart showing an example of the inspection processing for recognizing repeated defects.

FIG. 25 is a flowchart showing an example of the basic inspection processing in this embodiment. FIGS. 26 and 27 are flowcharts showing another example of the inspection processing in this embodiment, and show inspection processing for recognizing repeated defects. A block A of FIG. 27 is identical to the block A of FIG. 26, and is a preparation process before the inspection. A block B of FIG. 27 is identical to the block B of FIG. 26, and shows an inspection process of each inspection area.

In the basic inspection processing shown in the flowchart of FIG. 25, first, the operator inputs recipe retrieval parameters (a device name and a process name, and an inspection mode) into the inspection unit 12 through the input device 4 (step S302).

The inspection unit 12 retrieves the recipe database 22 using the recipe retrieval parameters as a key and takes out the recipe data (step S304). Then, in order to acquire the pattern image to-be-inspected, the inspection unit 12 sets the image acquisition parameters to the image generation device 7 and directs the image generation device 7 to perform wafer loading, alignment, and condition-setting for the irradiation system 310 (step S306).

Here, the alignment means a method of obtaining transformation coefficients between a coordinate system that is used in the design data and a coordinate system for controlling an observation position of the wafer (specimen). This method has been embodied by CAD (Computer Aided Design) navigation. The CAD navigation is a well-known method. In the method, after the alignment, the coordinate values of the position of CAD data that should be observed are transformed into the coordinate values of controlling the observation position of the wafer. Then a field of view is moved to that position, and an image at the position is acquired.

As the image generation device 7, a scanning electron microscope shown in FIG. 1 is most suitable. Various scanning microscopes such as a scanning focus ion-beam microscope, a scanning laser microscope, or a scanning probe microscope, or various microscopes may be used.

The image generation device 7 outputs the pattern image to-be-inspected (and its center position) to the inspection unit 12 for each inspection-unit-area (step S308).

4.1 The First Edge Detection

Next, the inspection unit 12 detects the first edge from the pattern image to-be-inspected (step S310). For the first edge detection, the following two edge detection methods can be used. The first edge detection method is chosen according to the above-mentioned 3.3 Recipe data "3. The first edge detection method".

4.1.1 The First Edge Detection Method 1

One is a method suitable for an image having a contrast between the inside of a pattern and the grounding. In many of such images, an edge can be detected through binarization processing. However, in the case where the contrast is relatively indistinct, the edges cannot be detected clearly. In this case, by application of a method disclosed in the literature [reference 1]: R. M. Haralick, "Digital step edges from ZERO crossing of second directional derivatives," IEEE Trans. Pattern Anal. Machine Intell., Vol. PAMI-6. No. 1, pp. 58-68, 1984 or other method, the edges can be detected. By using this method, a point of inflection on the edge part can be detected with sub pixel accuracy.

4.1.2 The First Edge Detection Method 2

The other is a method that can cope with an image having bright edges and having no contrast between the inside of the pattern and the grounding. For example, a method disclosed in the literature [reference 2]: Cartan Steger, "An unbiased detector of curvilinear structures," IEEE Trans. Pattern Anal. Machine Intell., Vol. 20, No. 2, February 1998, can be used. By using this method, a peak of the edge can be detected with sub pixel accuracy. However, in this method, the edge direction has only a value of 0 to 180 degrees because the inside of the pattern and the grounding cannot be distinguished.

As an alternative method of the above-mentioned 4.1.1 The first edge detection method 1, the method of the above-mentioned [literature 2] can be used. In this case, an image having a contrast between the inside of the pattern and the grounding is processed by a differential filter (for example, Sobel filter or a band-pass filter) in order to generate an edge magnitude image, and the edge is detected by using the edge magnitude image. In this case, the inside of the pattern and the grounding can be distinguished.

Because these methods are processed by using a rather large window, sub pixel accuracy can be obtained, and the edge direction can be stable. Therefore, a method, in which the edges are connected and the connected edges are processed by the linear approximation and then make line segment information in order to obtain higher edge detection accuracy, is not necessarily required.

At the first edge detection of step S310, the edge magnitude and the edge direction are obtained from the pattern image to-be-inspected for each pixel. The sharper the edge is, the larger the magnitude becomes. In the case of an image having a contrast between the inside of the pattern and the grounding as described in 4.1.1 The first edge detection method 1, by using the method of the above-mentioned [literature 1], the absolute value of the first derivative of the image can be set as the magnitude, and the zero cross point of the second derivative of the image can be taken as the edge position.

On the other hand, in the case of an image having no contrast between the inside of the pattern and the grounding as described in 4.1.2 The first edge detection method 2, by using the method of the above-mentioned [literature 2], a sign-inverted value (absolute value) of the second derivative of the image can be set as the magnitude, and the zero cross point of the first derivative of the image can be taken as the edge position. In either case, the edge can be obtained with sub pixel accuracy.

Figure 29:
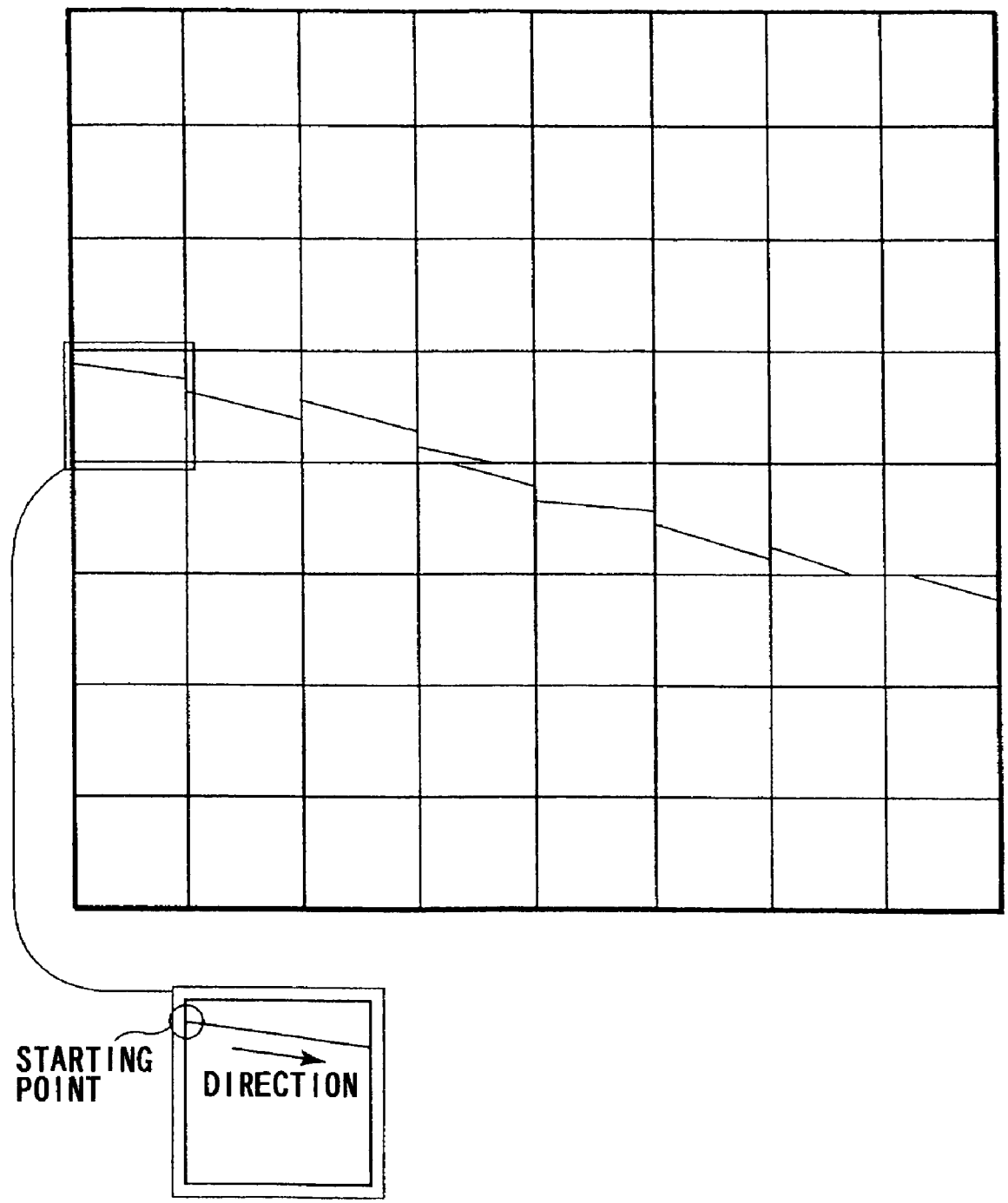
FIG. 29 is a diagram showing edges detected from the image of FIG. 28.

FIG. 28 is a diagram showing an example of an image having the contrast between the inside of the pattern and the grounding described in 4.1.1 The first edge detection method 1, and FIG. 29 is a diagram showing the edges detected from the image of FIG. 28. In FIG. 28, a luminance value is shown for each pixel. As shown in FIG. 29, an edge is detected for each pixel, and information of a starting point (with sub pixel accuracy), a direction (in 0 to 360 degrees), and a magnitude can be obtained for each pixel. As described above, the sharper the edge is, the larger the magnitude becomes.

FIG. 30 is a diagram showing an example of an image having bright edges and having no contrast between the inside of the pattern and the grounding described in the above-mentioned 4.1.2 The first edge detection method 2, and FIG. 31 is a diagram showing the edges detected from the image of FIG. 30. In FIG. 30 also, the luminance value is shown for each pixel. Furthermore, as shown in FIG. 31, an edge is detected for each pixel, and information of a starting point (with sub pixel accuracy), a direction (in 0 to 180 degrees), and a magnitude can be obtained for each pixel.

4.2 Line-Shaped Pattern Matching Method

Next, the inspection unit 12 dilates the edges of the pattern image to-be-inspected. Hereafter, obtained results are called dilated edges (step S312). In this embodiment, the edges are dilated by the allowable pattern deformation quantity that does not affect an electrical characteristic. In this stage, the allowable pattern deformation quantity is a positive integer. The quantity is the biggest value among values in the above-mentioned 3.3 Recipe data "2. The limit values of the negative side and the positive side of the allowable pattern deformation quantities". By dilating the edges by the allowable pattern deformation quantity, the matching can be performed with allowing the pattern deformation that does not affect the electrical characteristic.

FIG. 32 is a diagram showing magnitudes of edges of a one-dimensional pattern image to-be-inspected and FIG. 33 is a diagram showing an example in which the edges of FIG. 32 are dilated. For simple explanation, one-dimensional data is used in FIG. 32 and FIG. 33. In order to ignore the pattern deformation within the allowable pattern deformation quantity, the pattern image to-be-inspected is processed by a maximum value filter having a window that is twice as large as the allowable pattern deformation quantity. Here, in the maximum filter, the maximum value among intensity values, which neighboring pixels of a target pixel have, is obtained, and the maximum value is set to a value of the target pixel of a processed image. In FIG. 33, the edges of pattern image to-be-inspected of FIG. 32 are dilated rightward and leftward by two pixels, respectively. This is an example for the case where the allowable pattern deformation quantity is two pixels.

The case where edges of a reference pattern as showed in FIG. 34 will be considered. First, figures are obtained by shifting FIG. 34. Each shift quantity used in the above is from two pixel in the leftward direction to two pixel in the rightward direction, respectively. Next, when the evaluation value of the matching is obtained from FIG. 33 and each shifted figure, each evaluation value has the same value. Therefore, the shift quantity is not determined uniquely. The evaluation value of the matching is described later.

In order to solve this problem, the edges of FIG. 32 are dilated with giving weights to the neighboring pixels as shown in FIG. 35. In order to realize the dilation of FIG. 35, a smoothing filter consisting of 0.5, 0.75, 1.0, 0.75, and 0.5 coefficients may be used. In the case of the example shown in FIG. 35, when FIG. 34 (the edges of the reference pattern) is shifted by one pixel or more in the rightward direction or the leftward direction, the evaluation value will decrease.

Next, the case where the edges of the reference pattern are wider than the edges of the reference pattern shown in FIG. 34 by two pixels as shown in FIG. 36 will be considered. First, figures are obtained by shifting FIG. 36. Shift quantities used in the above are one pixel in the leftward direction and one pixel in the rightward direction. Next, when the evaluation value of the matching is obtained from FIG. 35 and each shifted figure, each evaluation value has the same value. Therefore, the shift quantity is not determined uniquely.

In order to solve this problem, the edges of FIG. 32 are dilated with giving weights to the neighboring pixels as shown in FIG. 37. In order to realize the dilation of FIG. 37, a smoothing filter consisting of 0.5, 0.9, 1.0, 0.9, and 0.5 coefficients (FIG. 38) may be used.

From the above consideration, the dilation as shown in FIG. 37 is most suitable. However, from a viewpoint of processing speed, crowdedness of the edges, and the like, the dilation as shown in FIG. 33 or FIG. 35 may be used.

After determining the coefficients of the smoothing filter, the coefficients are set into the above-mentioned 3.3 Recipe data "3. The coefficients of filter for edge dilation", and are used.

Figure 39:
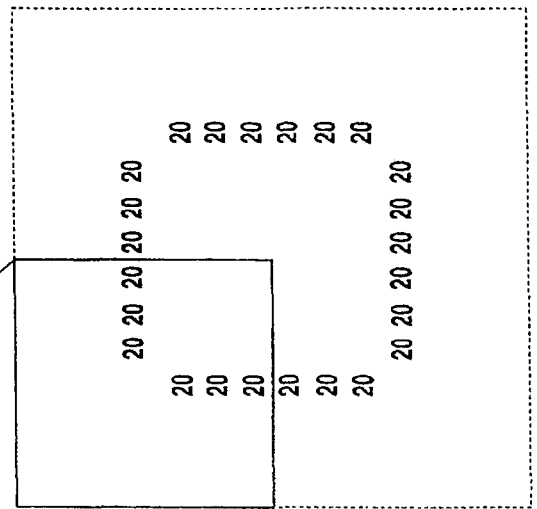
FIG. 39 is a diagram showing an example of magnitudes of edges of a two-dimensional pattern image to-be-inspected.
Figure 40:
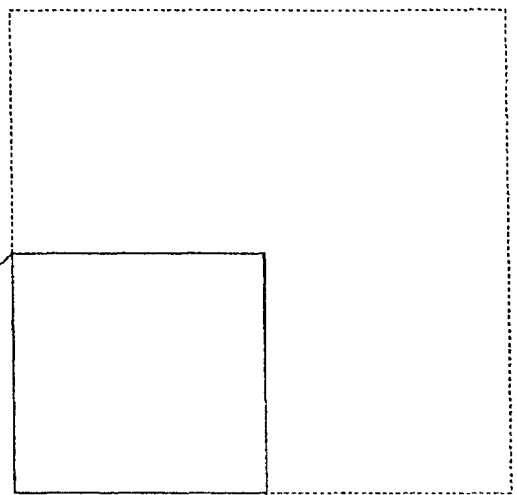
FIG. 40 is a diagram showing an example in which the edges of FIG. 39 are dilated.
Figure 41:
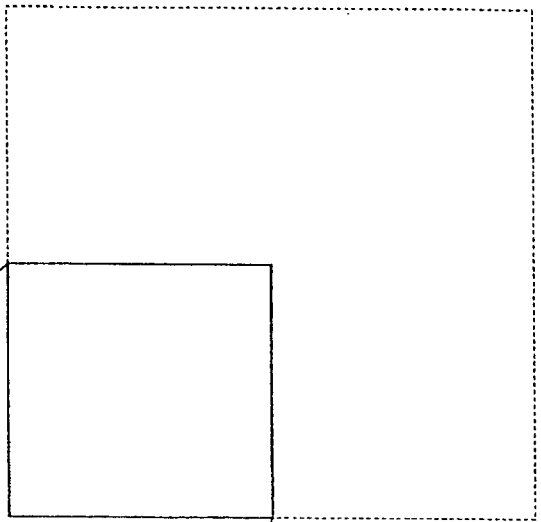
FIG. 41 is a diagram showing another example in which the edges of FIG. 39 are dilated.

FIG. 39 is a diagram showing an example of magnitudes of edges of a two-dimensional pattern image to-be-inspected, and FIGS. 40 and 41 are diagrams showing examples in which the edges of FIG. 39 are dilated. In FIG. 39, the magnitudes of edge are all zero except for pixels whose magnitudes are 20. FIG. 40 shows a result of the same dilation shown in FIG. 33, and FIG. 41 shows a result of the same dilation shown in FIG. 37.

Figure 42:
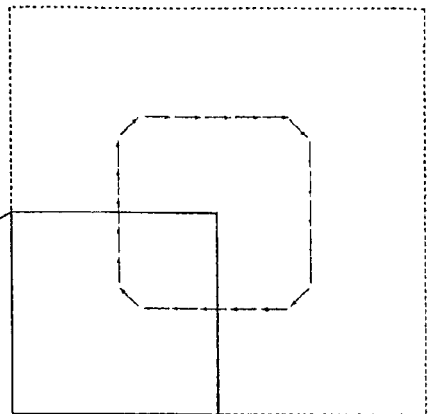
FIG. 42 is a diagram showing an example of edge vectors of the two-dimensional pattern image to-be-inspected.
Figure 43:
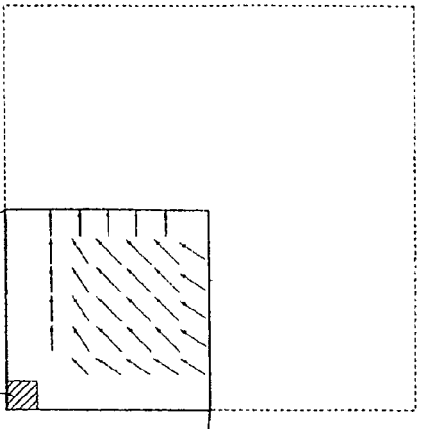
FIG. 43 is a diagram showing an example in which the edge vectors of FIG. 42 are dilated.

FIG. 42 is a diagram showing an example of edge vectors of the two-dimensional pattern image to-be-inspected, and FIGS. 43 and 44 are diagrams showing examples in which the edges of FIG. 42 are dilated. FIG. 43 shows a result of the same dilation shown in FIG. 33, and FIG. 44 shows a result of the same dilation shown in FIG. 37. The dilation is performed for each X- and Y-component separately.

The inspection unit 12 compares the dilated edges with the edge of the reference pattern, and performs the matching between the pattern image to-be-inspected and the reference pattern, pixel by pixel (step S314).

Figure 45:
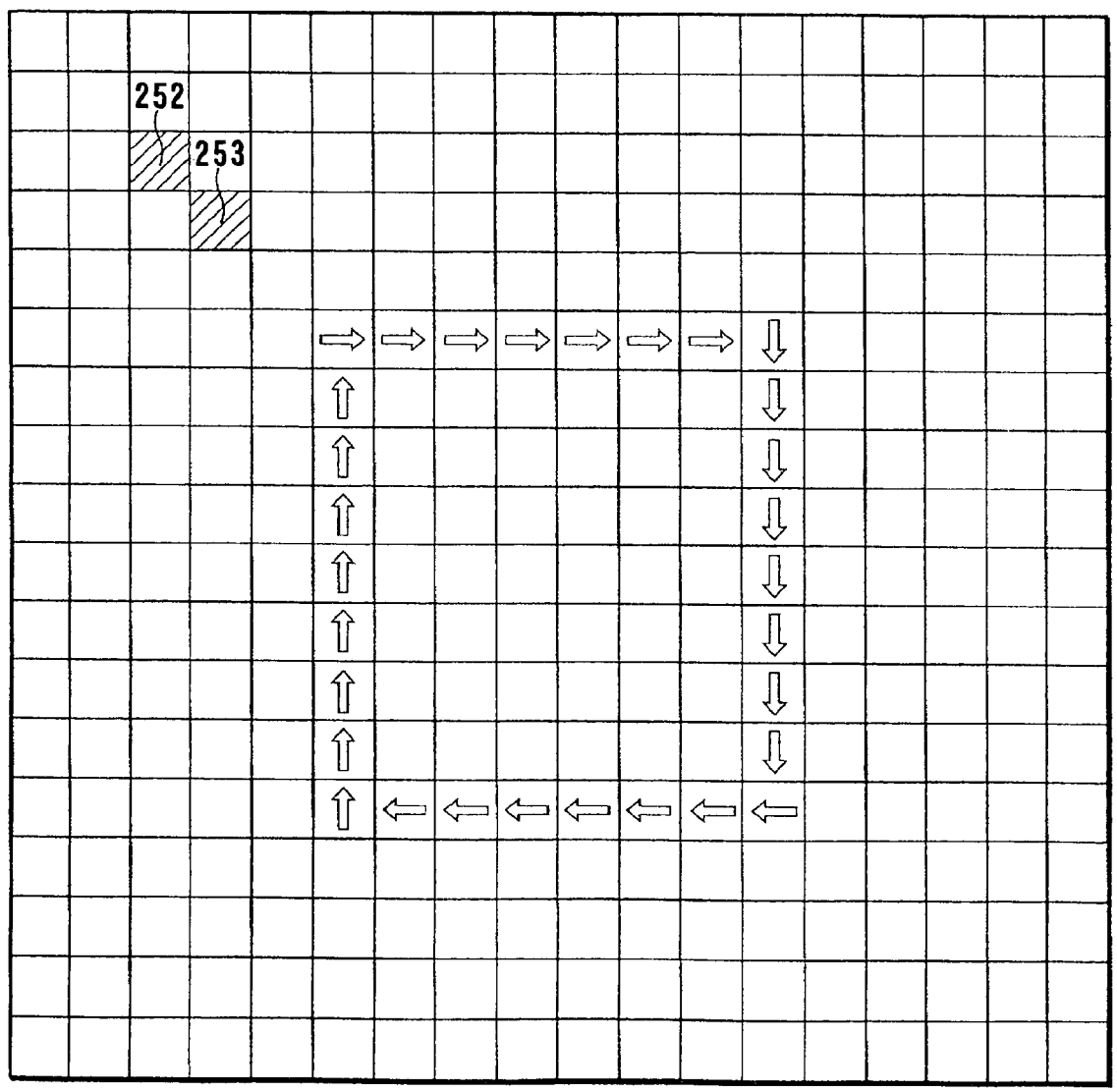
FIG. 45 is another diagram of FIG. 23 in which the reference pattern of FIG. 22 is expressed with the edge vectors for respective pixels.

In this embodiment, the matching is performed by using a shift quantity $S_2$ as described in the following description of 4.8 Pattern deformation quantities obtained from the whole inspection-unit-area. Therefore, the matching is performed pixel by pixel for purpose of high-speed calculation. Thus, FIG. 45 is a view showing FIG. 23 in units of pixel.

Figure 46:
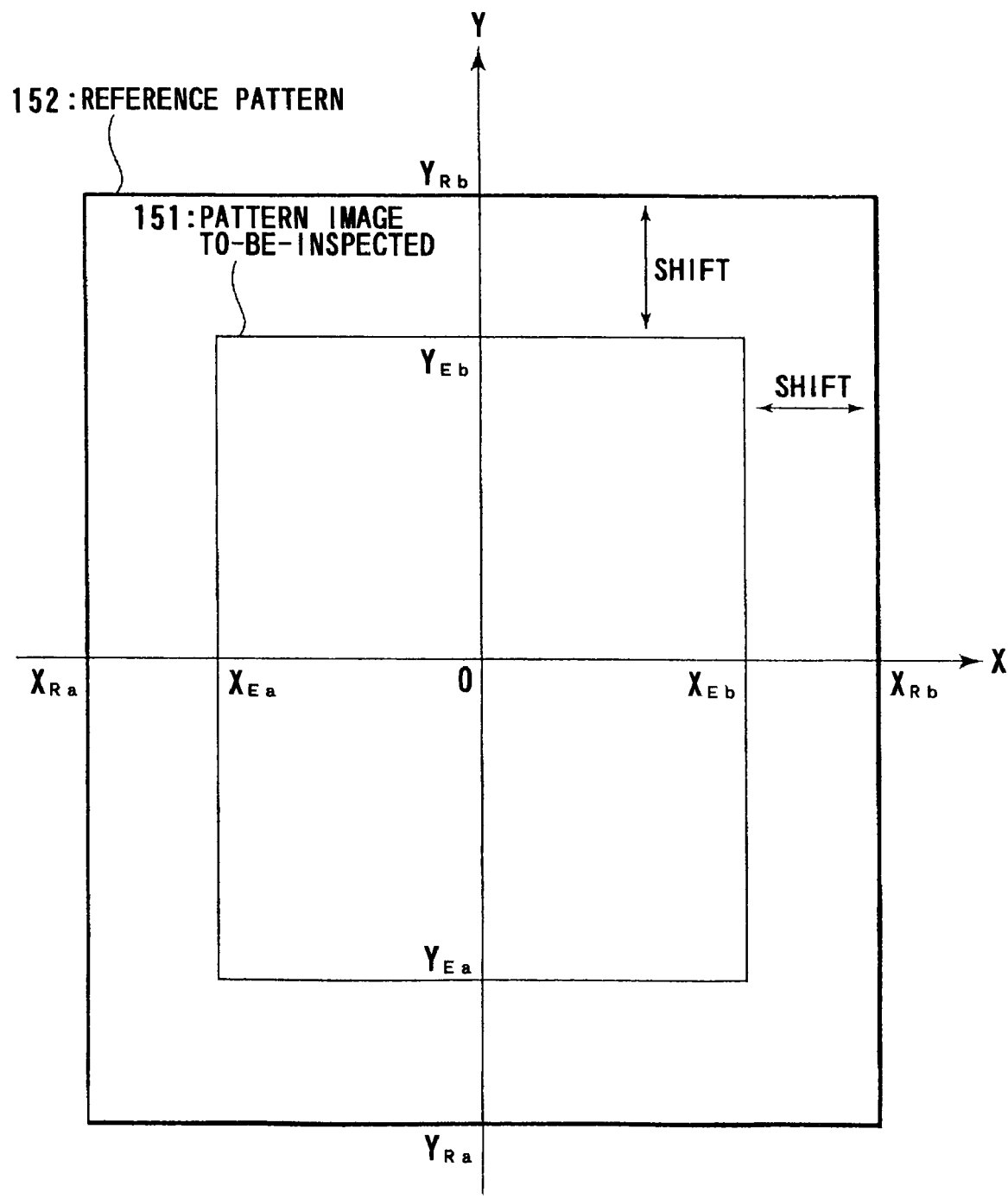
FIG. 46 is a diagram for explaining the matching.

In the matching of this embodiment, the reference pattern is shifted vertically and horizontally for every pixel relatively to the pattern image to-be-inspected to obtain a position where the evaluation value $F_0$ becomes the maximum, and the obtained position is taken as a matching position (FIG. 46). In this embodiment, as described in the following equation, a total sum of the magnitudes of the dilated edges in pixels where the edge of the reference pattern exists is used as the evaluation value $F_0$.

$$F_0(x_s, y_s) = \sum_{x=X_{Ea}}^{X_{Eb}} \sum_{y=Y_{Ea}}^{Y_{Eb}} |E(x, y)||R(x + x_s, y + y_s)|$$

$$(X_{Ra} - X_{Ea} \leq x_s \leq X_{Rb} - X_{Eb})(Y_{Ra} - Y_{Ea} \leq y_s \leq Y_{Rb} - Y_{Eb})$$

Here, $E(x,y)$ is a vector whose magnitude is equal to the magnitude of the dilated edge and whose direction is equal to the direction of the dilated edge. In pixels where no edge exists, the magnitude of $E(x,y)$ is zero. $R(x+x_s, y+y_s)$ is a vector whose direction is equal to the edge direction of the reference pattern, where the magnitude of $R(x+x_s, y+y_s)$ is a length of the reference pattern in the pixel. Here, a vector $(x_s, y_s)$ is the shift quantity $S_1$ of the edge of the reference pattern.

If, in the calculation of $F_0$, only the pixels whose $R(x,y)$ is non-zero are stored, the calculation can be performed at high speed and the memory area to be used can be reduced. If truncation of calculations used in the sequential similarity detection algorithm (SSDA) is adopted, the calculation can be speeded up even further.

Figure 47:
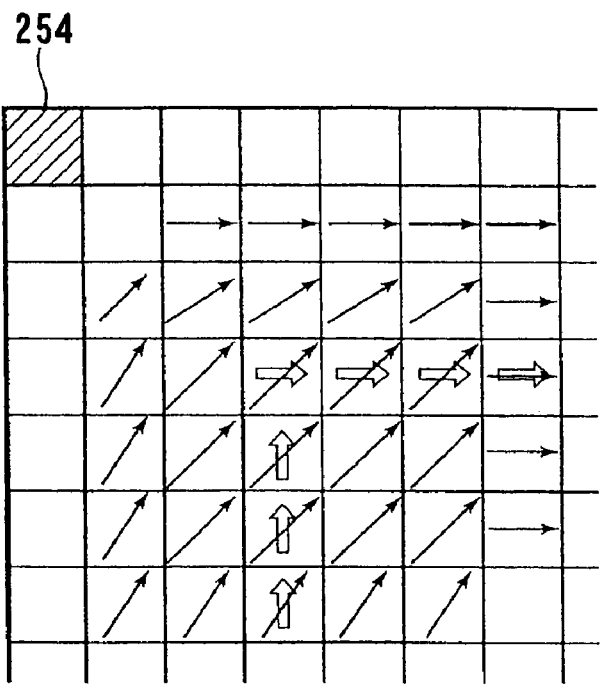
FIG. 47 is a diagram made by superimposing FIG. 43 on FIG. 45.
Figure 48:
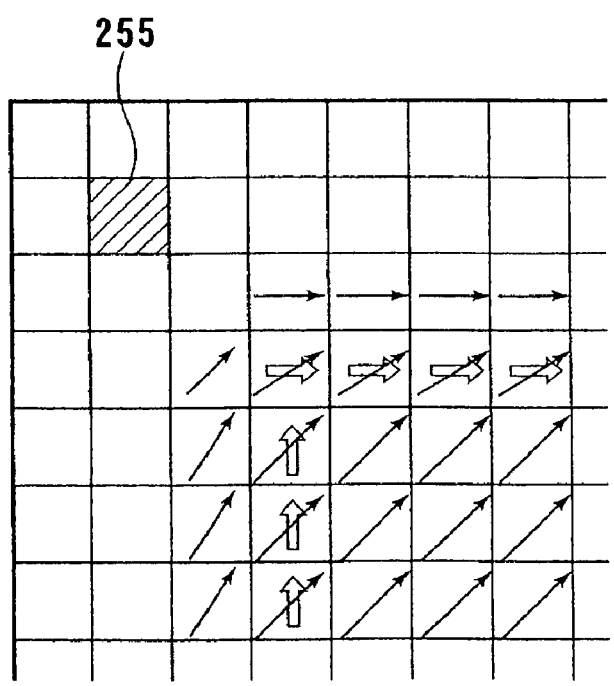
FIG. 48 is another diagram made by superimposing FIG. 43 on FIG. 45.

FIGS. 47 and 48 are diagrams made by superimposing FIG. 43 (the dilated edges) on FIG. 45 (the edges of the reference pattern). In FIG. 47, a pixel 254 corresponds to a pixel 251 of FIG. 43 and to a pixel 252 of FIG. 45. FIG. 48 shows relationship of positions of FIG. 43 and FIG. 45 in which FIG. 43 is shifted by one pixel in rightward direction and by one pixel in downward direction from relationship of positions shown in FIG. 47. Therefore, a pixel 255 corresponds to the pixel 251 of FIG. 43 and the pixel 253 of FIG. 45. By using evaluation value $F_0$, the larger the degree of overlapping of the pixels where the edge exists, the higher the evaluation value becomes. In the case where the evaluation value $F_0$ is used, the dilation processing as shown in FIGS. 39 through 41 should be performed. In addition, the evaluation value $F_0$ can be applied to both images described in the above-mentioned 4.1.1 The first edge detection method 1 and the above-mentioned 4.1.2 The first edge detection method 2.

In this embodiment, the above-mentioned evaluation value $F_0$ is used, however other evaluation values can also be used. For example, in the case of the image having the contrast between the inside of the pattern and the grounding described in the above-mentioned 4.1.1 The first edge detection method 1, the following evaluation value $F_a$ can be used:

$$F_a(x_s, y_s) = \sum_{x=X_{Ea}}^{X_{Eb}} \sum_{y=Y_{Ea}}^{Y_{Eb}} E(x, y) \cdot R(x + x_s, y + y_s)$$

$$(X_{Ra} - X_{Ea} \leq x_s \leq X_{Rb} - X_{Eb})(Y_{Ra} - Y_{Ea} \leq y_s \leq Y_{Rb} - Y_{Eb})$$

Moreover, for example, in the case of the image having bright edges and having no contrast between the inside of the pattern and the grounding described in the above-mentioned 4.1.2 The first edge detection method 2, the following evaluation value $F_b$ can be used.

$$F_b(x_s, y_s) = \sum_{x=X_{Ea}}^{X_{Eb}} \sum_{y=Y_{Ea}}^{Y_{Eb}} |E(x, y) \cdot R(x + x_s, y + y_s)|$$

$$(X_{Ra} - X_{Ea} \leq x_s \leq X_{Rb} - X_{Eb})(Y_{Ra} - Y_{Ea} \leq y_s \leq Y_{Rb} - Y_{Eb})$$

In the case where the evaluation value $F_a$ or $F_b$ is used, the dilation processing as shown in FIGS. 42 through 44 should be performed.

Figure 49A:
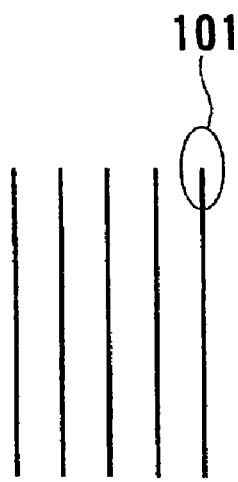
FIG. 49A is a diagram showing an example of reference patterns.
Figure 49B:
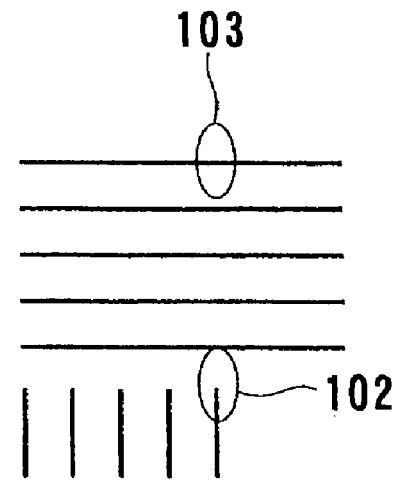
FIG. 49B is a diagram showing an example of a pattern image to-be-inspected.

Here the evaluation value $F_0$, $F_a$, and $F_b$ will be considered. The evaluation value $F_0$ has advantage with regard to high-speed calculation, because the data is scalar. On the other hand, the evaluation values $F_a$ and $F_b$ are effective, for example, in the case as shown in FIGS. 49A and 49B. When the evaluation values $F_a$ and $F_b$ are used, because the inner product between the edge (vector) of vertical line part of the reference pattern (FIG. 49A) and the edge (vector) of the horizontal line part of the pattern image to-be-inspected (FIG. 49B) becomes close to zero, a part 101 and a part 102 can be matched successfully. On the contrary, when the evaluation value $F_0$ is used, because only the magnitude is used without considering the direction, the part 101 and a part 103 are likely to be matched erroneously.

Figure 50:
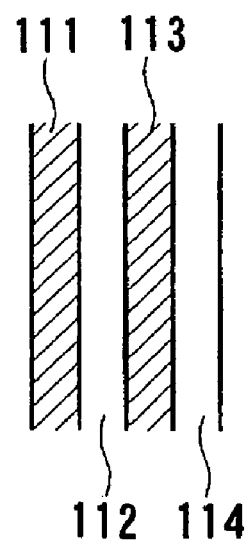
FIG. 50 is a diagram showing an example in which widths of lines and widths of spaces are equal.

The evaluation value $F_a$ is more robust for matching than the evaluation value $F_b$, because the evaluation value $F_a$ distinguishes the inside of the pattern and the grounding. For example, in the case where widths of lines 111, 113 and widths of spaces 112, 114 are equal as shown in FIG. 50, the value $F_a$ can obtain a more suitable result than the value $F_b$, because distinction between the line and the space is clear.

In this embodiment, the edges of the pattern image to-be-inspected are dilated and the matching is performed. Alternatively, the edges of the reference pattern may be dilated to perform the matching.

4.2.1 Matching Method Using Unique Pattern

Figure 51A:
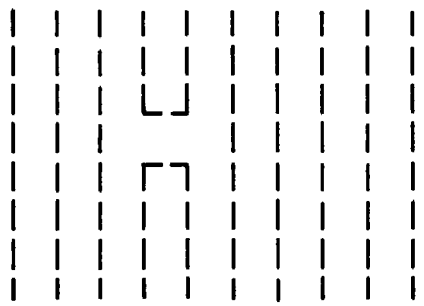
FIG. 51A is a diagram showing an example of reference patterns.
Figure 51B:
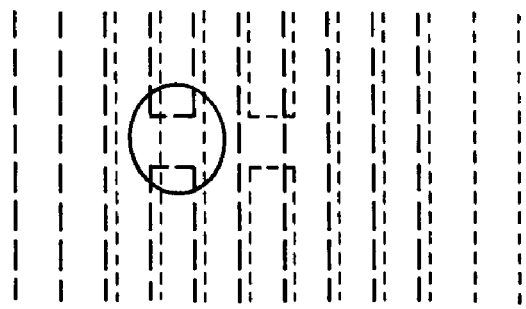
FIG. 51B is a diagram showing an example of the relation between the reference pattern of FIG. 51A and the pattern image to-be-inspected.

The above-mentioned matching method uses the magnitudes of the edges of the reference pattern equally. As an alternative method, matching can be robust by setting different weightings to the magnitudes of the edges of the reference pattern. This method is performed by the following procedure using FIGS. 51A and 51B:

FIG. 51A is a diagram showing an example of reference patterns, and FIG. 51B is a diagram showing an example of the reference patterns (dotted lines) and a pattern image to-be-inspected (solid lines) corresponding to the reference patterns in FIG. 51A. The reference pattern shown in FIG. 51A is periodic patterns that have a gap at one position. When the matching between the reference patterns and the pattern image to-be-inspected is performed, even if both are shifted by one period as shown in FIG. 51B, most part thereof except the gap part match with each other, and hence this matching gives a high evaluation value erroneously. In order to solve this problem, a large weighting is set to the magnitudes of edges corresponding to the gap part, so that the matching evaluation value will decrease drastically when the gap of the pattern image to-be-inspected and the gap of the reference pattern do not match with each other.

The weightings are set by the following procedure: First, the period of the pattern is obtained by the autocorrelation method. Next, by comparing the original patterns with the patterns shifted by one period, a pattern that exists in part of the original patterns, but does not exist in the pattern shifted by one period is obtained. Then, the obtained pattern is recognized as a unique pattern and a weighting (contribution) of the unique pattern to the matching is made larger than that of other patterns. In order to express the degree of contribution, a weighting, which is more than unity (1), is used for the magnitude of the reference pattern. As the weighting, a constant value obtained experimentally, a value defined as a constant value divided by a ratio of the unique pattern to all the patterns, or the like can be used.

4.2.2 Matching Method Using Negative Pattern

Figures 52A, 52B:
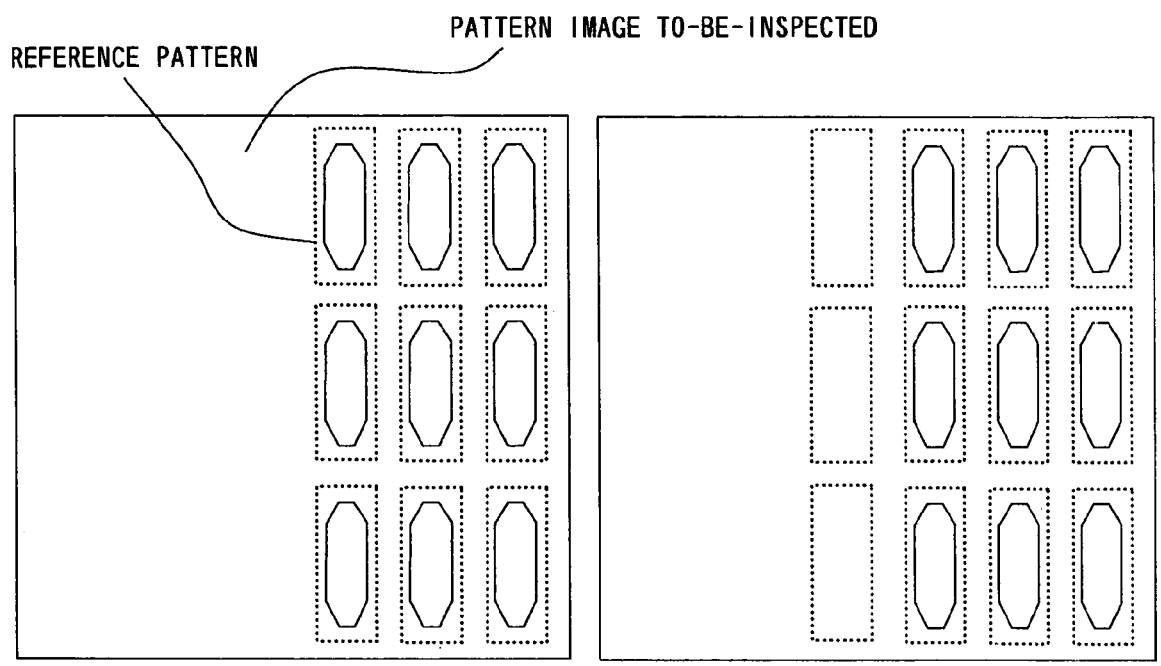
FIGS. 52A and 52B are schematic views showing a calculation method of a matching evaluation value of an array of rectangles.

In order to utilize the unique pattern more efficiently, a matching method that uses a negative pattern paired with the unique pattern can be used. FIGS. 52A and 52B are schematic views showing a method of calculating a matching evaluation value of an array of rectangles. Although rectangles are periodically arranged also on the right-hand side of the image to-be-inspected in FIGS. 52A and 52B, termination of the patterns on the right-hand side cannot be recognized because the image is limited. In this case, if matching is performed using the above-mentioned 4.2.1 Matching method using unique pattern, the matching evaluation value in FIG. 52A becomes substantially equal to the matching evaluation value in FIG. 52B, and hence the matching position cannot be uniquely determined.

In order to solve this problem, negative patterns paired with the unique patterns are extracted using the following procedure, and the extracted negative patterns are used in calculation of the matching evaluation value.

Figure 53A:
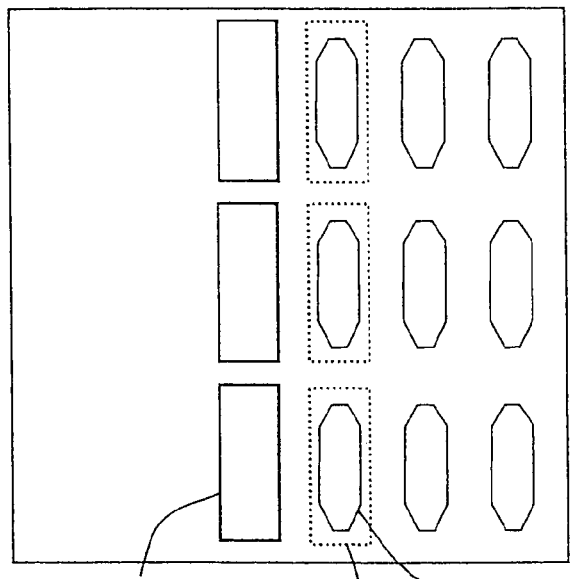
FIGS. 53A, 53B and 53C are schematic views showing a calculation method of a matching evaluation value in which negative patterns paired with unique patterns are used.
Figure 53B:
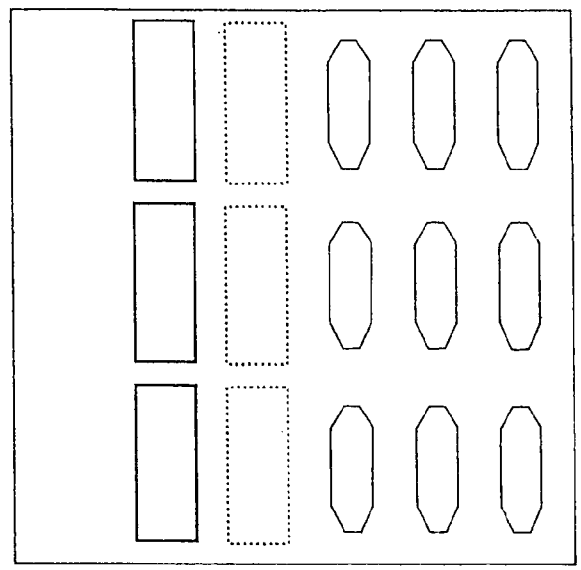
Figure 53C:
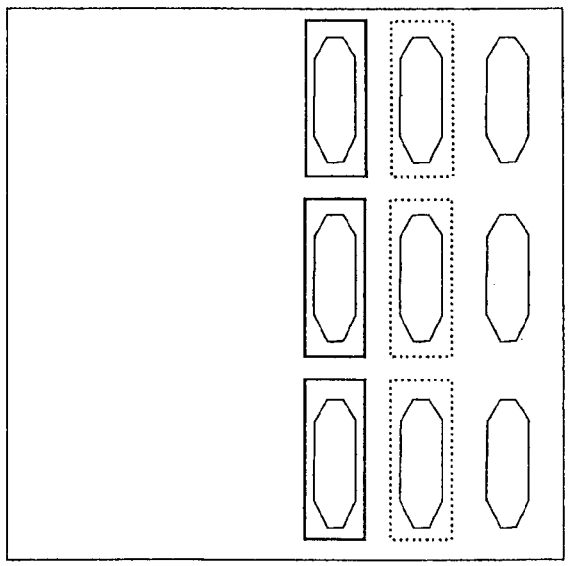

FIGS. 53A, 53B and 53C are schematic views showing the method in which the negative patterns paired with the unique patterns are used. If there is no pattern at a portion shifted from the original pattern to the leftward by one period, the portion of the original pattern is taken as the unique pattern (rectangle shown by dotted lines). The portion shifted from the unique pattern to the leftward by one period is taken as a negative pattern (rectangle shown by solid lines). Similarly, a negative pattern is extracted in other directions such as rightward, upward, and downward.

In order to express the degree of contribution of the unique pattern, the weighting, which is more than unity (1), is used for the magnitude of the reference pattern. On the other hand, in order to express the degree of contribution of the negative pattern, the above-mentioned weighting, which is more than unity (1), multiplied by (−1) is used for the magnitude of the reference pattern.

Here, the evaluation value using the negative pattern will be considered. An evaluation value when a pattern exists in one unique pattern is taken as F1. An evaluation value of FIG. 53A is $(3 \cdot F_1)$, an evaluation value of FIG. 53B is (0), and an evaluation value of FIG. 53C is $(3 \cdot F_1)-(3 \cdot F_2)$, i.e. nearly equal to (0). From this calculation, the condition shown in FIG. 53A is recognized as matching position.

According to this embodiment, it is possible to perform matching of the boundary between the region where the same patterns are periodically arranged and the other regions, because the negative patterns give a huge penalty for the evaluation value, in the case of shifting from the optimum matching position by one period.

4.2.3 Matching Method Using Projection Data Obtained by Projecting Edge on the Horizontal and Vertical Axes Although the above matching method is high-speed enough, a method of performing at higher speed is required. In order to perform at higher speed, the portion "matching pixel by pixel" in the step S314 is improved.

The design data is mostly composed of horizontal lines and vertical lines. By using this characteristic of the design data, it is possible to perform matching at higher speed using projection data obtained by projecting an edge of a reference patterns on the horizontal and vertical axes, and projection data obtained by projecting an edge of an image of a pattern to-be-inspected on the horizontal and vertical axes.

Figure 54A:
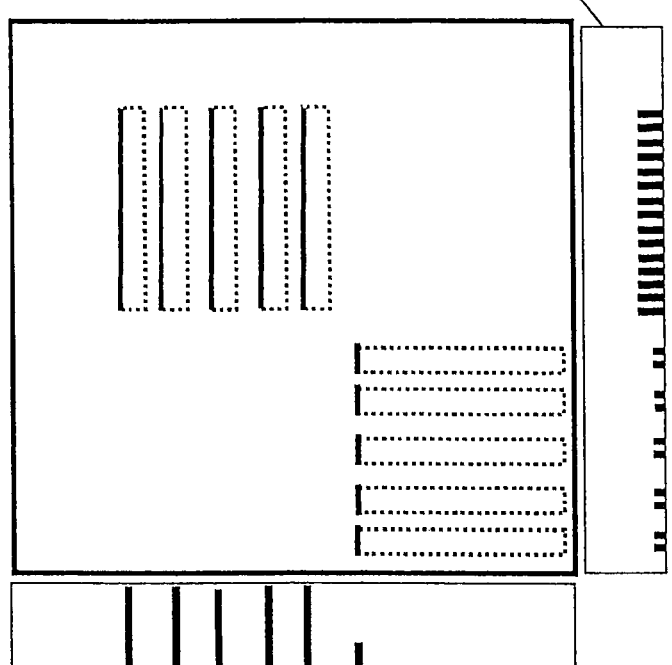
FIGS. 54A and 54B are schematic views showing a matching method that uses projection data obtained by projecting an edge detected by the first edge detection on the horizontal and vertical axes.
Figure 54B:
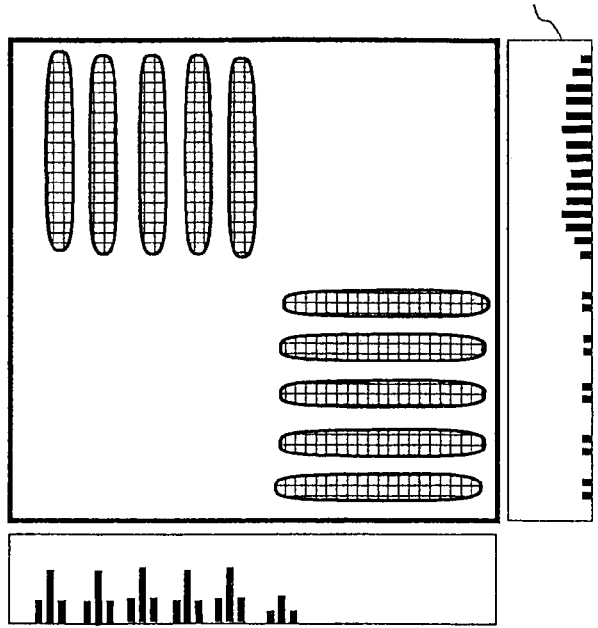

FIGS. 54A and 54B are schematic views showing a matching method that uses projection data obtained by projecting an edge detected by the above-mentioned 4.1 The first edge detection on the horizontal and vertical axes. In this embodiment, the matching method is explained using the edge detection suitable for an image having a contrast between the inside of the pattern and the grounding as described in 4.1.1 The first edge detection method 1. The reference patterns are composed of line segments that extend in four directions including upward, downward, rightward and leftward directions. Here, as a representative example, the method in which matching is performed using upward line segments will be described.

1. A summation $L_{rp}$ of lengths of all line segments that constitute the reference patterns is obtained. Next, the edges obtained by 4.1.1 The first edge detection method 1 are sorted out by magnitude. The $L_{rp}$ edges are selected in the descending order of magnitude from the sorted edges and are left, and other edges are eliminated. A size of the reference patterns on the wafer is almost the same as a size of the pattern image to-be-inspected on the wafer, and the reference patterns are represented by a coordinate system of a pixel unit, therefore, the selected edges correspond to edges of the reference patterns for the most part.

2. The upward line segments that constitute the reference pattern are extracted. Next, the extracted line segments are projected onto the horizontal axis (the X-axis) to produce one-dimensional data. This one-dimensional data is in the form of array, and an index corresponds to an X coordinate value and an element corresponds to a length of the line segments. Similarly, the extracted line segments are projected onto the vertical axis (the Y-axis) to produce one-dimensional data. This one-dimensional data is in the form of array, and an index corresponds to a Y coordinate value and an element corresponds to a length of the line segments. This result is shown in FIG. 54A.

3. Upward edges are extracted from the above selected edges. The edges are projected onto the horizontal axis (the X-axis) to produce one-dimensional data. This one-dimensional data is in the form of array, and an index corresponds to an X coordinate value and an element corresponds to a Y component of the edge (vector). Similarly, the edges are projected onto the vertical axis (the Y-axis) to produce one-dimensional data. This one-dimensional data is in the form of array, and an index corresponds to a Y coordinate value and an element corresponds to a Y component of the edge (vector). This result is shown in FIG. 54B.

Figure 55:
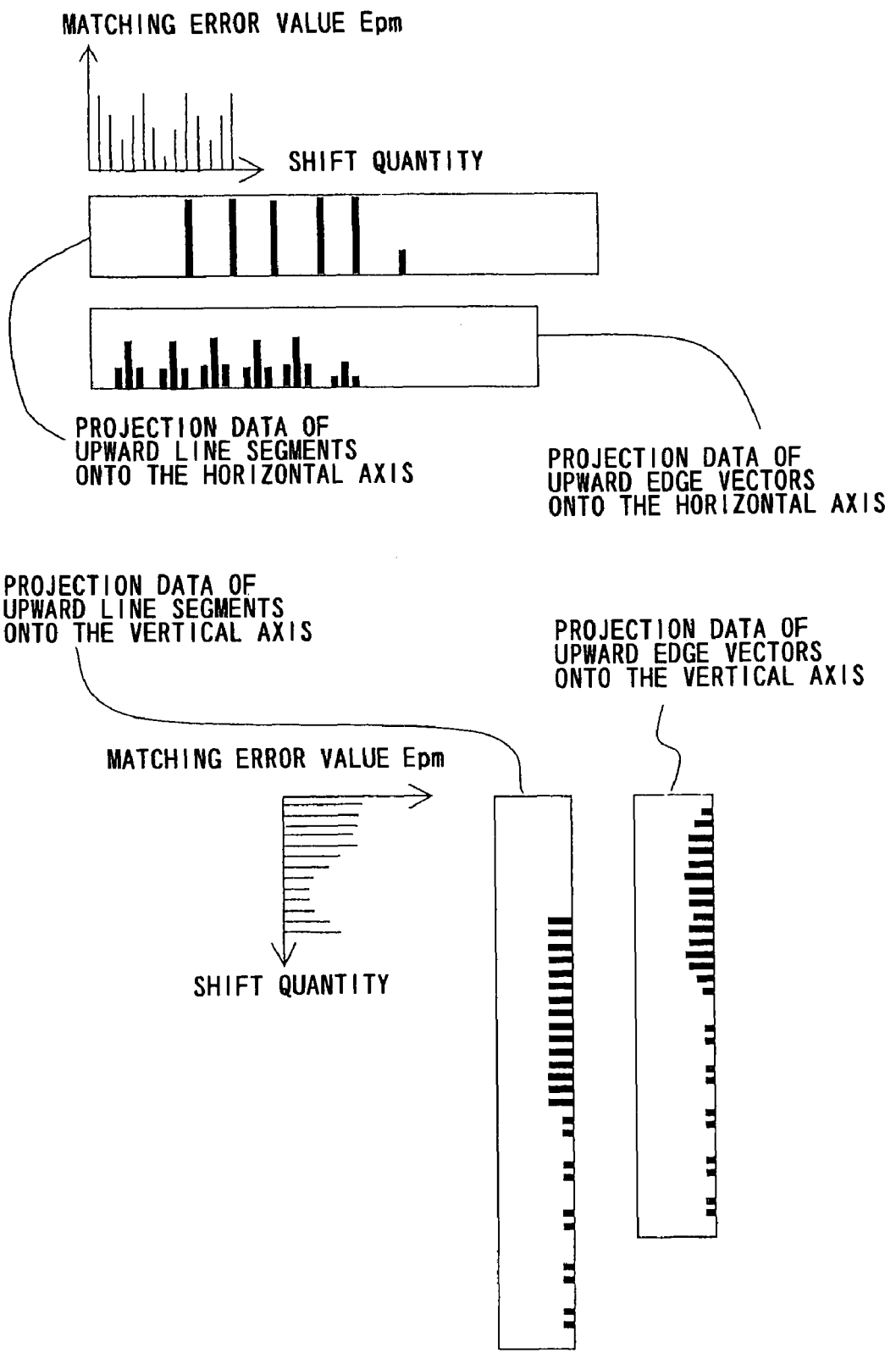
FIG. 55 is a schematic view showing a calculated matching error values $E_{pm}$.

4. While shifting the projection data of the upward edges onto the horizontal axis within the range of the X direction shown in FIG. 46, a matching error value $E_{pm}$ between the projection data of the upward edges onto the horizontal axis and the projection data of upward line segments onto the horizontal axis is calculated. Similarly, while shifting the projection data of the upward edges onto the vertical axis within the range of the Y direction shown in FIG. 46, the matching error value $E_{pm}$ between the projection data of the upward edges onto the vertical axis and the projection data of upward line segments onto the vertical axis is calculated. In FIG. 55, the calculated matching error values $E_{pm}$ are shown.

5. The maximum value $E_{pmMax}$ and the minimum value $E_{pmMin}$ of the matching error value $E_{pm}$ are obtained to calculate a threshold value by the following equation:

$$E_{pmMin} \cdot k_{mt} + E_{pmMax}(1-k_{mt})$$

Figure 56:
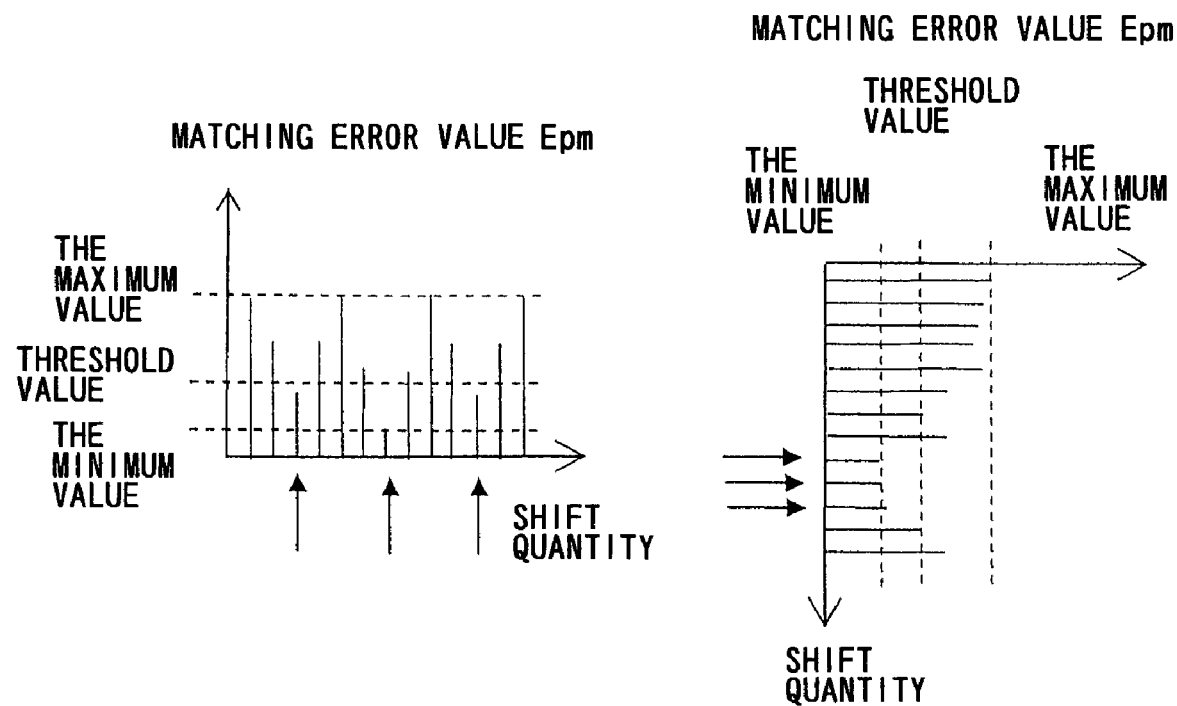
FIG. 56 is a schematic view showing shift quantities recognized suitable for matching from the calculated matching error values $E_{pm}$.

The shift quantity having the matching error value $E_{pm}$ that is equal to or less than the threshold value is recognized suitable for matching. Here, $k_{mt}$ is a value that is empirically determined and is in the range of 0 to 1. As $k_{mt}$ is nearer to 0, the number of the shift quantities that are recognized suitable for matching becomes larger. The shift quantities shown by the arrows in FIG. 56 are recognized suitable for matching.

6. Next, the optimum solution is obtained from the shift quantities that are recognized suitable for matching. In the above-mentioned 4.2 Line-shaped pattern matching method, "In the matching of this embodiment, the reference pattern is shifted vertically and horizontally for every pixel relatively to the pattern image to-be-inspected to obtain a position where the evaluation value $F_0$ becomes the maximum, and the obtained position is taken as a matching position (FIG. 46)" has been explained. According to this method, this phrase is replaced with "In the matching of this embodiment, the reference pattern is shifted vertically and horizontally for every shift quantity obtained from the above 5 relatively to the pattern image to-be-inspected to obtain a position where the evaluation value $F_0$ becomes the maximum, and the obtained position is taken as a matching position (FIG. 46)", and matching of the above-mentioned Line-shaped pattern matching method is performed.

Figure 57A:
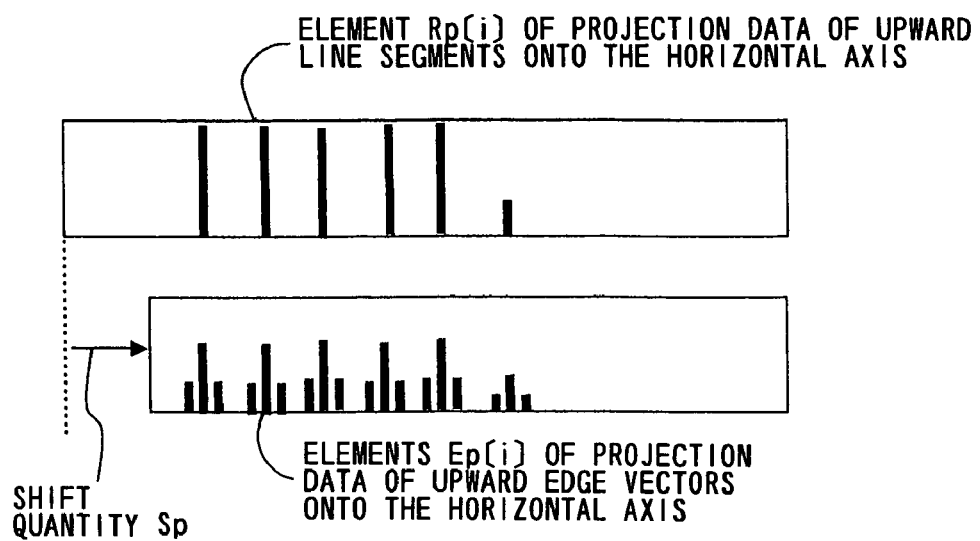
FIGS. 57A, 57B and 57C are schematic views showing a method of calculating the matching error values $E_{pm}$.

The matching error value $E_{pm}$ is calculated by the method shown in FIG. 57A. In this embodiment, the elements $R_p[i]$ of the projection data of upward line segments onto the horizontal axis, the elements $E_p[i]$ of the projection data of upward edges onto the horizontal axis, and a shift quantity $S_p$ are used, as a representative example. The simple matching error value $E_{pmS}$ is calculated by the following equation using the elements $R_p[i]$ of the projection data of upward line segments onto the horizontal axis, and the shifted element $E_p[i+S_p]$ of the projection data of upward edges onto the horizontal axis:

$$E_{pmS}=\Sigma_i|R_p[i]-E_p[i+S_p]|$$

Here, $\Sigma_i$ means summation for all the elements $E_p[i]$.

As described in the step S312 (dilate the edges of the pattern image to-be-inspected to obtain dilated edges), the pattern deformation within the allowable pattern deformation quantity that does not affect an electrical characteristic is necessary to be ignored.

Although the same manner as the step S312 may be used, in this case, the following different manner is used.

First, the following calculations are performed for all the elements $E_p[i]$. Here, the case in which the allowable pattern deformation quantity is 1 will be described.

1. if $$R_p[i] \geq E_p[i+S_p]$$

is satisfied, $$R_p[i] \Leftarrow R_p[i]-E_p[i+S_p]$$

$$E_p[i+S_p] \Leftarrow 0$$

2. if $$R_p[i]<E_p[i+S_p]$$

and the following $\delta R$ is positive, the following calculations with regard to $\rho_{-1}$ through $E_p[i+S_p]$ are performed:

$$\delta R \Leftarrow R_p[i-1]+R_p[i]+R_p[i+1]-E_p[i+S_p]$$

$$\rho_{-1} \Leftarrow R_p[i+S_p-1]/(R_p[i+S_p-1]+R_p[i+S_p+1])$$

$$\rho_{+1} \Leftarrow R_p[i+S_p+1]/(R_p[i+S_p-1]+R_p[i+S_p+1])$$

$$R_p[i] \Leftarrow 0$$

$$R_p[i-1] \Leftarrow \delta R \cdot \rho_{-1}$$

$$R_p[i+1] \Leftarrow \delta R \cdot \rho_{+1}$$

$$E_p[i+S_p] \Leftarrow 0$$

3. if $$R_p[i]<E_p[i+S_p]$$

and $\delta R$ is negative, the following calculations are performed:

$$R_p[i-1] \Leftarrow 0$$

$$R_p[i] \Leftarrow 0$$

$$R_p[i+1] \Leftarrow 0$$

$$E_p[i+S_p] \Leftarrow -\delta R$$

After finishing the above calculations, the matching error value $E_{pmD}$ with considering the deformation quantity is calculated by the following equation:

$$E_{pmD}=\Sigma_i(R_p[i]+E_p[i+S_p])$$

Figure 57B:
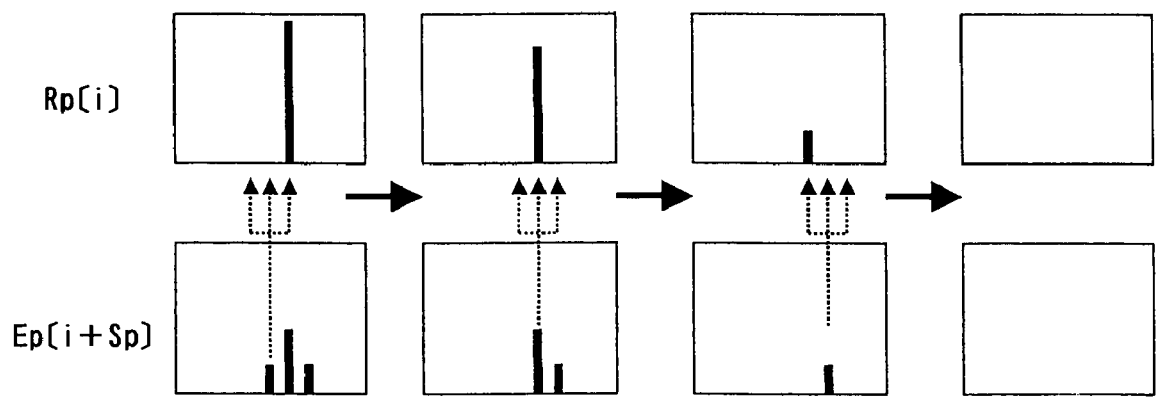
Figure 57C:
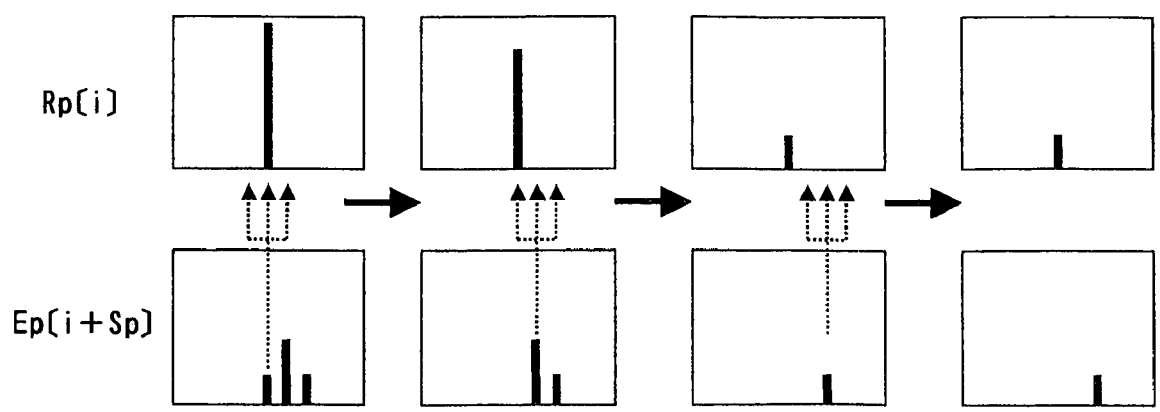

The results of the above calculations are shown in FIGS. 57B and 57C. In FIG. 57B, $R_p[i]$ and $E_p[i+S_p]$ are placed in the position suitable for matching. On the other hand, in FIG. 57B, $R_p[i]$ and $E_p[i+S_p]$ are placed in the position displaced by 1 pixel from the position suitable for matching. As shown in FIGS. 57B and 57C, the matching error value $E_{pmD}$ with considering the deformation quantity is smaller than the simple matching error value $E_{pmS}$ by the value that is created by correspondence with considering the allowable deformation quantity. Therefore, the matching error value $E_{pmD}$ with considering the deformation quantity is suitable for the matching error value $E_{pm}$.

In the case where the allowable deformation quantity is larger than 1, the above calculations should be performed by using not only $R_p[i-1],R_p[i+1]$, but also $R_p[i-2],R_p[i+2]$, and so forth.

The above matching error value $E_{pmD}$ calculation is performed for edges and line segments in downward, rightward and leftward directions also. Another direction, for example, directions of multiple of 45 degrees, also can be used.

In the above example, edges in the opposite directions of 180 degrees, for example upward edge and downward edge, can be distinguished from each other. However, in the case of using the above-mentioned 4.1.2 The first edge detection method 2, the edges in the opposite directions of 180 degrees can not be distinguished. In this case, edges in the opposite directions of 180 degrees are mixed up and are calculated.

FIG. 46 shows the method, in which the reference pattern is shifted vertically and horizontally for every pixel. However, according to this embodiment, the reference pattern is shifted at sporadic pixel unit intervals, instead of shifting every pixel. Therefore, the calculation time is greatly shortened.

4.3 Matching Method Using Geometrical Information for a Hole Pattern and an Island Pattern The above matching method is suitable for a line-shaped pattern. However, an alternative method of performing matching for a hole pattern and an island pattern can be used. A hole pattern and an island pattern are a rectangle pattern, and both the longer side and the shorter side of each pattern are shorter than the width that is two to three times the minimum line width. A calculation time for matching of a hole pattern and an island pattern is longer than a calculation time for matching of a line-shaped pattern because the hole pattern and the island pattern are smaller and more numerous than the line-shaped pattern. In order to solve this problem, the following high-speed calculation method that requires less calculation time can be used.

This method can be used for the case where all patterns comprise hole patterns or island patterns. In addition, ordinarily a hole pattern and an island pattern don't exist simultaneously. Therefore, in this embodiment a method in which every pattern is a hole pattern will be described. In the case of an island pattern, the matching method of the hole pattern can be used by replacing hole with island.

Figure 58A:
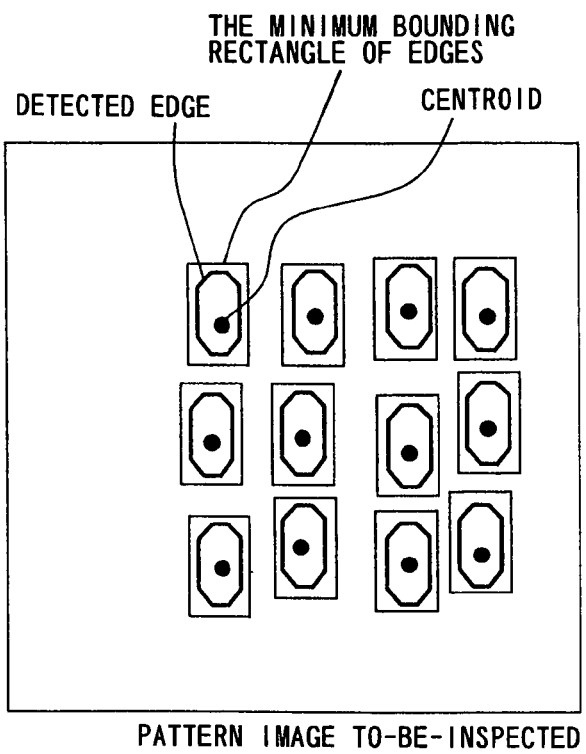
FIGS. 58A, 58B and 58C are schematic views of the first matching method of a hole pattern.
Figure 58B:
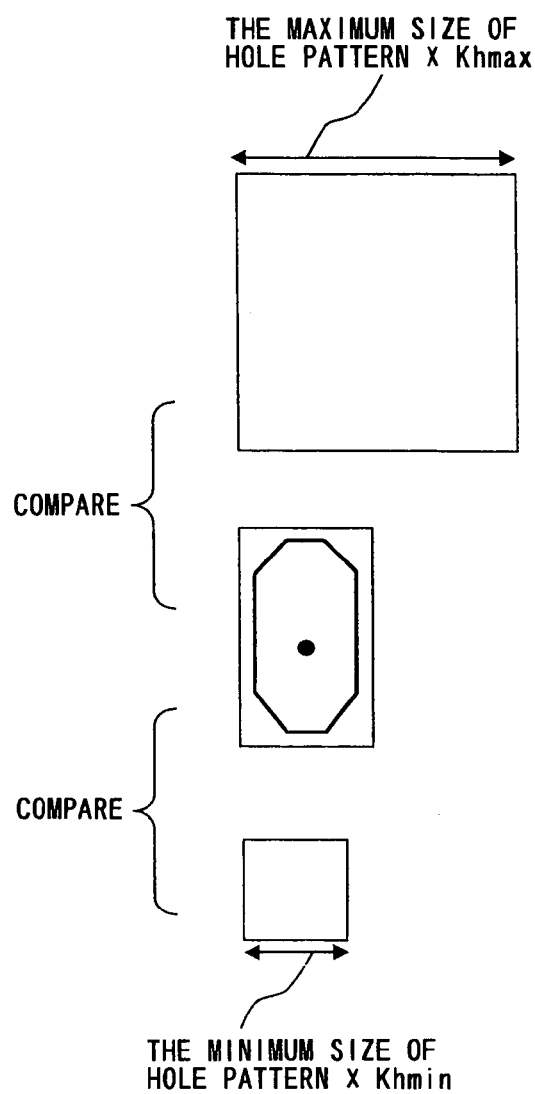
Figure 58C:
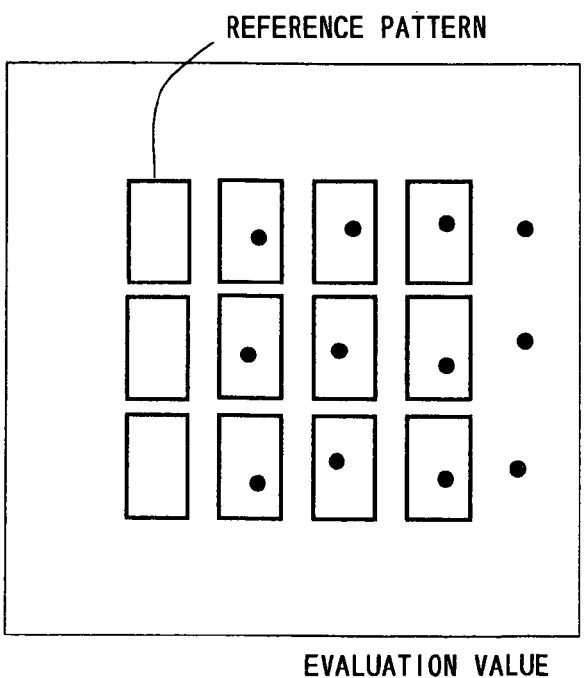

In the first matching method of a hole pattern, geometrical information obtained from edges of a pattern image to-be-inspected is used. FIGS. 58A, 58B and 58C are schematic views of the first matching method of a hole pattern. FIG. 58A shows bold lines as edges of the pattern image to-be-inspected and solid circles (●) as centroids of the edges.

As the first step, edges are detected, and the minimum bounding rectangle and a centroid of the edges are calculated as shown in FIG. 58A. In the case of an image having a contrast between the inside of the pattern and the grounding, the edge detection described in 4.1.1 The first edge detection method 1 can be used.

In the case of an image having bright edges and having no contrast between the inside of the pattern and the grounding, the edge detection described in the above-mentioned 4.1.2 The first edge detection method 2 can be used. In this case, detected edges cannot be necessarily recognized as connecting pixels. Thus, detected edges are dilated in order to connect to each other, and are recognized as connecting pixels by the labeling processing. Then, the minimum bounding rectangle and the centroid of the edges are calculated as the minimum bounding rectangle and the centroid of those connecting pixels.

As the second step, the detected edges are selected by the following procedure using FIG. 58B:

1. The above-mentioned 3.3 Recipe data "7. The minimum size $S_{hmin}$ and the maximum size $S_{hmax}$ of a hole pattern, and the safety factors $k_{hmin}$ and $k_{hmax}$" are determined, and set beforehand.

2. If the size of the minimum bounding rectangle of the edges is greater than $S_{hmin} \times k_{hmax}$, the edges are not recognized as edges of a hole pattern. Here, $k_{hmax}$ is a value that is 1 to 2 and is empirically determined.

3. If the size of the minimum bounding rectangle of the edges is smaller than $S_{hmax} \times k_{hmin}$, the edges are recognized as noise or dust, and are not recognized as edges of a hole pattern. Here, $k_{hmin}$ is a value that is 0.5 to 1 and is empirically determined.

4. If the detected edges don't form a ring-shape, the edges are not recognized as edges of a hole pattern.

5. In the case of the image having a contrast between the inside of the pattern and the grounding, it is possible to recognize whether the inside of the ring-shape of the above 4 is a hole or an island. If the inside of the ring-shape is not a hole, the edges are not recognized as edges of a hole pattern.

In this embodiment, matching is performed by using the evaluation value $F_h$ instead of the evaluation values $F_0$, $F_a$, and $F_b$ used in the above-mentioned 4.2 Line-shaped pattern matching method. The matching is performed in the same manner as the above-mentioned Line-shaped pattern matching method except for using the evaluation value $F_h$. In this embodiment, reference patterns are obtained from the design data by simple transformation. The evaluation value $F_h$ is a summation of values calculated from all the reference patterns, which are hole patterns, by the following procedure:

1. As shown in the first column of FIG. 58C, if there is no centroid of the edges in the reference pattern, the value is 0.

2. As shown in the second column of FIG. 58C, if there is a centroid of the edges, the value is 1.

In order to use the above-mentioned 4.2.1 Matching method using unique pattern, and the above-mentioned 4.2.2 Matching method using negative pattern described in the above-mentioned Line-shaped pattern matching method, the following two calculations are added. The recognition of the unique pattern and negative pattern, and setting of the degree of contribution of the unique pattern and negative pattern are the same as the above-mentioned Line-shaped pattern matching method.

3. If there is a centroid of the edges in the unique pattern, the value is the above-mentioned weighting.

4. If there is a centroid of the edges in the negative pattern, the value is the above-mentioned weighting multiplied by (−1).

According to this embodiment, a matching method using condensed information obtained from a plurality of the edges can be realized. The method is performed at higher speed than a method using edges individually. Moreover, calculation cost is reduced greatly.

Further, high-speed calculation can be performed by using the above-mentioned 4.2.3 Matching method using projection data obtained by projecting edge on the horizontal and vertical axes. In this case, projection data obtained by projecting the centroid of the edges are used, instead of projection data obtained by projecting the edges.

Figure 59A:
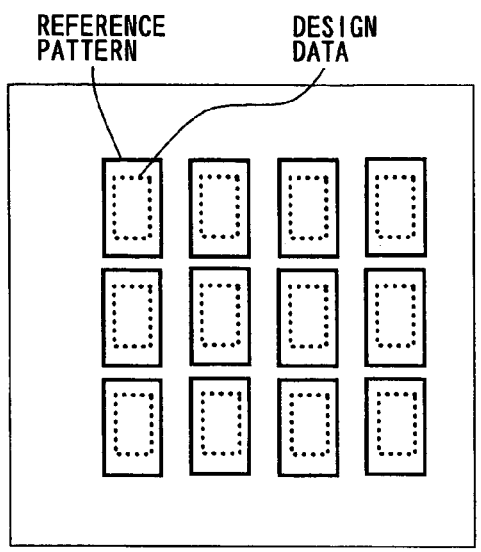
FIGS. 59A, 59B and 59C are schematic views of the second matching method of a hole pattern.
Figure 59B:
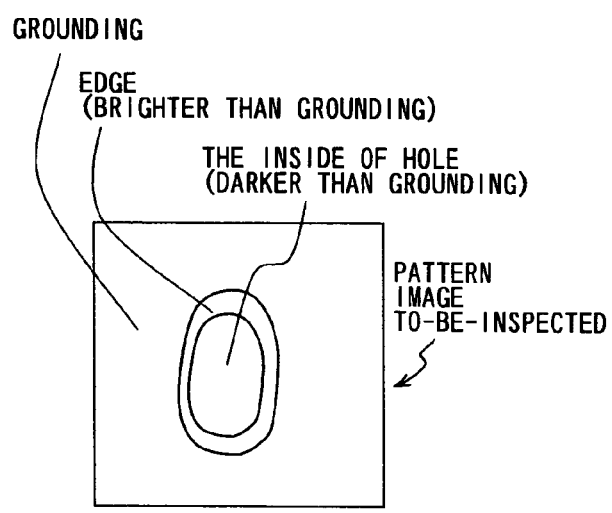
Figure 59C:
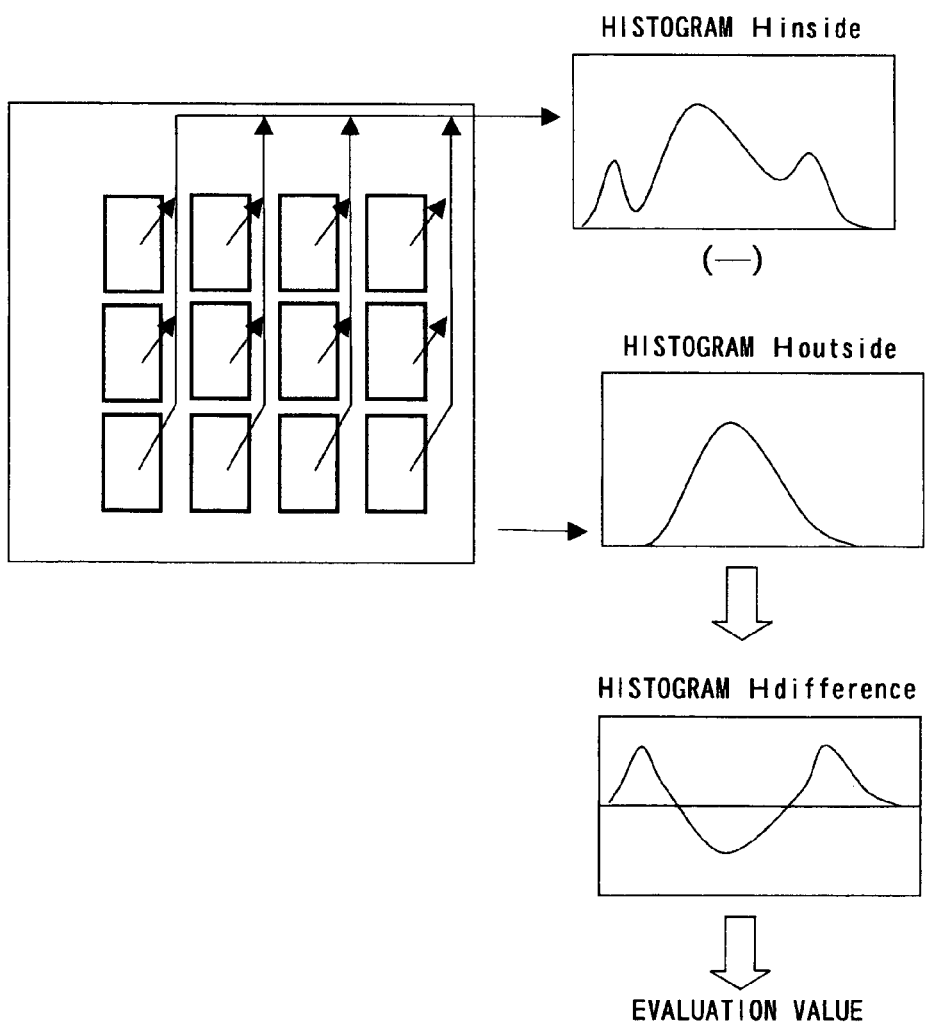

4.4 Matching Method of Using Statistic Values for Hole Pattern and Island Pattern In the second matching method of a hole pattern, a statistic value calculated from part of the pattern image to-be-inspected corresponding to the inside of a reference pattern and a statistic value calculated from part of the pattern image to-be-inspected corresponding to the outside of the reference pattern are compared. FIGS. 59A, 59B, and 59C are schematic views of the second matching method of a hole pattern. FIG. 59A shows reference patterns used in this embodiment. These reference patterns are obtained by the size processing of reference patterns obtained from the design data. A dilating quantity of the size processing is less than half of the bigger value of the above-mentioned 3.3 Recipe data "2. The allowable deformation quantity of a diameter, in the case of a hole pattern and island pattern". FIG. 59B shows a typical hole pattern image. The edges of the hole pattern are brighter than the grounding, and the inside of the hole pattern is darker than the grounding.

In this embodiment, matching is performed by using the evaluation value $F_d$ instead of the evaluation values $F_0$, $F_a$, and $F_b$ used in the above-mentioned 4.2 Line-shaped pattern matching method. The matching is performed in the same manner as the above-mentioned Line-shaped pattern matching method except for using the evaluation value $F_d$. The evaluation value $F_d$ is calculated from the following procedure:

1. As shown in FIG. 59C, a histogram $H_{inside}$ is obtained from pixels of the pattern image to-be-inspected corresponding to the insides of all the reference patterns. The obtained histogram $H_{inside}$ is standardized.

2. A histogram $H_{outside}$ is obtained from pixels of the pattern image to-be-inspected corresponding to the outside of all the reference patterns. The obtained histogram $H_{outside}$ is standardized.

3. Each element of a difference histogram $H_{difference}$ is calculated as a difference of corresponding element of the histogram $H_{inside}$ and corresponding element of the histogram $H_{outside}$.

The evaluation value $F_d$ is calculated by summing absolute values of all the elements of the difference histogram $H_{difference}$.

In order to use the above-mentioned 4.2.1 Matching method using unique pattern, and the above-mentioned 4.2.2 Matching method using negative pattern described in the above-mentioned Line-shaped pattern matching method, the following two calculations are added. The recognition of the unique pattern and negative pattern, and setting of the degree of contribution of the unique pattern and negative pattern are the same as the above-mentioned Line-shaped pattern matching method.

4. The histogram $H_{inside}$ is obtained from pixels of the pattern image to-be-inspected corresponding to the inside of the unique pattern with each of these pixels converted into the above-mentioned weighting pixels.

5. The histogram $H_{inside}$ is obtained from pixels of the pattern image to-be-inspected corresponding to the inside of the negative pattern with each of these pixels converted into the above-mentioned weighting multiplied by (−1) pixels.

The above-mentioned step 5 means the following. If a hole exists in a negative pattern, the total number of the elements of the histogram $H_{inside}$ decreases, however a shape of histogram $H_{inside}$ is not deformed particularly. Therefore, in this case, the evaluation value $F_d$ is nearly equal to the evaluation value $F_d$ that has been calculated before calculation of this negative pattern. On the other hand, if a hole does not exist in the negative pattern, the histogram $H_{inside}$ becomes similar to the difference histogram $H_{difference}$. The evaluation value $F_d$ using the difference histogram $H_{difference}$ and the histogram $H_{outside}$ is greater than the evaluation value $F_d$ using the histogram $H_{inside}$ and the histogram $H_{outside}$. Therefore, in this case, the evaluation value $F_d$ becomes greater than the evaluation value $F_d$ that has been calculated before calculation of this negative pattern.

Image brightness distribution of grounding of a hole pattern and an island pattern may be non-uniform due to electrification phenomenon and the like. It means that the histogram $H_{outside}$ may become spreading. However, by using this embodiment, the evaluation value $F_d$ is not drastically affected by spreading of the histogram $H_{outside}$.

According to this embodiment, the difference histogram made from histograms with regard to the inside and outside of the hole pattern or the island pattern is used as the evaluation value, and hence the matching method robust against non-uniform image brightness distribution due to electrification phenomenon and the like can be realized. In addition, this method can also be used for the line-shaped pattern matching.

4.5 Post-Matching Processing

When the matching is performed and the shift quantity $S_1=(x_s,y_s)$ at which the evaluation value takes the maximum is obtained, the reference pattern is shifted by the shift quantity $S_1$. The subsequent processing is performed while this shift is being maintained. The shift quantity $S_1$ can be outputted to the display device 5 and the printer 6 as the defect information.

After the matching is completed, the edges of the pattern image to-be-inspected are binarized. Specifically, the magnitude of each edge of the pattern image to-be-inspected is binarized by using the above-mentioned 3.3 Recipe data "3. The threshold used in binarization of the edges of the pattern image to-be-inspected".

As another binarization method, the p-tile method can be used. In this method, the edges of the pattern image to-be-inspected are set to a value '1' in the descending order of their magnitude, so that the number of pixels, which have a value '1', of the edges of the pattern image to-be-inspected becomes the number of the edge of the reference pattern×p. Here, the coefficient p is normally about 0.9 to 1.1, and is set as the parameter in the above-mentioned 3.3 Recipe data "3. The p-tile coefficient used in binarization of the edges of the pattern image to-be-inspected", and is used.

4.6 The First Inspection

Next, the inspection unit 12 performs the first inspection. Specifically, calculation of the pattern deformation quantity, defect detection, and recognition of defect class are performed. The inspection unit 12 establishes a correspondence between the edge of the pattern image to-be-inspected and the edge of the reference pattern (step S318). The edge position is treated with sub pixel accuracy. Therefore, the distance between the two edges can also be obtained with sub pixel accuracy. The direction is determined as a value in a range of 0 to 360 degrees with the right direction being set to, for example, 0 degree.

In this embodiment, the establishing of correspondence is performed in consideration of a distance between the edge of the pattern image to-be-inspected and the edge of the reference pattern, which is shifted by the shift quantity $S_1$, and the directions of both the edges as described in the following procedure. For each edge of the reference pattern, the edge of the pattern image to-be-inspected located within the distance of the above-mentioned 3.3 Recipe data "2. The limit values of the negative side and the positive side of the allowable pattern deformation quantities" are searched. Then, a directional difference between each detected edge and the edge of the reference pattern is calculated. If the directional difference is smaller than the above-mentioned 3.3 Recipe data "2. The limit values of the allowable directional difference between edges", the edge that is used in the calculation is recognized as a corresponding edge within the allowable deformation quantity. A vector d(x,y) between the two edges having the correspondence can be used to calculate the pattern deformation quantity. In addition, if a plurality of edges is recognized in the above procedure, an edge whose distance is smallest and whose directional difference is smallest is adopted.

FIG. 60 is a diagram showing an example of the establishing of correspondence between the edge of the pattern image to-be-inspected and the edge of the reference pattern. In FIG. 60, each edge is shown by an arrow to show its direction. In the example of FIG. 60, the establishing of correspondence is performed for each pixel that contains the edge of the reference pattern by obtaining the edge of the pattern image to-be-inspected in a direction perpendicular to the edge direction from the center of the edge of the reference pattern. If a distance between an edge of the pattern image to-be-inspected and the center of the edge of the reference pattern is shorter than the allowable pattern deformation quantity, and a directional difference between those is smaller than the allowable directional difference between edges, those edges correspond. FIG. 60, the vector d(x,y) between the two edges is an example of the above vector.

FIG. 61A is a diagram showing an example of the edge of the reference pattern, and FIG. 61B is a diagram showing an example of the edge of the pattern image to-be-inspected corresponding to the reference pattern of FIG. 61A. The establishing of correspondence of both the edges will be described with reference to FIGS. 61A and 61B. In this example, the allowable pattern deformation quantity is set to one pixel, and the allowable directional difference between edges is set to 60 degrees. For example, if an edge of the pattern image to-be-inspected corresponding to an edge 81 of the reference pattern is searched, because an edge 68 locates within the distance of the allowable pattern deformation quantity from the edge 81 and its directional difference is smaller than the allowable directional difference between edges, the edge 68 is recognized as the corresponding edge to the edge 81. With regard to an edge 84 of the reference pattern also, an edge 70 is recognized as the corresponding edge of the pattern image to-be-inspected.

Here, with regard to an edge 82 of the reference pattern, an edge 61 does not locate within the distance of the allowable pattern deformation quantity. An edge 64 does not locate within the distance of the allowable pattern deformation quantity, and the directional difference is larger than the allowable directional difference between edges. Although edges 66 and 69 locate within the distance of the allowable pattern deformation quantity, their directional differences are not smaller than the allowable directional difference between edges. Therefore, an edge corresponding to the edge 82 cannot be obtained. Similarly, an edge corresponding to an edge 83 cannot be obtained.

Figure 62:
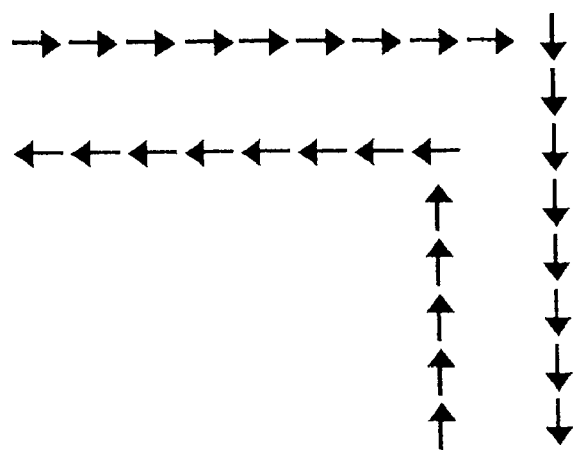
FIG. 62 is a diagram showing another example of the edges of the pattern image to-be-inspected.

In addition, FIGS. 61A and 61B show a method in which the inside and the outside of the pattern are not distinguished and the direction has a value only in a range of 0 to 180 degrees. However, a method in which the inside and the outside of the pattern are distinguished can be used. For example, if the edge direction is determined so that the inside of the pattern is always located on the right-hand side of the edge, the pattern image of FIG. 61A becomes the state shown in FIG. 62. Therefore, the establishing of correspondence can be executed more exactly.

Next, the inspection unit 12 performs defect detection (step S320). In order to detect a defect, the following two methods are used.

4.6.1 Method of Recognizing Defect Having Abnormal Pattern Deformation Quantity

As the first defect detection method, a defect having abnormal pattern deformation quantity is recognized by the following procedure. FIGS. 63A and 63B are schematic views showing a method of recognizing a defect having abnormal pattern deformation quantity. The inspection unit 12 recognizes edges of the pattern image to-be-inspected that do not correspond to edges of the reference pattern (for example, edges 61 to 67 and edges 69 to 75 of FIG. 61B) as defect pixels. A binary bitmap that represents the above defect pixels is obtained.

Next, the obtained binary bitmap is dilated in order to connect defect pixels each other by a dilation width $W_{dilation}$ (in this figure, two pixels) as shown in FIG. 63A. The dilated binary bitmap is obtained as the result of the dilation operation on the binary bitmap. The dilation operation is a well known operation used in the mathematical morphology.

As shown in FIG. 63B, when detecting a defect, the defect may be detected in such a state that the defect is divided into a plurality of parts due to noise and the like. Even if the defect is divided into a plurality of parts, the defect can be merged by using the dilation width $W_{dilation}$, which is empirically determined, as to a single defect.

Here, the dilation operation and the erosion operation that are well known in the mathematical morphology will be described. The dilation operation $\delta$ and erosion operation $\epsilon$ are operations that make the following results of calculation:

$$\delta_B(A) = \bigcup_{b \in B} (A)_{-b}$$

$$\varepsilon_B(A) = \bigcap_{b \in B} (A)_{-b}$$

In these equations, 'A' is a target image (binary bitmap), and 'B' is a structure element (binary bitmap). '$(A)_{-b}$' means translation of 'A' by 'b'. The symbols $\cup$, $\cap$ mean summation operation OR, and product operation AND of binary bitmaps for each b which satisfies b∈B.

Next, the pixels that have been connected to form one block area are determined as one clustered area through the labeling processing. Here, the labeling processing is defined as a method in which a group of the connected pixels is formed by writing the same value on the pixels that are being connected at four neighborhoods or eight neighborhoods thereof By giving a different value to the pixels that are not connected, the group of the connected pixels can be distinguished from other pixels. When the group of the connected pixels is recognized as a defect, a minimum bounding rectangle of the defect is obtained. The minimum bounding rectangle of the defect is defined as a minimum rectangle containing the pixels that have been recognized as the defect.

The above procedure is performed as shown in FIG. 63B. In FIG. 63B, there are discontinuous defects corresponding to a line segment extending in the lower right direction of reference pattern. These defects are to be a single defect inherently, but appear in a divided state. First, the areas which have been recognized as the defects are obtained as a binary image (shown by black pixels), and this binary image is dilated by the dilation width $W_{dilation}$ as shown by white pixels. Next, the black pixels and the white pixels are processed by labeling to obtain a connected area, and the minimum rectangle including the obtained connected area is obtained as a minimum bounding rectangle.

Finally, the center of the minimum bounding rectangle and the size of the minimum bounding rectangle are calculated to obtain a defect location and a defect size. The obtained defect location and the defect size are taken as defect information.

4.6.2 Method of Recognizing Defect Using Luminance Distribution of Pixels

As the second defect detection method, a defect is recognized by the following procedure using luminance distribution of pixels. First, a region is obtained by connecting the edges of the pattern image to-be-inspected that correspond to the reference pattern. Luminance distribution of pixels existing in the inside of the region and luminance distribution of pixels existing in the outside of the region are obtained. If there is no defect, these luminance distributions should be normal distributions. Therefore, by applying a quality control method, defect pixels can be recognized.

Next, pixels having luminance that is out of the normal distribution are obtained, and are connected in order to obtain a region. Finally, the center of the minimum bounding rectangle and the size of the minimum bounding rectangle of the region are calculated in order to obtain a defect location and a defect size. The obtained defect location and the defect size are taken as defect information.

Figure 64:
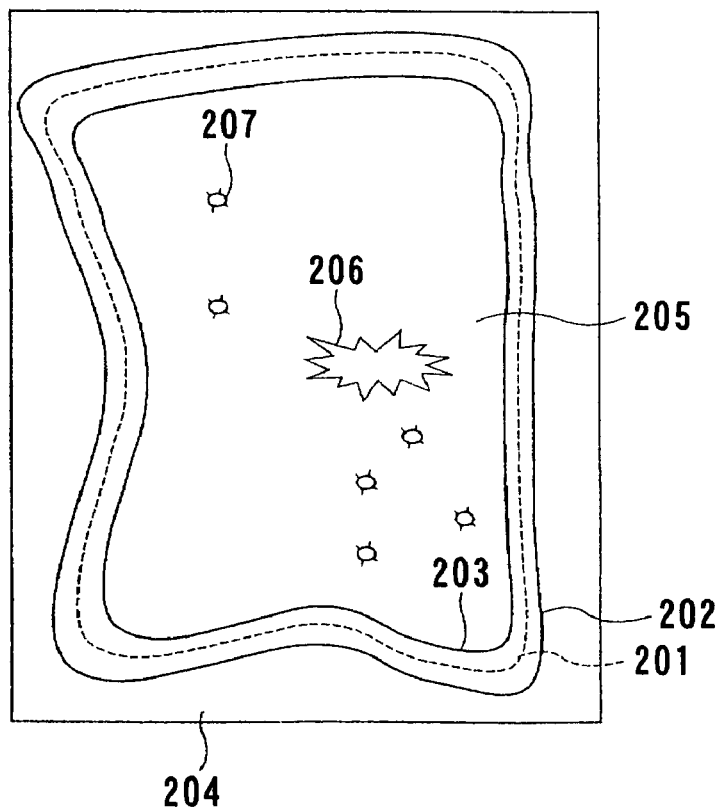
FIG. 64 is a schematic view showing a method of recognizing a defect using luminance distribution of pixels.

FIG. 64 is a schematic view showing a method of recognizing a defect using luminance distribution of pixels. A broken line 201 shows the edge of the pattern image to-be-inspected. Solid lines 202, 203 on both sides of the broken line 201 are segment lines that are formed by dilating the edges by a predetermined width, and a part surrounded by the solid lines 202, 203 is determined as the edge area. The luminance values of a grounding 204 and an inside 205 of the pattern roughly constitute a normal distribution.

Figure 65:
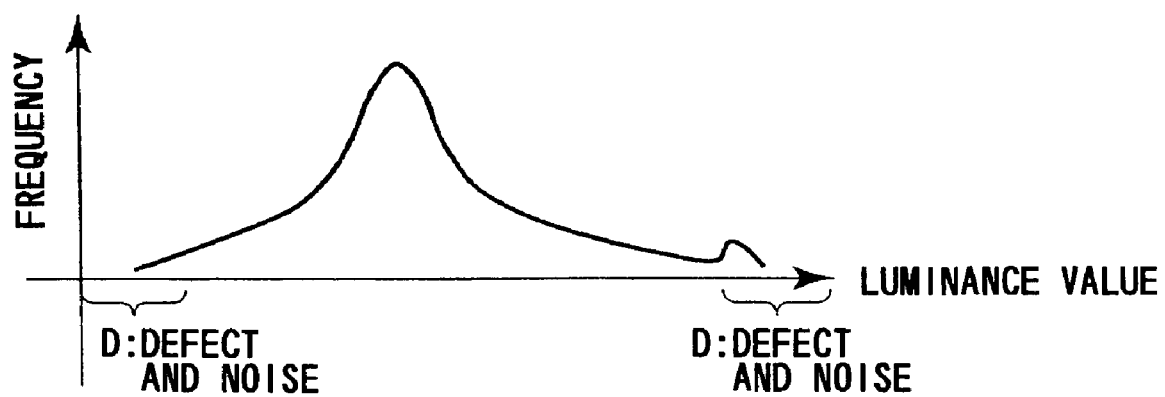
FIG. 65 is a diagram showing an example of frequency distribution of a luminance value.

As shown in FIG. 65, a part D located beyond the ±3σ regions of the distribution is very likely to be a defect. Although the part D also contains a noise, the noise exists in the area in a relatively uniform manner. On the other hand, the defect exists as being clustered. A binarized map in which any pixel having a luminance value equal to that of D is binarized to unity, i.e. 1 and a pixel having other luminance value is binarized to zero is formed. The clustered pixels having a luminance of unity (1) whose size is not more than a specified size (for example, 2×2 pixels) is erased (for example, the clustered pixels 207 of FIG. 64 being erased). For this calculation, the median filter or the like can be used. A window size of these filters should be empirically determined in consideration of the size of the defect that should be detected. The clustered pixels having a luminance of unity (for example, the clustered pixels 206 in FIG. 64) are regarded as the defect.

The above-mentioned 4.6.1 Method of recognizing defect having abnormal pattern deformation quantity detects a defect located near the edge of the reference pattern. On the other hand, this method of recognizing defect using luminance distribution of pixels detects a defect located in parts except for the neighborhood of the edge of the reference pattern.

When the defect is detected, defect information (here, the defect position and the size and its image) is outputted to the defect-class determination unit 14 (steps S322, S324).

4.7 Defect-Classes Based on Feature Quantity Obtained from Image

The defect-class determination unit 14 recognizes a defect-class using the defect information and information of the defect-class reference database 23 (step S326). Specifically, feature quantities are obtained from the given image and are compared with feature quantities of the images stored in the defect-class reference database 23 to recognize the defect-class. The defect-class determination unit 14 outputs the defect information (the defect position and the size and its image) and the defect-class to the display device 5 and the printer 6 through the output unit 13 (step S328). Here, the defect-class reference database 23 is a database in which the acquired images have been set into respective defect-classes.

The defect-class determination unit 14 can perform automatic classification of the defect-classes as described in the following procedure. Geometrical information, which is a kind of a feature quantity, of the clustered pixels determined as defects is obtained. By using the geometrical information, a shape feature such as being circular, being elongated, and the like can be recognized, and if the shape is circular, the defect is recognized the alien substance, if the shape is elongated, the defect is recognized as a scratch, or the like. The pixels recognized as defects are classified into three classifications: pixel inside the pattern; pixel outside the pattern; and pixel on the boundary. For each classification, the feature quantities of the pixels are obtained by using the pixel luminance values of the pattern image to-be-inspected. If the pixel is recognized as an alien substance based on the feature quantities obtained, whether the alien substance is a metal piece or organic material (for example, human dirt) or the like can be recognized. Specifically, if the alien substance is a metal, it looks bright; and if it is the organic material, it looks dark.

Further, in the case where the alien substance exists inside the pattern, when the pixels recognized as the alien substance show a large variation in the luminance, it is recognized that the alien substance is likely to exist on the pattern; when such pixels show a small variation in the luminance, it is recognized that the alien substance is likely to exist beneath the pattern. This is difficult processing for the conventional die-to-die method, because it is difficult to distinguish from the image whether the defect is in the inside of the pattern or the outside of the pattern. The present method uses these feature quantities to recognize the defect-class by a well-known classification method. As the classification method, a method in which the defect-class is recognized by comparing the defect with the defect-class reference database 23 using the k nearest neighbor method can be used.

The above defect-class automatic classification is a method based on a conventional optical method, namely, the ADC (Automatic Defect Classification) of the SEM method. According to the method of the present invention that uses the design data, distinction between the inside and the outside of the pattern can be performed clearly, therefore, the feature quantities for each part are obtained correctly, and accuracy of the classification is improved.

4.8 Pattern Deformation Quantities Obtained from the Whole Inspection-Unit-Area

Next, the inspection unit 12 obtains the pattern deformation quantities from the relation between the edge of the pattern image to-be-inspected and the edge of the reference pattern that correspond (step S330). The pattern deformation quantities are obtained from part where a defect is not detected as the result of the defect detection. Then, the pattern deformation quantities are outputted to the display device 5 and the printer 6 through the output unit 13 (step S332).

Two kinds of pattern deformation quantities are used. One is a pattern deformation quantities obtained from the whole inspection-unit-area, and the other is a pattern deformation quantities obtained for each attribute of the pattern. As the pattern deformation quantities obtained from the whole inspection-unit-area, a displacement quantity, a magnification variation quantity, and a deformation quantity of the line width can be used.

The displacement quantity can be calculated as an average value of the vectors $d(x,y)$ between the two edges that correspond. The quantity becomes the shift quantity $S_2$ with sub pixel accuracy. The shift quantity $S_2$ to which the shift quantity $S_1$ is added, which was described in the above-mentioned 4.5 Post-matching processing, becomes a shift quantity with sub pixel accuracy.

In the case of inspection with sub pixel accuracy, the reference pattern is shifted by the shift quantity of $S_1+S_2$, which is the renewed shift quantity $S_1$, and steps S318 through S330 are performed again.

In order to calculate a magnification variation quantity in the X-direction, X-components of the vectors $d(x,y)$ with regard to a line segment of a reference pattern in the vertical direction are approximated by a regression line $D(x)$ to obtain a regression line. Then, a gradient of the regression line is taken as the magnification variation quantity in the X-direction. The procedure is the same for the magnification variation quantity in the Y-direction.

FIG. 66A is a diagram showing an example of edges of the reference pattern (broken lines) and edges of the pattern image to-be-inspected (solid lines), and FIG. 66B is a diagram showing an example in which the X-components of the vectors $d(x,y_0)$ between two edges at $y=y_0$ shown in FIG. 66A are approximated by the regression line $D(x)$. When the X-components of the vectors $d(x,y_0)$ are approximated by the regression line $D(x)=ax+b$, the gradient 'a' corresponds to the magnification variation quantity. In the example of FIG. 66A, it is recognized that the pattern of the pattern image to-be-inspected is larger than the reference pattern as a whole.

Figure 67A:
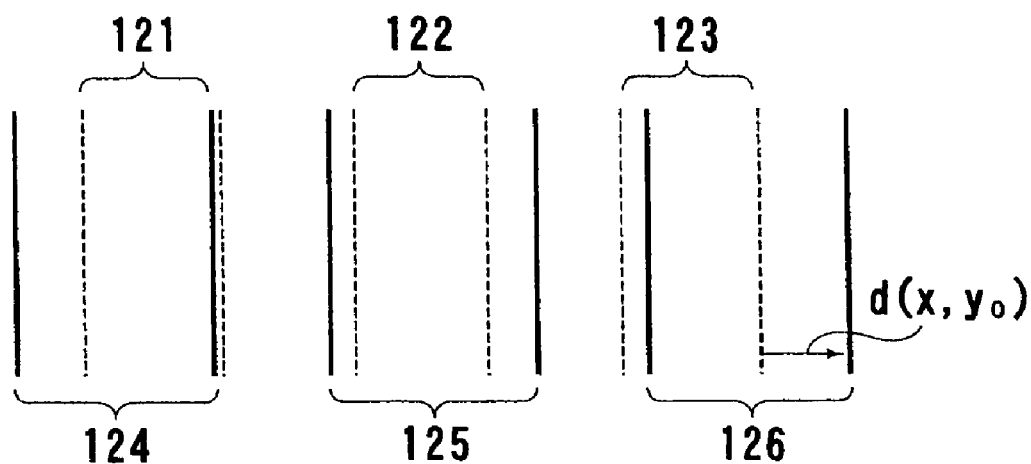
FIG. 67A is a diagram showing another example of the edges of the reference pattern and the edges of the pattern image to-be-inspected.
Figure 67B:
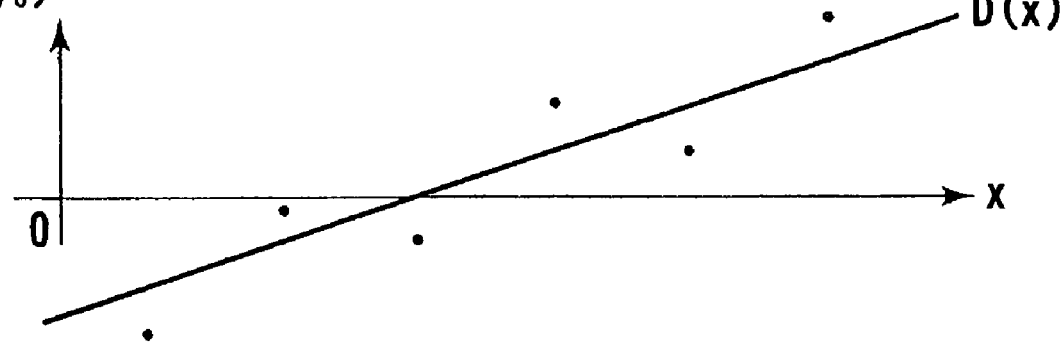
FIG. 67B is a diagram showing an example in which the X-components of the vectors $d(x,y_0)$ at $y=y_0$ between the two edges shown in FIG. 67A are approximated by the regression line $D(x)$.

FIG. 67A is a diagram showing another example of the edges of the reference pattern (broken lines) and the edges of the pattern image to-be-inspected (solid lines), and FIG. 67B is a diagram showing an example in which the X-components of the vectors $d(x,y_0)$ between the two edges at $y=y_0$ shown in FIG. 67A are approximated by the regression line $D(x)$. In the example of FIG. 67A, in addition to the patterns of the pattern image to-be-inspected being larger than the reference pattern as a whole, the line widths are dilated. In FIG. 67A, line-shaped patters 121, 122, and 123 of the reference pattern correspond to line-shaped patterns 121, 125, and 126 of the pattern image to-be-inspected, respectively.

The deformation quantity of the line width in the X-direction can be obtained, for example, by calculating the average value of $sign(x,y_0) \cdot \{X\text{-component of } d(x,y_0) - D(x)\}$. Here, $sign(x,y_0)$ takes a value of −1 when $(x,y_0)$ is positioned at the left end of the line, and takes a value of +1 when $(x,y_0)$ is positioned at the right end of the line. In addition, if the standard variation of $sign(x,y_0) \cdot \{X\text{-component of } d(x,y_0) - D(x)\}$ is calculated with respect to the deformation quantity of the line width, a degree of the variation in the line width can be obtained.

4.9 Method of Detecting Defect with Regard to Attribute of Pattern

Figure 68:
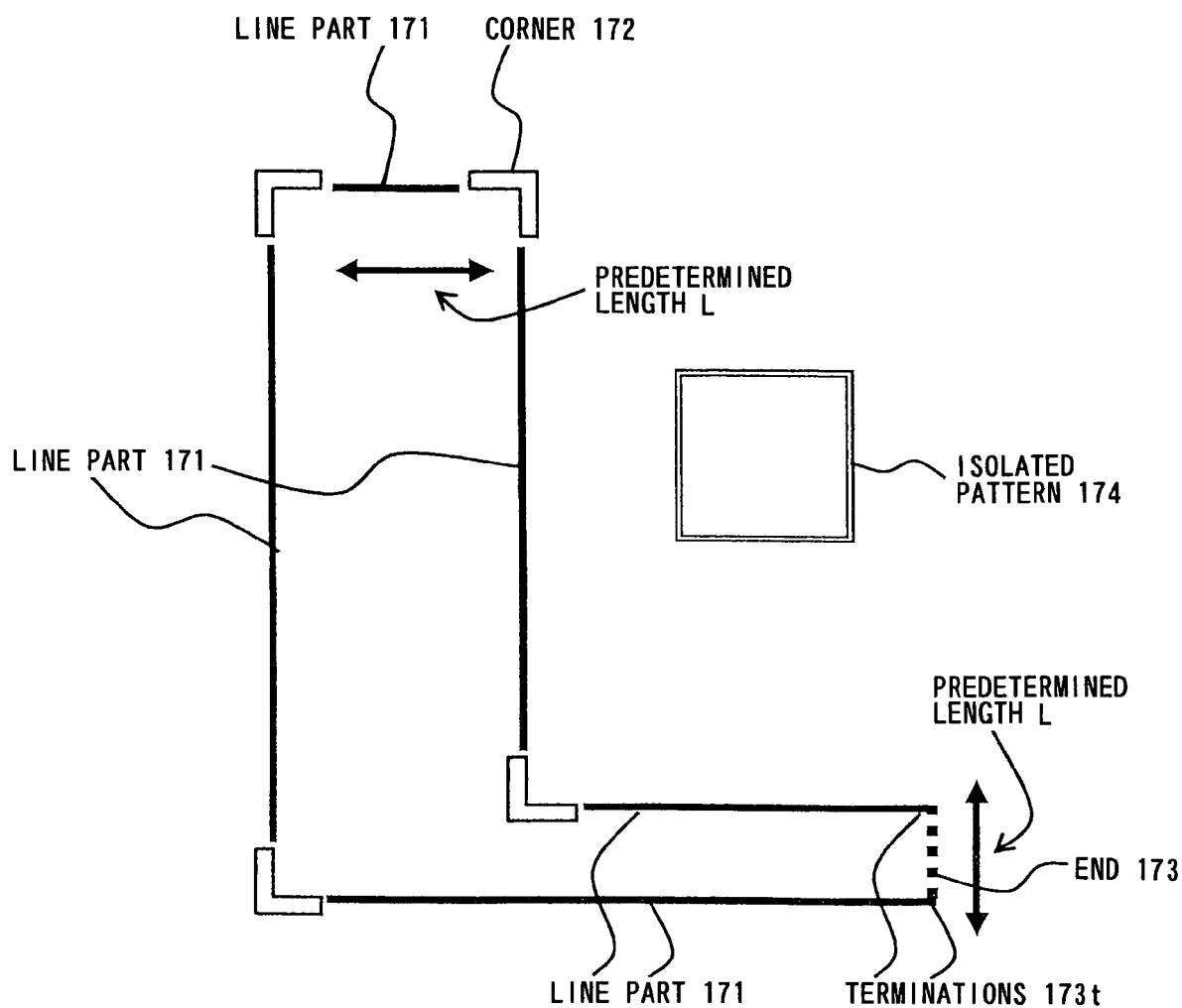
FIG. 68 is a diagram showing an example of attributes of a pattern.

First, pattern attributes will be described. As pattern attributes, a line part 171, a corner 172, an end 173, an isolated pattern 174, and the like can be used as described in FIG. 68. As the pattern deformation quantities with regard to the pattern attributes, for example, the followings can be used: the displacement quantity, the magnification variation quantity, and the deformation quantity of the line width, which were described in the above-mentioned 4.8 Pattern deformation quantities obtained from the whole inspection-unit-area; in addition, deformation quantities of feature quantities such as a diameter, an area, a length of periphery, a circularity, a moment, and a radius of curvature.

The attributes of patterns can be automatically added to the reference pattern. In order to extract the attributes of patterns, the above-mentioned 3.3 Recipe data "4. The parameters used in the extraction rules for determining attributes of the reference pattern" are set and used.

4.9.1 Defect of End Having Displacement Error

Figure 69A:
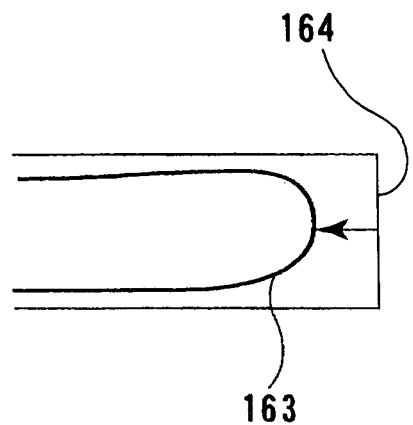
FIGS. 69A and 69B are diagrams showing displacement quantities of an end.
Figure 69B:
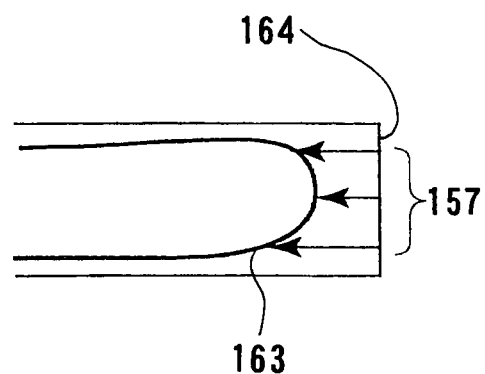

FIGS. 69A and 69B are diagrams showing a displacement quantity of an end. As shown in FIG. 69A, the displacement quantity of the end is the minimum distance between edges 164, which constitute the end, of the reference pattern and edges 163 of the pattern image to-be-inspected.

Alternatively, as shown in FIG. 69B, an average value, the maximum value, the minimum value, the median, or the like of distances corresponding to a section 157 having an arbitrary length may be used as the displacement quantity of the end.

If the displacement quantity is not within the allowable shift quantities of an edge of an end in the above-mentioned 3.3 Recipe data "2. The limit values of the negative side and the positive side of the allowable pattern deformation quantities", it is recognized that the end has a defect.

4.9.2 Defects of Line Part and Corner Having Displacement Error

In FIGS. 69A and 69B, the displacement quantity of the end has been described. In addition, with regard to a line part and a corner, the displacement quantity can be calculated in the same manner. With regard to the line part, the displacement quantity corresponding to the line part is calculated and a defect is detected. With regard to the corner, the displacement quantity corresponding to direction at an angle of half of the corner's angle or a specified angle is calculated and a defect is detected.

In these cases, instead of the allowable shift quantities of an edge, the allowable shift quantities of a line part and a corner are used, respectively.

4.9.3 Defects of Isolated Pattern Having Displacement Error

Figure 70:
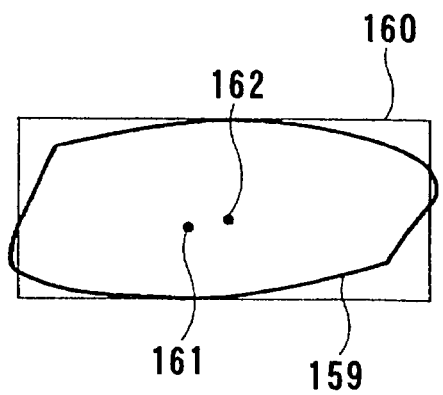
FIG. 70 is a diagram showing a displacement quantity of an isolated pattern.

FIG. 70 is a diagram showing a displacement quantity of an isolated pattern. The displacement quantity is defined as a displacement quantity between a centroid 162 of an edge 160 of the reference pattern (which forms the isolated pattern) and a centroid 161 of an edge 159 of the pattern image to-be-inspected (which forms the isolated pattern).

If the displacement quantity is not within the allowable shift quantities of an isolated pattern of an end in the above-mentioned 3.3 Recipe data "2. The limit values of the negative side and the positive side of the allowable pattern deformation quantities", it is recognized that the isolated pattern has a defect.

4.9.4 Other Defects of Isolated Pattern

Moreover, the deformation quantities of feature quantities of the isolated pattern can be inspected. As the feature quantities, an area, a length of periphery, the degree of circularity, a moment, and the like can be used. As shown in FIG. 70, the above-mentioned feature quantities of the edge 160 of the reference pattern and the edge 159 of the pattern image to-be-inspected are calculated, and then differences between feature quantities of both are inspected.

4.9.5 Defect of Corner Having Abnormal Curvature

Figure 71A:
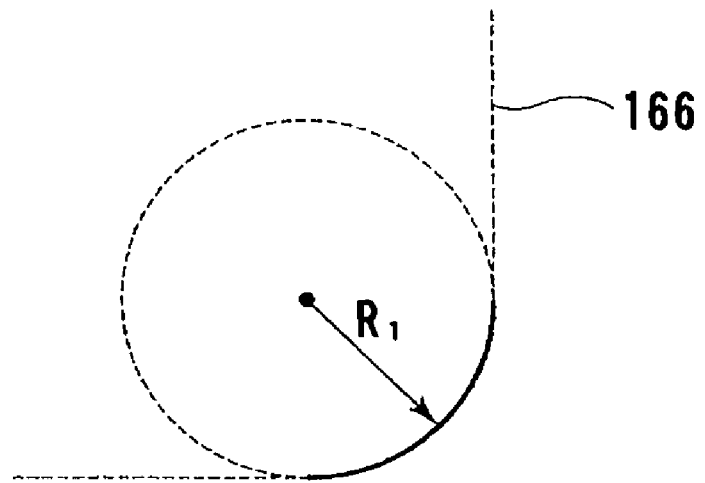
FIG. 71A is a diagram showing an example of a corner of a reference pattern.
Figure 71B:
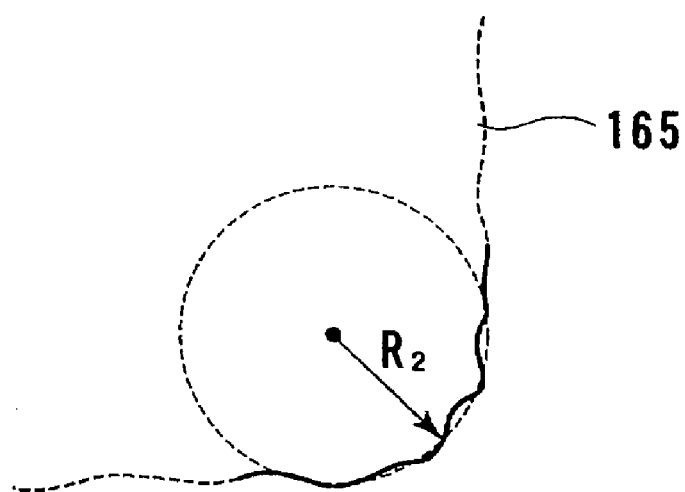
FIG. 71B is a diagram showing an example of edges of a corner of a pattern image to-be-inspected.

FIG. 71A is a diagram showing an example of a corner of a reference pattern, and FIG. 71B is a diagram showing an example of edges of a corner of the pattern image to-be-inspected. An edge 166 of corner of the reference pattern shown in FIG. 71A has been rounded off. As a radius of curvature of the corner, for example, a major axis or minor axis of an ellipse or a radius of a circle that is obtained when the curve of the corner is approximated by the ellipse or the circle by the least-squares method can be used. By obtaining the radius of curvature of the corner in the edge 166 of the reference pattern and the radius of curvature of the corner in an edge 165 of the pattern image to-be-inspected, the deformation quantity of the radius of curvature of the corner can be obtained and is inspected.

The above inspection methods are performed simultaneously for a plurality of positions within the field of view. The inspection items are selected according to the above-mentioned 3.3 Recipe data "1. The pattern deformation quantities to be inspected".

4.10 Extraction Rules for Pattern Attributes

Examples of the above-mentioned 3.3 Recipe data "4. The parameters used in the extraction rules for determining attributes of the reference pattern" will be described using FIG. 68. The line part 171 is extracted as a line segment having a length larger than a predetermined length L. The corner 172 is extracted as a portion positioned in the neighborhood of connecting points where two line parts connect with each other at a predetermined angle (90 degrees, 135 degree, 270 degrees, and the like). The end 173 is extracted as a line segment having a length equal to or smaller than a predetermined length L and having both terminations 173$t$, 173$t$ which contact the line parts 171, 171 at an angle of 90 degrees. The end 173 and the two line parts 171, 171 form a U shape. The isolated pattern is extracted as a closed figure having an area equal to or smaller than a predetermined area.

4.11 The Second Edge Detection

The inspection unit 12 detects the edge (the second edge) again from the pattern image to-be-inspected (step S334). The second edge is detected from a profile obtained from the pattern image to-be-inspected. As the second reference pattern, a reference pattern whose edge is a point Q in FIG. 76 is used. On the contrary, in the case of the image having bright edges and having no contrast between the inside of the pattern and the grounding, the edge detection described in 4.1.2 The first edge detection method 2, as the first reference pattern, a reference pattern whose edge is a point P in FIG. 76 is used. Therefore, the second reference pattern generally differs from the first reference pattern.

Before detecting the second edge of the pattern image to-be-inspected, the second reference pattern is shifted by the above-mentioned shift quantity $S_1+S_2$. Any subsequent processing is performed with keeping the shift quantity.

In order to detect an edge position from the profile, various methods (for example the threshold method, the linear approximation method, and the like) have been disclosed. In this embodiment, the threshold method is used and the measurement of the line width that is performed in the CD-SEM is applied to two-dimensional patterns (pattern image to-be-inspected). However, if the threshold method is replaced with other method such as the linear approximation method, the processing can be made similarly. Here, the linear approximation method is a method in which the profile is approximated by lines and an intersection is used to detect the edge.

As methods of setting the profile acquisition sections, the following two methods can be used. One is a method in which directions and positions for acquiring the profiles are set beforehand with using the second reference pattern. This method is used for the case where the above-mentioned 3.3 Recipe data "6. The flag for indicating whether profile acquisition sections are set at the time of setting recipe data, or are set after detecting the first edges" is off. In this method, the profile acquisition sections are set uniquely corresponding to the second reference pattern.

Figure 72:
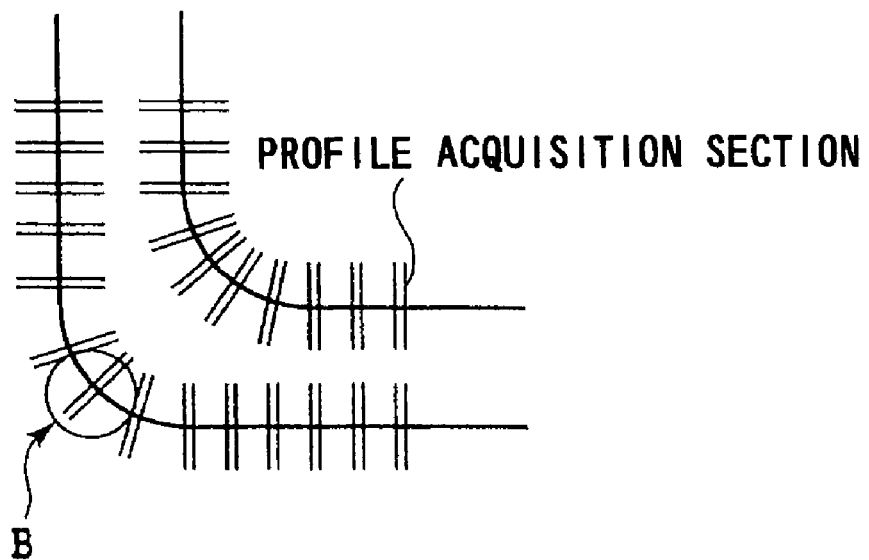
FIG. 72 is a diagram showing an example of profile acquisition sections.

FIG. 72 is a diagram showing an example of profile acquisition sections. As shown in FIG. 72, the profile acquisition section is perpendicular to the edge of the second reference pattern, and the edge of the second reference pattern is the center point of the profile acquisition section (double lines in FIG. 72). A length of the profile acquisition section is the above-mentioned 3.3 Recipe data "6. The length of a profile acquisition section", and an interval between the profile acquisition sections is the above-mentioned 3.3 Recipe data "6. The interval between profile acquisition sections".

Figure 73:
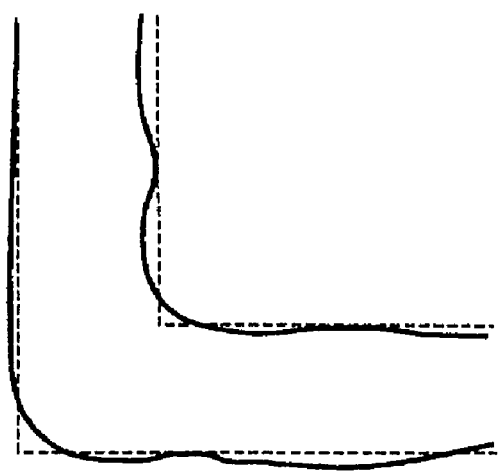
FIG. 73 is a diagram showing a contour of an exposed pattern obtained by a lithography simulator.

In addition, instead of the above-mentioned second reference pattern, as shown in FIG. 73, a contour of an exposed pattern obtained by the lithography simulator (solid lines in FIG. 73) can be used.

Profile data is acquired from a section of the pattern image to-be-inspected corresponding to the profile acquisition section for every interval, which is the above-mentioned 3.3 Recipe data "6. The interval between sampling points in a profile acquisition section". The length of the profile acquisition section is set to an arbitrary length longer than the allowable pattern deformation quantity. The interval between sampling points is set to an arbitrary value equal to or smaller than the interval of pixels. For obtaining profile data, the bilinear interpolation, the spline interpolation, or Fourier series is used.

Figure 74:
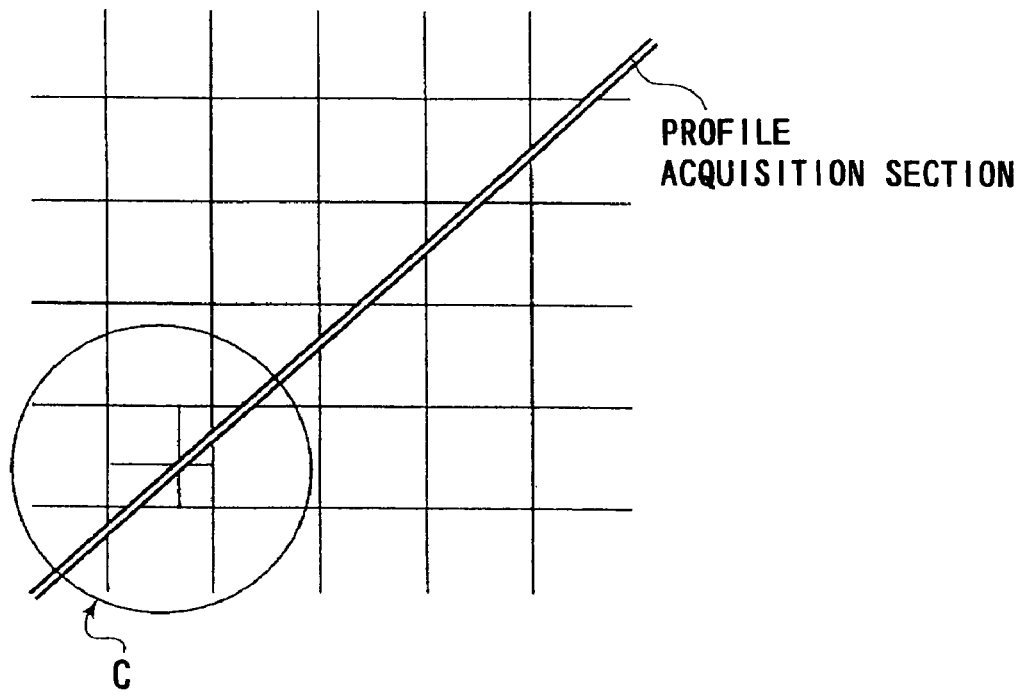
FIG. 74 is a diagram showing an enlarged part of FIG. 72 (portion of B)
Figure 75:
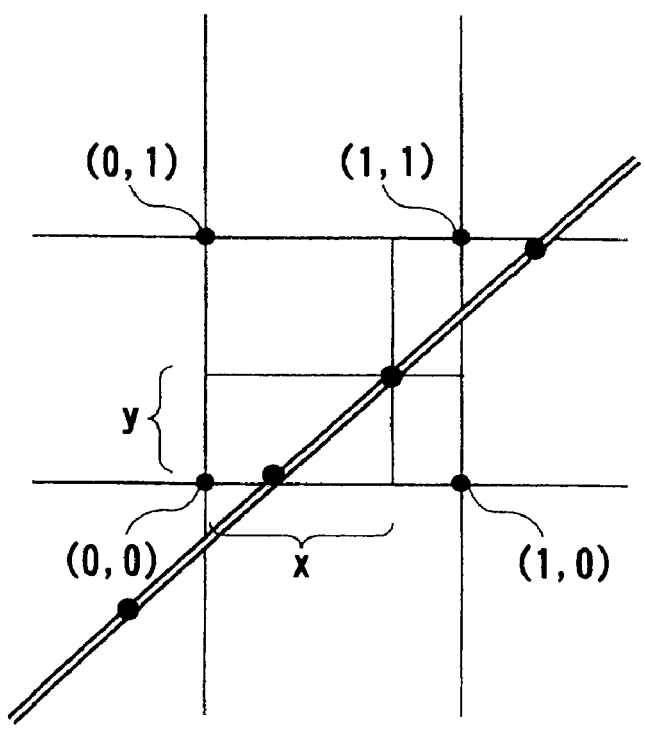
FIG. 75 is a diagram showing an enlarged part of FIG. 74 (portion of C)

FIG. 74 is an enlarged diagram of a part of FIG. 72 (portion B) and FIG. 75 is an enlarged diagram of a part of FIG. 74 (portion C). The double lines in FIG. 74 show the profile acquisition sections, intersections of the grid represent positions of the pixels, and the solid circles show positions where the luminance value of the pattern image to-be-inspected is acquired.

The bilinear interpolation method is a method in which the luminance value I(x,y) at a position (x,y) (0<x≦1, 0<y≦1) is calculated by the following equation using the luminance values I(0,0), I(0,1), I(1,0), and I(1,1) of the pixels shown by (0,0), (0,1), (1,0), and (1,1).

$$I(x,y)=\{(0,0)(1-x)+I(1,0)x\}(1-y)+\{I(0,1)(1-x)+I(1,1)x\}y$$

From the profile obtained by using this equation, the second edge position is detected by using the threshold value method. As shown in FIG. 76, the maximum luminance value V and its position P in the profile are obtained. The maximum luminance value V is multiplied by a previously specified coefficient k to obtain a threshold value T, and intersections of a line whose luminance value is equal to the threshold value T and the profile curve are obtained. From these intersections, an intersection Q, which is located in an outward direction of the pattern from the point P and is closest to the point P, is obtained. For all the profiles, by using the method, which detect the intersections Q, the second edges are detected.

A cross section of a wiring pattern formed on the wafer has a trapezoidal shape. By using the coefficient k, it can be set whether measurement is performed at the upper level, the lower level, or the middle level.

Figure 77A:
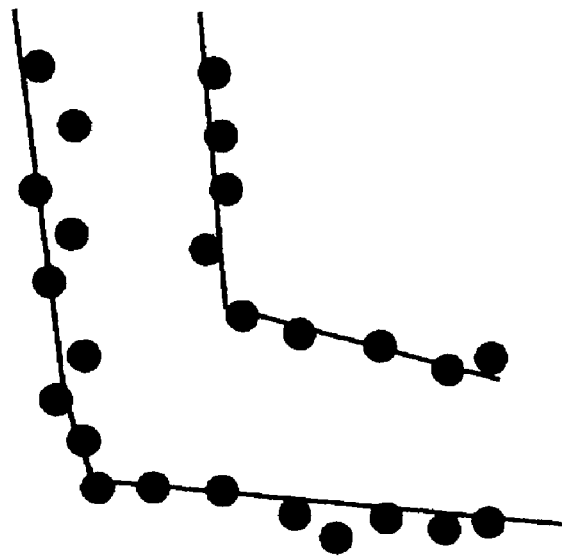
FIGS. 77A and 77B are diagrams showing examples in which the detected second edges are approximated by curves (including the polygon approximation) to connect the detected second edges

After the second edges are detected, the detected second edges are approximated by curves (including the polygon approximation) to connect the detected second edges. The simplest method is to connect the detected second edges by segment lines (polygonal lines). However, in the case of using the split-and-merge method disclosed in the following, the detected second edges are smoothly connected by polygon approximation using the least-squares method. T. Pavlidis and S. L. Horowitz, "Segmentation of plane curves," IEEE Trans. on Computers, Vol. C-23, No. 8, August 1974. FIG. 77A shows an example of the above method.

Figure 77B:
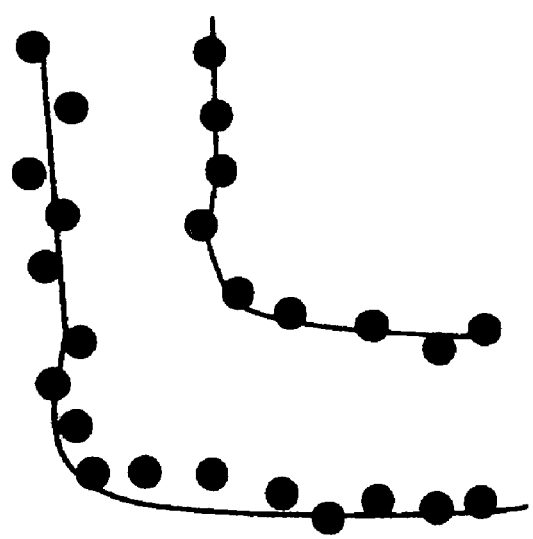

Alternatively, a curve approximation by smoothing of plane data using the least-squares method and a two-dimensional spline function, as shown in FIG. 77B, can also be used. The former can be processed at high speed, but has little flexibility for patterns containing many rounded parts. On the other hand, the latter can be processed at high speed and can be flexible. Besides the above methods, various methods such as a method using a Fourier descriptor have been disclosed and one of these can substitute for the above methods.

In addition, the above curve approximation may be performed after the first edge detection is completed.

As an alternative method of setting the profile acquisition sections, a method in which the profile acquisition sections are adaptively set after detecting the edges can be used. This method is used for the case where the above-mentioned 3.3 Recipe data "6. The flag for indicating whether profile acquisition sections are set at the time of setting recipe data, or are set after detecting the first edges" is on.

Figure 78A:
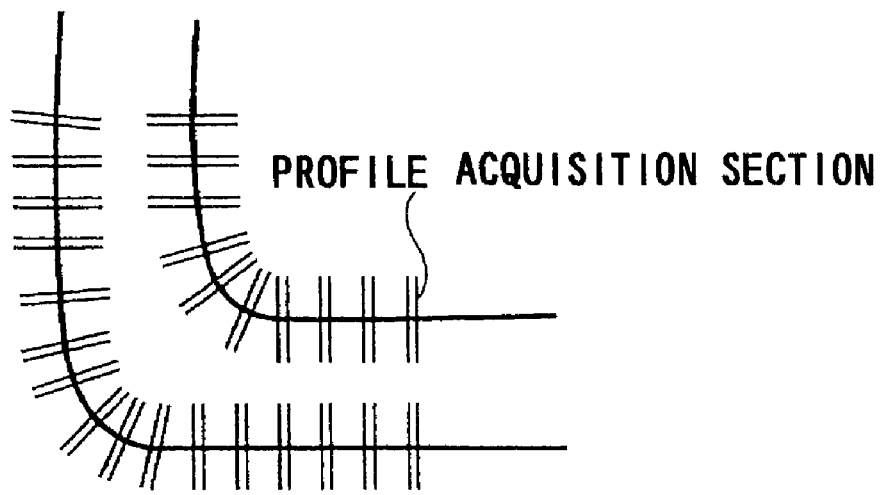
FIG. 78A is a diagram showing another example of the profile acquisition sections.
Figure 78B:
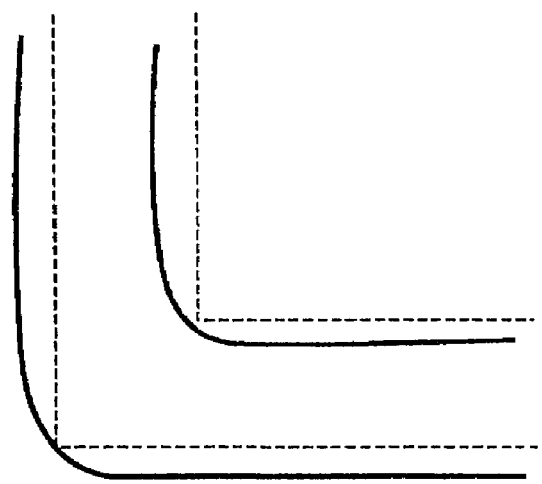
FIG. 78B is a diagram showing an example of relation between the first edges of the pattern image to-be-inspected and the second reference pattern.

Specifically, as shown in FIG. 78A, in this method, the profile acquisition section is set in a direction perpendicular to the detected first edge of the pattern image to-be-inspected. According to this method, as shown in FIG. 78B, even if the detected first edges (solid lines) of the pattern image to-be-inspected are displaced from the above-mentioned second reference pattern (dotted lines), the profile acquisition sections can be shorter than the above-mentioned method. Further, this method can easily follow pattern deformation compared to the above-mentioned method. After the profile acquisition sections are set, the same processing as the above-mentioned method is performed.

4.12 The Second Inspection

After the second edge detection as described above, the inspection unit 12 performs the second inspection (step S336). This inspection (step S336) is the same processing as the steps S320 through S332 in the above-mentioned 4.6 The first inspection except for using the second edge instead of the first edge. Moreover, in step S318, the inspection unit 12 establishes the correspondence between the edge of the pattern image to-be-inspected and the edge of the reference pattern; however, in the second inspection, the correspondence is established by the profile acquisition sections.

The second inspection performs the defect detection, and then obtains the pattern deformation quantity. The displacement quantity (shift quantity) $S_3$ with regard to the whole image corresponds to the quantity $S_2$ described in the above-mentioned 4.8 Pattern deformation quantities obtained from the whole inspection-unit-area. The obtained quantity $S_3$ plus the above shift quantity $S_1$ and $S_2$ becomes the total shift quantity between the second reference pattern and the pattern image to-be-inspected.

In the second inspection, the above-mentioned 4.6.1 Method of recognizing defect having abnormal pattern deformation quantity and the above-mentioned 4.6.2 Method of recognizing defect using luminance distribution of pixels are altered.

In the above-mentioned 4.6.1 Method of recognizing defect having abnormal pattern deformation quantity of the first inspection, the edges of the pattern image to-be-inspected that do not correspond to the edges of the reference pattern are recognized as defect pixels. However, in the second inspection, the profile acquisition sections which do not have edges within the above-mentioned 3.3 Recipe data "2. The limit values of the negative side and the positive side of the allowable pattern deformation quantities" are recognized as a defect.

In the above-mentioned 4.6.2 Method of recognizing defect using luminance distribution of pixels of the above-mentioned first inspection, the region is obtained by connecting the edges of the pattern image to-be-inspected that correspond to the reference pattern. However, in second inspection, a region is obtained by connecting the edges of the reference pattern.

When the above basic inspection processing has been performed for all the inspection-unit-areas, the inspection processing is terminated; otherwise, the flow goes back to step S108 (step S140).

5. Application Inspection Processing

The foregoing is the basic inspection processing according to the flow chart shown in FIG. 25. In this chapter, application processing expanded based on the basic inspection processing will be described.

5.1 Method of Recognizing Repeated Defect

As described in the above 4. Basic Inspection processing, the example of inspection processing for recognizing a repeated defect is described with reference to FIG. 27. The inspection processing is an expanded process of the inspection processing according to the flow chart shown in FIG. 25.

First, the block A of the preparation process before inspection is performed. Next, defects are merged after completing the block B of the inspection process for inspection area in each semiconductor device (step S402). The block A and the block B of FIG. 27 are identical to the block A and the block B of FIG. 26, respectively. The steps S302 to S306 in the block A are identical to the steps S302 to S306 of FIG. 25. Further, the steps S308 to S136 in the block B are identical to the steps S308 to S336 of FIG. 25.

In the block B, after the step S336, the step S338 for outputting the defect information to the defect information storage unit 24 is added. Addition of step S338 is different from FIG. 25. The step S340 in the block B is identical to the step S340 of FIG. 25. The inspection-unit-areas in the step S340 are obtained by dividing the inspection area represented by the coordinates on the design data, and this inspection area should be the area to-be-inspected in a plurality of semiconductor devices.

When the inspection area larger than the inspection-unit-area shown in FIG. 20 is inspected, a defect extending across the boundary between inspection-unit-areas may be detected in such a state that the defect is divided into a plurality of portions. By merging these divided portions of the defect, influence of boundaries between the inspection-unit-areas may be eliminated.

Figure 79:
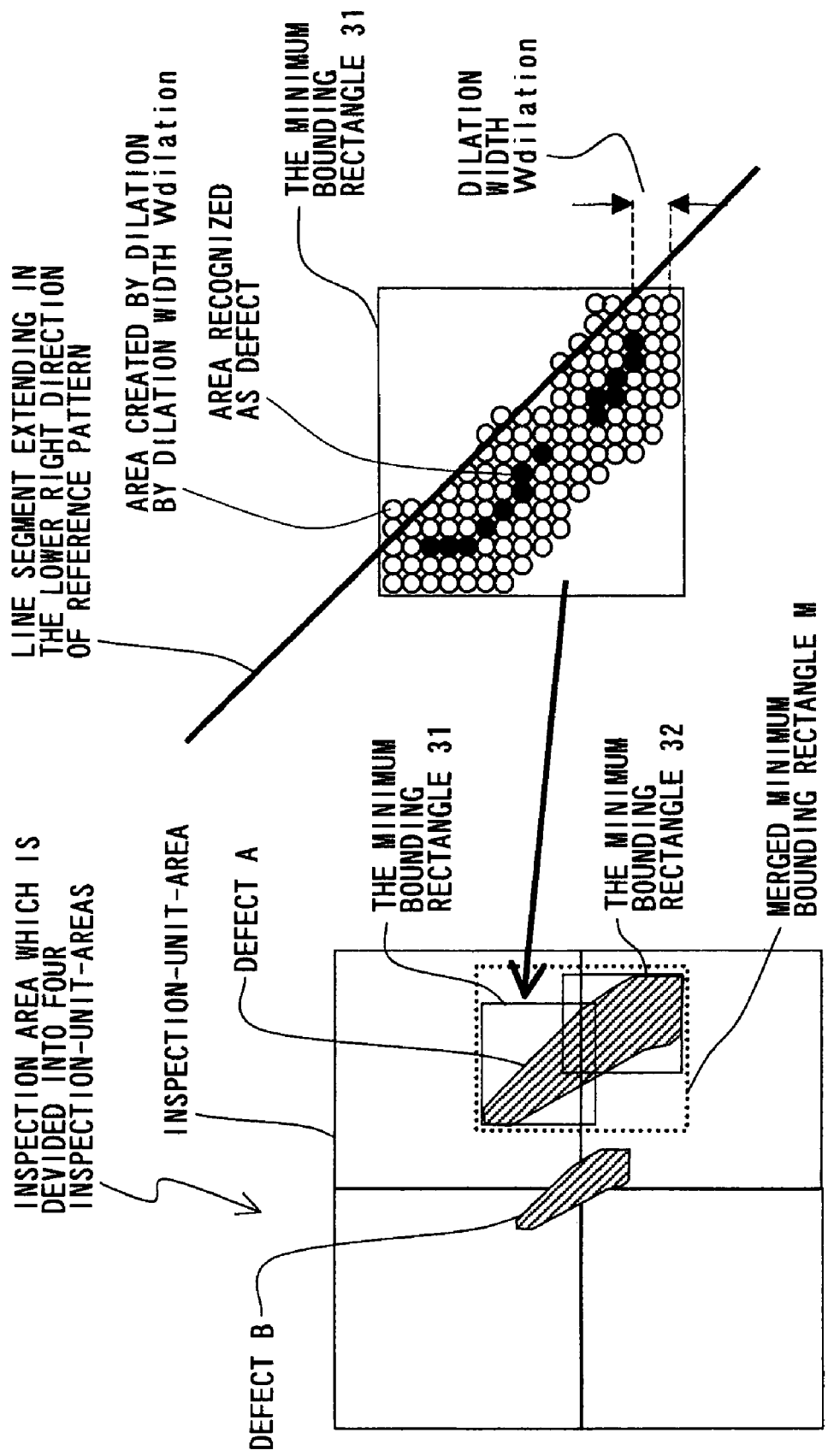
FIG. 79 is a schematic view showing an example in which an inspection area is divided into four inspection-unit-areas.

FIG. 79 is a schematic view showing an example in which an inspection area is divided into four inspection-unit-areas. A defect A lies across the inspection-unit-area on the upper right and the inspection area on the lower right. First, the minimum bounding rectangle 31 of the defect located in the inspection-unit-area on the upper right and the minimum bounding rectangle 32 of the defect located in the inspection-unit-area on the lower right are obtained. The minimum bounding rectangle 31 and the minimum bounding rectangle 32 are obtained by the procedure shown in FIG. 63B.

Next, overlapping check of the minimum bounding rectangles included in all of the inspection-unit-areas that constitute the inspection area is performed. If the minimum bounding rectangles are overlapped, the minimum bounding rectangle including all the overlapped minimum bounding rectangles is taken as the merged minimum bounding rectangle. In this example, the minimum bounding rectangle M is obtained as the merged minimum bounding rectangle from the minimum bounding rectangle 31 and the minimum bounding rectangle 32. In FIG. 79, although the minimum bounding rectangle M (shown by dotted line), the minimum bounding rectangle 31, and the minimum bounding rectangle 32 should be overlapped partially, the minimum bounding rectangle M is drawn slightly larger for simple drawing.

Similarly, the defect B lying across the four inspection-unit-areas may be merged. In this case, four minimum bounding rectangles are merged as the single minimum bounding rectangle (step S402). The defect information existing in the obtained minimum bounding rectangle is merged, and the merged defect information is stored in the defect information storage unit 24 (step S403).

After checking whether all the inspection of the semiconductor device to-be-inspected has been completed (step S404), if it is judged that all the inspection has been completed, repeated defects are recognized (step S406). The defect information obtained from the same inspection areas in a plurality of semiconductor devices which have been fabricated based on the same design data, and is represented in a coordinate system used in the design data is stored in the defect information storage unit 24 by step S338.

Figure 80:
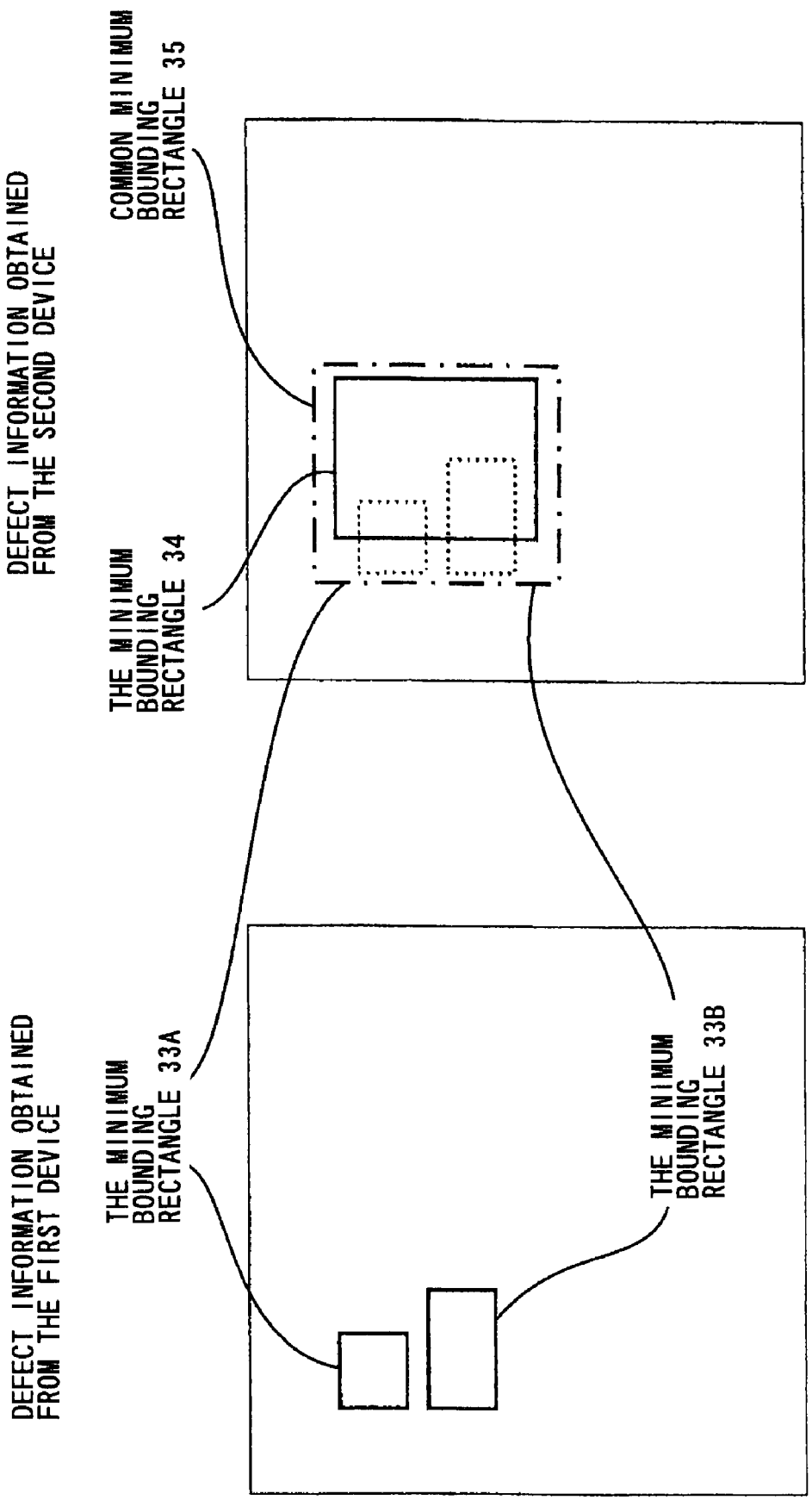
FIG. 80 is a schematic view showing defect information obtained from the first semiconductor device and defect information obtained from the second semiconductor device.

FIG. 80 is a schematic view showing defect information obtained from the first semiconductor device and defect information obtained from the second semiconductor device. When the defect information obtained from the first semiconductor device and the defect information obtained from the second semiconductor device are superimposed, it is recognized that the minimum bounding rectangle 33A and the minimum bounding rectangle 33B are overlapped with the minimum bounding rectangle 34. This processing is well known as processing of the Boolean OR operation. The common minimum bounding rectangle 35 is obtained as the minimum bounding rectangle including these three minimum bounding rectangles. Defects, which are not shown in the figure, in the common minimum bounding rectangle 35 are recognized as defects that exist commonly in a plurality of semiconductor devices, i.e. repeated defects.

This means that there exist the repeated defects in the common minimum bounding rectangle 35, the defects have been detected as the divided minimum bounding rectangle 33A and the minimum bounding rectangle 33B due to noise or the like in the first semiconductor device, and the defect has been detected as the single minimum bounding rectangle 34 in the second semiconductor device. The shift of the minimum bounding rectangle 33A and the minimum bounding rectangle 33B from the minimum bounding rectangle 34 means that the defects have been detected at a slightly different position.

The above processing may be the same in the case where the defect information that has been obtained from N semiconductor devices including at least three semiconductor devices is used. In this case, when the minimum bounding rectangles obtained from semiconductor devices of not less than M overlap each other, the repeated defects are recognized. M is in the range of 2 to N in number. The larger M is, the more accurately the repeated defects can be obtained.

The defect information of the repeated defects detected by the above inspection is outputted to the defect information storage unit 24 (step S408). The defect information in the defect information storage unit 24 is outputted to the display device 5 and the printer 6 through the output unit 13 (step S410).

By using the embodiment, huge labor of an operator is made unnecessary, and the defect recognition inaccuracy caused by an operator's mistake can be prevented. In addition, in the case where a specimen is contaminated by a carbon coating, which is described later, or the like, contaminations are not detected as a repeated defect, because the contaminations seldom or never exist at the same location of different devices.

As an alternative method, defect information is obtained from the entire inspection area in at least one of semiconductor devices, and then defect information is obtained by inspecting the defect locations in another semiconductor device corresponding to the defect locations in the defect information obtained from the above inspected semiconductor device and its neighborhood. Then, the repeated defects can be recognized.

In this embodiment, a method in which defect information is obtained from the entire inspection area in the first semiconductor device, and then defect information is obtained by inspecting the defect locations in the second semiconductor device corresponding to the defect locations in the defect information obtained from the first semiconductor device and its neighborhood will be described.

As the first step, with regard to the first semiconductor device, the block A, the block B, the step S402, and the step S403 are performed. On the left-hand side of FIG. 81, defect information of the first semiconductor device obtained from the step S403 is shown schematically. An image corresponding to the minimum bounding rectangle 41 obtained from the first semiconductor device and its neighborhood is acquired from the second semiconductor device, and the defects are inspected from the image. On the right-hand side of FIG. 81, defect information in the limited areas is shown schematically as defect information obtained from the second semiconductor device.

Figure 81:
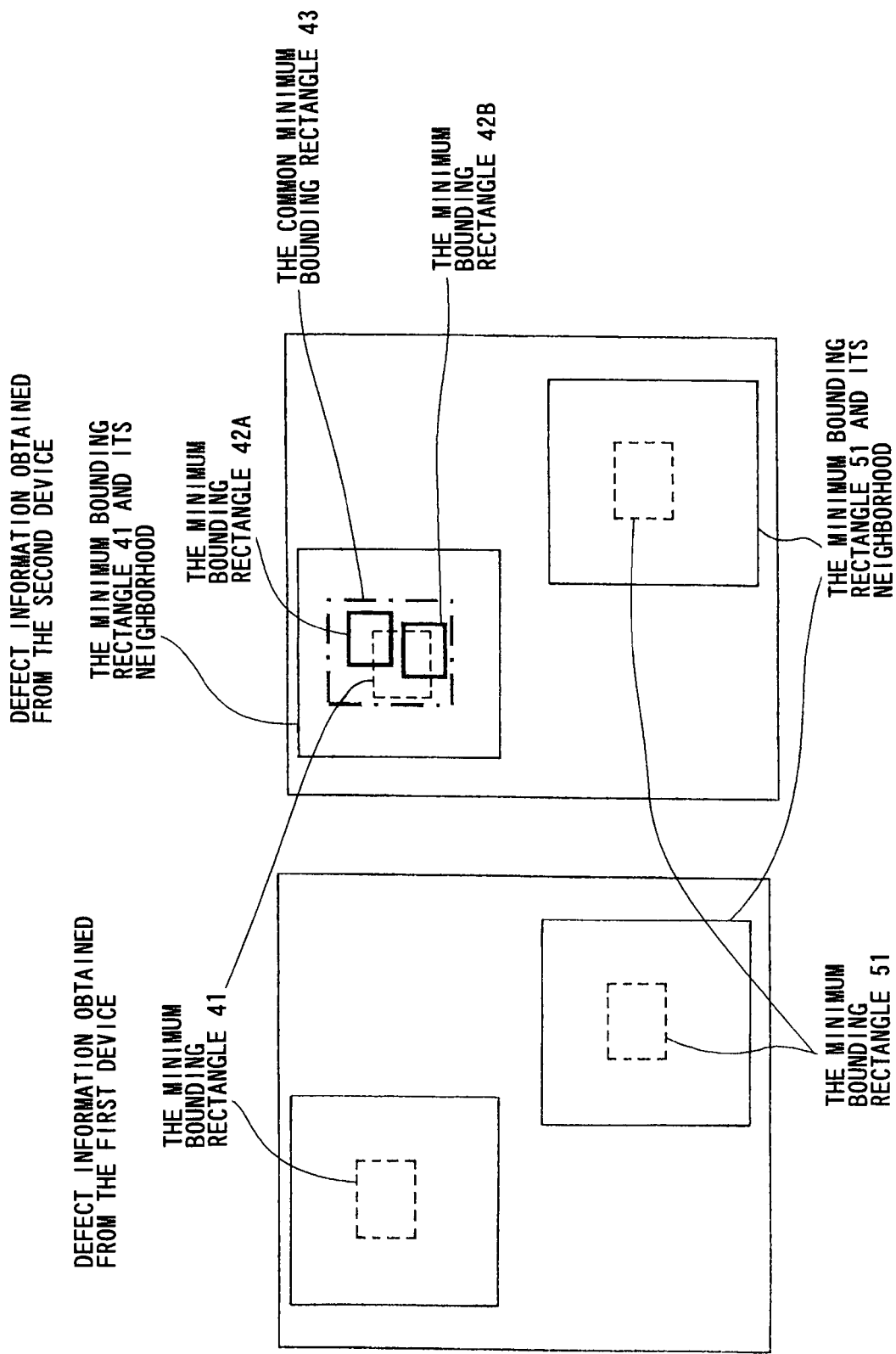
FIG. 81 is a schematic view showing defect information obtained from the first semiconductor device and defect information obtained from a limited area of the second semiconductor device.

As the second step, whether the defect information obtained from the first semiconductor device and the defect information from the second semiconductor device overlap each other is checked. In FIG. 81, the minimum bounding rectangle 41, and the minimum bounding rectangle 42A and the minimum bounding rectangle 42B overlap one another. Next, the minimum bounding rectangle including these three minimum bounding rectangles is obtained as a common minimum bounding rectangle 43. Defects, which are not shown in the figure, in the common minimum bounding rectangle 43 are recognized as the defects that exist commonly in both semiconductor devices, i.e. repeated defects. The same processing is performed on the minimum bounding rectangle 51. In this manner, with respect to all the defects included in the defect information that have been obtained from the first semiconductor device, the second semiconductor device is inspected in the limited areas.

In the case where the number of the defects included in the defect information that has been obtained from the first semiconductor device is small, this method is performed faster than the previous method.

5.2 Region Inspection Method

In the above-mentioned 4.6 The first inspection and the above-mentioned 4.12 The second inspection, the design data is simply transformed into the reference pattern. As an alternative inspection method, an inspection method in which a reference pattern suitable for a region inspection method is extracted by using geometrical information of line segments constituting the design data, and/or by using relationship between line segments that contact with each other or are located closely to each other can be used. The region inspection method means an inspection method using edges facing each other.

As the region inspection method, methods of inspecting a line width, an average line width, a space width, and an average space width of a line-shaped pattern; a line width, an average line width, a space width, and an average space width of a curvilinear-shaped pattern; a part that is liable to cause an open or bridge defect; and a gate width can be used.

5.2.1 Methods of Inspecting Line Width, Average Line Width, Space Width, and Average Space Width of Line-Shaped Pattern A semiconductor device process is controlled by monitoring a line width, an average line width, a space width, or an average space width. According to this embodiment, an inspection method in which a reference pattern suitable for inspection of the line width, the average line width, the space width, or the average space width is extracted from the design data of a layer to-be-inspected; and an allowable deformation quantity for the line width, the average line width, the space width, or the average space width is set to the extracted reference pattern can be used. The inspection method is performed in the following procedure:

FIG. 82 is a schematic view showing a rule for automatically extracting reference patterns suitable for line width inspection from the design data. A line-shaped polygon of the design data that has a width smaller than the predetermined maximum line width Lw and has a length longer than the predetermined minimum line length Lm is an object for obtaining a reference pattern suitable for line width inspection. As shown in the left part of FIG. 82, there are three line-shaped polygons in the design data shown in FIG. 82. The left line-shaped polygon can be the object to be processed, but the middle line-shaped polygon cannot be the object to be processed because the middle line-shaped polygon has a width larger than the maximum line width Lw. Further, the right line-shaped polygon cannot be the object to be processed because the right line-shaped polygon has a length shorter than the minimum line length Lm.

Next, as shown on the right-hand side of FIG. 82, the selected line-shaped polygon is shortened from its terminations by the predetermined termination shortening length $L_o$. The line-shaped polygon is divided into rectangles having a length Li, and the divided rectangles are set as reference patterns A (shown by solid lines) for line width inspection. Further, reference patterns B (shown by double lines) whose centers are located at the boundaries between the adjacent reference patterns for line width inspection may be added.

By addition of the reference patterns B, defect detection capability is improved in the case where a defect exists in the boundaries of the reference patterns A and their neighbors. The higher a ratio of a defect size to a reference pattern size is, the higher defect detection capability is. The ratio of the defect size to the reference pattern size in the case where the defect exists in the one reference pattern is defined as R. Then, two respective ratios of the defect size to the reference pattern size in the case where the defect, which has the same size as the above, exists in the two reference patterns in a divided manner are less than R. Therefore, the defect detection capability is higher in the case where the defect exists in the one reference pattern.

Figure 83:
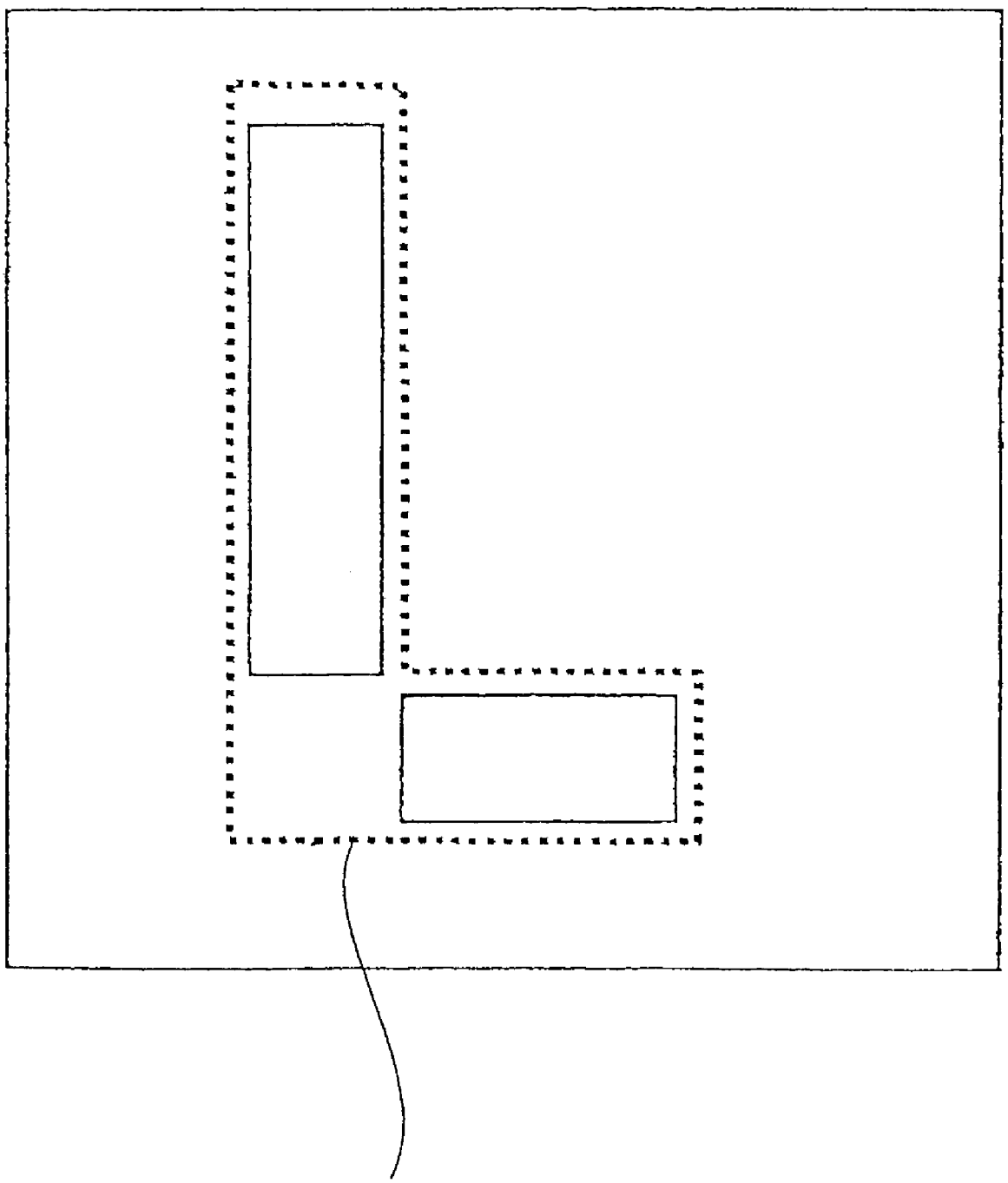
FIG. 83 is a schematic view showing a method of dividing line-shaped polygon having a corner into two rectangles at a corner portion.

As shown in FIG. 83, a line-shaped polygon having at least one corner is separated into a plurality of rectangles at the corner, and then the plurality of rectangles is processed. In an example shown in FIG. 83, the line-shaped polygon (L-shaped polygon) having a corner (shown by dotted lines) is separated into two rectangles (shown by the solid lines).

Figure 84:
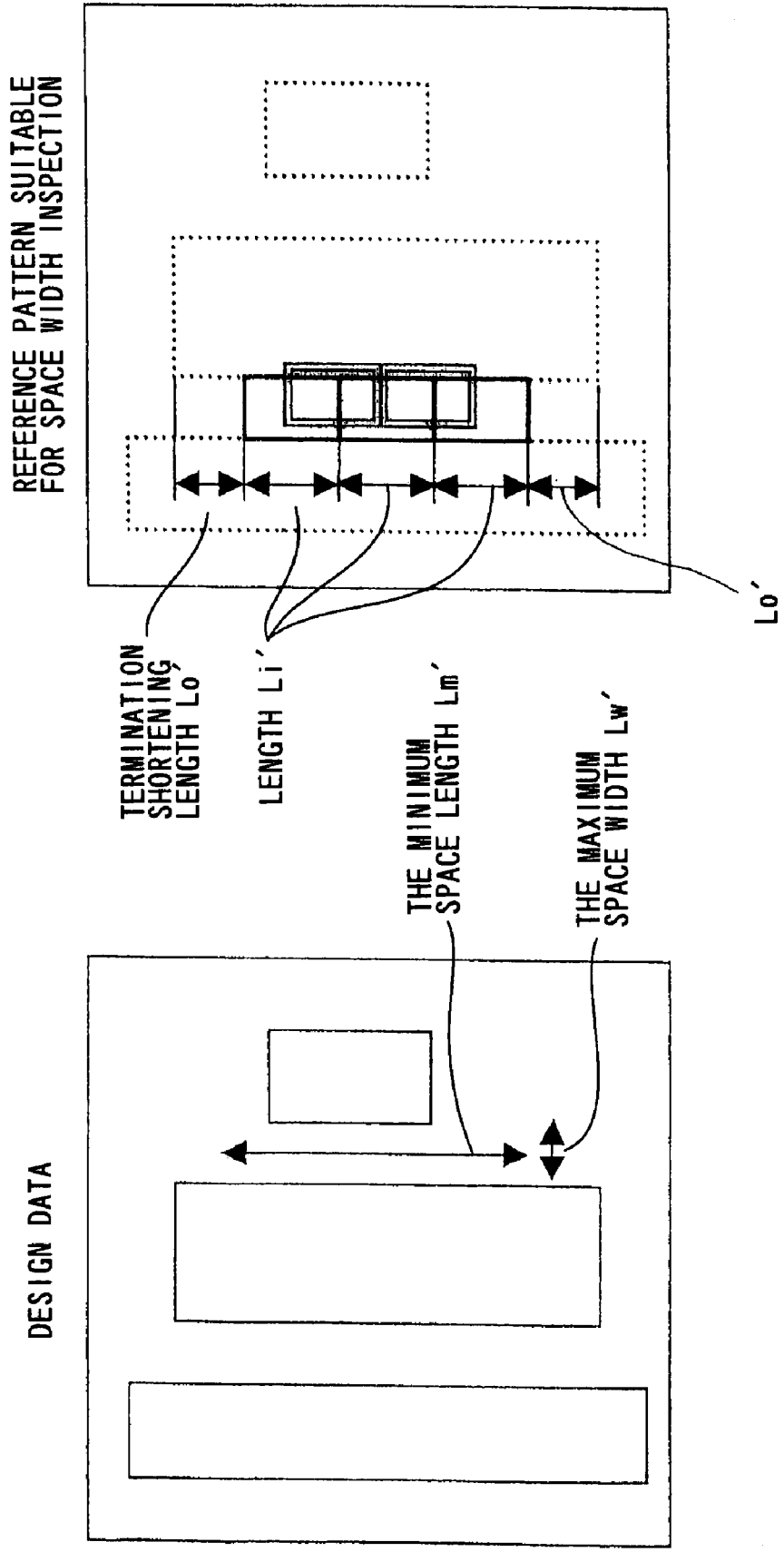
FIG. 84 is a schematic view showing a rule for automatically extracting a reference pattern suitable for space width inspection from the design data.

The space width inspection can be realized in the same process described above by using the inverted design data. The inverted design data is produced by inverting inside and outside of pattern in the design data, i.e. inverting the inside into the outside and the outside into the inside. FIG. 84 is a schematic view showing a rule for automatically extracting a reference pattern suitable for space width inspection from the design data. As shown in FIG. 84, Lm', Lw', Li', and Lo' are the same as Lm, Lw, Li, Lo, however the values of Lm', Lw', Li', and Lo' are different from those of Lm, Lw, Li, and Lo. By using these values, the space width inspection may be performed in the same manner as the method described in FIG. 82. The values of Lm, Lw, Li, Lo, Lm', Lw', Li', and Lo' are controlled as the above-mentioned 3.3 Recipe data "5. the maximum line width, the minimum line length, and the termination shortening length of a reference pattern suitable for line width inspection; and the maximum line width, the minimum line length, and the termination shortening length of a reference pattern suitable for space width inspection".

An inspection method that uses reference patterns suitable for line width inspection and reference patterns suitable for space width inspection is performed by the following procedure. Average edge locations of edges of pattern image to-be-inspected corresponding to line segments in the obtained reference pattern that had existed in the design data are calculated. A distance between the average edge locations is calculated. When a difference between the distance and a line width or space width W of the design data exceeds the above-mentioned 3.3 Recipe data "2. The allowable deformation quantity of a line width", or "The allowable deformation quantity of a space width", the portion corresponding to the reference pattern is recognized as a defect.

Figure 85:
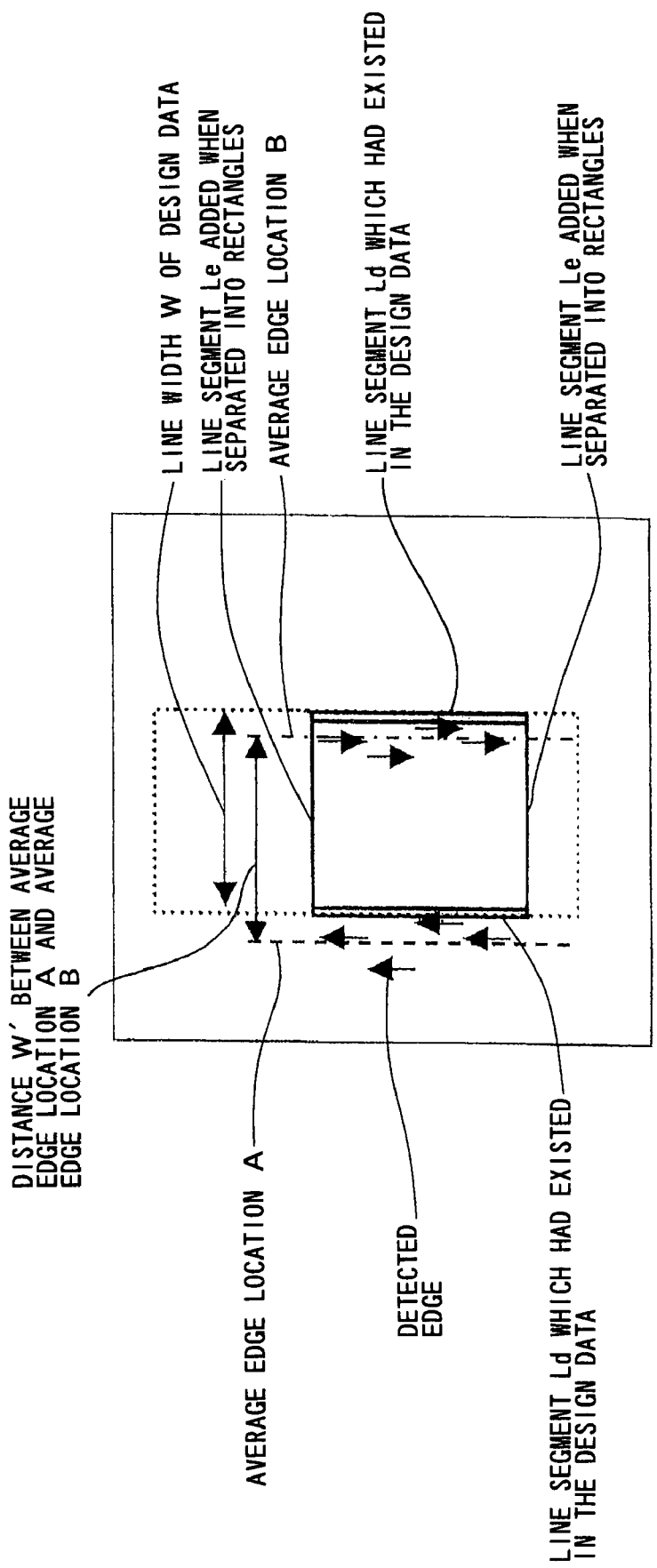
FIG. 85 is a schematic view showing an inspection method which uses a reference pattern suitable for line width inspection and a reference pattern suitable for space width inspection.

FIG. 85 is a schematic view showing the inspection method that uses a reference pattern suitable for line width inspection and a reference pattern suitable for space width inspection. The reference pattern includes line segments Ld (shown by double lines) which had existed in the design data, and line segments Le added when separated into rectangles. As shown in FIG. 72, profiles are acquired in a direction perpendicular to the line segments Ld, and edges are detected from the profiles as shown in FIG. 76. The detected edge locations are averaged to calculate an average edge location.

As shown in FIG. 85, the right average edge location A and the left average edge location B are calculated. Next, the distance W' between the left average edge location A and the right average edge location B is calculated, and then a difference between the distance W' and the line width W of the design data is calculated. If this difference is larger than the allowable deformation quantity, the portion corresponding to the reference pattern is recognized as a defect.

As an alternative method, all profiles with regard to the line segment Ld are acquired, and these profiles are averaged to obtain an average edge location.

The above description also is made for methods of inspection of the average line width and the average space width. Instead of using the average values, a method in which an individual line width or an individual space width is inspected can be used.

Further, as described later, 5.3.1 Method of inspecting gate line width is a kind of the inspection methods of the line width and the average line width of the line-shaped pattern. However, the inspection method of the gate line width that extracts a region suitable for the region inspection is different.

5.2.2 Methods of Inspecting Line Width, Average Line Width, Space Width, and Average Space Width of Curvilinear-Shaped Pattern Methods of inspecting a line width, an average line width, a space width, and an average space width of a curvilinear-shaped pattern that cannot be inspected by the above region inspection methods can be used. A typical example of the curvilinear-shaped pattern is a pattern corresponding to a corner. Although complex calculation for curvilinear-shaped pattern inspection methods is required, these inspection methods are as important as the above line-shaped pattern inspection methods in order to control a semiconductor device process.

Figure 86:
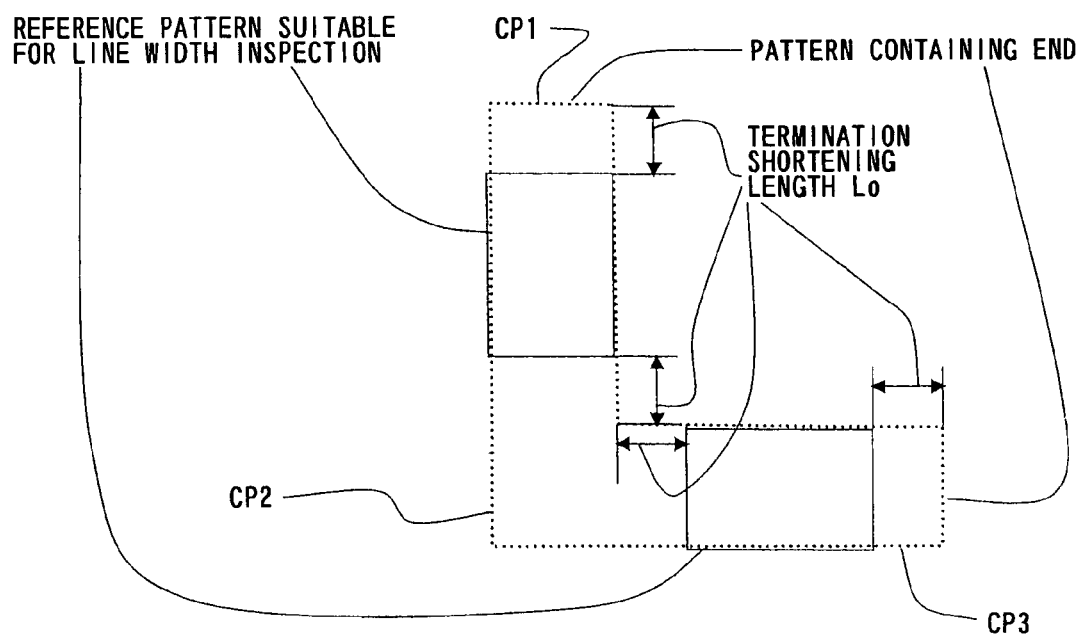
FIG. 86 is a schematic view showing a method of obtaining a reference pattern suitable for line width inspection of a corner part.
Figure 87:
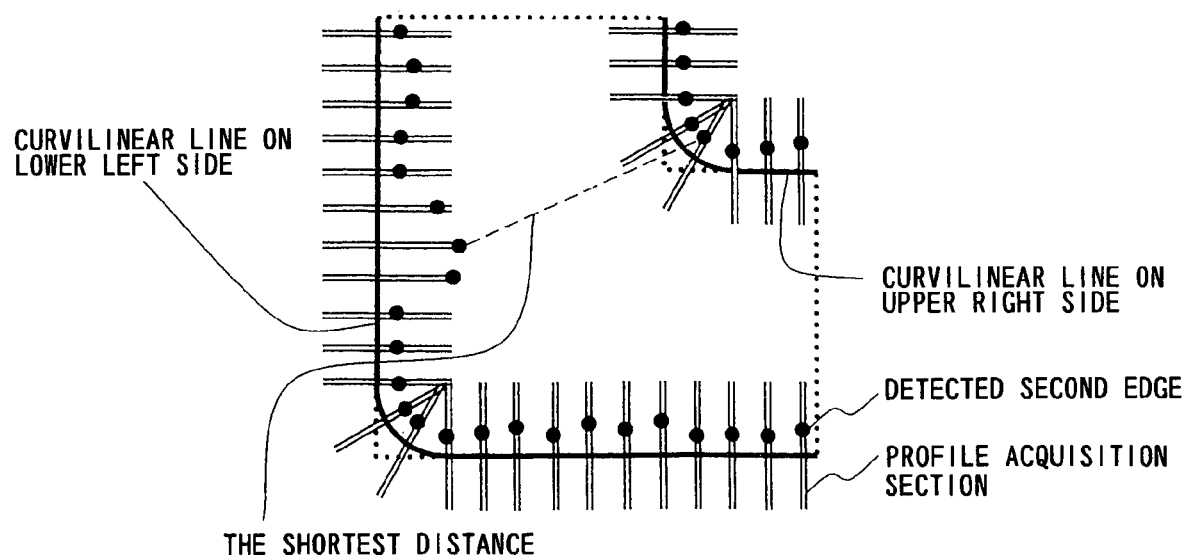
FIG. 87 is a schematic view showing a method of inspecting the minimum line width of a curvilinear-shaped pattern that is a pattern corresponding to a corner.

The method inspecting the line width of the curvilinear-shaped pattern that is a pattern corresponding to a corner is performed by the following procedure. FIG. 86 is a schematic view showing a method of obtaining a reference pattern suitable for line width inspection of a corner part, and FIG. 87 is a schematic view showing a method of inspecting the minimum line width of a curvilinear-shaped pattern that is a pattern corresponding to a corner;

As shown in FIG. 86, polygons CP1, CP2, CP3 are obtained by subtraction of reference patterns (two rectangles shown by solid lines) suitable for the line width inspection of the line-shaped pattern from a reference pattern (L-shaped polygon shown by dotted lines) obtained from the design data. The polygon CP2 that does not contain an end is chosen as a reference pattern suitable for line width inspection of a corner part.

A line width to-be-inspected is the minimum distance between curvilinear lines (shown by bold solid lines in FIG. 87 corresponding to L-shaped line segments having corners rounded off by a curve as shown in FIG. 18) corresponding to a line segment that had existed in the design data. The second edges (see FIGS. 72 through 76) corresponding to these curvilinear lines are detected. In FIG. 87, double lines represent profile acquisition sections and solid circles (●) represent the detected second edges.

The following procedure is performed for all the detected second edges corresponding to the curvilinear line on the lower left side.

1. Distances from one of the detected second edges corresponding to the curvilinear line on the lower left side to all the detected second edges corresponding to the curvilinear line on the upper right side are calculated.

2. The shortest distance of the above distances is chosen.

In the case where the shortest distance in the obtained distances is shorter than the above-mentioned 3.3 Recipe data "2. The allowable minimum line width", it is recognized that this part has a defect. A method of inspecting an average line width may also be performed by calculating an average distance, instead of the shortest distance.

The curvilinear-shaped patterns are composed of a plurality of line-shaped patterns that have different line widths in general. In addition, the curvilinear-shaped patterns are used for connection of circuits. From the above reasons, the inspection method of the minimum line width is more suitable than the method of inspecting the line width that uses the allowable deformation quantity.

Figure 88:
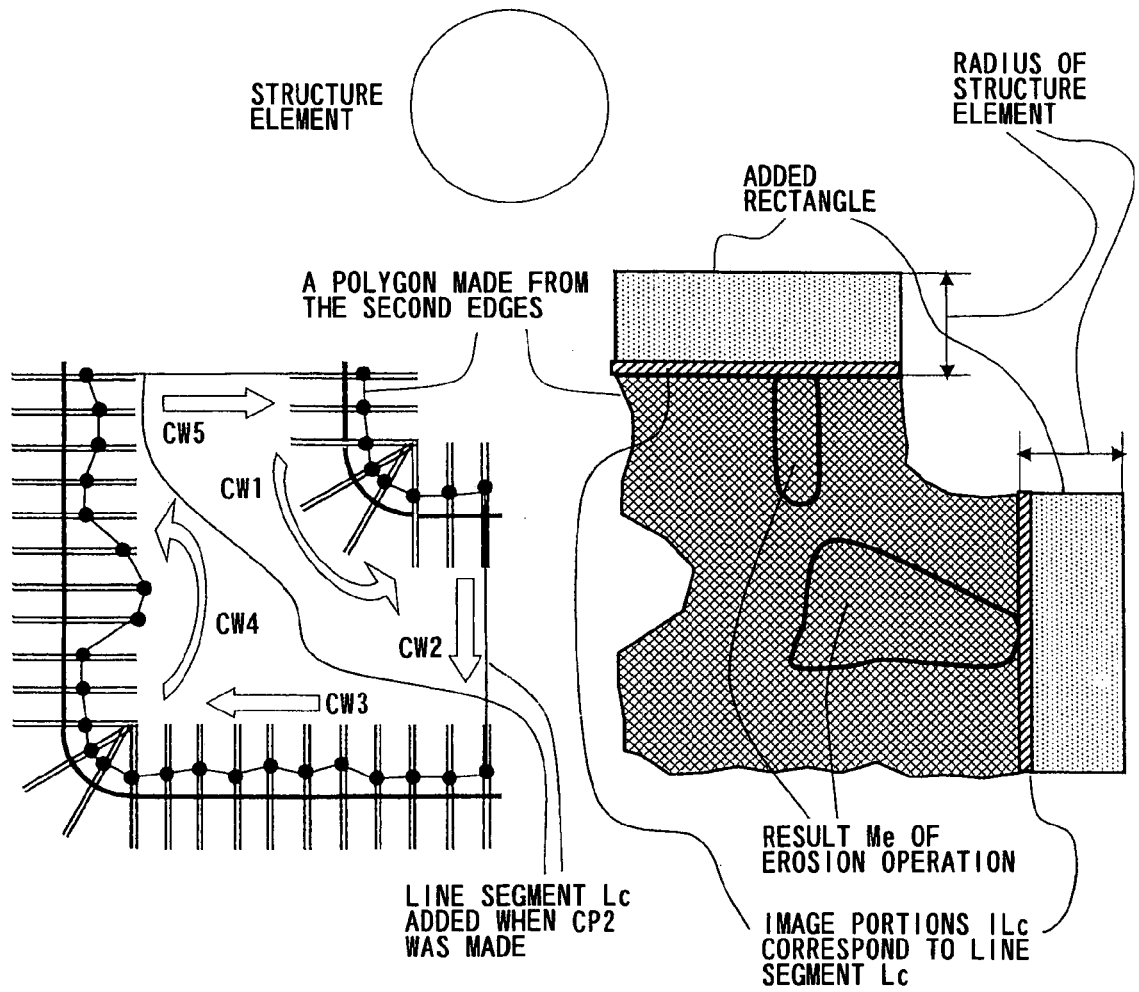
FIG. 88 is a schematic view showing a method of inspecting the minimum line width of a curvilinear-shaped pattern, that is a pattern corresponding to a corner, using the erosion operation.

An alternative method using the erosion operation can be used. FIG. 88 is a schematic view showing a method of inspecting the minimum line width of a curvilinear-shaped pattern, which is a pattern corresponding to a corner, using the erosion operation. A method of inspecting the minimum line width using the erosion operation is performed in the following procedure: The erosion operation is well known operation used in the mathematical morphology, as described above.

1. A polygon is made from the detected second edges on the lower left side and the detected second edges on the upper right side with sequentially connecting all the detected second edges clockwise or counterclockwise. In FIG. 88, all the detected second edges are connected sequentially clockwise by line segments as shown by arrows CW1-CW5.

2. The above polygon is transformed into a binary bitmap (the grid-like part in FIG. 88).

3. The rectangles having a width equal to a radius of a structure element, which is used in the erosion operation, are attached to line segments $L_C$ that are added when the polygon CP2 was made (the dotted parts in FIG. 88).

4. A result of the erosion operation on the above bitmap is obtained (the two regions Me surrounded with the bold lines in FIG. 88). Here, the structure element used in erosion operation is a circle whose diameter is an absolute value of the above-mentioned 3.3 Recipe data "2. The limits values of the negative side of the allowable deformation quantity of a line width".

5. If image portions $IL_C$ corresponding to the line segments $L_C$ are connected through the regions Me, it is recognized that this part does not have a defect. However, in this case, the image portions $IL_C$ corresponding to the line segments $L_C$ are not connected through the regions Me, and hence it is recognized that this part has a defect.

The above description is made for the method of inspecting of the line width, and a space width is inspected in the same manner.

According to these embodiments with regard to the region inspection, defect detection capability and defect recognition accuracy can be improved, because the above-mentioned region inspections use the average value of a plurality of defect information.

5.2.3 Method of Inspecting Part that is Liable to Cause Open or Bridge Defect

Figure 89:
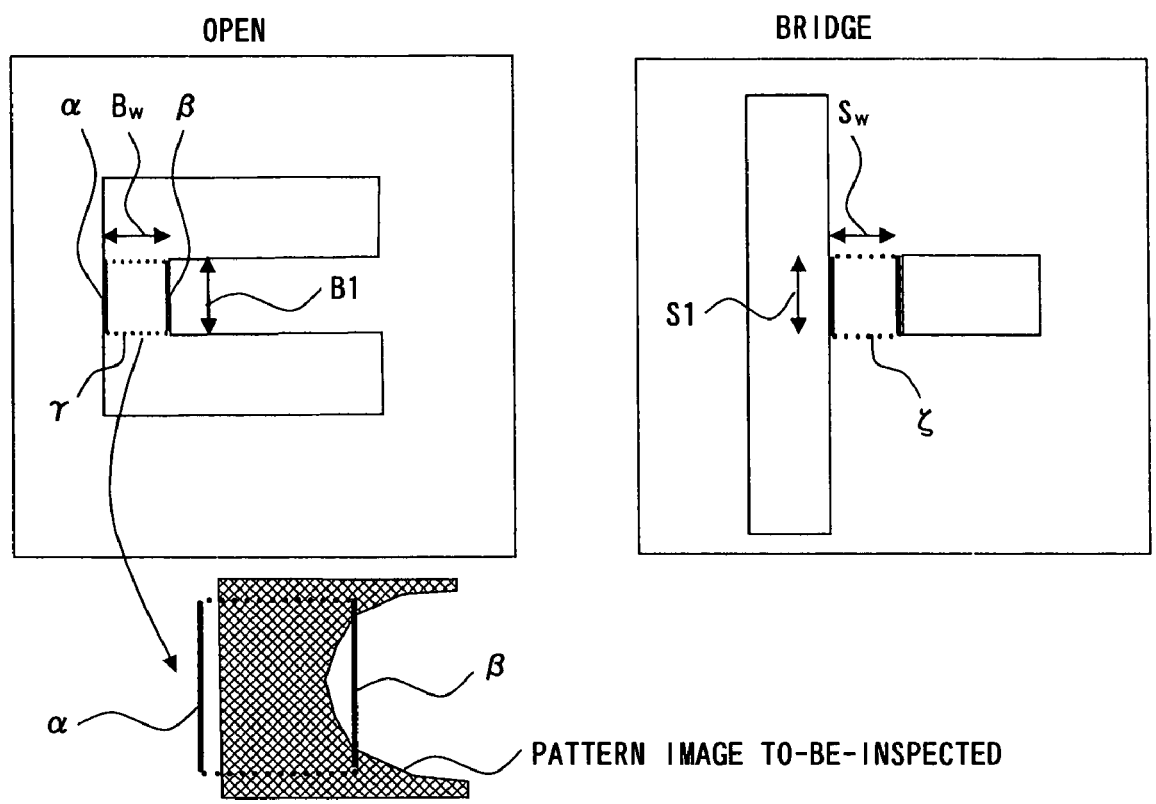
FIG. 89 is a schematic view showing a method of extracting a part that is liable to cause open or bridge.

As a kind of the inspection methods of the line width of the line-shaped pattern and the space width of the line-shaped pattern, a method of inspecting a part that is liable to cause an open or bridge defect can be used. FIG. 89 is a schematic view showing a method in which a part that is liable to cause an open or bridge defect is extracted. As shown on the right-hand side of FIG. 89, a part (shown by the rectangular y) of a line-shaped pattern of the design data, whose line width is narrower than the above-mentioned 3.3 Recipe data "5. The maximum line width Bw of a part that is liable to cause an open defect", and whose length is shorter than the above-mentioned 3.3 Recipe data "5. The maximum line length B1 of a part that is liable to cause an open defect", is extracted.

The extracted part (shown by the rectangular γ) means a part that is liable to cause open, and the part is set as a reference pattern. The edge detection is performed with regard to the line segment a and the line segment β in the same manner shown in FIG. 85. Here, the line segment β has corner roundness. Therefore, without using the average line width, an individual line width is inspected.

Similarly, with respect to the part that is liable to cause bridge, as shown on the right-hand side of FIG. 89, the rectangle ζ obtained by using the above-mentioned 3.3 Recipe data "5. The maximum space width Sw of a part that is liable to cause a bridge defect" and 3.3 Recipe data "5. The maximum space length Sl of a part that is liable to cause a bridge defect" is set as the part that is liable to cause bridge, and the space width is inspected.

Figure 90:
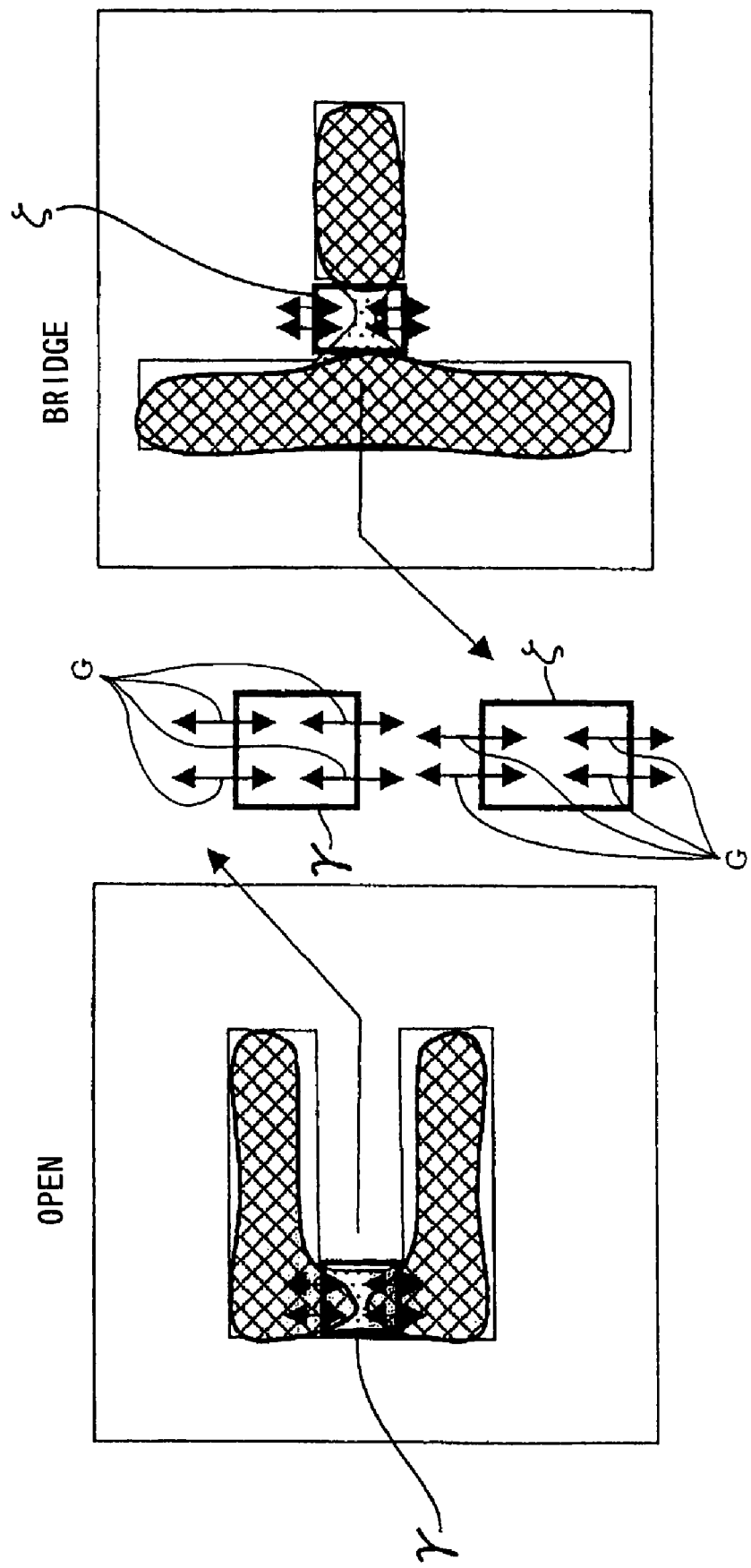
FIG. 90 is a schematic view showing a procedure for inspecting a part that is liable to cause open or bridge.

An alternative method of inspecting a part that is liable to cause an open or bridge defect is performed in the following procedure as shown in FIG. 90. The left-hand side of FIG. 90 shows schematically a method of inspecting a part that is liable to cause an open defect, and the right-hand side of FIG. 90 shows schematically a method of inspecting a part that is liable to cause bridge.

The patterns (shown by bold lines in FIG. 90) are the same as the rectangle γ and the rectangle ζ of FIG. 89. The pixels corresponding to the grid-like parts of FIG. 90 have a high contrast to the grounding, however the pixels corresponding to the dotted parts have a low contrast to the grounding. The dotted part of the left-hand side of FIG. 90 shows open state, and the dotted part of the right-hand side of FIG. 90 shows bridge state.

In such cases, three kinds of edges exist. One of them is an edge that exists in the boundary between the grounding and the grid-like part, another is an edge that exists in the boundary between the grounding and the dotted part, and the remaining one is an edge that exists in the boundary between the grid-like part and the dotted part. In the case of the open defect as shown on the left-hand side of FIG. 90, the edges existing in the boundary between the grounding and the dotted part are detected, so that the defect cannot be detected. Further, in the case of the bridge as shown on the right-hand side of FIG. 90, the edges existing in the boundary between the grid-like part and the dotted part are detected, so that the defect cannot be detected. In either case, the defect existing in the dotted part can be detected in the following manner.

It is inspected whether an edge exists or not in the eight sections (shown by G) included in γ and ζ in the direction shown by arrows. An edge should not exist in these eight sections. Therefore, if an edge is detected in these eight sections, γ or ζ is recognized as a defect.

According to this embodiment, an open or bridge defect observed as a weak contrast can be detected.

According to these embodiments with regard to the region inspection, inspection for a wide area that cannot be performed by an operator can be performed.

5.3 Inspection Methods Using Result of the Boolean Operation

In the above-mentioned 4.6 The first inspection and the above-mentioned 4.12 The second inspection, inspection is performed using a layer to-be-inspected of the design data. However, inspection methods using a result of the Boolean operation on a polygon in a layer to-be-inspected of the design data and a polygon in a layer related to the layer can realize an advanced inspection.

5.3.1 Method of Inspecting Gate Line Width

The first method of the above-mentioned inspection methods using a result of the Boolean operation is an inspection method in which a reference pattern suitable for region inspection is extracted by using a result of the Boolean operations. As the method, a method of inspecting a gate line width or a method of inspecting an end-cap is used.

Figure 91:
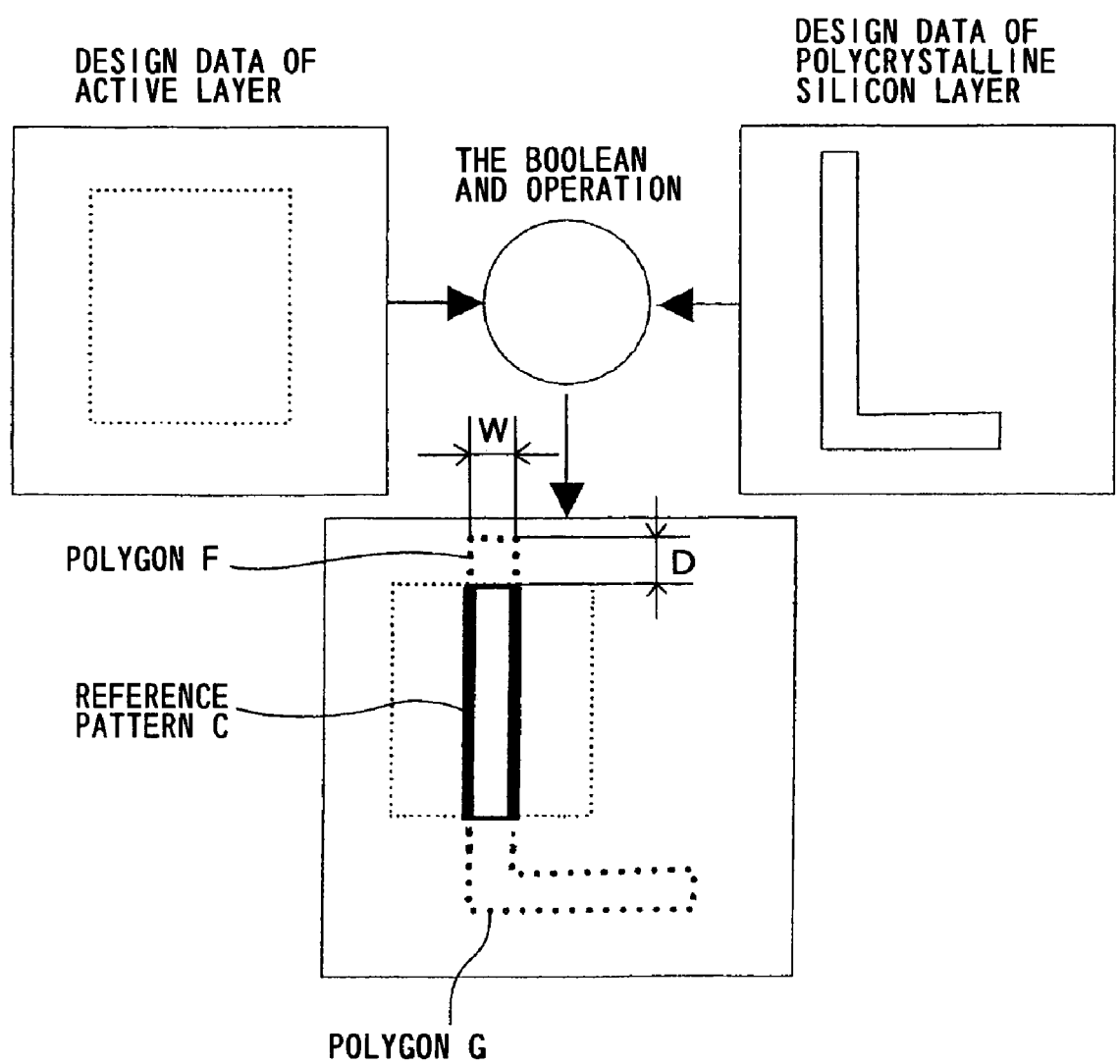
FIG. 91 is a schematic view showing an inspection method that uses a reference pattern obtained from a result of the Boolean AND operation on the design data of a layer to-be-inspected and the design data of the preceding process layer or the subsequent process layer.

For inspecting a semiconductor device, a method of inspecting a gate width of a transistor is used. An overlapping part of a polycrystalline silicon layer and an active layer (preceding process layer of the polycrystalline silicon layer) is an object of the gate width to-be-inspected. FIG. 91 is a schematic view showing an inspection method that uses a reference pattern obtained from a result of the Boolean AND operation on the design data of a layer to-be-inspected and the design data of the preceding process layer or the subsequent process layer.

The reference pattern C (rectangle shown by solid lines) is obtained from a result of the Boolean AND operation on a polygon, which is the design data of the polycrystalline silicon layer, and on a polygon, which is the design data of the active layer. The Boolean AND operation used in this calculation is well known operation used in computational geometry. The inspection is performed in the same manner as the above-mentioned 5.2.1 Methods of inspecting line width and average line width of line-shaped pattern by using the reference pattern C.

According to this embodiment, the gate portion is automatically extracted. Therefore, all the gate widths of the entire semiconductor device can be inspected. Thus, the inspection can contribute to performance improvement.

5.3.2 Method of Inspecting End-Cap

As a kind of methods of inspecting an end, a method of inspecting an end-cap of a gate is used. First, a method of recognizing an end-cap will be described. Polygons are obtained by subtraction of the reference pattern C from the design data of the polycrystalline silicon layer of FIG. 91. These polygons are shown in a polygon F and a polygon G of FIG. 91. A polygon that satisfies the following conditions is recognized as the end-cap.

1. A polygon is a rectangle whose line width W (in FIG. 91) is a predetermined value or less.

2. A rectangle has a distance D (FIG. 91) between line segments facing each other (one of which is the end), and this distance D has a predetermined value or less.

The polygon that satisfies these conditions is the polygon F. Next, the end in the polygon F is inspected in the same manner as that shown in FIGS. 69A and 69B. The allowable deformation quantity for controlling shrinkage of the end-cap of the gate is smaller than that of a simple end. This is because the effective gate length should be ensured.

According to this embodiment, the end-cap of the gate can be inspected more strictly, because the allowable deformation, which is different from the allowable deformation of the simple end, can be automatically set to the end-cap of the gate.

5.3.3 Method of Adaptive Setting of Allowable Deformation Quantity of End

Figure 92:
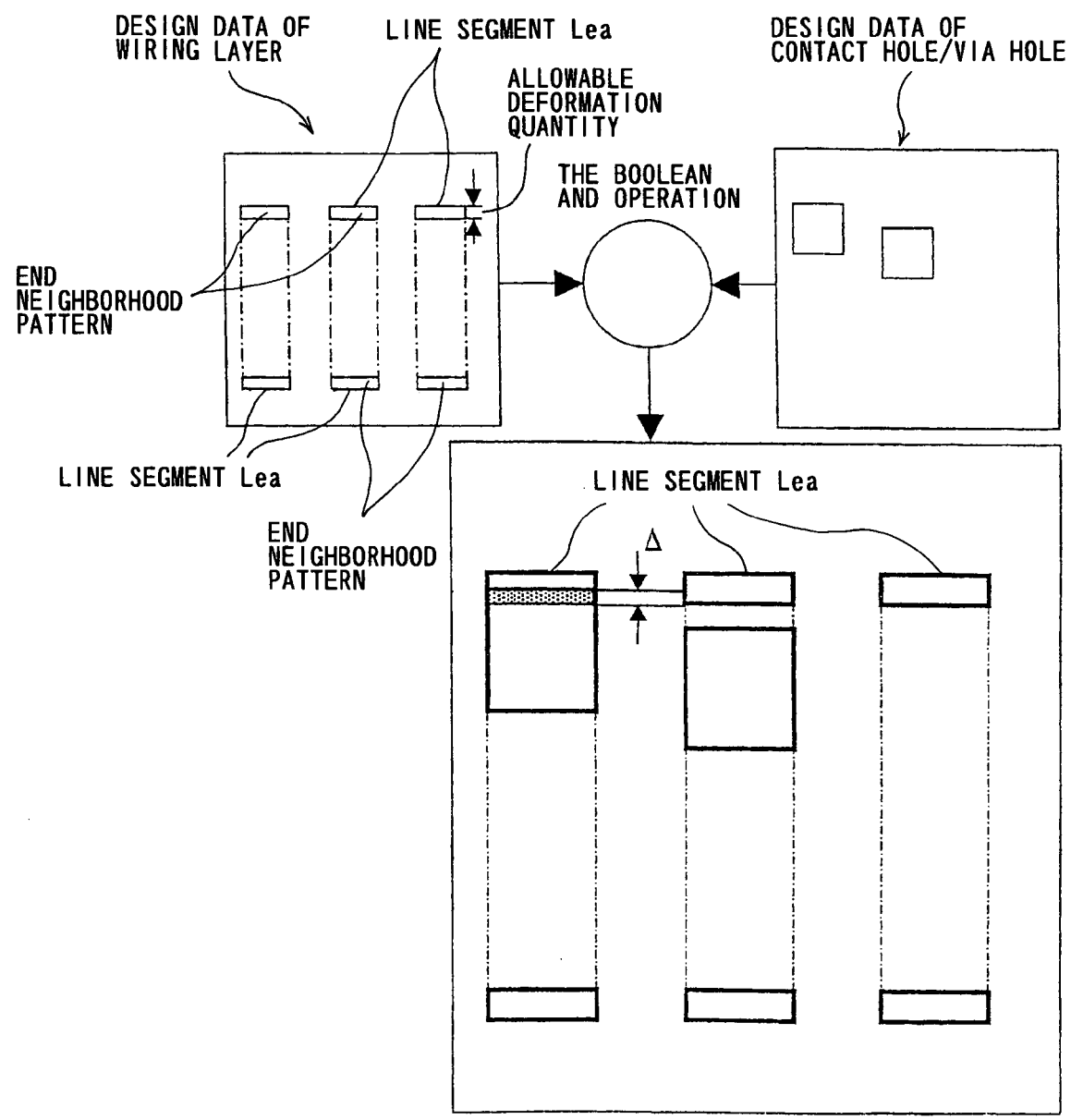
FIG. 92 is a schematic view showing a method of adaptive setting of an allowable deformation quantity of an end.

The second method of the above-mentioned 5.3 Inspection methods using result of the Boolean operation is a method of adaptive setting of an allowable deformation quantity of an end. In this method, an end to be connected to a contact hole/via hole, whose margin does not have a certain value, is recognized, and an allowable deformation quantity is adaptively set to the recognized end, and then the end is inspected. FIG. 92 is a schematic view showing the above method.

A contact-area of a contact hole/via hole with an end of a wiring layer is inspected. Even if an end has the same or similar shape, an allowable deformation quantity for controlling shrinkage of the end to be connected to the contact hole/via hole is smaller than that of a simple end. This is because the contact-area should be ensured.

The allowable deformation quantity of the end to be connected to the contact hole/via hole is determined in consideration of an overlay error between the wiring layer and the contact hole/via hole layer at the time of exposure, and a margin of an end. Almost all margins of ends should keep a certain value or larger. However, the margins of the ends of dense wiring patterns may not keep the certain value or larger.

A method of recognizing the end to be connected to the contact hole/via hole, whose margin does not have a certain value, is performed as the following procedure:

1. The rectangles shown by solid lines on the upper left side of FIG. 92 that include line segments Lea as ends of the wiring layer and have a length equal to an allowable deformation quantity in the inward direction of polygons, which are the design data of a wiring layer, are produced. Hereafter, these rectangles are called "end neighborhood patterns".

2. Results of the Boolean AND operation on the end neighborhood patterns and the design data of the contact hole/via hole layer are obtained as a region, which is a rectangle region shown by a dotted part. The end, whose margin may not keep a certain value or larger, generates the region obtained by the Boolean AND operation.

The allowable deformation quantity of the end shrinkage of the wiring layer related to the generation of the region (dotted part) is made smaller than the allowable deformation quantity of the other. The quantity to be made smaller corresponds to the length Δ in FIG. 92. An allowable deformation quantity reflected by the length Δ is adaptively set to the recognized end, and then the end is inspected According to this embodiment, the allowable deformation quantity of end shrinkage can be adaptively set according to the margin which the end to be connected to a contact hole/via hole has.

5.3.4 Method of Inspecting Contact-Area

The third method of the above-mentioned 5.3 Inspection methods using result of the Boolean operation is a method of inspecting a contact-area of the contact hole/via hole and the end of the wiring layer. This method is also an alternative method of controlling the contact hole/via hole with the end of the wiring layer. FIGS. 93A and 93B are schematic views showing the above method.

First, a reference pattern Rca is obtained by the Boolean AND operation on a polygon which is the design data of the contact hole/via hole layer and a polygon which is the design data of the wiring layer. This is the same manner as FIG. 91.

Next, edges corresponding to segments Ld (shown by double lines) which had existed in the design data are detected in the same manner as FIG. 85. A polygon Pca is obtained by connecting the detected edges. Each line segments shown by dotted line connects a terminal of detected edges corresponding to one of line segments Ld with a terminal of the detected edges corresponding to the other line segment Ld.

Finally, a ratio of an area of the polygon Pca to an area of the reference pattern Rca is calculated. If the ratio is less than the above-mentioned 3.3 Recipe data "2. The allowable contact-area inspection ratio", it is recognized that this part has a defect.

5.4 Method of Inspecting Correction Pattern that should not be Formed on Wafer

In the above-mentioned 4.6 The first inspection and the above-mentioned 4.12 The second inspection, a pattern that should be formed on a wafer is inspected. As another inspection, a correction pattern that should not be formed on a wafer is inspected. For example, a correction pattern as a kind of OPC pattern is added to mask data in order to correct a pattern. The correction pattern is located adjacent to the pattern to-be-inspected, and should not be formed on a wafer. However, the correction pattern might be formed as a defect. Although, recently, such patterns are used in plenty, automatic inspection method has not existed.

FIG. 94A is a diagram showing an example of a correction pattern that should not be formed on a wafer, and FIG. 94B is a schematic view showing a method of a correction pattern that should not be formed on a wafer. In order to solve this problem, the inspection method is performed by the following procedure:

1. The above OPC pattern is converted into a reference pattern. In this inspection method, the OPC pattern is used instead of design pattern.

2. As shown in FIG. 94B, the second edges are detected by using the reference pattern. Such an OPC pattern has a different shape far from the shape of the reference pattern even if the pattern is formed. Therefore, it is necessary that the profile acquisition section should be large in order to cover the deformation.

3. If a ratio of the number of detected edges to the number of profile acquisition sections is greater than the above-mentioned 3.3 Recipe data "2. The defect judgment coefficient $K_{cp}$ of a correction pattern that should not be formed on a wafer", it is recognized that this part has a defect. Here, $K_{cp}$ is less than 0.1, and is empirically determined.

According to this embodiment, the method of inspecting the correction pattern that should not be formed on a wafer can be realized by applying the edge detection.

5.5 Method of Inspecting Patterns Requiring Signal Intensity Correction

In the above-mentioned 4.6 The first inspection and the above-mentioned 4.12 The second inspection, a pattern to-be-inspected is inspected individually. However, in some cases, a distance between two edges forming a part of a pattern is observed to be narrower than the actual width, or to be wider than the actual width due to phenomena caused by a variation of generation rate of charged particles and a variation of capture rate of secondary charged particles. These phenomena appear in parts of patterns corresponding to proximate line segments and remote line segments of a reference pattern. The proximate line segments are defined as line segments that face each other closest together with a distance between them shorter than a predetermined distance. The remote line segments are defined as line segments that face each other closest together with a distance between them longer than a predetermined distance.

For example, in some cases, a distance between two edges corresponding to the proximate line segments is observed to be wider than the actual width, or a distance between two edges corresponding to the remote line segments is observed to be narrower than the actual width. According to this embodiment, positions of the proximate/remote line segments are corrected and allowable deformation quantities of the proximate/remote line segments are set to different values from those of other line segments to cancel these phenomena.

Further, in some cases, a distance between two edges corresponding to the remote line segments is shorter than a distance between those in the design data due to a variation of process condition. However, the characteristics of the semiconductor device are not necessarily affected by this shorter distance. In such cases, the allowable deformation quantities of the remote line segments are made larger to neglect the shorter distance.

FIG. 95 is a schematic view showing a method of extracting proximate line segments from reference patterns. The maximum distance between the proximate line segments that requires correction is taken as Dp. First, line segments close to the one shown by a bold line on the right-hand side of a left rectangle in the left frame of FIG. 95 are obtained. The line segments to be obtained are facing the line segment shown by the bold line, exist in the rightward direction, and correspond to line segments for forming the left sides of the reference patterns (shown by dotted lines in the left frame of FIG. 95). Next, the line segment Lp (shown by the dotted line) being the part of the central rectangle is selected, because it locates within the distance Dp from the bold line. Finally, the selected line segment Lp is projected on the line segment (shown by the bold line), and the overlapping part is recognized as a proximate line segment to be corrected (shown by the wavy line in the right frame of FIG. 95).

With respect to the proximate line segment, the correction of the position of the line segment is made, and the allowable deformation quantity is set to a different value from those of other line segments. In this case, the position correction quantity or the allowable deformation quantity may be variable according to the distance.

Figure 96:
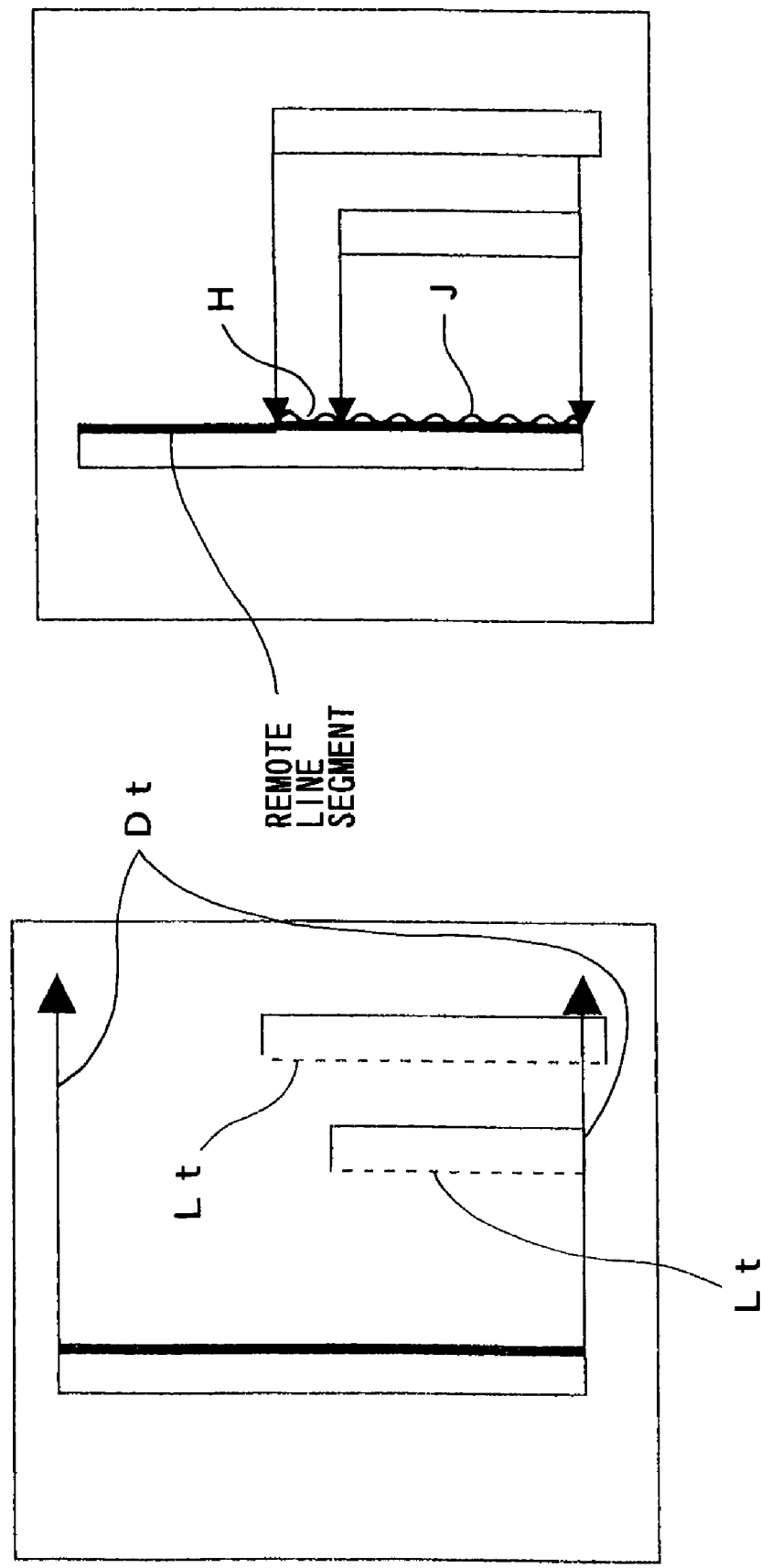
FIG. 96 is a schematic view showing a method of extracting remote line segments, which are defined as line segments which face each other closest together with a distance between them longer than a predetermined distance, from reference patterns.

FIG. 96 is a schematic view showing a method of extracting remote line segments from reference patterns. The minimum distance between the remote line segments that requires correction is taken as Dt. First, line segments close to the one shown by a bold line on the right-hand side of a left rectangle in the left frame of FIG. 96 are obtained. The line segments to be obtained are facing the line segment shown by the bold line, exist in the rightward direction, and correspond to line segments for forming the left sides of reference patterns (shown by dotted lines in the left frame of FIG. 96).

Next, line segments Lt (shown by the dotted lines) are selected, because they locate within the distance Dt from the bold line. Finally, the selected line segments Lt are projected on the line segment (shown by the bold line), and the overlapping part is recognized as a line segment not to be corrected (shown by the wavy line in the right frame of FIG. 96). Therefore, the line segment that is the part of the line segment shown by the bold line and is not the part shown by the wavy line is recognized as a remote line segment.

With respect to the remote line segment, also, the correction of the position of the line segment is made, and the allowable deformation quantity is set to a different value from those of other line segments. In this case, the position correction quantity or the allowable deformation quantity may be variable according to the distance. For example, the case where the position correction quantity for the part H is set to a smaller quantity than the position correction quantity for the obtained remote segment and the position correction quantity for the part J is set to zero can be used.

According to this embodiment, by correcting the position of the line segment of the reference pattern or setting the allowable deformation quantity individually, these effects of the above-mentioned phenomena can be reduced.

5.6 Method of Separating Pattern Deformation Quantities into Global Pattern Deformation Quantities and Local Pattern Deformation Quantities In the above-mentioned 4.8 Pattern deformation quantities obtained from the whole inspection-unit-area, the pattern deformation quantity is obtained for every inspection-unit-area. By using the method, in the case where the patterns are globally formed in line widths different from line widths of the design data due to differences of conditions of pattern formation, all the pattern deformation quantities obtained from the whole image have big values. However, a characteristic of a semiconductor device is restricted by a variation of line widths in a local region rather than a variation of average line widths in a global region. Therefore, it is necessary to evaluate the characteristic of the semiconductor device by separating pattern deformation quantities into global pattern deformation quantities and local pattern deformation quantities.

Figure 97:
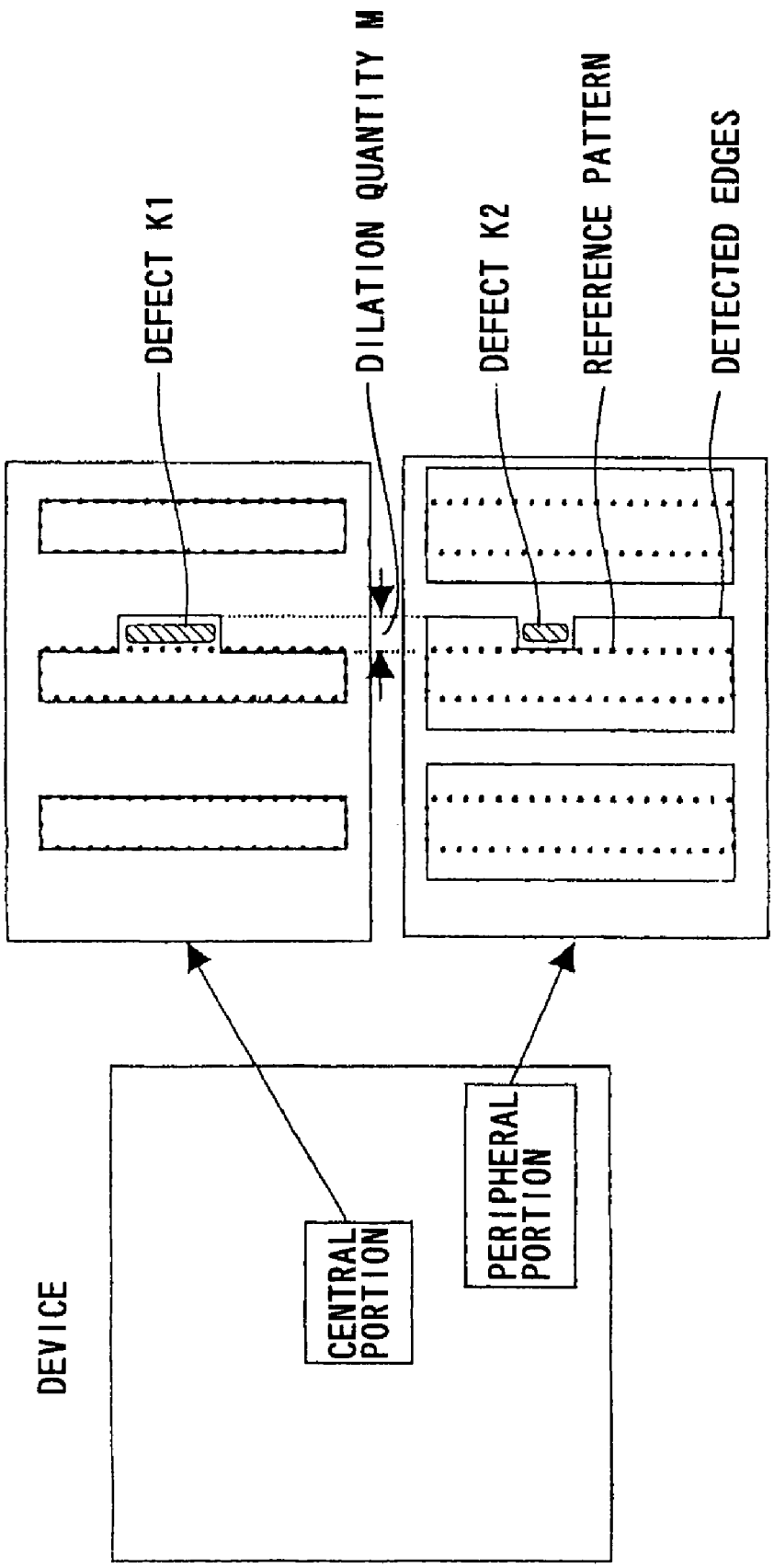
FIG. 97 is a schematic view showing an example in which patterns are formed in line widths different from line widths of the design data over the entire semiconductor device due to differences of conditions of pattern formation.

FIGS. 97 through 100 are schematic views showing a method of separating pattern deformation quantities into global pattern deformation quantities and local pattern deformation quantities. Here, as a deformation quantity, a deformation quantity of a line width is used. FIG. 97 is a schematic view showing an example in which patterns are formed in line widths different from line widths of the design data over the entire semiconductor device due to differences of conditions of pattern formation.

As shown in FIG. 97, in the central portion of a semiconductor device, line widths are normal in a global region, and a defect K1 exists. On the other hand, in the peripheral portion of the semiconductor device, line widths are dilated in the X direction in the global region. It is assumed that this deformation quantity and the size of the defect K1 in the X direction have the same quantity M. In this case, the defect K1 should be recognized as a defect, but the lines that have the deformation quantity M should not be recognized as defects. Further, if the lines that have the deformation quantity M are recognized as defects, a great number of defects should be registered.

In order to solve this problem, a method in which the line widths of the design data is corrected in consideration of a global deformation quantity of an average line width in the global region before recognizing defects may be used. In order to correct the design data, the pattern inspection apparatus should have a first method that obtains a global deformation quantity of an average line width using inspected inspection-unit-areas, and a second method of correcting the line widths of the design data using the global deformation quantity obtained by the first method. The global deformation quantity of the average line width should be obtained from a sufficiently large region, but it is not necessary that this region should be the entire semiconductor device.

FIGS. 98A, 98B and 98C are views showing an example of the first method that obtains a global deformation quantity of an average line width using inspected inspection-unit-areas. As a deformation quantity of an average line width, the deformation quantity of the line width in the X direction used for the above-mentioned 4.8 Pattern deformation quantities obtained from the whole inspection-unit-area is used.

First, by applying the method described in connection with the deformation quantity of the line width in the X direction (see FIGS. 67A and 67B) to each inspection-unit-area, the deformation quantity $C_X$ of the line width is obtain as shown in FIG. 98A. A deformation quantity of the line width in the Y direction is obtained in the same manner. If necessary, deformation quantities of the line widths in 45 degrees and 135 degrees may be obtained.

Next, in order to obtain the global deformation quantity $<C_X>$ of the average line widths in the X direction, an average of $C_X$ should be obtained ($<>$ means the average value). For example, as shown in FIG. 98B, with respect to an inspection-unit-area to-be-corrected (shown by part shown by dots), a method of obtaining the average of $C_X$ of inspected inspection-unit-areas (grid-like parts in FIG. 98B) located near the inspection-unit-area may be used.

Further, in the sequential inspection described in the above-mentioned 3.4 Inspection-unit-area (shown in FIG. 98C), with respect to an inspection-unit-area to-be-corrected (part shown by dots), a method of obtaining an average of the above-mentioned 3.3 Recipe data "8. The number of inspection-unit-areas in order to obtain a global deformation quantity" of $C_X$ obtained from the latest inspected inspection-unit-areas (grid-like parts in FIG. 98C) may be used. Instead of the average, the moving average may be used. The global deformation quantities $<C_Y>$, $<C_{45}>$, and $<C_{135}>$ of the average line widths in the Y direction, 45 degrees direction, and 135 degrees direction may be obtained in the same manner. The obtained global deformation quantities $<C_X>$, $<C_Y>$, $<C_{45}>$, and $<C_{135}>$ become the global deformation quantities of the patterns.

The global deformation quantities of the average line widths may be separated into quantities obtained from each group that has the same attribute of the patterns. Further, this separation may be performed by dividing all line segments into proximate line segments, remote line segments, and other line segments, or may be performed according to line widths. Further, the global deformation quantity of the average line width may be expressed in the form of a function of a line width.

Figure 99:
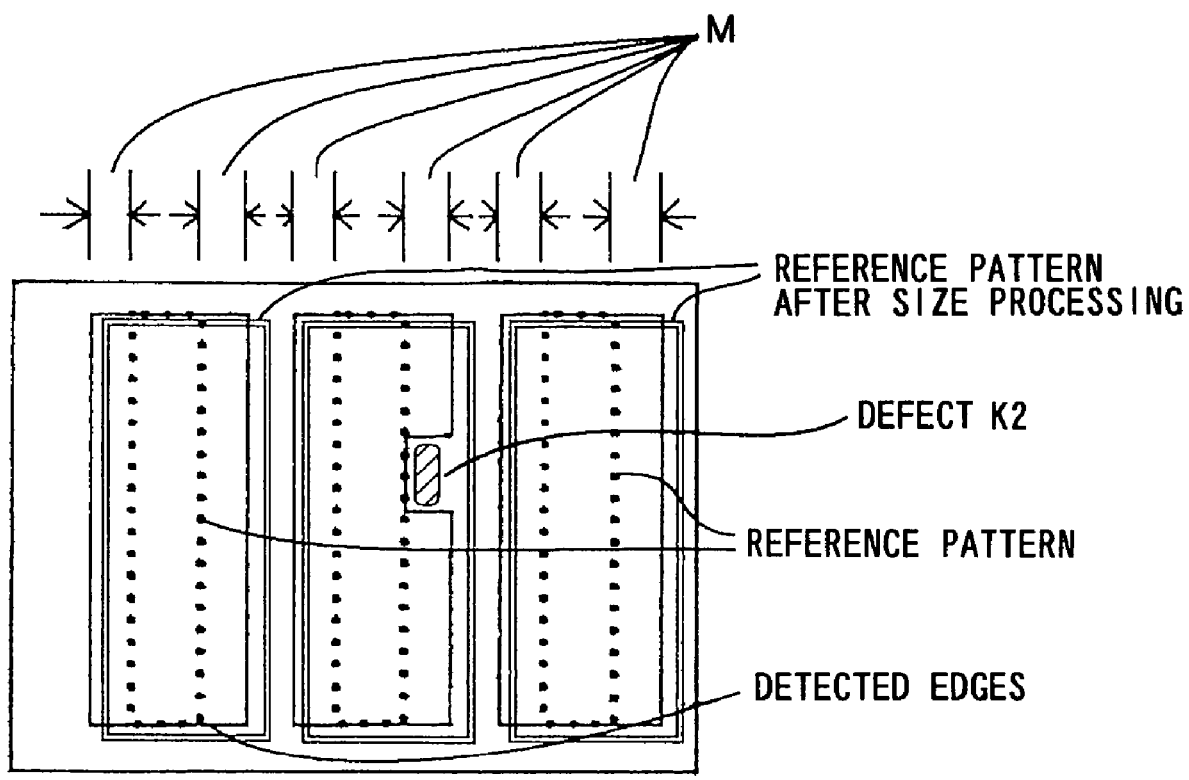
FIG. 99 is a view showing an example of the second method of correcting line widths of the design data using the global deformation quantities obtained by the first method as shown in FIGS. 98A, 98B and 98C.

FIG. 99 is a view showing an example of the second method of correcting the line widths of the design data using the global deformation quantities obtained by the first method. Here, as the global deformation quantities of the average line widths, the above global deformation quantities $<C_X>$, $<C_Y>$, $<C_{45}>$, and $<C_{135}>$ are used.

When the obtained global deformation quantities $<C_X>$, $<C_Y>$, $<C_{45}>$, and $<C_{135}>$ of the average line widths are used for correction of the line widths of the design data, the size processing (processing in which the line width is altered) in step S206 (see FIG. 19) for generating the reference patterns based on the design data is performed. Specifically, each line segment in the reference patterns is moved by the global deformation quantity $<C_X>$, $<C_Y>$, $<C_{45}>$, or $<C_{135}>$ of the average line width in each direction. This step of moving is performed after the inspection unit 12 retrieves the recipe database 22 using the recipe retrieval parameters as a key and takes out the recipe data (step S304).

As an example of this step, result obtained by the size processing, in which the reference patterns (shown in FIG. 97) are altered by the global deformation quantity $<C_X>$ of the average line width in the X direction, is shown by double lines in FIG. 99. In this example, the global deformation quantity $<C_X>$ of the average line width in the X direction is obtained as a value nearly equal to the deformation quantity M by the above-mentioned calculation.

With respect to the global deformation quantity of the average line width in a direction in which the line width is not calculated, for example, the global deformation quantity $<C_{30}>$ of the average line width in 30 degrees direction, the global deformation quantity of the average line width in the calculated direction (the global deformation quantity $<C_X>$ of the average line width in the X direction, the global deformation quantity $<C_Y>$ of the average line width in the Y direction, the global deformation quantity $<C_{45}>$ of the average line width in 45 degrees direction) may be interpolated and used.

$$<C_{30}>=(2<C_X>+<C_Y>)/3$$

$$<C_{30}>=(2<C_{45}>+<C_X>)/3$$

Figure 100:
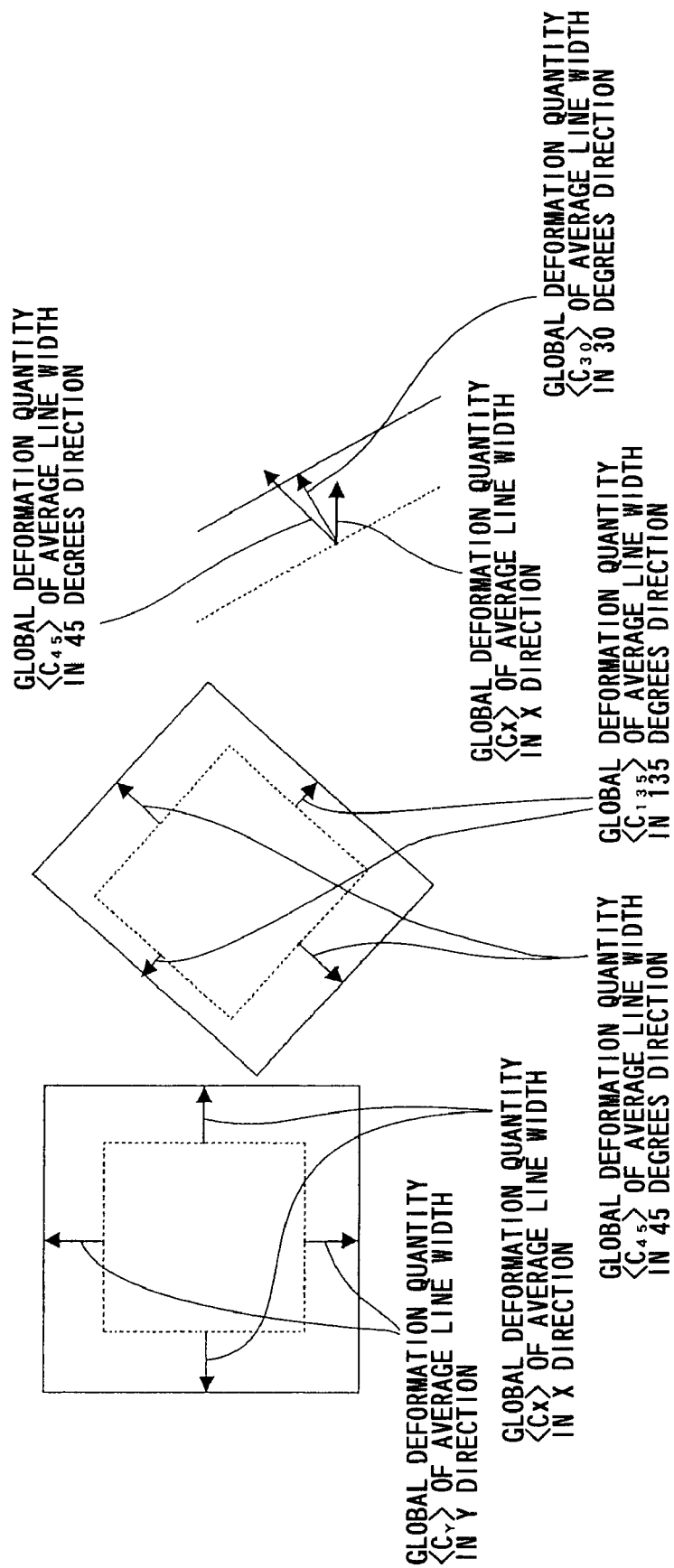
FIG. 100 is a view showing an example of a method of calculating a deformation quantity of the line width in 30 degrees direction.

In FIG. 100, the latter calculation example is shown. In FIG. 100, line segments shown by dotted lines schematically show reference pattern, and line segments shown by solid lines schematically show edges detected from a pattern image to-be-inspected. The global deformation quantity $<C_{30}>$ of the average line width in 30 degrees direction, the global deformation quantity of the average line width in the calculated direction (the global deformation quantity $<C_X>$ of the average line width in the X direction, the global deformation quantity $<C_Y>$ of the average line width in the Y direction, the global deformation quantity $<C_{45}>$ of the average line width in 45 degrees direction), the global deformation quantity $<C_{135}>$ of the average line width in 135 degrees are defined based on FIG. 100. On the right-hand side of FIG. 100, the global deformation quantity $<C_{30}>$ of the average line width in 30 degrees direction has been calculated using the global deformation quantity $<C_X>$ of the average line width in the X direction and the global deformation quantity $<C_{45}>$ of the average line width in 45 degrees direction.

As an alternative method, a method of detecting a global deformation quantity of an average line width once at a specified position before inspection and correcting line widths of the design data in each position using the detected global deformation quantity of the average line width may be used.

When the steps subsequent to step S304 (see FIG. 25) described in FIG. 25 are performed, the defect is detected in step S320 (see FIG. 25). As described above, in the semiconductor device shown in FIG. 97, in the central portion of the semiconductor device, the line widths are normal in the global region, but in the peripheral portion of the semiconductor device, the line widths are dilated in the global region. In the case where the size processing is performed so that the defect K1 is detected, the defect K2 is not detected and most part of the dilated pattern is recognized as a defect. However, according to this embodiment, as shown in FIG. 99, only the defect K2 can be recognized as a defect.

As a result, the defect information that are separated into the global deformation quantities of the line widths in each inspection-unit-area as the global deformation quantities and defect information as the local deformation quantities can be outputted.

In the case of using this embodiment, it is necessary to cancel the variation of defect information caused by correcting the line widths of the design data. Specifically, each deformation quantity of the line width, which is one of pattern deformation quantities obtained from the whole image described in the above-mentioned 4.8 Pattern deformation quantities obtained from the whole inspection-unit-area is added to the global deformation quantity of the average line width.

According to this embodiment, by separating the global deformation quantity of the pattern and the local deformation quantity of the pattern, the number of defects to be detected can be reduced. As a result, important defects can be detected fully, and generation of nuisance defect can be reduced. Here, the nuisance defect is defined as a defect that is not necessary to be recognized as a defect 5.6.1 Method of Correcting Time-Dependence Variation of Measurement Value of Line Width In the case of long-term inspection, a beam spot size may be varied gradually. The wider beam spot size is, the larger measurement value of line width is. This variation is added to the above-mentioned global deformation quantities of the line widths. Therefore, it is necessary to correct the above-mentioned global deformation quantities of the line widths for canceling a time-dependence variation of measurement value of a line width.

Figure 101:
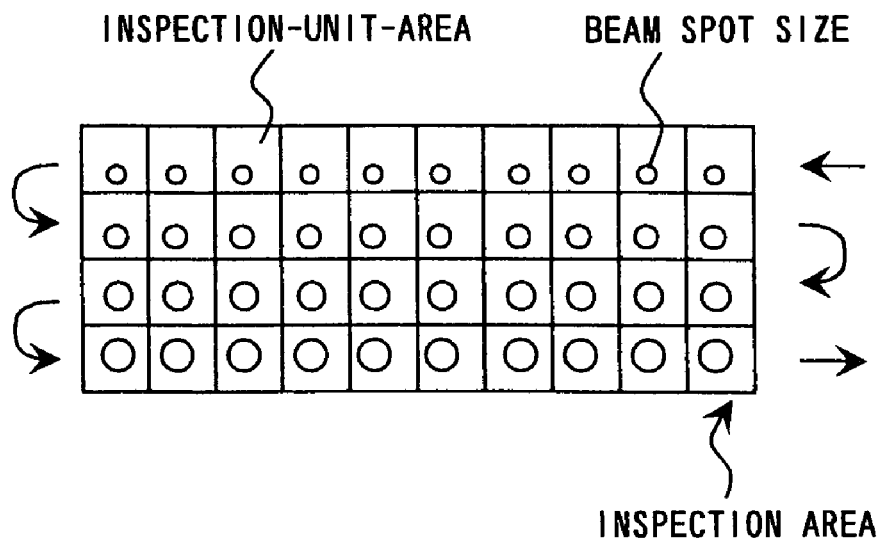
FIG. 101 is a schematic view showing a variation of a beam spot size on the modified figure drawn from FIG. 20.
Figure 102:
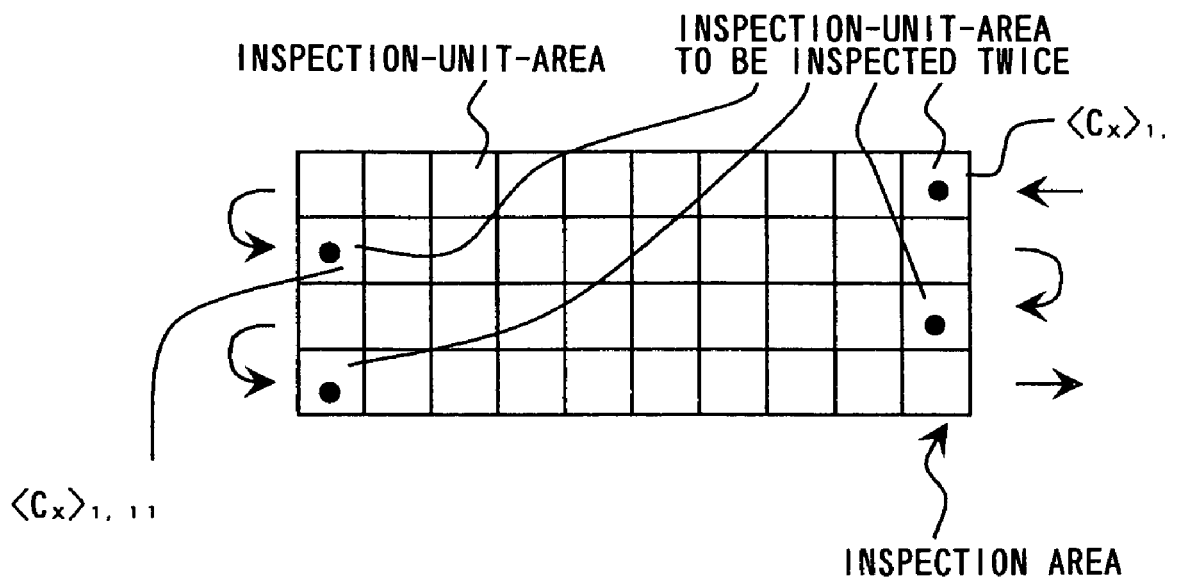
FIG. 102 is a schematic view showing a method of determining inspection-unit-areas to be inspected twice.

FIG. 101 is a schematic view showing a variation of a beam spot size on the modified figure drawn from FIG. 20. In FIG. 101, although a beam spot size becomes wider gradually, a variation of the beam spot size can be ignored while inspecting inspection-unit-areas in one line. Such a variation of the measurement value of the line width caused by the variation of the beam spot size is corrected by the following procedure:

First, inspection-unit-areas to be inspected twice are determined by the method shown in FIG. 102. Each inspection-unit-area to be inspected twice is set for each time range in which the variation of the beam spot size can be ignored. In FIG. 101, time for inspecting inspection-unit-areas in one line corresponds to the time range. Thus, the inspection-unit-areas to be inspected twice are determined as shown in FIG. 102.

Next, the inspection-unit-areas to be inspected twice are inspected in order to obtain the above global deformation quantities $<C_X>$, $<C_Y>$, $<C_{45}>$, and $<C_{135}>$ of the line widths, as shown in FIG. 102. In this embodiment, the case where the global deformation quantity $<C_X>$ of the average line widths in the X direction is used will be described, because calculation procedure of the global deformation quantities $<C_X>$, $<C_Y>$, $<C_{45}>$, and $<C_{135}>$ are the same. In order to represent the first time inspection and the inspection-unit-area number, suffixes are used as shown by $<C_X>_{1,1}$, $<C_X>_{1,11}$ in FIG. 102. The global deformation quantities represent location-dependence quantities, and the global deformation quantities representing time-dependence quantities can be ignored.

Figure 103:
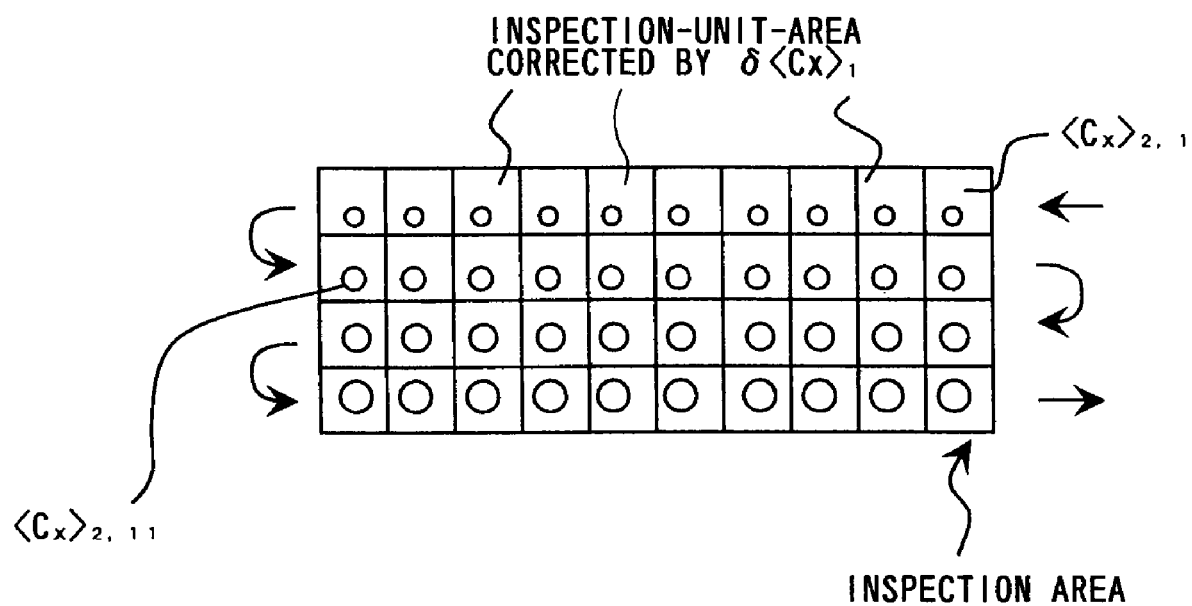
FIG. 103 is a schematic view showing a method of inspecting inspection-unit-areas twice.

After the first time inspection, all the inspection-unit-areas are inspected as the second time inspection in order to obtain the above global deformation quantities $<C_X>$, $<C_Y>$, $<C_{45}>$, and $<C_{135}>$ of the average line widths, as shown in FIG. 103. In order to represent the second time inspection and the inspection-unit-area number, suffixes are used as shown $<C_X>_{2,1}$, $<C_X>_{2,11}$ in FIG. 103.

When the inspection-unit-area whose inspection-unit-area number is 1 is inspected, a correction term $\delta<C_X>_1$ is calculated by the following equation using the global deformation quantity $<C_X>_{2,1}$ and the global deformation quantity $<C_X>_{1,1}$:

$$\delta<C_X> = <C_X>_{2,1} - <C_X>_{1,1}$$

The obtained correction term $\delta<C_X>_1$ means a time-dependence correction term.

Each deformation quantity $<C_X>$ of the average line width obtained from the inspection-unit-area whose inspection-unit-area number is from 2 to 10 is added to the obtained correction term $\delta<C_X>_1$ in order to correct a time-dependence variation. The inspection-unit-area number 10 means the preceding number of the next inspection-unit-area number 11, and the next inspection-unit-area is to be inspected twice.

The above procedure is performed for each of the global deformation quantities $<C_Y>$, $<C_{45}>$, and $<C_{135}>$ of the average line width in the same manner. These procedures are performed for all the inspection-unit-areas, which are to be inspected twice.

In the case where patterns made of an ArF resist are inspected by a scanning electron microscope any number of times, the patterns are shrunk gradually. However, according to this embodiment, this shrinkage can be ignored, because the same portion is inspected only twice. Therefore, the variation of the measurement value of the line width caused by the gradual variation of the beam spot size can be corrected, even if the above patterns are inspected.

5.7 Defect-Classes Based on Geometrical Information of Reference Pattern, Information of Design Data, or Information of Data Related to Design Data The defect-classes are determined using characteristic quantities of a defect image by a defect-class determination unit 14 as described in the above-mentioned 4.7 Defect-classes based on feature quantity obtained from image. Besides these defect-classes, defect-classes, which are determined by using geometrical information of a reference pattern, information of the design data, or information of data related to the design data, can be used.

The following items are used as geometrical information of the design data:

1. The attributes of pattern (line part, corner, end, isolated pattern, and the like)

2. A proximate line segment, a remote line segment, or the other

3. Line widths (for example, the minimum line width, widths larger than the minimum line width and smaller than the minimum line width×1.5, widths not less than the minimum line width×1.5)

The following items are used as information of the design data:

4. Places where a defect is detected (for example, memory part, logic part, and the like)

5. A cell name of the design data corresponding to the defect. In addition, a line segment number of the cell corresponding to the defect, or position of the defect on a coordinate system, which describes the cell, can be used as additional information.

6. The attributes of wiring (ground wiring, clock wiring, and the like) in the case where these attributes are defined in the design data.

The following item is used as information of data related to the design data: Here, as information of the data related to the design data, the mask data is used.

7. A cell name of the mask data corresponding to the defect. In addition, a line segment number of the cell corresponding to the defect, or position of the defect on a coordinate system, which describes the cell, can be used as additional information.

Further, in addition to the above, as a defect-class that uses the pattern deformation, the following item can be used:

8. Defect size information (for example, six classifications of large dilation, medium dilation, small dilation, large shrinkage, medium shrinkage, small shrinkage, and the like).

Figure 104:
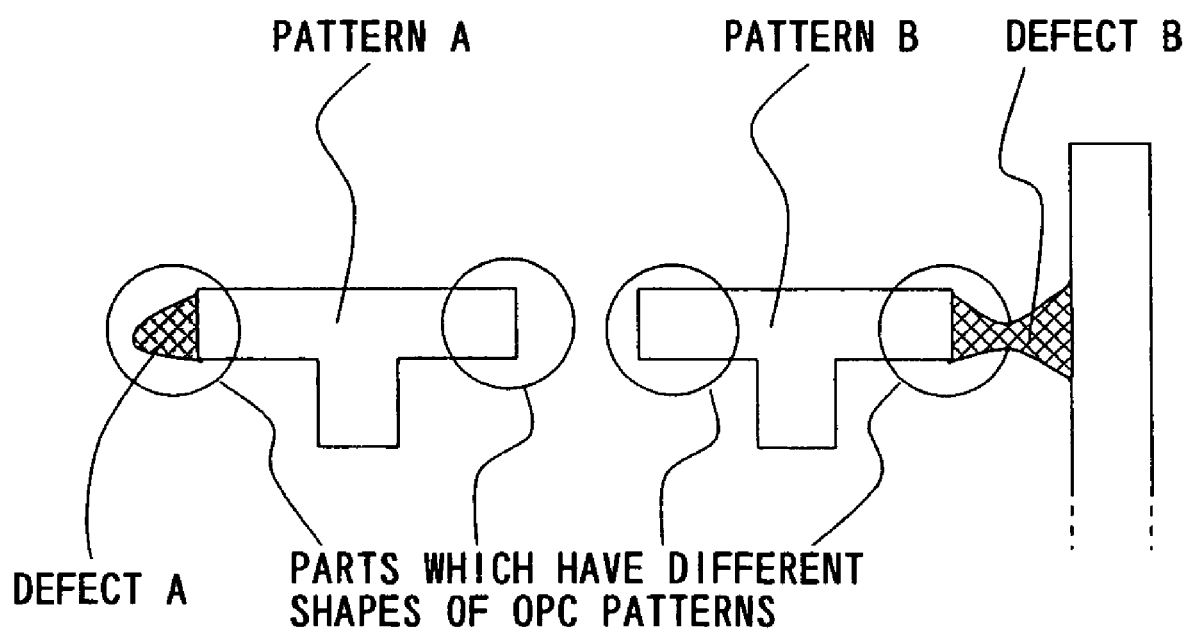
FIG. 104 is a schematic view showing sub-indexes of defect-class, which are determined by classification according to each line segment in the case of periodical patterns such as patterns in a memory.

FIG. 104 is a schematic view showing sub-indexes of defect-class that are determined by the cell name and the line segment number (see the above-mentioned 5.). T-shaped two patterns A and B represent cells of memories that have the same cell name. End parts surrounded by circles have the same shape of a reference pattern; however have different shapes of OPC patterns. In this case, a defect A and a defect B are different defects that are caused by the different OPC patterns. The defect A and the defect B cannot be classified by the cell name. On the other hand, OPC patterns that have related to a cause of a defect can be recognized by the line segment number.

The above geometrical information can be used in combination. FIG. 105 is a schematic view showing sub-indexes of defect-class that are determined by the above geometrical information in combination. The geometrical information used here is a combination of the tree sub-classes, which are above-mentioned 6, 1 and 8.

According to the present method, tendencies for defects to be generated can be easily grasped. Further, a cause of generation of defects can be easily specified.

5.8 Method of Grouping Defects Based on Feature of Reference Pattern

Figure 106:
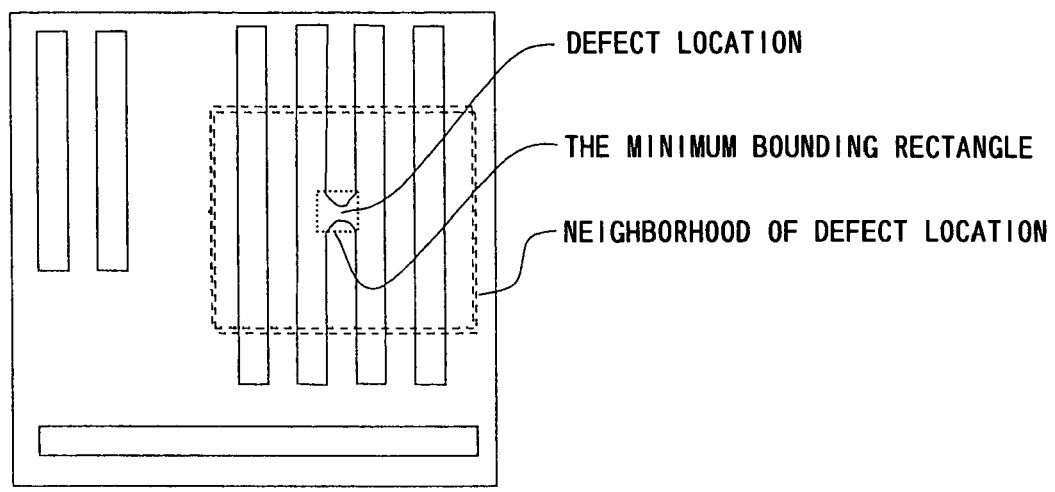
FIG. 106 is a schematic view showing a defect location, clipped reference patterns, and the minimum bounding rectangle.
Figure 107:
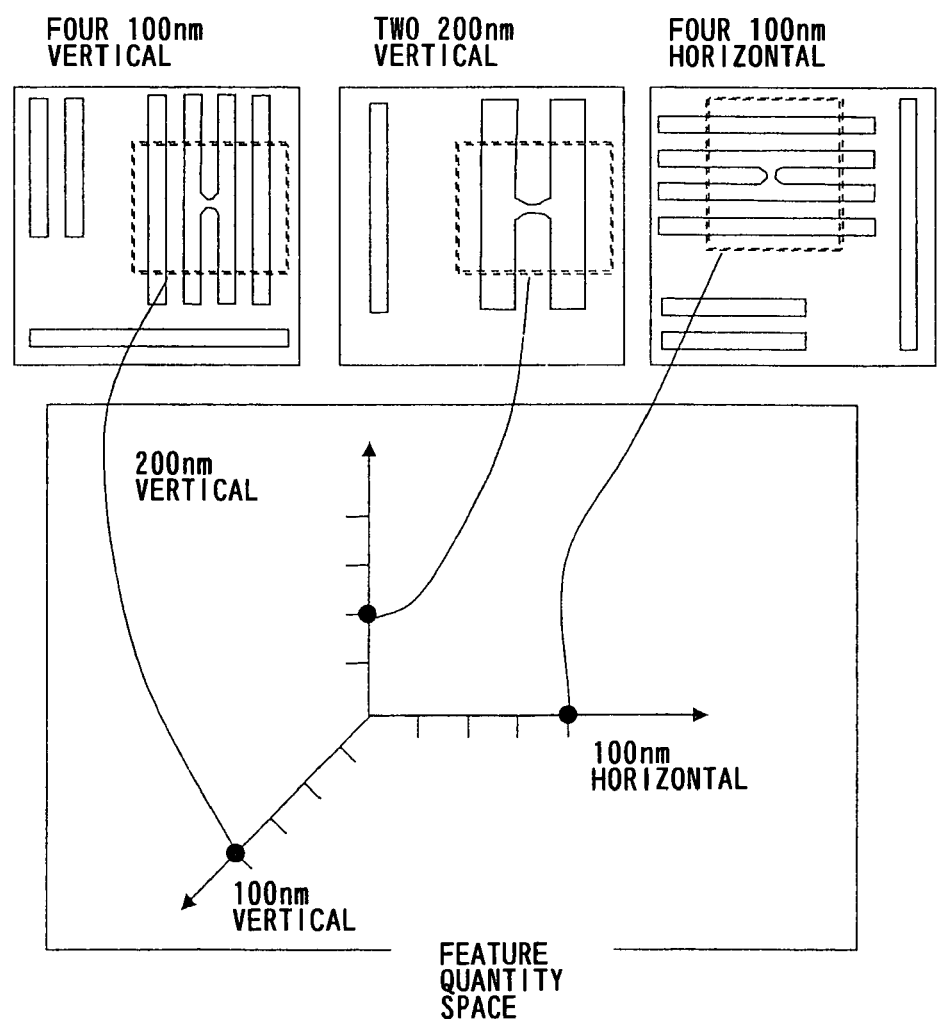
FIG. 107 is a schematic view showing an example of a feature quantity space.

A method of grouping defects based on a feature of a reference pattern corresponding to a defect and its neighborhood can be used. FIGS. 106 through 108 are schematic views showing the above method.

When a defect is detected, reference patterns are clipped by a rectangle corresponding to the neighborhood of the defect location and are memorized. When the inspection is finished, feature quantities are calculated from the clipped reference patterns, and the defects are grouped.

In FIG. 106, a defect location, clipped reference patterns, and the minimum bounding rectangle are shown. The defect location is a center of the minimum bounding rectangle. The clipped reference patterns exist in the rectangle corresponding to the neighborhood of the defect location. As the feature quantity with regard to the line-shaped polygons, a set of a line width, a line direction, and the number of polygons can be used. In addition, a set of a space width, a space direction and the number of spaces can be used. As other feature quantities, a set of a type of a corner and the number of the corners, a set of a type of an end and the number of the ends, or a set of a type of an isolated pattern and the number of the isolated patterns can be used. Next, the feature quantity space that is constituted of the above feature quantities is grouped according to the cluster analysis. The cluster analysis is one of classification methods and is well known in the statistics.

FIG. 107 is a schematic view showing an example of a feature quantity space. In FIG. 107, a set of 100 nm line width, the vertical direction, and the four line-shaped polygons; a set of 200 nm line width, the vertical direction, and the two line-shaped polygons; and a set of 100 nm line width, the horizontal direction, and the four line-shaped polygons are uses as the feature quantities. In this example, three clipped reference patterns are clearly separated in a feature quantity space. However, they might not necessarily be clearly separated, because it is uncertain whether a pattern located in a boundary is included in a clipped reference patterns or not, due to a difference of a defect location. Therefore, the cluster analysis that can classify objects being similar to each other is required.

For grouping the clipped reference patterns in detail, it is necessary to subdivide the feature quantities. For an example shown in FIG. 108, it is necessary to use feature quantities having upward and downward line-shaped polygons and having short and long line-shaped polygons.

According to this embodiment, tendencies for defects to be generated such as "many defects have been generated at dense patterns which have thin vertical lines" can be easily grasped as a whole. Moreover, the defect can be classified for every reference pattern of the similar feature. Further, cause of generation of defect can be easily specified 5.9 Method of Selecting Defect Image to-be-Registered The defect-class determination unit 14 outputs an image to the display device 5 and the printer 6 through the output unit 13 in step S328 (see FIG. 25). Here, if the number of defects drastically increases, a huge number of images must be registered, and hence the memory capacity increases. Therefore, this method is of no practical use. Thus, in order to solve this problem, the number of maximum registrations of the defect images for each defect-class is predetermined.

The number of maximum registrations of the defect images for each defect-class may be statically determined based on the number of the above-mentioned 3.3 Recipe data "9. The number of maximum registrations of defect images", or may be dynamically variable based on the number of defects which have been detected and monitored. For example, the above dynamic number of maximum registrations for each defect-class may be determined as the number that is proportional to the logarithm of the number of the detected defects.

The new defect image is registered until the number of registered defect images becomes equal to the number of the maximum registrations of the defect images. When the number of the registered defect images exceeds the number of maximum registrations of the defect images, whether the new defect image should be registered is determined. If it is judged to be registered, a defect image to be cancelled is determined. As an alternative method, random numbers may be used to determine whether the new defect image is to-be-registered.

According to this embodiment, even if there are many defects having the same defect-class and there are few defects having other defect-class, much more kinds of images can be registered.

5.10 Method of Selecting Defect to-be-Reinspected

In some cases, the defect image is reacquired under the condition of acquiring an image at high magnification, and is reinspected. The reinspection is performed in the following procedure:

1. The recipe registration processing described in FIG. 19 is performed.

In step S202 of FIG. 19, an operator inputs the operator input parameters into the reference pattern generation unit 11 via the input device 4. In the case of reinspection, also the operator inputs the operator input parameters for reinspection into the reference pattern generation unit 11 via the input device in step S202. Here, an inspection area, which is one of parameter of the image acquisition parameters in the input parameters for reinspection, is not inputted, because the inspection area is determined in the following step 4.

2. The inspection processing described in FIG. 25 or FIG. 26 is performed.

3. A defect to-be-reinspected is automatically selected from detected defects.

4. The recipe registration processing described in FIG. 19 is performed.

Here, the operator input parameters for reinspection described in the above-mentioned step 1 are inputted into the reference pattern generation unit 11, instead of performing step S202. The inspection area whose center is a position of the defect to-be-reinspected is automatically set as an inspection area for the random inspection.

5. The inspection processing described in FIG. 25 or FIG. 26 is performed as reinspection.

As described above, in the case of reinspection, it is necessary to select a defect to-be-reinspected automatically from the detected defects before reinspection. The defect to-be-reinspected may be selected from the detected defects by thinning out. However, defects having the same defect-class that are frequently generated are not necessarily important, and in some cases, the defects having the same defect-class that are occasionally generated are required to-be-reinspected fully. In order to meet this requirement, the number of maximum registrations of defects to-be-reinspected for each defect-class should be determined.

As used in the determination of the number of maximum registrations of the defect images described in the above-mentioned 5.9 Method of selecting defect image to-be-registered, the number of maximum registrations of the defects to-be-reinspected for each defect-class may be statically determined based on the above-mentioned 3.3 Recipe data "10. The number of maximum registrations of defects to-be-reinspected.", or may be dynamically variable based on the number of defects which have been detected and monitored. For example, the above dynamic number of maximum registrations for each defect-class may be determined as the number that is proportional to the logarithm of the number of the detected defects.

After inspection is performed, whether the defect should be reinspected or not is determined based on random numbers. Specifically, all detected defects are given random numbers. A defect having a larger random number is more important. If a larger defect should be reinspected selectively, a random number to which a certain weighting is given based on the defect size information may be used. Further, the weighting may be made using other criteria than the defect size information.

According to this embodiment, the defects having the same defect-class that have been frequently generated and the defects having the same defect-class that have been occasionally generated are reinspected fully.

5.11 Method of Displaying Distribution Diagram of Pattern Deformation Quantities As described in steps S328, S332 (see FIG. 25), the defect information is outputted to the display device 5 and the printer 6 through the output unit 13. If the output unit 13 outputs the defect information as numerical numbers, a tendency for defects in the entire semiconductor device to be generated is difficult to grasp. In order to solve this problem, it is necessary to provide a method in which the output unit 13 creates the following distribution diagram presented by a bitmap, and outputs to the display device 5 and the printer 6. The distribution diagram is created by transforming the above-mentioned 4.8 Pattern deformation quantities obtained from the whole inspection-unit-area into a gray-scale or pseudo-color bitmap, and by superimposing defects.

Figure 109:
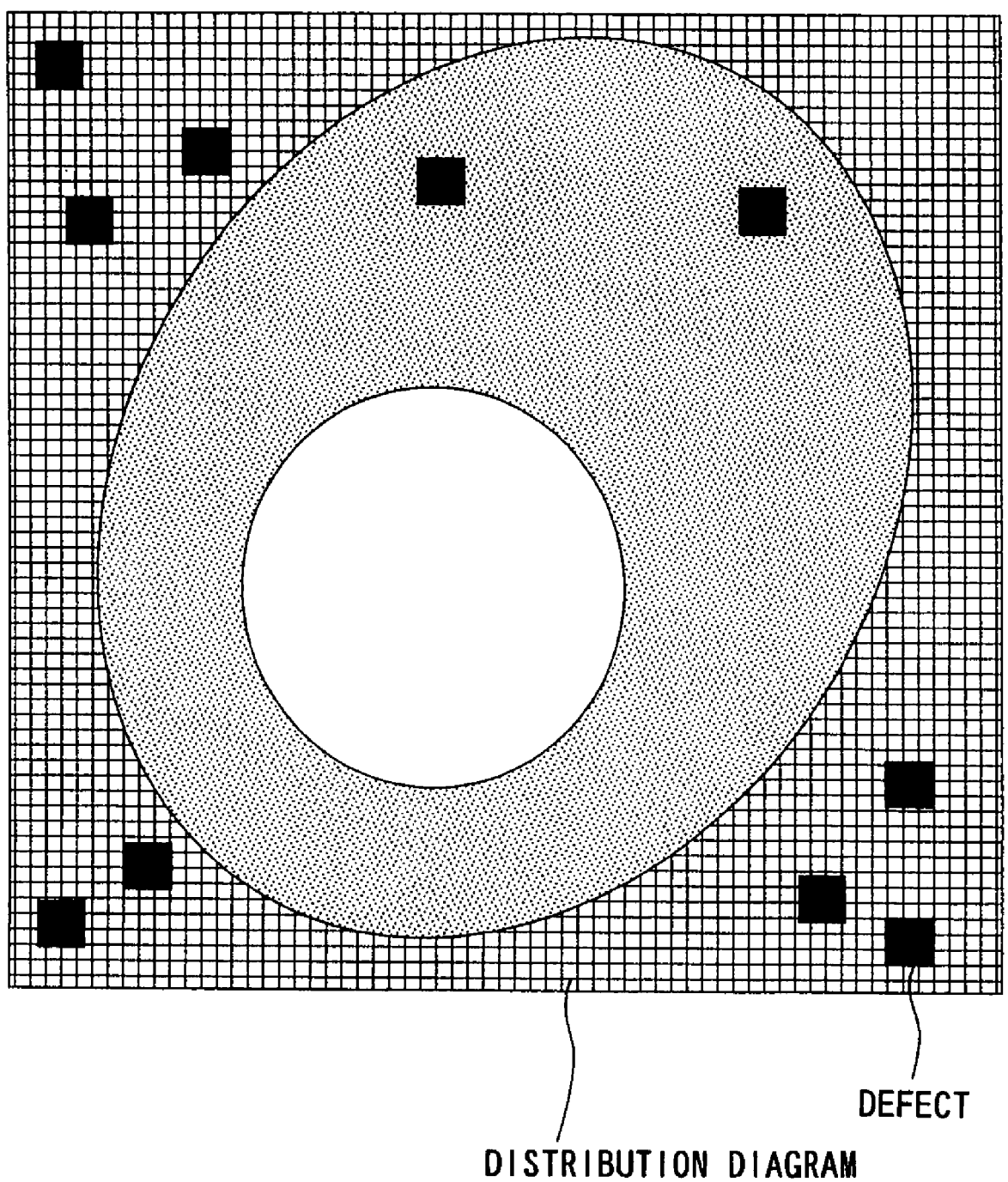
FIG. 109 is a schematic view showing an example of a distribution diagram that is created by transforming deformation quantities of the line widths, which are one of the pattern deformation quantities obtained from the whole inspection-unit-area, into a gray-scale bitmap, and by superimposing defects.

FIG. 109 shows an example of a distribution diagram that is created by transforming deformation quantities of the line widths, which are one of the pattern deformation quantities obtained from the whole inspection-unit-area, into a gray-scale bitmap, and by superimposing defects. A grid part has the largest deformation quantity of the line width, a dotted part has the larger deformation quantity, and a space part has normal deformation quantity. Black squares show defects. From FIG. 109, it is recognized that the larger deformation quantity of the line width a part has, more the number of defects in the part is.

Further, as shown in FIG. 109, in the case where the deformation quantity of the line width is displayed, a stepper aberration, pattern deformation depended on a location in a wafer, and the like, can be grasped graphically. For example, if a semiconductor device, which constitutes periodical patterns, and which is formed normally, is inspected and the distribution diagram is observed, a tendency for line widths in a peripheral part of the distribution diagram to be larger than a line width in the center part of the distribution diagram is grasped. From the tendency, it is understood that a peripheral part of the stepper lens has the aberration. As another example, if a SoC, which is formed normally, is inspected and the distribution diagram is observed, it is understood that line widths for every function blocks such as a memory or logic have different values.

Moreover, in the case where the degree for the variation in the line width, which is another one of the pattern deformation quantities obtained from the whole inspection-unit-area, a quality of the semiconductor device can be verified.

According to this embodiment, cause of generation of defects can be easily specified and the quality of the semiconductor device can be verified, because it becomes easy to recognize tendencies for defects to be generated graphically.

6. Other Scan Methods of Image Generation Device

Instead of scan methods described in the above-mentioned 2.2 Scan methods of image generation device, the following scan methods can be used in the image generation device 7.

Figure 110A:
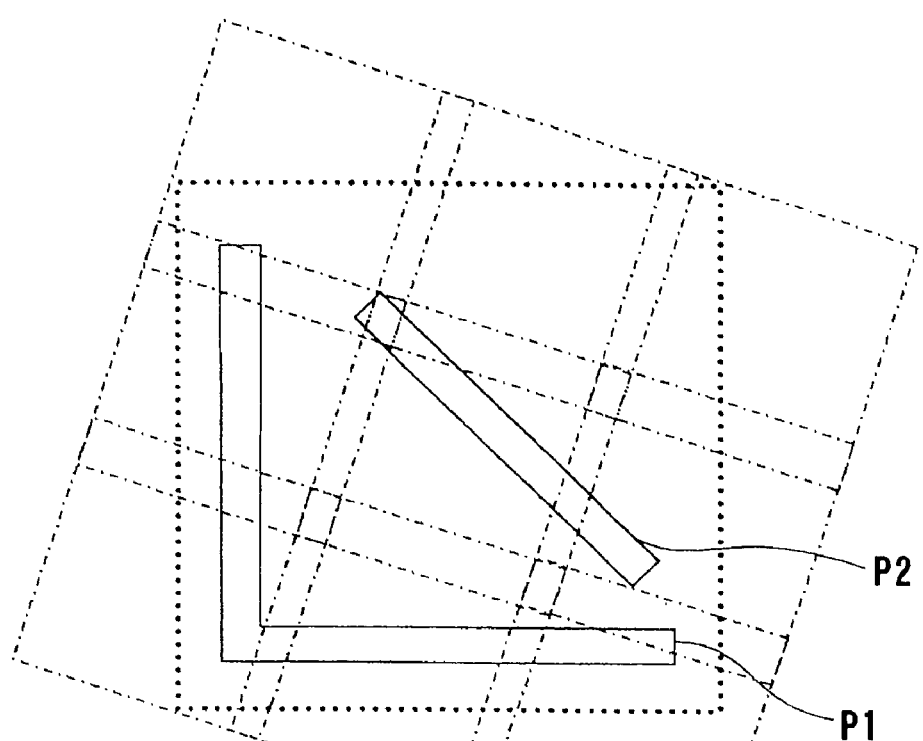
FIGS. 110A and 110B are schematic views showing a method in which a scanning direction for an electron beam is 18 degrees.
Figure 110B:
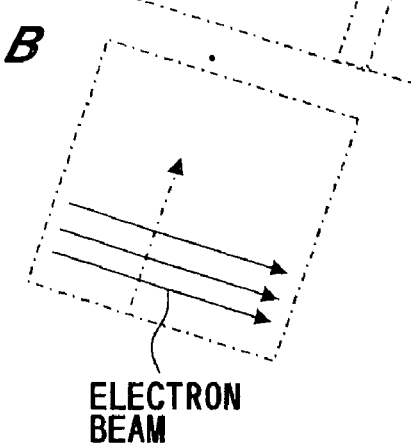

6.1 Method of Scanning Electron Beam in 18 Degrees, Method of Scanning Hexagonal Block, and Method of Automatically Determining Scanning Conditions Based on Reference Pattern FIGS. 110A and 110B schematically show a method of scanning an electron beam in 18 degrees. FIG. 110A shows patterns P1, P2 which are identical to those shown in FIG. 8A. More than 99% of lines of patterns on semiconductor integrated circuits (LSI) and liquid crystal panels consist of horizontal lines and vertical lines or lines inclined downwardly and upwardly to the right at 45 degrees. As an optimum scanning direction for causing scanning direction to cross edges patterns to-be-inspected in all those directions, a scanning direction at 18 degrees can be used. The scanning direction at 18 degrees as shown in FIG. 110B is expected to achieve relatively accurate inspection accuracy for all line segments that are horizontal, vertical, and inclined at 45 degrees.

The scanning direction may be at an angle other than 18 degrees as long as it extends more perpendicular to all the lines of patterns to-be-inspected. For example, the scanning line may be at 22.5 degrees, 63 degrees, which is the sum of 18 degrees and 45 degrees, or 108 degrees, which is the sum of 18 degrees and 90 degrees.

Figure 111A:
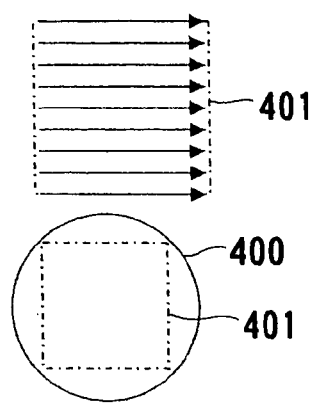
FIGS. 111A through 111D are schematic views showing a method of scanning a hexagonal block.
Figure 111C:
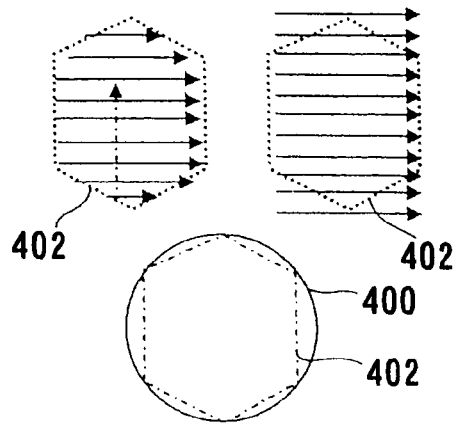
Figure 111B:
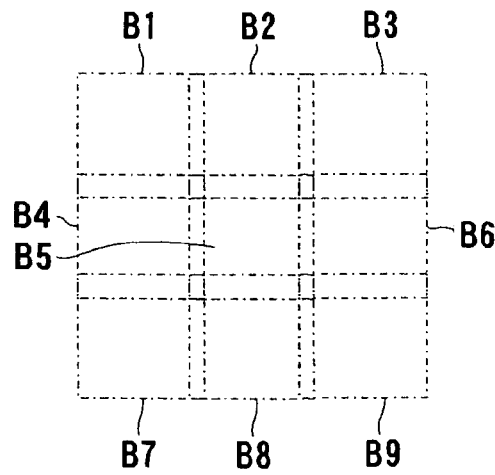

FIG. 111A through 111D are schematic views showing a method of scanning a hexagonal block. A conventional scanning electron microscope such as a CD-SEM or the like generally captures a square image with horizontal scanning lines. However, because of limitations on design of the scanning electron microscope, an area that can be scanned free of distortions is a circular area. Therefore, as shown in FIG. 111A, it is customary for a scanning electron microscope to scan a pattern using a square block 401 within a circular block 400. The circular block 400 contains the areas that can be scanned free of distortions, but are not scanned, in the upper part, the lower side, the left side, and the right side of the square block 401. Accordingly, some areas are wasted in order to capture a larger scanned area. Specifically, when smaller scanned areas are overlapping to combine into a larger scanned area, the larger scanned area may comprise nine overlapping square blocks B1 through B9 as shown in FIG. 111B.

Figure 111D:
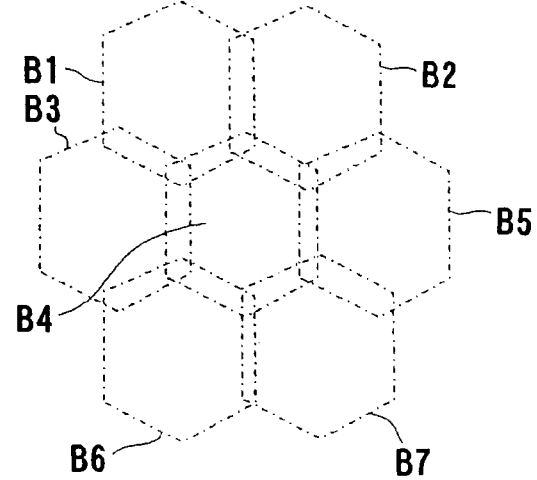

If a hexagonal block 402 (see the lower side of FIG. 111C), instead of the square block, is captured by one scan, an area that approximates to a circular area can be captured, using wider areas that can be scanned than with the square block. The hexagonal block 402 can be scanned in two ways. According to the first process, as shown on the left-hand side of FIG. 111C, the hexagonal block 402 is scanned fully inside, but not outside. According to the second process, as shown on the right-hand side of FIG. 111C, a rectangular area containing the hexagonal block 402 is scanned, and the upper right, the lower right, the upper left, and the lower left triangular areas around the hexagonal block 402 within the rectangular area are not used for inspection. Using such hexagonal blocks makes it possible to capture a wider area with a less number of scans for blocks B1 through B7, than square blocks, as shown in FIG. 111D.

Figure 112:
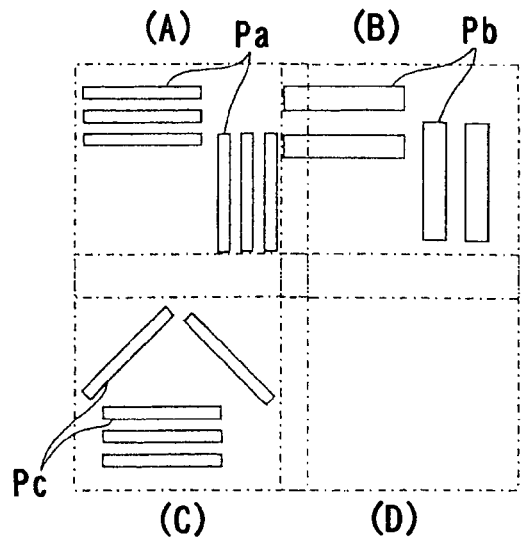
FIG. 112 is schematic view showing a method of automatically determining scanning conditions based on a reference pattern.

FIG. 112 is schematic view showing a method of automatically determining scanning conditions based on a reference pattern. It is necessary to determine conditions as to whether an area is to be scanned once or twice according to a reference pattern, as with the description of the scanning directions at 0 degree and 90 degrees automatically. There are available three processes for automatically determining a scanning direction for an electron beam, as described in the following.

1. A method of omitting scan, in the case where no pattern exists in a block as shown a block (D)

2. A method in which scanning conditions are determined depending on the line width of a pattern For example, a comparison between patterns Pa in a block (A) and patterns Pb in a block (B) indicates that the line width of the patterns Pb is twice the line width of the patterns Pa. In the case of inspecting a variation ratio of the line width of a pattern, an image can be acquired by a scan in the block (B) at a magnification of ½ with respect to a scan in the block (A).

3. A method in which conditions for a scanning direction are determined depending on the direction of a distribution of reference patterns For example, because patterns Pa in the block (A) have the horizontal and the vertical line segments, the block (A) is needed to be scanned once in a scanning direction at 45 degrees, and because patterns Pc in a block (C) have the horizontal and 45 degrees line segments, the block (C) is need to be scanned twice.

According to this embodiment, the pattern may be scanned with a minimum electron beam (charged particle beam), and hence the image of the pattern to-be-inspected can be obtained in a minimum time. In addition, an area that can be scanned is utilized at maximum, thus allowing a wider block to be represented by as few smaller blocks as possible. Further, for preventing reduction of accuracy to detect an edge, which depends on the scanning direction, an image can be acquired according to an optimum condition using a reference pattern.

6.2 Scanning Paths of Electron Beam

Figure 113:
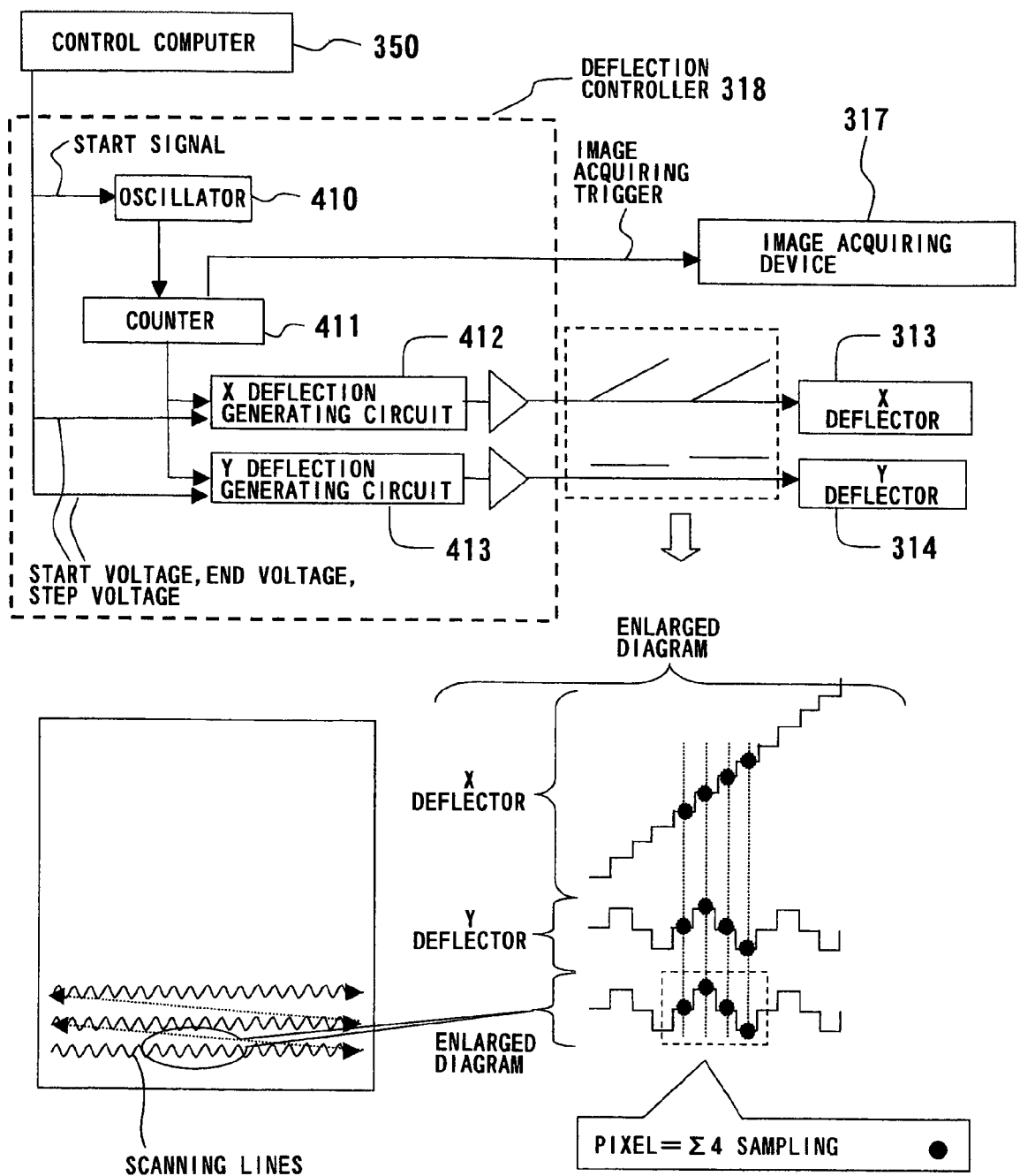

FIGS. 113 and 114 show scanning paths for an electron beam. An oscillator 410, a counter 411, an X-deflection generating circuit 412, a Y-deflection generating circuit 413 are components of the deflection controller 318 as shown in the upper part of FIGS. 113 and 114. The control computer 350 sets start voltage, end voltage, step voltage to the X-deflection generating circuit 412, and the Y-deflection generating circuit 413. The control computer 350 sends start signal to the oscillator 410.

In ordinary scans, a pattern is scanned stepwise in each pixel by the deflection in the X direction and scanned stepwise in each line by the deflection in the Y direction. According to such a conventional scanning process, inspection accuracy is liable to be low because no information may be acquired between scanning lines. According to the present invention, as shown in FIG. 113, in order to acquire information between scanning lines, a signal having amplitude, such as a sine-wave signal, is added for the deflection in the Y direction for acquiring data between the scanning lines (see the lower left side of FIG. 113).

As shown in FIG. 113, data at four points are sampled (see the lower right side of FIG. 113). In this manner, spread data for the deflection in the Y direction can be acquired in one period of the sine wave. The data from the four points are added and transmitted as one-pixel information to the control computer 350.

As shown in the upper part of FIG. 113, the oscillator 410 having an internal frequency, which is four times an output frequency, is connected to a counter 411. The counter 411 is connected to the X-deflection generating circuit 412 and the Y-deflection generating circuit 413. The above circuit arrangement generates a stepwise waveform that increases in the rightward direction for the deflection in the X direction, and a sine wave for the deflection in the Y direction, based on the internal frequency. Data at the four points are sampled according to the internal frequency, and added into sampling data corresponding to an actual pixel.

As an alternative method, a method in which the waveform for the deflection in the Y direction is generated by using the above method and a waveform for the deflection in the X direction is generated as a stepwise waveform in order to obtain a zigzag scanning path can be used. FIG. 114 shows an example of the above method.

FIG. 115 schematically shows the filtering of a vertical scan. Pixels A are close to each other in the horizontal direction and are smoothed by a detector and an amplifier. Pixels B are close to each other in the vertical direction, but are not smoothed. Therefore, the smoothing filter is applied vertically to reduce difference between image qualities in the horizontal and vertical directions. In FIG. 115, the simplest filtering coefficients are illustrated. However, optimum filtering coefficients may be selected to match horizontal frequency characteristics.

According to this embodiment, the difference between the image qualities in the X and Y directions can be reduced to the utmost by changing scanning paths in order to acquire information between scanning lines or filtering.

6.3 Method of Scanning Only Neighboring Portion of Edges

It is necessary to shorten image-acquiring time by using a method of scanning only a neighboring portion of edges. Further, it is necessary to improve the edge detection accuracy by scanning the electron beam in direction perpendicular to direction of an edge.

Figure 117:
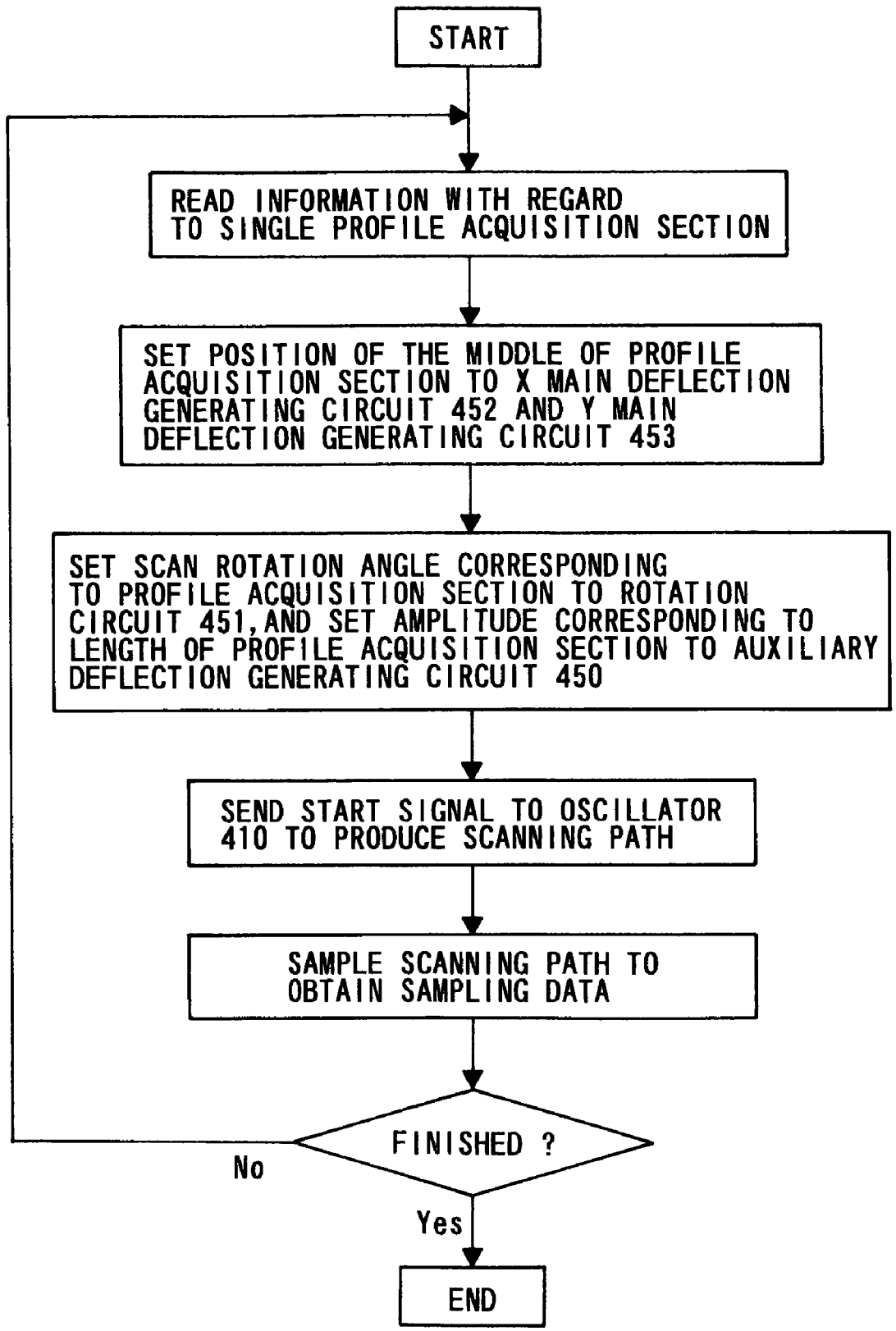

FIG. 116 is a schematic view showing the method of scanning only a neighboring portion of an edge, and FIG. 117 is a flowchart of the method. The circuit arrangement shown in FIG. 116 includes an auxiliary deflection generating circuit 450.

The method in which only a neighboring portion of an edge is scanned is performed by the following procedure:

1. A profile acquisition section that is used for detecting the second edge is obtained from a reference pattern, and information with regard to the profile acquisition section has been registered beforehand. The information includes a position of the middle point, a direction, and a length of the profile acquisition section.

2. The control computer 350 reads information with regard to the single profile acquisition section.

3. The control computer 350 sets the position of the middle point of the profile acquisition section to an X main deflection generating circuit 452 and a Y main deflection generating circuit 453, thereby moving a central position of a beam.

4. A scan rotation angle corresponding to the direction of the profile acquisition section is set to a rotation circuit 451, and an amplitude corresponding to the length of the profile acquisition section is set to the auxiliary deflection generating circuit 450.

5. A start signal is sent to an oscillator 410, and a counter 411 connected to the oscillator 410 generates a scanning waveform in the X and Y directions. The outputs of the X main deflection generating circuit 452 and the Y main deflection generating circuit 453 are added to the generated scanning waveform to produce a scanning path shown in the upper central part of FIG. 116.

6. The scanning path is then sampled at seven points as shown in the upper right part of FIG. 116 in order to obtain sampling data.

Figure 118A:
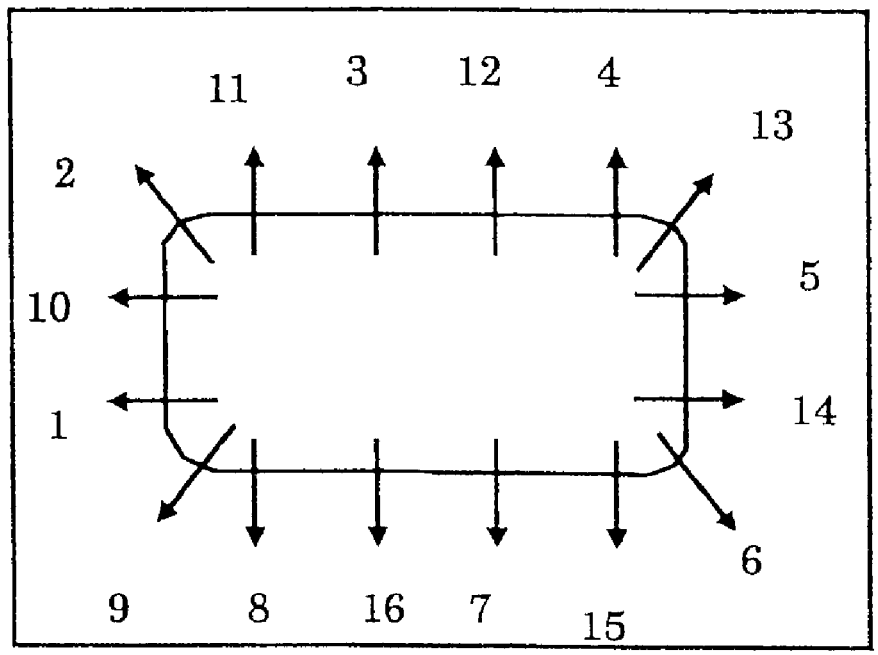
Figure 118B:
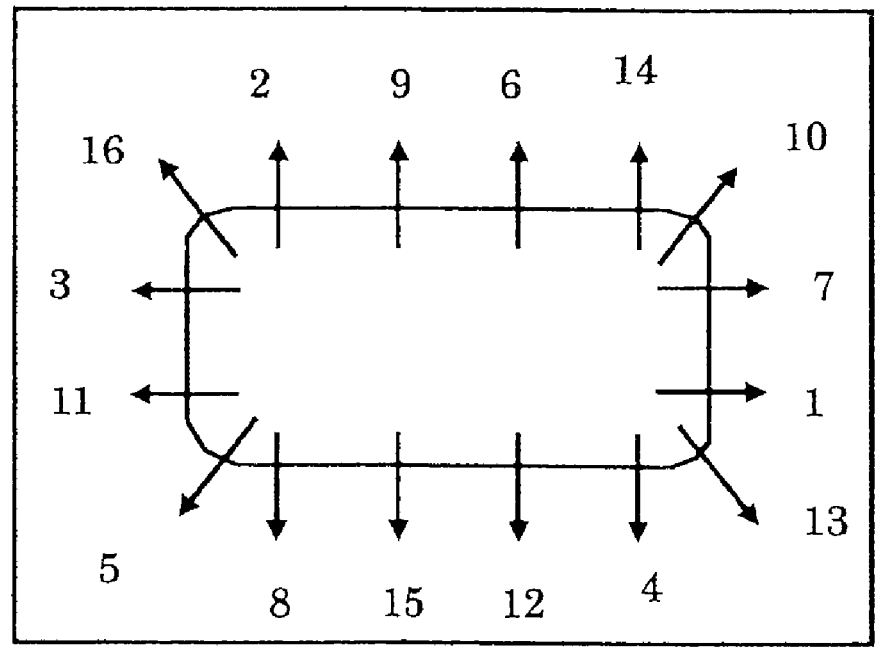

FIGS. 118A and 118B are diagrams illustrative of processes of sequencing the acquisition of measured data. The following two methods can be used. In one method, the sampling points are sampled by skipping according to a skipping rate as shown in FIG. 118A. In an alternative method, the sampling points are sampled randomly according to random numbers as shown in FIG. 118B. According to this embodiment, deformation of the profile due to the electrification phenomenon of a specimen can be effectively reduced, and hence are suitable for inspecting insulation. If the electrification phenomenon of the specimen can be ignored, the sampling points can be sampled successively in order to go around the reference pattern.

According to this embodiment, scanning method can be performed at high speed and accurate edge detection can be realized. Moreover, the electrification phenomenon effect can be reduced.

6.4 Method of Scanning Only Neighboring Portion Corresponding to Region for Region Inspection Method In the case of using the above-mentioned 5.2 Region inspection method, by using a scanning method of only a neighboring portion corresponding to a region for the region inspection method, image-acquiring time can be shortened. Further, the edge detection accuracy can be improved because a scanning direction and a direction of an edge are perpendicular to each other.

Figure 119A:
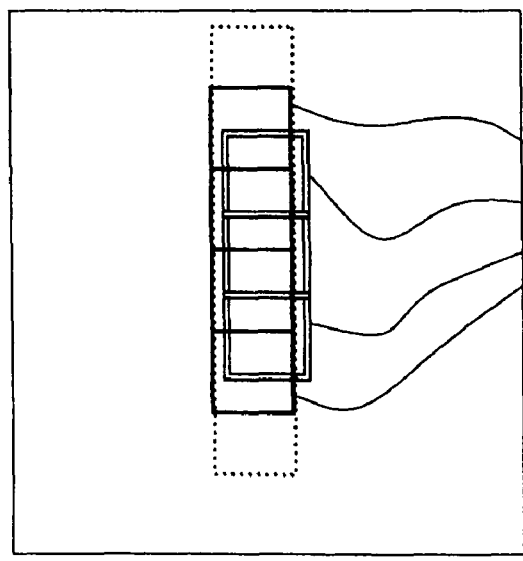

For example, in the case of inspecting only a reference pattern suitable for line width inspection or space width inspection, a method in which rectangular portions obtained by the following are scanned may be used. The rectangular portions are neighboring portions corresponding to regions for the region inspection method, and are obtained by the following procedure shown in FIGS. 119A, 119B and 119C.

1. A reference patterns K suitable for line width inspection are obtained. The rectangles K are shown by solid lines and double lines in FIG. 119A, and are the same as those in FIG. 82.

2. The minimum rectangles including profile acquisition sections required for detecting all edges based on the reference patterns K are obtained as scanning portions.

Specifically, the minimum rectangle R including the reference patterns K is obtained. The profile acquisition sections are set to a right line segment and a left line segment, respectively.

Figure 119B:
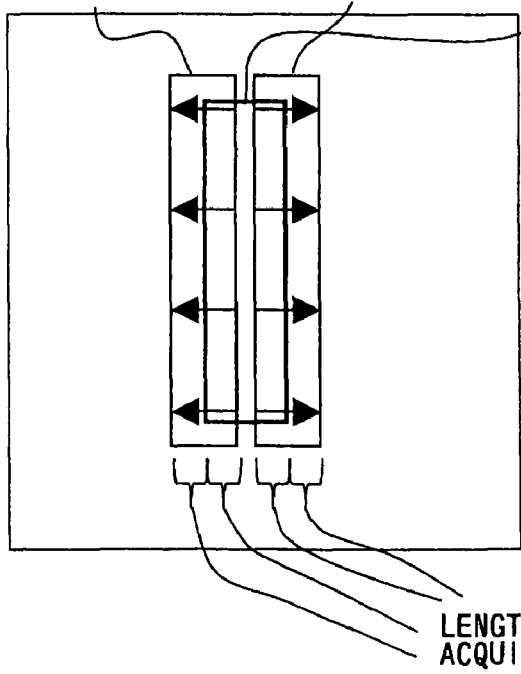
Figure 119C:
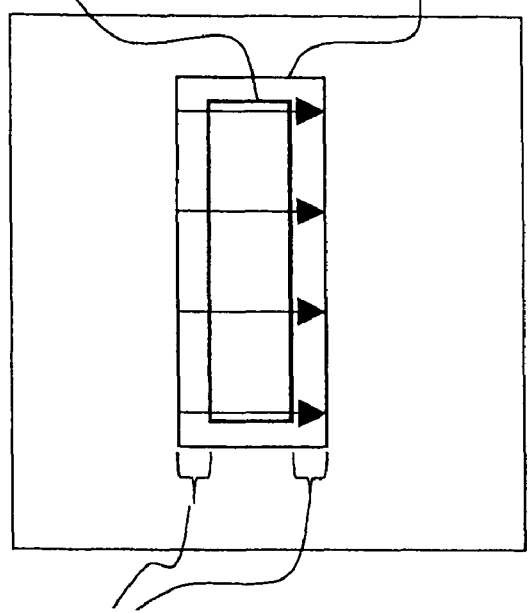

As scanning portions, the portions shown in FIG. 119B or FIG. 119C may be used. In FIG. 119B, rectangles Sa and Sb obtained with dilating the right line segment and the left line segment of the rectangle R by a length L of the profile acquisition section become the scanning portions. The scanning portions are shown by rectangles with four arrows, and the arrows show scanning directions.

In FIG. 119C, a rectangle Sc obtained with dilating the rectangle R by the length L of the profile acquisition section rightward and leftward becomes a scanning portion. This method is advantageous in that although scanning cannot be performed with respect to both of the right and left edges from the inward to the outward of the pattern, a single scanning region is sufficient.

The scanning region in the space width inspection may be determined in the same manner.

According to this embodiment, image-acquiring time can be shortened. Further, the edge detection accuracy can be improved because the scanning direction and the direction of the edge are perpendicular to each other.

7. Method of Correcting Image of Pattern to-be-Inspected 7.1 Method of Correcting at Least One of Reference Pattern and Image of Pattern to-be-Inspected by Detecting Distortion Quantities of Image A rotation of the specimen caused by stage moving or the like may cause a rotation of a pattern image to-be-inspected. Moreover, the electrification phenomenon of the specimen or the like may cause deformation such as a rotation including a skew or a variation of magnification or the like. Because of the above image distortion, a fine defect smaller than the above distortion quantities cannot be detected. The above distortion occurs sporadically, and the distortion cannot be predicted. Therefore, it is necessary to detect the above distortion quantities, and correct the above image distortion every time when an image is acquired.

FIG. 120 is a schematic view showing an image of a pattern to-be-inspected having the above distortion. The line segments shown by dotted lines schematically show the reference pattern, and tips of vectors d(x,y) schematically show detected edges. The matching between the reference pattern and the detected edges is performed. However, in the matching using only translation, distortion such as the rotation, the variation of magnification or the like remains as matching errors.

First, these matching errors are summed up by using the affine transformation. Here, the affine transformation means the linear transformation using the coefficients 'a' to 'f'.

$$X = ax + by + c$$

$$Y = dx + ey + f$$

In this transformation equation, (x,y) are coordinate values of a point on the reference pattern, and (X,Y) are coordinate values of a detected edge corresponding to the above point. The coefficients 'a', 'b', 'd', and 'e' represent the rotation including the skew and the variation of magnification. If it is not necessary to correct the skew, the following matrix is restricted to be an orthogonal matrix:

$$\begin{pmatrix} a & b \\ d & e \end{pmatrix}$$

In addition, if it is not necessary to correct the variation of magnification, the matrix is restricted to be a rotational matrix.

In this transformation equation, the coefficients 'c' and 'f' represent shift quantities. In the example shown in FIG. 120, these shift quantities are zero.

The method in which the matching using a sub-inspection-unit-area is performed is shown in FIG. 121. The sub-inspection-unit-area is defined as an area made by dividing an inspection-unit-area. In the case where the inspection-unit-area is huge, the matching using the sub-inspection-unit-area is exceedingly faster than the matching using the inspection-unit-area. In this case, the coefficients 'c' and 'f' of other sub-inspection-unit-areas are not zero in general.

The coefficients 'a' to 'f' are calculated by the following procedure:

1. The vector d(x,y) which represents a summation of a pattern deformation quantity and a pattern distortion quantity (shown in FIG. 120) is obtained. The vector d(x,y) is the same as the vector d(x,y) between the two edges shown in FIG. 60.

2. The coefficients 'a' to 'f' are obtained from $(d_x(x_i,y_i),d_y(x_i,y_i))$ ('i' is a number from 1 to the number of data), which are components of the respective vectors d(x,y), by using least mean square method. $(x_i,y_i)$ are coordinate values of the point of the reference pattern. $(x_i+d_x(x_i,y_i),y_i+d_y(x_i,y_i))$ are coordinate values of the detected edge corresponding to the above point. Thus, a summation E of square errors of data is calculated by the following equation:

$$E = \Sigma(x_i + d_x(x_i,y_i) - (ax_i + by_i + c))^2 + \Sigma(y_i + d_y(x_i,y_i) - (dx_i + ey_i + f))^2$$

Here, $\Sigma$ means summation for all 'i'.

The least mean square method requires that partial derivatives of the summation E of square errors of data with respect to the coefficients 'a', 'b', 'c', 'd', 'e', and 'f' are zero:

$$\frac{\partial E}{\partial a}=0, \frac{\partial E}{\partial b}=0, \frac{\partial E}{\partial c}=0, \frac{\partial E}{\partial d}=0, \frac{\partial E}{\partial e}=0, \frac{\partial E}{\partial f}=0$$

The following equations are obtained from these equations:

$$\begin{pmatrix} \sum ax_ix_i & \sum by_ix_i & \sum cx_i & 0 & 0 & 0 \\ \sum ax_iy_i & \sum by_iy_i & \sum cy_i & 0 & 0 & 0 \\ \sum ax_i & \sum by_i & \sum c & 0 & 0 & 0 \\ 0 & 0 & 0 & \sum dx_ix_i & \sum ey_ix_i & \sum fx_i \\ 0 & 0 & 0 & \sum dx_iy_i & \sum ey_iy_i & \sum fy_i \\ 0 & 0 & 0 & \sum dx_i & \sum ey_i & \sum f \end{pmatrix} \begin{pmatrix} a \\ b \\ c \\ d \\ e \\ f \end{pmatrix} = \begin{pmatrix} \sum (x_i + d_x(x_i, y_i))x_i \\ \sum (x_i + d_x(x_i, y_i))y_i \\ \sum (x_i + d_x(x_i, y_i)) \\ \sum (y_i + d_y(x_i, y_i))x_i \\ \sum (y_i + d_y(x_i, y_i))y_i \\ \sum (y_i + d_y(x_i, y_i)) \end{pmatrix}$$

The coefficients 'a' to 'f' are obtained by solving the above equations. The processing for obtaining the coefficients 'a' to 'f' is performed between the step S314 and the step S318 shown in the flowchart of FIGS. 25 through 27. Hereafter, this processing is called step S316.

The following three correction methods using the obtained coefficients 'a' to 'f' can be used, as shown in FIG. 122.

1. Distortion Correction Method 1

The reference pattern is corrected using the coefficients 'a' to 'f'. Then, the processing subsequent to the step S314 and later steps are performed. However, in this case, the step S316 is not performed.

2. Distortion Correction Method 2

The edges are detected again after correcting the image of pattern to-be-inspected using the coefficients 'a' to 'f'. In this case, the invert transformation equations of the equations described in the affine transformation are used. Then, the processing subsequent to the step S310 and later steps are performed. However, in this case, the step S316 is not performed.

3. Distortion Correction Method 3

$(d_x(x_i,y_i),d_y(x_i,y_i))$ which are components of the respective vectors d(x,y) are corrected by the follow equation using the coefficients 'a' to 'f':

$$(d_x(x_i,y_i)-(ax_i+by_i+c-x_i), d_y(x_i,y_i)-(dx_i+ey_i+f-y_i))$$

Next, the step S318 is skipped, and the step S320 and later steps are performed. In the step S320, the obtained corrected vectors d(x,y) are used as the vector d(x,y) between the two edges shown in FIG. 60.

The above-mentioned distortion correction method 1 and the distortion correction method 2 can correct distortion quantities of the image of the pattern to-be-inspected accurately. However, they require huge calculating cost. On the other hand, in the above-mentioned distortion correction method 3, although the vectors d(x,y) of corner portions are not corrected sufficiently accurately, the calculating cost is low. In addition, this inaccuracy may be ignored.

Although this embodiment uses the affine transformation, other transformation can be used. For example, transformation equations using quadratic terms of $x_i$, $y_i$ can be used. However, complex transformation equations may ignore actual pattern deformation quantities, and hence it is necessary to choose transformation equations carefully.

According to this embodiment, the deformation quantities of the image of the pattern to-be-inspected are detected as linear values, and are corrected. As a result, the deformation quantities, which should not be detected as a defect, can be ignored, so that generating false defects can be prevented.

The above method that detects the rotation including the skew, and the variation of magnification can be used for rotation and magnification adjustments of the image generation device 7. The adjustments can be performed before the inspection or at an appropriate time during the inspection as needed. In this case, the affine transformation coefficients 'a', 'b', 'd', and 'e' are converted into adjustment values of rotation and magnification of the image generation device 7, and the adjustment values are set to the image generation device 7.

7.2 Method of Correcting Nonlinear Image Distortion

The image generation device 7 generating an image with a large field of view may have image distortions that cannot be corrected by the above affine transformation. The image distortions are caused by Seidel's five aberrations. One of the most important image distortions is a nonlinear image distortion. In order to correct the nonlinear image distortion, a method shown in FIGS. 123 through 128 can be used.

Figure 123:
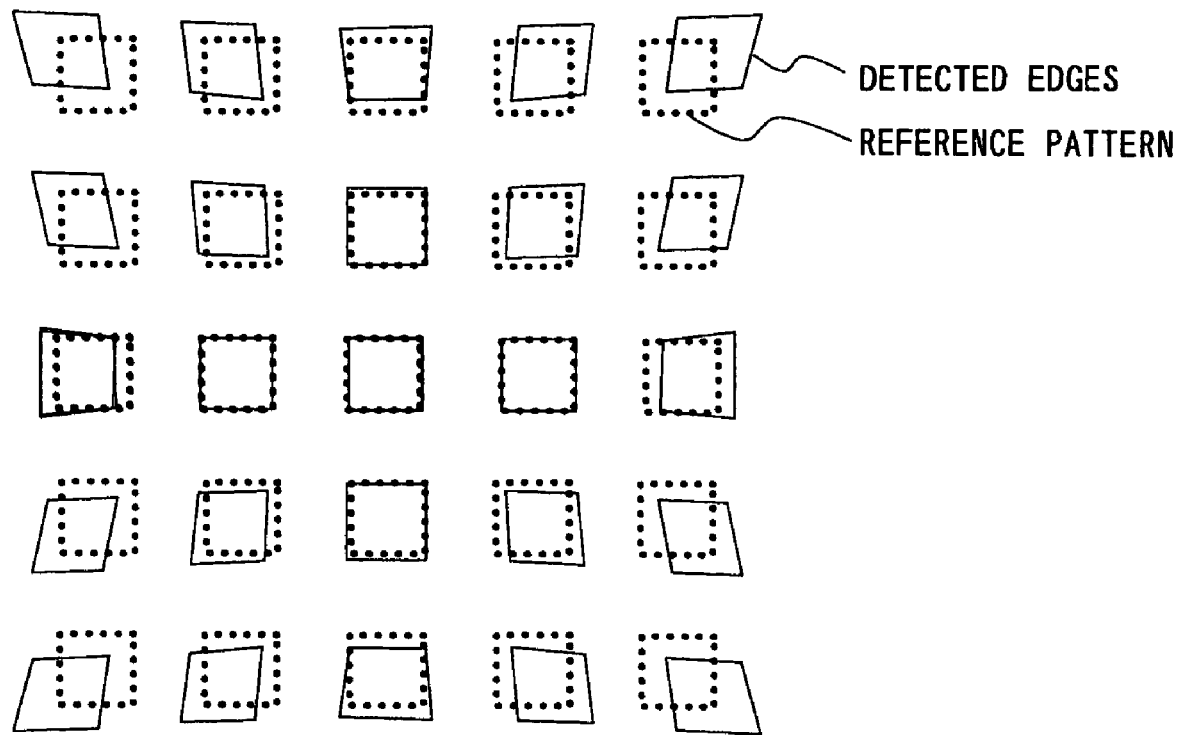
Figure 124:
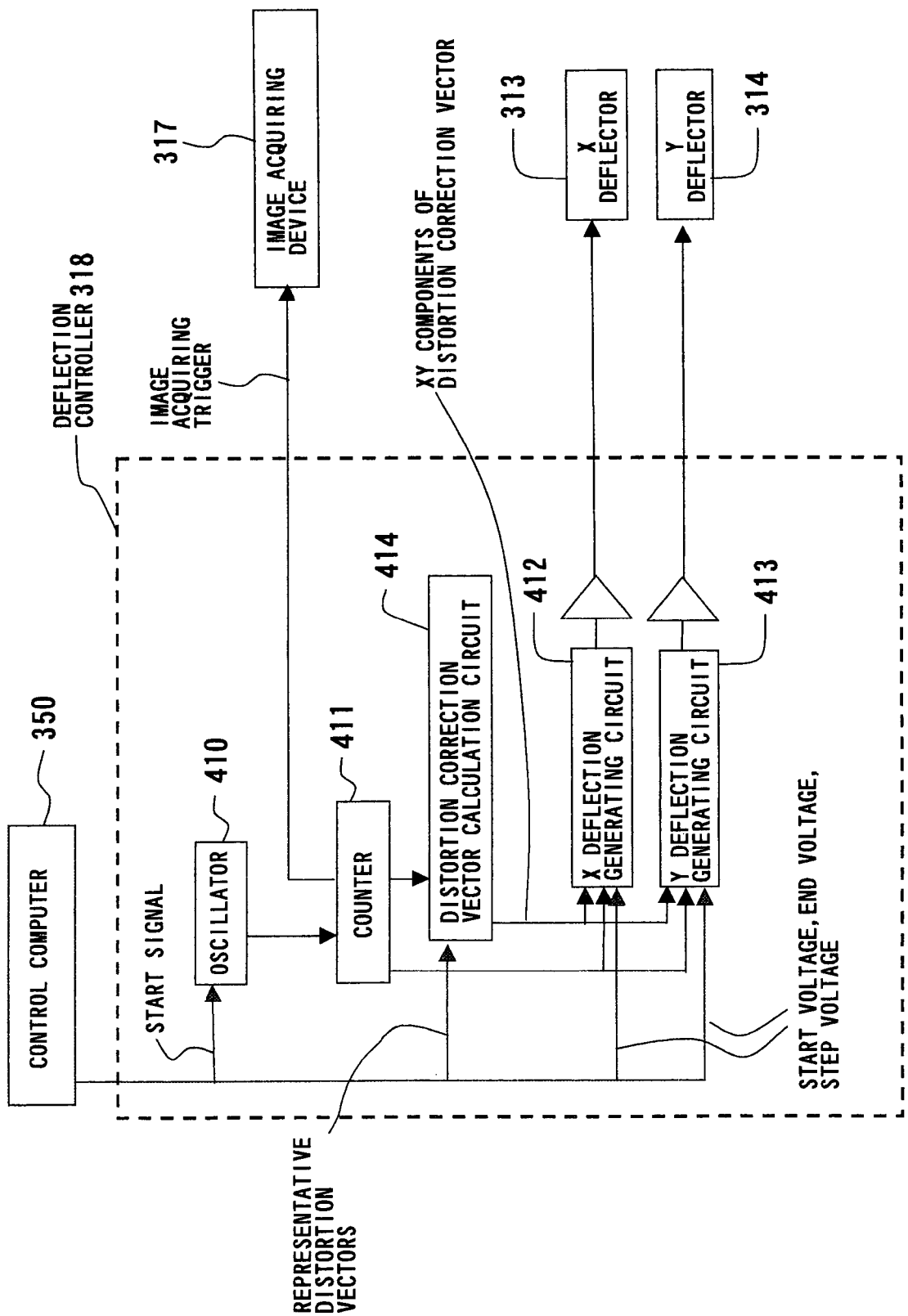

As shown in FIG. 123, the nonlinear image distortion can be ignored in a central area of an image, but cannot be ignored in a peripheral area of the image. In this method, distortion vectors are obtained from the image, the obtained distortion vectors are transformed into representative distortion vectors, and then a distortion correction vector of each scanning point is calculated by the obtained representative distortion vectors. The distortion correction vectors are used in the deflection controller 318 as shown in FIG. 124. FIG. 124 is the same as FIG. 113 except for adding a distortion correction vector calculation circuit 414. The control computer 350 sets the representative distortion vectors to the distortion correction vector calculation circuit 414. The distortion correction vector calculation circuit 414 calculates a distortion correction vector in synchronism with a signal from the counter 411. Then, the distortion correction vector calculation circuit 414 outputs X and Y components of the distortion correction vector to the X-deflection generating circuit 412 and the Y-deflection generating circuit 413.

In FIG. 125, a method in which the distortion correction vector calculation circuit 414 calculates the distortion correction vector using the representative distortion vectors is shown. FIG. 125 uses an X deflection voltage and a Y deflection voltage as the XY coordinates. The representative distortion vectors are set to locations shown by solid circles (●) for every X directional interval and for every Y directional interval. These intervals are equal to the above-mentioned 3.3 Recipe data "12. The interval of representative distortion vectors held by the distortion correction vector calculation circuit". One interval corresponds to a step voltage between scanning points. Here, for simple explanation, a method in which the X and Y directional intervals are the same interval 8 will be described.

In order to calculate the distortion correction vector $C_d(x,y)$ of a scanning point shown in FIG. 125, the following bilinear interpolation equation that uses the representative distortion vectors $R_d^{[0,0]}$, $R_d^{[8,0]}$, $R_d^{[0,8]}$, and $R_d^{[8,8]}$ is used:

$$C_d(x,y) = [\{R_d^{[0,0]}(8-x) + R_d^{[8,0]}x\}(8-y) + \{R_d^{[0,8]}(8-x) + R_d^{[8,8]}x\}y]/8^2$$

Here, the (x,y) are scanning point coordinates determined by the counter 411. A variable having the suffixes $[x,y]$ means a variable corresponding to the scanning point coordinates (x,y).

A method in which the representative distortion vectors are calculated from the distortion vectors will be described. First, matching between reference patterns and detected edges is performed in the central area of the image. Reference patterns suitable for the method of correcting nonlinear image distortion are simple patterns arranged periodically as shown by dotted lines in FIG. 123.

In FIG. 126A, a method in which representative distortion vectors located at the vertices of the rectangle area are calculated from the distortion vectors in a rectangle is shown. In this case, the above bilinear interpolation method is used in the calculation. FIG. 126A is the same as FIG. 125, except that the distortion vectors d(x,y) are used instead of the distortion correction vectors of the scanning points. The distortion vector d(x,y) is defined as a vector whose start point is a point on a reference pattern, and whose end point is a point of a detected edge corresponding to the point on the reference pattern. The distortion vector d(x,y) is the same as the vector d(x,y) between the two edges shown in FIG. 60.

This embodiment will use z(x,y) which is an X or Y component of the distortion vector d(x,y) because calculation procedure of the X component of the distortion vector d(x,y) and calculation procedure of the Y component of the distortion vector d(x,y) are the same. Similarly, $r_z^{[0,0]}$, $r_z^{[8,0]}$, $r_z^{[0,8]}$, and $r_z^{[8,8]}$ will be used as an X or Y component of the representative distortion vectors $R_d^{[0,0]}$, $R_d^{[8,0]}$, $R_d^{[0,8]}$, and $R_d^{[8,8]}$, respectively. Therefore, z(x,y) is expressed by the following equation:

$$z(x,y) = \{r_z^{[0,0]}(8-x)(8-y) + r_z^{[0,8]}(8-x)y + r_z^{[8,8]}xy\}/8^2$$

In order to solve $r_z^{[0,0]}$, $r_z^{[8,0]}$, $r_z^{[0,8]}$, and $r_z^{[8,8]}$, the least mean square method is performed by using sufficient data $(x_i, y_i, z_i)$ which exist in the rectangular region. Here, the $x_i$, $y_i$ mean X, Y coordinates of the scanning point, and $z_i$ means an X or Y component of the distortion vector d(x,y). Therefore, a summation E of square errors of data is calculated by the following equation:

$$E = \Sigma^{[0,0]}[z_i - \{r_z^{[0,0]}(8-x)(8-y) + r_z^{[8,0]}x(8-y) + r_z^{[0,8]}(8-x)y + r_z^{[8,8]}xy\}/8^2]^2$$

Here, $\Sigma^{[0,0]}$ means summation for all the data in the rectangular region ($P_s^{[0,0]}, P_s^{[8,0]}, P_s^{[0,8]}, P_s^{[8,8]}$). The suffix $[0,0]$ means the suffix $[0,0]$ held by the lower left point $P_s^{[0,0]}$.

The least mean square method requires that partial differentials for $r_z^{[0,0]}$, $r_z^{[8,0]}$, $r_z^{[0,8]}$, and $r_z^{[8,8]}$ of the summation E of square errors of data should be zero.

$$\frac{\partial E}{\partial r_z^{[0,0]}} = 0, \quad \frac{\partial E}{\partial r_z^{[8,0]}} = 0, \quad \frac{\partial E}{\partial r_z^{[0,8]}} = 0, \quad \frac{\partial E}{\partial r_z^{[8,8]}} = 0$$

Thus, the following equations are established:

$$\begin{pmatrix} \sum^{[0,0]} k_{00i}k_{00i} & \sum^{[0,0]} k_{10i}k_{00i} & \sum^{[0,0]} k_{01i}k_{00i} & \sum^{[0,0]} k_{11i}k_{00i} \\ \sum^{[0,0]} k_{00i}k_{10i} & \sum^{[0,0]} k_{10i}k_{10i} & \sum^{[0,0]} k_{01i}k_{10i} & \sum^{[0,0]} k_{11i}k_{10i} \\ \sum^{[0,0]} k_{00i}k_{01i} & \sum^{[0,0]} k_{10i}k_{01i} & \sum^{[0,0]} k_{01i}k_{01i} & \sum^{[0,0]} k_{11i}k_{01i} \\ \sum^{[0,0]} k_{00i}k_{11i} & \sum^{[0,0]} k_{10i}k_{11i} & \sum^{[0,0]} k_{01i}k_{11i} & \sum^{[0,0]} k_{11i}k_{11i} \end{pmatrix} \begin{pmatrix} r_z^{[0,0]} \\ r_z^{[8,0]} \\ r_z^{[0,8]} \\ r_z^{[8,8]} \end{pmatrix} = \begin{pmatrix} \sum^{[0,0]} k_{00i}z_i \\ \sum^{[0,0]} k_{10i}z_i \\ \sum^{[0,0]} k_{01i}z_i \\ \sum^{[0,0]} k_{11i}z_i \end{pmatrix}$$

Here following symbols are used:

$$k_{00i} = (8-x_i)(8-y_i)/8^2$$

$$k_{10i} = x_i(8-y_i)/8^2$$

$$k_{01i} = (8-x_i)y_i/8^2$$

$$k_{11i} = x_i y_i/8^2$$

By solving the above equations, solutions can be obtained.

As shown in FIG. 126B, a composed distortion vector which is made from composition of the distortion vector d(x,y) obtained by the X component and the distortion vector d(x,y) obtained by the Y component is not perfectly consistent with a distortion vector at the position. In order to reduce the inconsistency, the above embodiment should be iterated. The above bilinear interpolation (described in the following equation again) is linear with regard to $r_z^{[0,0]}$, $r_z^{[8,0]}$, $r_z^{[0,8]}$, and $r_z^{[8,8]}$. Therefore, $r_z^{[0,0]}$, $r_z^{[8,0]}$, $r_z^{[0,8]}$, and $r_z^{[8,8]}$ calculated in the calculation following the first calculation are added to $r_z^{[0,0]}$, $r_z^{[8,0]}$, $r_z^{[0,8]}$, and $r_z^{[8,8]}$ calculated in the preceding calculation. Then the obtained $r_z^{[0,0]}$, $r_z^{[8,0]}$, $r_z^{[0,8]}$, and $r_z^{[8,8]}$ are used for distortion correction.

$$z(x,y) = \{r_z^{[0,0]}(8-x)(8-y) + r_z^{[8,0]}x(8-y) + r_z^{[0,8]}(8-x)y + r_z^{[8,8]}xy\}/8^2$$

In order to expand this method into a method in which a plurality of rectangular is used, the above calculation is applied to a plurality of rectangular regions. This will be described using an example in which four rectangular regions ($P_s^{[0,0]}, P_s^{[8,0]}, P_s^{[16,0]}, P_s^{[0,8]}, P_s^{[8,8]}, P_s^{[16,8]}, P_s^{[0,16]}, P_s^{[8,16]}, P_s^{[16,16]}$) are used as shown in FIG. 127.

First, the above equations will be expressed for simplification as follows:

$$\begin{pmatrix} s_{00}^{00} & s_{10}^{00} & s_{20}^{00} & s_{30}^{00} \\ s_{01}^{00} & s_{11}^{00} & s_{21}^{00} & s_{31}^{00} \\ s_{02}^{00} & s_{12}^{00} & s_{22}^{00} & s_{32}^{00} \\ s_{03}^{00} & s_{13}^{00} & s_{23}^{00} & s_{33}^{00} \end{pmatrix} \begin{pmatrix} r_z^{[0,0]} \\ r_z^{[8,0]} \\ r_z^{[0,8]} \\ r_z^{[8,8]} \end{pmatrix} = \begin{pmatrix} s_0^{00} \\ s_1^{00} \\ s_2^{00} \\ s_3^{00} \end{pmatrix}$$

Here, the following symbols are used:

$$s_{00}^{00} = \sum^{[0,0]} k_{00i}k_{00i} \quad s_{10}^{00} = \sum^{[0,0]} k_{10i}k_{00i}$$

$$s_{01}^{00} = \sum^{[0,0]} k_{00i}k_{01i} \quad s_{11}^{00} = \sum^{[0,0]} k_{10i}k_{01i}$$

$$s_{02}^{00} = \sum^{[0,0]} k_{00i}k_{10i} \quad s_{12}^{00} = \sum^{[0,0]} k_{10i}k_{10i}$$

$$s_{03}^{00} = \sum^{[0,0]} k_{00i}k_{10i} \quad s_{13}^{00} = \sum^{[0,0]} k_{10i}k_{11i}$$

$$s_0^{00} = \sum^{[0,0]} k_{00i}z_i$$

$$s_1^{00} = \sum^{[0,0]} k_{10i}z_i$$

$$s_2^{00} = \sum^{[0,0]} k_{01i}z_i$$

$$s_3^{00} = \sum^{[0,0]} k_{11i}z_i$$

-continued $$s_{20}^{00} = \sum^{[0,0]} k_{01i}k_{00i} \quad s_{30}^{00} = \sum^{[0,0]} k_{11i}k_{00i}$$

$$s_{21}^{00} = \sum^{[0,0]} k_{01i}k_{01i} \quad s_{31}^{00} = \sum^{[0,0]} k_{11i}k_{10i}$$

$$s_{22}^{00} = \sum^{[0,0]} k_{01i}k_{10i} \quad s_{32}^{00} = \sum^{[0,0]} k_{11i}k_{01i}$$

$$s_{23}^{00} = \sum^{[0,0]} k_{01i}k_{11i} \quad s_{33}^{00} = \sum^{[0,0]} k_{11i}k_{11i}$$

Here, the suffixes $^{00}$ means the suffix of $\Sigma^{[0,0]}$.

The summation E of square errors of data in the four rectangular regions is calculated by the following equation:

$$E = \sum^{[0,0]} \left[ z_i - \left\{ \begin{array}{c} r_z^{[0,0]}(8-x)(8-y) + r_z^{[8,0]}x(8-y) + \\ r_z^{[0,8]}(8-x)y + r_z^{[8,8]}xy \end{array} \right\} \Big/ 8^2 \right]^2 +$$

$$\sum^{[8,0]} \left[ z_i - \left\{ \begin{array}{c} r_z^{[8,0]}(8-x)(8-y) + r_z^{[16,0]}x(8-y) + \\ r_z^{[8,8]}(8-x)y + r_z^{[16,8]}xy \end{array} \right\} \Big/ 8^2 \right]^2 +$$

$$\sum^{[0,8]} \left[ z_i - \left\{ \begin{array}{c} r_z^{[0,8]}(8-x)(8-y) + r_z^{[8,8]}x(8-y) + \\ r_z^{[0,16]}(8-x)y + r_z^{[8,16]}xy \end{array} \right\} \Big/ 8^2 \right]^2 +$$

$$\sum^{[8,8]} \left[ z_i - \left\{ \begin{array}{c} r_z^{[8,8]}(8-x)(8-y) + r_z^{[16,8]}x(8-y) + \\ r_z^{[8,16]}(8-x)y + r_z^{[16,16]}xy \end{array} \right\} \Big/ 8^2 \right]^2$$

Thus, the following equations are established.

$$MZ = S$$

$$M = \begin{pmatrix} s_{00}^{00} & s_{10}^{00} & 0 & s_{20}^{00} & s_{30}^{00} & 0 & 0 & 0 & 0 \\ s_{01}^{00} & s_{11}^{00}+s_{00}^{80} & s_{10}^{80} & s_{21}^{00} & s_{31}^{00}+s_{20}^{80} & s_{30}^{80} & 0 & 0 & 0 \\ 0 & s_{01}^{80} & s_{11}^{80} & 0 & s_{21}^{80} & s_{31}^{80} & 0 & 0 & 0 \\ s_{02}^{00} & s_{12}^{00} & 0 & s_{22}^{00}+s_{00}^{08} & s_{32}^{00}+s_{10}^{08} & 0 & s_{20}^{08} & s_{30}^{08} & 0 \\ s_{03}^{00} & s_{13}^{00}+s_{02}^{80} & s_{12}^{80} & s_{23}^{00}+s_{01}^{08} & s_{33}^{00}+s_{22}^{80}+s_{11}^{08}+s_{00}^{88} & s_{32}^{80}+s_{10}^{88} & s_{21}^{08} & s_{31}^{08}+s_{20}^{88} & s_{30}^{88} \\ 0 & s_{03}^{80} & s_{13}^{80} & 0 & s_{23}^{80}+s_{01}^{88} & s_{33}^{80}+s_{11}^{88} & 0 & s_{21}^{88} & s_{31}^{88} \\ 0 & 0 & 0 & s_{02}^{08} & s_{12}^{08} & 0 & s_{22}^{08} & s_{32}^{08} & \\ 0 & 0 & 0 & s_{03}^{08} & s_{13}^{08}+s_{02}^{88} & s_{12}^{88} & s_{23}^{08} & s_{33}^{08}+s_{22}^{88} & s_{32}^{88} \\ 0 & 0 & 0 & 0 & s_{03}^{88} & s_{13}^{88} & 0 & s_{23}^{88} & s_{33}^{88} \end{pmatrix}$$

-continued $$Z = \begin{pmatrix} r_z^{[0,0]} \\ r_z^{[8,0]} \\ r_z^{[16,0]} \\ r_z^{[0,8]} \\ r_z^{[8,8]} \\ r_z^{[16,8]} \\ r_z^{[0,16]} \\ r_z^{[8,16]} \\ r_z^{[16,16]} \end{pmatrix}, S = \begin{pmatrix} s_0^{00} \\ s_1^{00} + s_0^{80} \\ s_1^{80} \\ s_2^{00} + s_0^{08} \\ s_3^{00} + s_2^{80} + s_1^{08} + s_0^{88} \\ s_3^{80} + s_1^{88} \\ s_2^{08} \\ s_3^{08} + s_2^{88} \\ s_3^{88} \end{pmatrix}$$

By solving the above equations, solutions can be obtained.

Next, a variation of magnification of the image in the X direction and the Y direction is obtained from the data $(x_i, y_i, z_i)$ located in the neighborhood of the representative distortion vector. In this embodiment, a method in which a variation $a_{mag}$ of the magnification in the X direction is obtained will be described. The part having the variation $a_{mag}$, which is equal to 1, is observed in the same magnification as the central part having no distortion. The part having the variation $a_{mag}$, which is greater than 1, is observed at higher magnification than the central part. $z_i$ is taken as an X component of the distortion vector $d(x,y)$, and $S_c$ is taken as a shift quantity. Thus, the following equation is established:

$$x_i + z_i = a_{mag} x_i + S_c$$

In the case where the number of data is not less than three, this equation should be solved by the least mean square method. A summation E of square errors of data is:

$$E = \sum_i (x_i + z_i - a_{mag} x_i - S_c)^2$$

The least mean square method requires the following equations:

$$\frac{\partial E}{\partial a_{mag}} = 0, \quad \frac{\partial E}{\partial S_c} = 0$$

Then, the following equations are obtained by solving the above equations.

$$a_{mag} \sum_i x_i - S_c = \sum_i (x_i + z_i),$$

$$a_{mag} \sum_i x_i^2 - S_c \sum_i x_i = \sum_i (x_i + z_i) x_i$$

Therefore, the following equation is obtained:

$$a_{mag} = \frac{\sum_i (x_i + z_i) \sum_i x_i - N \sum_i (x_i + z_i) x_i}{\sum_i x_i \sum_i x_i - N \sum_i x_i^2}$$

Here, N means the total number of data. The representative distortion vectors are multiplied by the obtained variation $a_{mag}$ in order to correct the variation of magnification.

FIGS. 128A and 128B show a method in which the distortion correction vector calculation circuit 414 converts the distortion correction vector into a deflection voltage. FIGS. 128A and 128B use the vertical axis as an X position scanned by an electron beam. The origin of the vertical axis means the center of the image. Upper part of the vertical axes means a peripheral part of the image. The horizontal axis is an X deflection voltage. Scale markings on the horizontal axis mean voltages that are set to scanning points.

A stair-like waveform shown by a dotted line in FIG. 128A means an ideal scanning waveform. A stair-like waveform shown by a solid line means scanning waveform having distortion. A vector whose start point is a point on the dotted line at the scanning point, and whose end point is a point on the solid line corresponding to the above point on the dotted line at the scanning point means the X component $r_z^{[8,0]}$ of the representative distortion vector $R_d^{[8,0]}$. In order to simplify the drawing, the representative distortion vector $R_d^{[0,0]}$ at the origin is set to zero.

In order to correct this distortion, an additional voltage $E_{dX}^{[8,0]}$ is added to a voltage, which has a step voltage interval, and which is applied to a scanning point. The additional voltage $E_{dX}^{[8,0]}$ is calculated by the following equation:

$$E_{dX[8,0]} = r_{z[8,0]} a_{mag} E_s$$

Here, a coefficient $a_{mag}$ is the above variation $a_{mag}$, and $E_s$ is the step voltage for moving the electron beam by one scanning point in a part that has no distortion.

In the case where $z_i$ is used by a Y component of the distortion vector $d(x_i, y_i)$, and $y_i$ is used instead of $x_i$, a method of correcting nonlinear image in distortion Y direction can be also performed.

Instead of adding the distortion correction vector calculation circuit 414 to the image generation device 7, a method in which an image is transformed to cancel distortion may be used.

In this embodiment, the number 8 is used for the interval number. The smaller the interval number is, the more accurate the distortion correction vector is. However, representative distortion vector is more inaccurate. Therefore, the interval number should be selected empirically.

According to this embodiment, the method of correcting nonlinear image distortion held by the image generation device 7 generating the image with the large field of view has can be performed automatically and accurately for a short time. Therefore, the field of view can be extended to the portion that is efficiently corrected by using the correction method.

7.3 Method of Correcting Variation of Line Width Depending on Image Position in Pattern Image to-be-Inspected Another one of the most important image distortions is a variation of a line width depending on a position in the image. The variation of the line width is caused by a variation of an electron beam spot size. In order to correct the variation of the line width, a method in which a line width in a pattern image to-be-inspected is corrected by using detected line widths of an image beforehand can be used.

FIG. 129 is a schematic view showing the above method. As shown by circles in FIG. 129, an electron beam spot size in a peripheral portion is wider than an electron beam spot size in a central portion. As a result, an observed line width in the peripheral portion is wider than an observed line width in the central portion. In the case where the electron beam spot size is uniform in each sub-inspection-unit-area, the following method can be used for correcting the changed line widths.

1. A pattern image to-be-inspected corresponding to a part of reference patterns having the same line width and having uniform density is acquired beforehand. The part having periodical patterns such as part of a memory is suitable for the part.

2. The deformation quantity of line widths for each sub-inspection-unit-area is calculated from reference patterns and edges detected from the pattern image to-be-inspected.

3. The changed line widths are corrected by using the deformation quantities of line widths calculated from the above-mentioned step 2 during inspection.

The calculation method and the correction method in the above-mentioned step 2 and step 3 are the same as the methods described in the above-mentioned 5.6 Method of separating pattern deformation quantities into global pattern deformation quantities and local pattern deformation quantities.

The above correction method may be applied to each group that has the same line width. In addition, the above correction method may be applied to areas obtained by dividing a sub-inspection-unit-area.

According to this embodiment, the method of correcting the variation of the line width depending on the image position held by the image generation device 7 generating the image with the large field of view has can be performed automatically and accurately for a short time. Therefore, the field of view can be extended to the portion that is efficiently corrected by using the correction method.

8. Other Methods

8.1 Method of Extracting Region Suitable for Image Adjustment

In a long-term inspection, image adjustment is required. A region suitable for auto contrast brightness adjustment and auto focus adjustment corresponds to a region that includes many horizontal or vertical line segments. If the region that meets the above requirement from the design data is obtained, and the obtained region is used for auto contrast brightness adjustment and auto focus adjustment, each auto adjustment can be efficiently performed. Therefore, it is necessary to provide a method of extracting a region suitable for the above image adjustment.

The method is performed by the following procedure using geometrical information of line segments of the design data and/or using relationship between line segments of the design data that connect or are located closely:

FIG. 130 is a schematic view showing the above method.

1. A size of a rectangular region R used for each auto adjustment is determined. The size of the rectangular region R is empirically determined.

2. The region A used for auto adjustment is determined. This region A is preferably near the inspection area. The region A is larger than the region R.

3. While moving the region R relative to the region A, the total length of the vertical line segments existing within the region in the design data corresponding to the region R is obtained. In the same manner, the total length of the horizontal line segments is obtained. The smaller of the total length of the vertical line segments or the total length of the horizontal line segments is taken as an estimated value. In this example, the total length of the line segments is used as geometrical information.

4. The region R having the largest estimated value of the estimated values obtained in the above-mentioned step 3 is regarded as the optimum region (which includes many horizontal lines and vertical lines).

The above region R is set into the above-mentioned 3.3 Recipe data "11. The region suitable for auto contrast brightness adjustment, auto focus adjustment, and auto astigmatism adjustment". Auto contrast brightness adjustment and auto focus adjustment can be performed timely during inspection using the above registered region R.

A region suitable for auto astigmatism adjustment corresponds to a region that includes many line segments and has the total length in each direction of X direction, Y direction, 45 degrees direction, and 135 degrees direction that is substantially the same length. In this case, the procedure is performed in the same manner as the above except for using the total lengths of 45 degrees direction and 135 degrees direction in addition to the total lengths of X direction and Y direction. If the above region cannot be obtained, partial regions corresponding to ends or corners of the reference pattern may be used. In this case, auto astigmatism adjustment is performed in the following procedure:

First, the region suitable for auto astigmatism adjustment is obtained. As an example, this region is a region that includes partial regions including a left end and a right end as shown in FIG. 131. As another example, this region is a region that includes partial regions including an upper left corner, a lower left corner, an upper right corner, and a lower right corner as shown in FIG. 131. These regions may be replaced with other regions that include partial regions including an upper end and a lower end, for example. If the above regions are obtained, the regions contain omnidirectional edges, and hence such regions are suitable for auto astigmatism adjustment.

The following procedure that is similar to the procedure for obtaining the region suitable for the above auto contrast brightness adjustment and auto focus adjustment is performed. In this example, the procedure that uses upper left corners, lower left corners, upper right corners, and lower right corners will be described with reference to FIG. 132.

1'. A size of a rectangular region R' used for each astigmatism adjustment is determined. The size of the rectangular region R' is empirically determined.

2'. The region A' used for astigmatism adjustment is determined. The region A' is larger than the region R'.

3'. While moving the region R' relative to the region A', the number of the upper left corners existing within the region in the design data corresponding to the region R' is obtained. In the same manner, the number of the lower left corners, the number of the upper right corners, and the number of the lower right corners are obtained. The smallest of the number of the lower left corners, the number of the upper right corners, and the number of the lower right corners is taken as an estimated value. In this example, the number of corners is used as geometrical information.

4'. The region R' having the largest estimated value of the estimated values obtained in the above-mentioned step 3' is regarded as the optimum region (which includes many upper left corners, lower left corners, upper right corners, and lower right corners).

5'. Some corners are thinned out so that the number of the upper left corners, the number of the lower left corners, the number of the upper right corners, and the number of the lower right corners are almost the same.

The corners and their neighborhoods obtained in the above are used as partial regions P.

The rectangular region obtained by the above procedure is set into the recipe. Auto astigmatism adjustment can be performed timely during inspection using the above registered rectangular region. This auto astigmatism adjustment is performed in the following procedure:

1. Auto focus adjustment is performed.
2. The matching between the image and the region R' suitable for auto astigmatism adjustment is performed.
3. The evaluated value of astigmatism is obtained from partial images corresponding to the partial regions P included in the region R'.
4. The above-mentioned step 2 and step 3 are performed while varying a value of astigmatism.
5. A value of astigmatism corresponding to the best evaluated value of astigmatism obtained in the above-mentioned step 4 is determined as the best astigmatism value.

According to the embodiment, the region suitable for image adjustment can be extracted automatically, in the optimum. Further, in the case of the region to-be-recognized as separated regions, automatic adjustment may be more accurately performed than the case in which the whole image is used.

8.2 Method of Selecting the Most Suitable Sub-Inspection-Unit-Area for Matching

In the case where an inspection-unit-area is very large, an inspection-unit-area is divided into a plurality of sub-inspection-unit-areas, and sub-inspection-unit-areas are inspected. In this case, if distortion and rotation of a pattern image to-be-inspected can be ignored, matching of the inspection-unit-area can be performed by performing matching of one of the sub-inspection-unit-areas. Therefore, in this embodiment, a method of selecting the most suitable sub-inspection-unit-area for matching will be described.

The most suitable sub-inspection-unit-area for matching is a sub-inspection-unit-area that has the biggest evaluation value of evaluation values of all the sub-inspection-unit-areas. The evaluation value is obtained from the following calculation:

1. Unique patterns are obtained by the method shown in FIGS. 51A and 51B.
2. The total lengths of four directional line segments that are horizontal, vertical, inclined at 45 degrees, and inclined at 135 degrees are calculated by classifying the line segments constituting the unique patterns in four directions.
3. The total length of one of four directional line segments that has the second longest length is selected as the evaluation value. The reason for using the second longest length is that at least two directional line segments are required to exist sufficiently.

In FIG. 133, two sub-inspection-unit-areas are shown. Here, dotted lines are reference patterns, and solid lines are unique patterns. The sub-inspection-unit-area shown on the left-hand side of FIG. 133 has many vertical line segments, but does not have many horizontal line segments. On the other hand, the sub-inspection-unit-area shown on the right-hand side of FIG. 133 has many vertical line segments and relatively many horizontal line segments. Although the total length of line segments constituting the sub-inspection-unit-area shown on the left-hand side is longer than the total length of line segments constituting the sub-inspection-unit-area shown on the right-hand side, the evaluation value of the sub-inspection-unit-area shown on the left-hand side is larger than the evaluation value of the sub-inspection-unit-area shown on the right-hand side.

In the above description, calculation is performed using two-dimensional unique patterns. However, this calculation requires a huge calculation time and is disadvantageous. Thus, a method that requires a less calculation time even if calculation is not perfectly accurate has been necessary. This embodiment will be described with reference to FIG. 134.

The most suitable sub-inspection-unit-area for matching is a sub-inspection-unit-area that has the biggest evaluation value of evaluation values of all the sub-inspection-unit-areas. The evaluation value is obtained from the following calculation:

1. A one-dimensional data is obtained by classifying the line segments constituting the reference patterns into four directional line segments that are horizontal, vertical, inclined at 45 degrees, and inclined at 135 degrees.
2. Unique patterns in the one-dimensional data are obtained by the same method as the method shown in FIGS. 51A and 51B. Solid lines shown in the one-dimensional data of the horizontal line segment and the vertical line segment in FIG. 134 means unique patterns.
3. The total length of the unique patterns in one-dimensional data of the horizontal line segment is calculated. In the same manner, the total lengths with regard to the vertical line segment, the 45 degrees inclined line segment, and the 135 degrees inclined line segment are calculated.
4. The above total length of the unique patterns that has the second longest length is selected as the evaluation value.

According to this method, matching can be performed by using the sub-inspection-unit-area that is the most suitable for matching, in the case where the inspection-unit-area is divided into the sub-inspection-unit-areas. Thus, the matching using the sub-inspection-unit-area is faster than the matching using the whole inspection-unit-area.

8.3 Inspection Method Using High-Magnification Image and Low-Magnification Image In the case of an SEM with a function that enables a part of a low-magnification image to be observed at high magnification electromagnetically, a pattern that cannot be observed in a full view at high magnification can also be inspected. That is, this means that the edge position obtained at high magnification can be converted correctly into the edge position obtained at low magnification. A similar relation may be realized with a high-precision stage. For example, in FIG. 135, if positions 182 and 183 on a pattern 181 of the pattern image to-be-inspected are obtained using a high-magnification images 184 and 185, respectively, these positions are converted into the positions on a low-magnification image 187, and a width 186 of the pattern 181 of the pattern image to-be-inspected is obtained; the width 186 can be inspected more accurately than that as inspected only using the low-magnification image 187.

8.4 Inspection Method of Pattern to-be-Inspected Affected by Pattern of Preceding Process In the case where there is a pattern of a lower layer formed in the preceding process beneath a pattern to-be-inspected, part of the pattern to-be-inspected where there is a pattern of the lower layer formed in the preceding process and part of the pattern to-be-inspected where there is no pattern of the lower layer formed in the preceding process have different shapes, and are sometimes observed differently. In order to solve this problem, it is necessary to provide a method in which inspection is performed by using different inspection parameters according to the part of the pattern to-be-inspected where there is the pattern of the lower layer formed in the preceding process and the part of the pattern to-be-inspected where there is no pattern of the lower layer formed in the preceding process.

FIG. 136 is the schematic view showing the case where there is a pattern of a lower layer formed in the preceding process beneath a pattern to-be-inspected. In such case, inspection is performed by separating a inspection area into the inside part, the boundary part, and the outside part of the pattern of the preceding process. The inside part of the pattern of the preceding process is recognized by the same manner as the reference pattern C described in the above-mentioned 5.3.1 Method of inspecting gate line width. The boundary part of the pattern of the preceding process is recognized as a band-shaped part whose center line is the reference pattern of the preceding process and whose width has a predetermined value that is determined empirically. The outside part of the pattern of the preceding process is the remainder of parts.

The inside part and the outside part of the pattern of the preceding process may have the different contrast due to an effect of the pattern of the preceding process. In addition, the pattern to-be-inspected is formed in different widths due to height difference of the top surface of the lower layer.

In order to cancel the effect, position correction quantities and allowable deformation quantities are set separately to line segments in the inside part of the patterns of the preceding process and line segments in the outside part of the pattern of the preceding process respectively. If the boundary part is suitable for edge detection, a different position correction quantity and an allowable deformation quantity are set to the boundary part. If the boundary part is not suitable for edge detection, this boundary part is excluded from the inspection part.

According to this method, probability of detecting a defect (nuisance defect) that is not necessary to be recognized as a defect shown in the grid-like parts of FIG. 136 can be reduced.

8.5 Display Method of Superimposing Defect Information on Information Corresponding to it When defect information, which includes a defect feature and defect image, is displayed together with at least one of the design data, mask data (data created by adding OPC pattern to the design data), a feature obtained from a lithography simulator using the design data, and data related to the design data which are corresponding to the defect information, it becomes easy to recognize tendencies for defects to be generated. Therefore, it is necessary to provide a method of displaying the related information and the inspection result together.

The followings are examples of tendencies for defects to be generated:

1. Many defects are detected in dense patterns in the design data.
2. Many defects are detected in the specific OPC pattern.
3. Many defects are detected in shrunken parts obtained by the lithography simulator.

In the case of wafer inspection, it is effective to use a photomask image corresponding to the defect. By comparing the defect image to the photomask image, it can be easily recognized whether this defect has been caused by the photomask, In order to realize the above display, the above data related to the design data is related to the defect information. The above relationship is performed by the following procedure:

1. An edge of the reference pattern is added to information of the design data. As the above additional information, a cell name of a polygon in the design data, to which the edge belongs, a line segment number of the polygon to which the edge belongs, coordinate values of an initial point and a terminal point of a line segment to which the edge belongs, and coordinate values of a point on a line segment corresponding to the edge can be used.

2. When a defect is detected, information of the design data added to the edge of the reference pattern used in the detection is attached to an inspection result.

3. By using the attached information of the design data, the above data related to the design data is retrieved. Even if the above data related to the design data is described by the different coordinate from the design data, the relationship can be performed by using the cell name of the polygon and the line segment number.

FIG. 137 shows an example of a display of superimposing the design data and mask data on a defect image, and FIGS. 138A, 138B, 138C, and 138D show examples of displaying detected defects as diagrams. This example uses the following methods for display:

1. A method of displaying a polygon which is an outline of a defect as shown in FIG. 138A
2. A method of displaying a rectangle which represents the minimum bounding rectangles of dent defects and projection defects as shown in FIG. 138B. In the case of the projection defects, it is possible to add short line segments at corners of the rectangle in order to distinguish the projection defects from the dent defects.
3. A method of displaying rectangles whose sides represent line widths of defects having abnormal line widths as shown in FIGS. 138C and 138D.

In the above methods, the inspection result is directly used for displaying. However, a method in which a defect is converted into the design data and is displayed as shown in FIG. 139 can be used. This method is performed by the following procedure:

1. The polygons obtained by FIGS. 138A, 138B, 138C, and 138D are stored into the design data.
2. In the case where the design data have a layer for describing an actual pattern and a layer for describing a pattern that does not exist, the polygons obtained by FIGS. 138A, 138B, 138C, and 138D are stored into the layer for describing a pattern that does not exist.
3. In the case where the design data have a plurality of layers for describing a pattern that does not exist, the polygons can be stored into the specified layers for every dent defect, projection defect, and defect having the abnormal line width. FIG. 139 shows an example in which the design data is stored into the layer 1, the dent defects, the projection defects are stored into the layer 12, and the defects having the abnormal line widths are stored into the layer 13.

This embodiment is suitable for modification of design because inspection result can be reviewed by using a apparatus that handles the design data.

The superimposition display described in the above can be replaced with a parallel display. The parallel display is performed in the same manner.

According to this embodiment, a cause of generation of defects can be easily specified and design can be easily modified, because it becomes easy to recognize tendencies for defects to be generated.

9. Inspection Methods of Specimen Liable to Cause the Electrification Phenomenon Two inspection methods of a specimen liable to cause the electrification phenomenon such as a resist specimen will be described. One of the methods is a method in which a specimen is coated with a carbon film. The other of the method is an inspection method of using only a central part of an image. Although the former method requires the coating process, an image can be acquired by high throughput scanning conditions. On the other hand, the latter does not require the coating process. However, high throughput inspection cannot be performed.

9.1 Method of Coating Resist Specimen with Carbon Film

First, a lithography process of a semiconductor device inspected by the apparatus for pattern inspection according to the present invention will be described in detail. FIGS. 140A through 140F are schematic views showing a lithography process of a semiconductor device. A typical example of a single layer process is shown in FIGS. 140A through 140F. A semiconductor device is fabricated by repeating the single process in order to form multiple layers.

As shown in FIG. 140A, an oxide film ($SiO_2$) 502 is formed on a silicon substrate 501 in a thermal oxidation process. Next, as shown in FIG. 140B, a resist film 503 is coated onto the oxide film 502 in a resist coat process. Then, as shown in FIG. 140C, the resist film 503 is partially exposed to ultraviolet rays penetrating a photomask 504 by an exposure system (a stepper) 505 in an exposure process.

Next, as shown in FIG. 140D, the resist film 503 is developed in a development process, whereby the exposed portions of the resist film 503 are removed. Thereafter, as shown in FIG. 140E, the oxide film 502 is removed at the portions where the resist film 503 has been removed in an etching process. Then, as shown in FIG. 140F, the resist film 503 is stripped in a resist stripping (ashing) process.

In the above lithography process, patterns formed in the resist film 503 after the development process shown in FIG. 140D are inspected by the apparatus for pattern inspection described in the present invention. Specifically, the apparatus for pattern inspection inspects whether the patterns are formed in the resist film 503 in conformity with the design data.

The apparatus for pattern inspection inspects the patterns formed in the resist film 503 using an electron beam (charged particle beam). When the resist film 503 is irradiated with the electron beam in the state shown in FIG. 140D, the electrification phenomenon occurs because the resist is generally composed of high polymer that is insulation. Therefore, a shape of the pattern in a pattern image to-be-inspected is deformed by the electrification phenomenon, because the electron beam is deflected by a top surface of the resist film 503 that is partially charged, and the electron beam is applied to an inaccurate position. Therefore, in this embodiment, before patterns formed in the resist film 503 are inspected by the electron beam, the patterns formed in the resist film 503 are coated with a carbon film in order not to cause the electrification phenomenon.

Specifically, as shown in FIG. 141, a carbon film 506 is coated onto the resist film 503 and the exposed oxide film 502 formed by removing the resist film 503. By coating the carbon film 506, when the electron beam is irradiated, the electron beam flows through the carbon film 506 to the silicon substrate 501. Consequently, the electron beam flows from the silicon substrate 501 to ground, and hence the electrification phenomenon can be prevented.

In this case, thickness of the carbon film 506 is preferably in the range of 5 nm to 20 nm, more preferably approximately 10 nm, although the thickness of the carbon film 506 differs depending on a line width of the pattern. If the thickness of the carbon film 506 is less than 5 nm, the carbon film 506 has relatively poor continuity. If the thickness of the carbon film 506 exceeds 20 nm, the carbon film may project toward the portion of the space of the pattern, and hence the pattern may be recognized as deformation and as a defect. Therefore, it is desirable that the thickness of the carbon film 506 is in the range of 5 nm to 20 nm. The carbon coating can be performed by using the vacuum deposition method, the sputter method, and the like. In this embodiment, a method in which the carbon sputtering coating apparatus is used for carbon coating will be described.

FIG. 142 is a schematic view showing a semiconductor wafer inspection system that integrates the apparatus for pattern inspection according to the present invention and a carbon sputtering coating apparatus. As shown in FIG. 142, a carbon sputtering coating apparatus 510 is provided adjacent to the apparatus for pattern inspection shown on the right-hand side. A wafer-loading robot 515 and a preparatory evacuation chamber 517 are provided between the carbon sputtering coating apparatus 510 and the wafer-loading device 340 of the apparatus for pattern inspection. A wafer cassette 516 that houses a plurality of semiconductor wafers W is placed on the wafer-loading robot 515. A semiconductor wafer W is taken out from the wafer cassette 516 and is loaded into the carbon sputtering coating apparatus 510 by the wafer-loading robot 515. Further, the wafer-loading robot 515 can load the semiconductor wafer W coated by the carbon sputtering coating apparatus 510 into the wafer-loading device 340 of the apparatus for pattern inspection.

In this embodiment, the carbon sputtering coating apparatus 510 comprises a sputtering apparatus, and the carbon sputtering coating apparatus 510 has a holder 511 for holding a semiconductor wafer W, a carbon rod 512 provided in order to face the semiconductor wafer W held by the holder 511, and a sputtering control apparatus 513 for controlling sputtering. The preparatory evacuation chamber 517 is provided to maintain vacuum in the carbon sputtering coating apparatus 510 when the semiconductor wafer W is loaded into the carbon sputtering coating apparatus 510 or is unloaded from the carbon sputtering coating apparatus 510. The preparatory evacuation chamber 517 also serves to allow new semiconductor wafers W to be in a standby condition while the semiconductor wafer W is processed in the carbon sputtering coating apparatus 510.

In the semiconductor wafer inspection system shown in FIG. 142, the semiconductor wafer W housed in the wafer cassette 516 is loaded into the carbon sputtering coating apparatus 510 through the preparatory evacuation chamber 517. At this time, the carbon sputtering coating apparatus 510 and the preparatory evacuation chamber 517 are evacuated, and the carbon sputtering coating apparatus 510 and the preparatory evacuation chamber 517 have the same pressure. The semiconductor wafer W is loaded into the carbon sputtering coating apparatus 510, and the semiconductor wafer is held by the holder 511, and then a gate valve (not shown) provided between the preparatory evacuation chamber 517 and the carbon sputtering coating apparatus 510 is closed. Then, the semiconductor wafer W is coated with carbon.

By this carbon coating process, the carbon film 506 is coated onto the resist film 503 and the exposed oxide film 502 formed by removing the resist film 503 as shown in FIG. 141. In this manner, the semiconductor wafer W coated with the carbon film 506 is unloaded from the carbon sputtering coating apparatus 510 by the wafer-loading robot 515, and is loaded into the wafer-loading device 340 through the preparatory evacuation chamber 517. Then, the semiconductor wafer W is loaded into the specimen chamber 320 by the wafer-loading device 340, and is then inspected by the apparatus for pattern inspection. In the apparatus for pattern inspection, the semiconductor wafer W is irradiated with the electron beam, and the electron beam flows to the silicon substrate 501 through the carbon film 506. Consequently, the electron beam flows from the silicon substrate 501 to ground, and hence the electrification phenomenon can be prevented.

According to the semiconductor wafer inspection system shown in FIG. 142, the carbon coating process and the pattern inspection process can be continuously performed. Therefore, the inspection process can be speeded up, and the throughput can be improved. Further, the coating process and the pattern inspection process can be automated.

Further, accuracy of edge detection is improved. In the case where there is no carbon film, as shown in FIG. 143A, when the pattern image to-be-inspected is acquired by the electron beam, the insides of the patterns and grounding are bright non-uniformly and unstably because of the electrification phenomenon. The electrification phenomenon occurs non-uniformly and unstably depending on pattern density, and secondary electron emission rates of the inside of pattern and grounding differ. As a result, edges cannot be detected accurately. In the case where the carbon film is coated onto the same specimen, as shown in FIG. 143B, parts of edges have uniform edge effect and brightness of grounding is uniform, because the specimen surface is equipotential. By the above effect, parts of edges are bright uniformly and there is a uniform contrast between the edge parts and grounding. As a result, edges can be detected accurately.

9.2 Inspection Method of Using Only Central Part of Image

In the case where a specimen liable to cause the electrification phenomenon is inspected, a peripheral part of a pattern image to-be-inspected is distorted. A central part of the image to-be-inspected is electrified equipotentially. However, a peripheral part of the image to-be-inspected is electrified non-uniformly at a location where an electron beam is applied and a location where the electron beam is not applied, and hence this distortion can be caused. Further, when part of the specimen electrified once, this electrification is kept for a long time.

As shown in FIG. 144, an inspection method of using only a central part of an image can be used. In FIG. 144, rectangles shown in dotted lines are inspection-unit-areas, and rectangles shown in solid lines are expanded inspection-unit-areas. The expanded inspection-unit-areas are scanned, and then image parts corresponding to the inspection-unit-areas are inspected.

However, in this method, the expanded inspection-unit-areas are electrified and cannot be inspected more than once. Thus, as shown in FIG. 144, inspection results are obtained from the upper left die, the upper right die, the lower left die, and the lower right die, respectively, then inspection results obtained from the four dies are merged, and an inspection result with regard to the whole inspection area is obtained.

According to this embodiment, the patterns formed in the resist film that are formed on a silicon substrate can be inspected without being subjected to special treatment.

10. Modifications of Embodiments of Present Invention

While the embodiments of the present invention have been described above, various modifications can be used. For example, while a scanning electron microscope is used in the embodiments as the image generation device 7 for scanning a pattern to-be-inspected with an electron beam (charged particle beam) to obtain an image of the pattern to-be-inspected, the present invention is also applicable to any of various other scanning microscopes including a scanning focus ion beam microscope, a scanning laser microscope, and a scanning probe microscope. The scanning directions are not limited to those at 0 degree and 90 degrees, but may be those with desired small angles added, e.g., 5 degrees and 95 degrees.

It is possible to modify this embodiment into an off-line input processing system in which the acquired image data is inputted through an external input device such as the magneto-optical disk and the magnetic tape or through an LAN (Local Area Network) such as the Ethernet.

The image generation method may be replaced by any method other than the method described in this embodiment, and the reference pattern may be transferred from other type of data. The reference pattern can be generated during inspecting, instead of being registered with the recipe database 22.

Moreover, in this embodiment, the defect information and the like is outputted to the display device 5 and the printer 6, but may be outputted to an image database, a simulator, a recording medium, and the like, or may be transmitted (outputted) to other computers through a network.

Furthermore, it is possible to construct a hybrid method in which a typical die, which means a semiconductor device, in a wafer is inspected by the method according to the present invention, and other dies are inspected by the die-to-die comparison method.

As described above, the present invention offers the following advantages:

1. The repeated defects can be automatically recognized using defect information obtained from a plurality of semiconductor devices. As a result, huge simple labor of an operator is made unnecessary, and the defect recognition inaccuracy caused by an operator's mistake can be prevented. In addition, in the case where the specimen is contaminated by the carbon coating or the like, contaminations are not detected as a repeated defect, because the contaminations seldom or never exist at the same location of different devices.

2. The region inspection can be realized. The region inspection method means an inspection method using edges facing each other.

Namely, inspection of a line width of a line-shaped pattern, an average line width of a line-shaped pattern, a space width of a line-shaped pattern, and an average space width of a line-shaped pattern that can not be performed by local inspection can be performed automatically. Moreover, inspection of a line width of a curvilinear-shaped pattern, an average line width of a curvilinear-shaped pattern, a space width of a curvilinear-shaped pattern, an average space width of a curvilinear-shaped pattern, and inspection of a gate line width can be performed automatically.

By using the above automation method, the above inspection for controlling a semiconductor device process can be performed without operator's operation. Further, inspection for a wide area that cannot be performed by an operator can be performed. Especially, inspection of a gate width of the entire semiconductor device can contribute to performance improvement.

Moreover, defect detection capability and defect recognition accuracy can be improved, because the above-mentioned region inspections use an average value of a plurality of defect information.

Moreover, the method of inspecting a part that is liable to cause an open or bridge defect can be realized. According to this method, an open or bridge defect observed as a weak contrast can be recognized. Further, defect-classes that indicate an open or bridge defect can be used.

As other advantage, the method in which only a neighboring portion corresponding to a region for the region inspection is scanned can shorten image-acquiring time. Further, the edge detection accuracy can be improved because the scanning direction and the direction of the edge are perpendicular to each other.

3. By using a result of the Boolean AND operations on a polygon in a polycrystalline silicon layer of the design data and an active layer (preceding process layer of the polycrystalline silicon layer) of the design data, a reference pattern for a gate line width inspection or an end-cap inspection can be obtained. According to this method, the gate portion is automatically extracted, and the end-cap of the gate can be inspected more strictly, because an allowable deformation, which is different from an allowable deformation of a simple end, can be automatically set to the end-cap of the gate.

Further, by using a result of the Boolean AND operations on a polygon in a wiring layer of the design data and a polygon in a contact hole/via hole layer, an allowable deformation quantity of an end shrinkage is adaptively set according to a margin which an end to be connected to a contact hole/via hole has. By using the above result of the Boolean AND operations, a contact-area of a contact hole/via hole with an end of a wiring layer can be calculated.

4. A correction pattern as a kind of OPC pattern is added to mask data in order to correct a pattern. The correction pattern is located adjacent to the pattern to-be-inspected, and should not be formed on a wafer. However, the correction pattern might be formed as a defect. The method of inspecting such a correction pattern that should not be formed as a pattern to-be-inspected can be realized by applying the edge detection 5. By obtaining a statistic from an inspection result in each divided inspection area and displaying the obtained statistic as a distribution diagram, pattern deformation quantities over the entire semiconductor device can be visually grasped. Thus, stepper aberration or the like can be recognized.

6. Deformation quantities of an image of the pattern to-be-inspected are detected as linear values, and are corrected. As a result, the deformation quantities, which should not be detected as a defect, can be ignored, so that generating false defects can be prevented.

7. The methods of correcting image distortions held by the image generation device generating the image with the large field of view has can be performed automatically and accurately for a short time. Thus line widths, which are changed depending on an image position due to a variation of electron beam spot size, can be corrected. As a result, the field of view can be extended to the portion that is efficiently corrected by using the correction methods.

8. By separating a global deformation quantity of a pattern and a local deformation quantity of the pattern, the number of defects can be reduced. As a result, important defects can be detected fully, and generation of nuisance defect can be reduced.

9. In the case where patterns made of an ArF resist are inspected by a scanning electron microscope any number of times, the patterns are shrunk gradually. However, this shrinkage can be ignored, because the same portion is inspected only twice. Therefore, a variation of a measurement value of a line width caused by a gradual variation of a beam spot size can be corrected, even if the above patterns are inspected.

10. By classifying defects based on geometrical information of a reference pattern, information of the design data, or information of data related to the design data, tendencies for defects to be generated can be easily grasped. Further, cause of generation of defects can be easily specified.

11. Even if there are many defects having the same defect-class and there are few defects having other defect-class, much more kinds of images can be registered.

12. Defects having the same defect-class that are frequently generated and defects having the same defect-class that are occasionally generated are reinspected fully.

13. The method of grouping based on a feature of the reference pattern corresponding to the defect and its neighborhood can be realized. As a result, tendencies for defects to be generated such as "many defects generated at dense patterns which have thin vertical lines" can be easily grasped as a whole. Moreover, the defect can be classified for every reference pattern of the similar feature. Further, cause of generation of defect can be easily specified.

14. If a distance between two line segments that face each other closest together is shorter than a predetermined distance, the two line segments require signal intensity correction for canceling effects of phenomena caused by a variation of generation rate and capture rate of secondary charged particles. If a distance between two line segments that face each other closest together is longer than another predetermined distance, the two line segments require signal intensity correction. In order to correct the signal intensity, by correcting a position of the line segment of the reference pattern or setting an allowable deformation quantity individually, and hence these effects of the phenomena can be reduced.

15. A region suitable for image adjustment can be recognized automatically and in the optimum by extracting a region based on geometrical information of line segments of the design data or relationship between line segments of the design data that are connected together or are located closely. Further, in the case of the region to-be-recognized as separated regions, automatic adjustment may be more accurately performed than the case in which the whole image is used.

16. The design data is mostly composed of horizontal lines and vertical lines. By using this characteristic of the design data, it is possible to perform matching using projection data obtained by projecting an edge of a reference pattern on the horizontal and vertical axes, and projection data obtained by projecting an edge of an image of a pattern to-be-inspected on the horizontal and vertical axes. By using this method, matching can be performed with shifting the reference pattern at sporadic pixel unit intervals, instead of shifting every pixel. Thus, the calculation time is greatly shortened.

17. It is possible to perform matching of a boundary between a region where the same patterns are periodically arranged and other regions, because negative patterns give a huge penalty for an evaluation value, in the case of shifting from the optimum matching position by one period.

Here, a negative pattern is recognized as follows:

Reference patterns which exist on the boundary of periodical patterns is recognized as a unique pattern, the unique pattern is shifted by one period, in the case where there is no reference pattern in the neighborhood of the shifted unique pattern, the shifted unique pattern is recognized as a negative pattern.

18. A calculation time for matching of hole patterns or island patterns is longer than a calculation time for matching of line-shaped patterns, because the hole patterns or the island patterns are smaller and more numerous than the line-shaped patterns. In order to solve this problem, the matching method using condensed information obtained from a plurality of edges can be realized. The method is performed more rapidly than a method using edges individually. Moreover, calculation cost is reduced greatly.

19. A matching method robust against non-uniform image brightness distribution due to electrification phenomenon or the like can be realized. In the method, a difference histogram made from histograms with regard to the inside and outside of the hole pattern or the island pattern is used as the evaluation value.

20. In the case where an inspection-unit-area is divided into sub-inspection-unit-areas, matching can be performed using a sub-inspection-unit-area that is the most suitable for matching, and can be performed faster than the matching using the whole inspection-unit-area.

21. In the case where there is a pattern of a lower layer formed in the preceding process beneath a pattern to-be-inspected, part of a pattern to-be-inspected where there is a pattern of the lower layer formed in the preceding process and part of a pattern to-be-inspected where there is no pattern of the lower layer formed in the preceding process can be inspected by using different inspection parameters. Thus, the probability of detecting a nuisance defect can be greatly reduced.

22. One of the design data, mask data (data created by adding OPC pattern to the design data), a feature obtained from simulation using the design data, and data related to the design data is related to the inspection result. By displaying the related information and the inspection result together, it becomes easy to recognize tendencies for defects to be generated. As a result, cause of generation of defects can be easily specified and design can be easily modified.

23. In a lithography process, before patterns formed in a resist film on a silicon substrate are inspected using an electron beam (charged particle beam), the patterns formed in a resist film are coated with a carbon film. By coating the carbon film, when the electron beam is irradiated, the electron beam flows through the carbon film to the silicon substrate. Consequently, the electron beam flows from the silicon substrate to ground, and hence the electrification phenomenon can be prevented and a pattern image having no deformation can be obtained.

24. In a lithography process, patterns formed in a resist film on a silicon substrate can be inspected by using an electron beam scanning method without being subjected to special treatment. In the inspection method, only the central part of an image electrified equipotentially is inspected.

25. In order to obtain an image of a pattern to-be-inspected, the pattern may be scanned with a minimum electron beam (charged particle beam), and hence the image of the pattern to-be-inspected can be obtained in a minimum time.

26. An area that can be scanned is utilized at maximum, thus allowing a wider block to be represented by as few smaller blocks as possible. Further, for preventing reduction of accuracy to detect an edge, which depends on the scanning direction, an image can be acquired according to an optimum condition using a reference pattern.

27. Difference between image qualities in the X and Y directions can be reduced to the utmost by changing scanning paths in order to acquire information between scanning lines, making scans twice, or filtering.

28. A deformation of a profile due to the electrification phenomenon of a wafer can be reduced, thus it is realized to improve the edge detection accuracy. Further, an image can be acquired at a high speed by scanning only an edge that is most important for measurement, rather than making a raster scan over the entire pattern to acquire data.

29. A rotated image can be acquired without lowering of image quality due to interpolation, and hence the detection accuracy of the edge can be prevented from being lowered.

What is claimed is:

1. A pattern inspection apparatus for inspecting a pattern to-be-inspected by using an image of said pattern to-be-inspected and data for fabricating said pattern to-be-inspected, said pattern inspection apparatus comprising:
   an image generation device configured to generate said image of said pattern to-be-inspected; and
   a memory storing a plurality of machine readable instructions that when executed perform the steps of:
   (a) storing in said memory a reference pattern representing one or both of (i) one or more line segments, and (ii) one or more curves, said reference pattern generated from said data;
   (b) storing in said memory detected edges of said image;
   (c) inspecting said pattern to-be-inspected by comparing said detected edge to at least one of said line segment and said curve of said reference pattern to generate defect information; and
   (d) recognizing repeated defects from said defect information of corresponding inspection areas of each of a plurality of semiconductor devices fabricated using said data.

2. The pattern inspection apparatus according to claim 1, wherein said defect information is generated from the entire inspection area in a first of said semiconductor devices, and from at least a part of the inspection area of another of said semiconductor device corresponding to a location and neighborhood of at least one defect identified within said defect information generated for said first semiconductor device.

3. A pattern inspection apparatus for inspecting a pattern to-be-inspected by using an image of said pattern to-be-inspected and data for fabricating said pattern to-be-inspected, said pattern inspection apparatus comprising:
   an image generation device configured to generate said image of said pattern to-be-inspected; and
   a memory storing a plurality of machine readable instructions that when executed perform the steps of:
   (a) storing in said memory a reference pattern representing one or both of (i) one or more line segments, and (ii) one or more curves, said reference pattern generated from at least one of (a) geometrical information of line segments of said data, and (b) relationships between line segments, of said data, that connect or are located closely together, and Boolean operations performed on a first polygon in a layer to-be-inspected of said data and a second polygon in a layer related to said layer;
   (b) storing in said memory detected edges of said image; and
   (c) inspecting said pattern to-be-inspected by comparing said detected edge to at least one of said line segment and said curve of said reference pattern to generate defect information.

4. A pattern inspection apparatus for inspecting a pattern to-be-inspected by using an image of said pattern to-be-inspected and data for fabricating said pattern to-be-inspected, said pattern inspection apparatus comprising:
   an image generation device configured to generate said image of said pattern to-be-inspected; and
   a memory storing a plurality of machine readable instructions that when executed perform the steps of:
   (a) storing in said memory a reference pattern representing one or both of (i) one or more line segments, and (ii) one or more curves, said reference pattern generated from at least one of (a) geometrical information of line segments of said data, and (b) relationships between line segments, of said data, that connect or are located closely together;
   (b) storing, in said memory, detected edges of said image; and
   (c) inspecting said pattern to-be-inspected by comparing said detected edge with at least one of said line segment and said curve of said reference pattern to generate defect information, said inspecting identifying an edge in a direction that differs from a direction of said detected edge to determine whether a defect of the defect information is an open or bridge defect.

5. A pattern inspection apparatus for inspecting a pattern to-be-inspected by using an image of said pattern to-be-inspected and data for fabricating said pattern to-be-inspected, said pattern inspection apparatus comprising:

an image generation device configured to generate said image of said pattern to-be-inspected; and a memory storing a plurality of machine readable instructions that when executed perform the steps of:

(a) storing in said memory a reference pattern representing one or both of (i) one or more line segments, and (ii) one or more curves, said reference pattern generated from said data;

(b) storing, in said memory, detected edges of said image; and (c) inspecting said pattern to-be-inspected by comparing said detected edge to at least one of said line segment and said curve of said reference pattern to generate defect information, said inspecting determining an inspection parameter based upon a result of Boolean operations on (a) a polygon in said data with respect to a process at the time of said inspection and (b) a polygon in said data with respect to a process related to said process at the time of said inspection.

6. A pattern inspection apparatus for inspecting a pattern to-be-inspected by using an image of said pattern to-be-inspected and data for fabricating said pattern to-be-inspected, said pattern inspection apparatus comprising:

an image generation device configured to generate said image of said pattern to-be-inspected; and a memory storing a plurality of machine readable instructions that when executed perform the steps of:

(a) storing in said memory a reference pattern representing one or both of (i) one or more line segments, and (ii) one or more curves, said reference pattern generated from said data and a correction pattern added to said data;

(b) storing, in said memory, detected edges of said image;

(c) inspecting said pattern to-be-inspected by comparing said detected edge to at least one of said line segment and said curve of said reference pattern to generate defect information; and (d) determining a correspondence between said correction pattern and said pattern to-be-inspected to identify patterns that should not be formed.

7. A pattern inspection apparatus for inspecting a pattern to-be-inspected by using an image of said pattern to-be-inspected and data for fabricating said pattern to-be-inspected, said pattern inspection apparatus comprising:

an image generation device configured to generate said image of said pattern to-be-inspected; and a memory storing a plurality of machine readable instructions that when executed perform the steps of:

(a) storing in said memory a reference pattern representing one or both of (i) one or more line segments, and (ii) one or more curves, said reference pattern generated from said data;

(b) storing, in said memory, detected edges of said image;

(c) inspecting said pattern to-be-inspected by comparing said detected edge to at least one of said line segment and said curve of said reference pattern to generate defect information; and (d) determining deformation quantities that are separated into global pattern deformation quantities and local pattern deformation quantities.

8. A pattern inspection apparatus for inspecting a pattern to-be-inspected by using an image of said pattern to-be-inspected and data for fabricating said pattern to-be-inspected, said pattern inspection apparatus comprising:

an image generation device configured to generate said image of said pattern to-be-inspected; and a memory storing a plurality of machine readable instructions that when executed perform the steps of:

(a) storing in said memory a reference pattern representing one or both of (i) one or more line segments, and (ii) one or more curves, said reference pattern generated from said data;

(b) storing, in said memory, detected edges of said image;

(c) inspecting said pattern to-be-inspected by comparing said detected edge to at least one of said line segment and said curve of said reference pattern to generate defect information; and (d) determining a divided inspection area to be inspected;

wherein said divided inspection area is inspected to obtain a first inspection result at a first time, and said divided inspection area is inspected to obtain a second inspection result during inspection at a later time, and then a time-dependence variation of said image generation device is corrected by using said first inspection result and said second inspection result.

9. A pattern inspection apparatus for inspecting a pattern to-be-inspected by using an image of said pattern to-be-inspected and data for fabricating said pattern to-be-inspected, said pattern inspection apparatus comprising:

an image generation device configured to generate said image of said pattern to-be-inspected; and a memory storing a plurality of machine readable instructions that when executed perform the steps of:

(a) storing in said memory a reference pattern representing one or both of (i) one or more line segments, and (ii) one or more curves, said reference pattern generated from said data;

(b) storing, in said memory, detected edges of said image;

(c) inspecting said pattern to-be-inspected by comparing said detected edge to at least one of said line segment and said curve of said reference pattern to generate defect information; and (d) determining defect-classes of said defect information based upon one of (a) geometrical information of said reference pattern, (b) information of said data, and (c) information of data related to said data.

10. A pattern inspection apparatus for inspecting a pattern to-be-inspected by using an image of said pattern to-be-inspected and data for fabricating said pattern to-be-inspected, said pattern inspection apparatus comprising:

an image generation device configured to generate said image of said pattern to-be-inspected; and a memory storing a plurality of machine readable instructions that when executed perform the steps of:

(a) storing in said memory a reference pattern representing one or both of (i) one or more line segments, and (ii) one or more curves, said reference pattern generated from said data;

(b) storing, in said memory, detected edges of said image;

(c) inspecting said pattern to-be-inspected by comparing said detected edge to at least one of said line segment and said curve of said reference pattern to generate defect information; and (d) registering said image identified as defective by said inspecting, wherein the maximum number of defect images to be registered for each of a plurality of determined defect-classes is determined, and said image is registered if the number of registered defect images is less than the maximum number of defect images to be registered for a determined defect-class of said image, and wherein whether said image should be registered is determined if the number of the registered defect images is equal to the maximum number of defect images to be registered for said determined defect-class of said image.

11. A pattern inspection apparatus for inspecting a pattern to-be-inspected by using an image of said pattern to-be-inspected and data for fabricating said pattern to-be-inspected, said pattern inspection apparatus comprising:

an image generation device configured to generate said image of said pattern to-be-inspected; and a memory storing a plurality of machine readable instructions that when executed perform the of:

(a) storing in said memory a reference pattern representing one or both of (i) one or more line segments, and (ii) one or more curves, said reference pattern generated from said data;

(b) storing, in said memory, detected edges of said image;

(c) inspecting said pattern to-be-inspected by comparing said detected edge to at least one of said line segment and said curve of said reference pattern to generate defect information; and (d) registering said image identified as defect by said inspecting, wherein the maximum number of defects to-be-reinspected for each of a plurality of determined defect-classes is determined, and defects to-be-reinspected are selected using said maximum number of defects to-be-reinspected.

12. A pattern inspection apparatus for inspecting a pattern to-be-inspected by using an image of said pattern to-be-inspected and data for fabricating said pattern to-be-inspected, said pattern inspection apparatus comprising:

an image generation device configured to generate said image of said pattern to-be-inspected; and a memory storing a plurality of machine readable instructions that when executed perform the steps of:

(a) storing in said memory a reference pattern representing one or both of (i) one or more line segments, and (ii) one or more curves, said reference pattern generated from said data;

(b) storing, in said memory, detected edges of said image; and (c) inspecting said pattern to-be-inspected by comparing said detected edge to at least one of said line segment and said curve of said reference pattern to generate defect information;

wherein defects detected by said inspecting are grouped according to a feature of said reference pattern corresponding to said defect and its neighborhood.

13. A pattern inspection apparatus for inspecting a pattern to-be-inspected by using an image of said pattern to-be-inspected and data for fabricating said pattern to-be-inspected, said pattern inspection apparatus comprising:

an image generation device configured to generate said image of said pattern to-be-inspected; and a memory storing a plurality of machine readable instructions that when executed perform the steps of:

(a) storing in said memory a reference pattern representing one or both of (i) one or more line segments, and (ii) one or more curves, said reference pattern generated from said data;

(b) storing, in said memory, detected edges of said image; and (c) inspecting said pattern to-be-inspected by comparing said detected edge to at least one of said line segment and said curve of said reference pattern to generate defect information;

wherein a line segment that requires signal intensity correction is extracted from said reference pattern, and, at least one of (a) a position of said line segment and (b) an allowable deformation quantity of said line segment, is corrected based on a quantity of said signal intensity correction;

wherein said line segments that require signal intensity correction are two line segments that face each other closest together with a distance between said two line segments being shorter than a first predetermined distance or being longer than a second predetermined distance.

14. A pattern inspection apparatus for inspecting a pattern to-be-inspected by using an image of said pattern to-be-inspected and data for fabricating said pattern to-be-inspected, said pattern inspection apparatus comprising:

an image generation device configured to generate said image of said pattern to-be-inspected; and a memory storing a plurality of machine readable instructions that when executed perform the steps of:

(a) storing in said memory a reference pattern representing one or both of (i) one or more line segments, and (ii) one or more curves, said reference pattern generated from said data;

(b) storing, in said memory, detected edges of said image; and (c) inspecting said pattern to-be-inspected by comparing said detected edge to at least one of said line segment and said curve of said reference pattern to generate defect information;

wherein one of said reference patterns, located at a boundary of periodical patterns, is recognized as a unique pattern, and is shifted by one period, said shifted unique pattern, in the case where there is no reference pattern in the neighborhood of said shifted unique pattern, is recognized as a negative pattern, and matching is performed by said inspecting based upon at least one of (a) said unique pattern and (b) said negative pattern.

15. A pattern inspection apparatus for inspecting a pattern to-be-inspected by using an image of said pattern to-be-inspected and data for fabricating said pattern to-be-inspected, said pattern inspection apparatus comprising:

an image generation device configured to generate said image of said pattern to-be-inspected; and a memory storing a plurality of machine readable instructions that when executed perform the steps of:

(a) storing in said memory a reference pattern representing one or both of (i) one or more line segments, and (ii) one or more curves, said reference pattern generated from said data;

(b) storing, in said memory, detected edges of said image; and (c) inspecting said pattern to-be-inspected by comparing said detected edge to at least one of said line segment and said curve of said reference pattern to generate defect information;

wherein said detected edge is matched with said line segment or said curve of said reference pattern by comparing a statistic calculated from part of said image of said pattern to-be-inspected corresponding to the inside of said reference pattern and a statistic calculated from part of said image of said pattern to-be-inspected corresponding to the outside of said reference pattern.

16. A pattern inspection apparatus for inspecting a pattern to-be-inspected by using an image of said pattern to-be-inspected and data for fabricating said pattern to-be-inspected, said pattern inspection apparatus comprising:
an image generation device configured to generate said image of said pattern to-be-inspected; and
a memory storing a plurality of machine readable instructions that when executed perform the steps of:
(a) storing in said memory a reference pattern representing one or both of (i) one or more line segments, and (ii) one or more curves, said reference pattern generated from said data;
(b) storing, in said memory, detected edges of said image; and
(c) inspecting said pattern to-be-inspected by comparing said detected edge to at least one of said line segment and said curve of said reference pattern to generate defect information;
wherein inspection parameters of said inspecting are selected according to part of said pattern to-be-inspected which is affected by the preceding process and part of said pattern to-be-inspected which is not affected by the preceding process.

17. A pattern inspection apparatus for inspecting a pattern to-be-inspected by using an image of said pattern to-be-inspected and data for fabricating said pattern to-be-inspected, said pattern inspection apparatus comprising:
an image generation device configured to generate said image of said pattern to-be-inspected; and
a memory storing a plurality of machine readable instructions that when executed perform the steps of:
(a) storing in said memory a reference pattern representing one or both of (i) one or more line segments, and (ii) one or more curves, said reference pattern generated from said data;
(b) storing, in said memory, detected edges of said image;
(c) inspecting said pattern to-be-inspected by comparing said detected edge to at least one of said line segment and said curve of said reference pattern to generate defect information; and
(d) outputting a result of said inspection of said pattern to-be-inspected;
wherein as said result of said inspection, information of said data is attached, and correspondence of one of said data, said data to which correction patterns are added, patterns obtained from simulation using said data, another information related to said data, and said result of said inspection is established by using said information of said data.

18. A method of inspecting a pattern to-be-inspected by using an image of said pattern to-be-inspected and data for fabricating said pattern to-be-inspected, said pattern inspection method comprising:
generating, within a pattern inspection apparatus, a reference pattern, from said data, represented by one or both of (a) one or more line segments, and (b) one or more curves;
generating, under control of said pattern inspection apparatus, said image of said pattern to-be-inspected;
detecting, within said pattern inspection apparatus, an edge of said image of said pattern to-be-inspected;
inspecting, within said pattern inspection apparatus, said pattern to-be-inspected by comparing said detected edge of said image with said line segment or said curve of said reference pattern; and
coating carbon on said pattern to-be-inspected prior to said step of scanning;
wherein said step of generating said image comprises scanning a charged particle beam on said carbon-coated pattern to-be-inspected to generate said image of said pattern to-be-inspected.

19. The method according to claim 18, wherein the thickness of carbon film on said pattern to-be-inspected is in the range of 5 nm to 20 nm.

20. A method of inspecting a pattern to-be-inspected by using an image of said pattern to-be-inspected and data for fabricating said pattern to-be-inspected, said pattern inspection method comprising:
generating, within a pattern inspection apparatus, a reference pattern, from said data, represented by one or both of (a) one or more line segments, and (b) one or more curves;
generating, under control of said pattern inspection apparatus, said image of said pattern to-be-inspected;
detecting, within said pattern inspection apparatus, an edge of said image of said pattern to-be-inspected; and
inspecting, within said pattern inspection apparatus, said pattern to-be-inspected by comparing said detected edge of said image with said line segment or said curve of said reference pattern;
wherein said step of generating said image comprising scanning a charged particle beam on a wider area than an area at a time to be acquired of a specimen containing said pattern to-be-inspected to generate said image of said pattern to-be-inspected, said method further comprising the steps of:
obtaining inspection results from a plurality of semiconductor devices fabricated based on said same data; and
obtaining a merged inspection result by merging said inspection results.

21. A pattern inspection apparatus for inspecting a pattern to-be-inspected by using an image of said pattern to-be-inspected and data for fabricating said pattern to-be-inspected, said pattern inspection apparatus comprising:
an image generation device configured to generate said image of said pattern to-be-inspected;
a reference pattern generation unit, realized by a program, for generating, from said data, a reference pattern represented by one or both of (i) one or more line segments, and (ii) one or more curves; and
an inspection unit, realized by at least one program, for (i) detecting an edge of said image, and (ii) inspecting said pattern to-be-inspected by comparing said detected edge with at least one of said line segment and said curve of said reference pattern to generate defect information;
wherein said image generation device sets a scanning condition for a charged particle beam by using said reference pattern, and said image generation device scans said pattern to-be-inspected with said charged particle beam to generate said image of said pattern to-be-inspected;
wherein said image generation device sets a scanning direction, which is one of said scanning conditions, for said charged particle beam based upon said reference pattern;

wherein said image generation device sets said scanning direction for said charged particle beam, such that said scanning direction becomes substantially perpendicular to-lines of said pattern to-be-inspected;

wherein said scanning direction is in the horizontal direction in a region where vertical lines of said pattern to-be-inspected exist, said scanning direction is in the vertical direction in a region where horizontal lines of said pattern to-be-inspected exist, and said scanning direction is in one of 45 degree direction, −45 degree direction, −135 degree direction, which is the opposite direction of said 45 degree direction, and 135 degree direction, which is the opposite direction of said −45 degree direction, in a region where horizontal and vertical lines of said pattern to-be-inspected exist.

22. A pattern inspection apparatus for inspecting a pattern to-be-inspected by using an image of said pattern to-be-inspected and data for fabricating said pattern to-be-inspected, said pattern inspection apparatus comprising:

an image generation device configured to generate said image of said pattern to-be-inspected;

a reference pattern generation unit, realized by a program, for generating, from said data, a reference pattern represented by one or both of (i) one or more line segments, and (ii) one or more curves; and an inspection unit, realized by at least one program, for (i) detecting an edge of said image, and (ii) inspecting said pattern to-be-inspected by comparing said detected edge with at least one of said line segment and said curve of said reference pattern to generate defect information;

wherein said image generation device sets a scanning condition for a charged particle beam by using said reference pattern, and said image generation device scans said pattern to-be-inspected with said charged particle beam to generate said image of said pattern to-be-inspected;

wherein said image generation device sets a scanning direction, which is one of said scanning conditions, for said charged particle beam based upon said reference pattern;

wherein said image generation device sets said scanning direction for said charged particle beam, such that said scanning direction becomes substantially perpendicular to-lines of said pattern to-be-inspected;

wherein said image generation device scans said pattern to-be-inspected with said charged particle beam to generate a plurality of said images of said pattern to-be-inspected by setting a plurality of said scanning directions, and said inspection unit detects said edge of said image of said pattern to-be-inspected from one of said plurality of said images of said pattern to-be-inspected which has been generated in one of said plurality of said scanning directions which becomes more perpendicular to said edge of said image of said pattern to-be-inspected.

23. The pattern inspection apparatus according to claim 22, wherein said image generation device scans said pattern to-be-inspected with said charged particle beam to generate two images of said pattern to-be-inspected by setting the horizontal scanning direction and the vertical scanning direction, and said inspection unit detects said edge of said image of said pattern to-be-inspected, which corresponds to a horizontal line of said reference pattern, from said image of said pattern to-be-inspected, which has been generated in the vertical scanning direction, and said inspection unit detects said edge of said image of said pattern to-be-inspected, which corresponds to a vertical line of said reference pattern from said image of said pattern to-be-inspected, which has been generated in the horizontal scanning direction.

24. A pattern inspection apparatus for inspecting a pattern to-be-inspected by using an image of said pattern to-be-inspected and data for fabricating said pattern to-be-inspected, said pattern inspection apparatus comprising:

an image generation device configured to generate said image of said pattern to-be-inspected; and a memory storing a plurality of machine readable instructions that when executed perform the steps of:
  (a) storing in said memory a reference pattern representing one or both of (i) one or more line segments, and (ii) one or more curves, said reference pattern generated from said data;
  (b) storing, in said memory, detected edges of said image; and
  (c) inspecting said pattern to-be-inspected by comparing said detected edge to at least one of said line segment and said curve of said reference pattern to generate defect information;

wherein a rotated image is generated by replacing positions of pixels of said image of said pattern to-be-inspected.

25. A pattern inspection apparatus for inspecting a pattern to-be-inspected by using an image of said pattern to-be-inspected and data for fabricating said pattern to-be-inspected, said pattern inspection apparatus comprising:

an image generation device configured to generate said image of said pattern to-be-inspected;

a reference pattern generation unit, realized by a program, for generating, from said data, a reference pattern represented by one or both of (i) one or more line segments, and (ii) one or more curves; and an inspection unit, realized by at least one program, for (i) detecting an edge of said image, and (ii) inspecting said pattern to-be-inspected by comparing said detected edge with at least one of said line segment and said curve of said reference pattern to generate defect information;

wherein said image generation device scans an area of said pattern to-be-inspected with a charged particle beam by imparting a vertical amplitude to a scanning direction for said charged particle beam to generate said image of said pattern to-be-inspected.

26. A pattern inspection apparatus for inspecting a pattern to-be-inspected by using an image of said pattern to-be-inspected and data for fabricating said pattern to-be-inspected, said pattern inspection apparatus comprising:

an image generation device configured to generate said image of said pattern to-be-inspected;

a reference pattern generation unit, realized by a program, for generating, from said data, a reference pattern represented by one or both of (i) one or more line segments, and (ii) one or more curves; and an inspection unit, realized by at least one program, for (i) detecting an edge of said image, and (ii) inspecting said pattern to-be-inspected by comparing said detected edge with at least one of said line segment and said curve of said reference pattern to generate defect information;

wherein said image generation device scans a part, which is used for detecting said edges of said image of said pattern to-be-inspected, with said charged particle beam to generate said image of said pattern to-be-inspected, and said image generation device does not scan the remainder of said part, which is used for detecting said edges of said image of said pattern to-be-inspected.

27. The pattern inspection apparatus according to claim 26, wherein said image generation device does not scan the remainder part of said part, which is used for detecting said edges of said image of said pattern to-be-inspected, so that a deformation of said image of said pattern to-be-inspected due to the electrification phenomenon of a specimen, on which said pattern to-be-inspected exists, is reduced.

28. A pattern inspection apparatus for inspecting a pattern to-be-inspected by using an image of said pattern to-be-inspected and data for fabricating said pattern to-be-inspected, said pattern inspection apparatus comprising:
  an image generation device configured to generate said image of said pattern to-be-inspected;
  a reference pattern generation unit, realized by a program, for generating, from said data, a reference pattern represented by one or both of (i) one or more line segments, and (ii) one or more curves; and
  an inspection unit, realized by at least one program, for (i) detecting an edge of said image, and (ii) inspecting said pattern to-be-inspected by comparing said detected edge with at least one of said line segment and said curve of said reference pattern to generate defect information;
  wherein said image generation device scans an area of said pattern to-be-inspected to generate a hexagonal image of said pattern to-be-inspected, and scans an area, which is adjacent to said area of said pattern to-be-inspected, to generate a next hexagonal image repeatedly, such that successive images of said pattern to-be-inspected are generated.

29. A method of inspecting a pattern to-be-inspected by using an image of said pattern to-be-inspected and data for fabricating said pattern to-be-inspected, said pattern inspection method comprising:
  generating, within a pattern inspection apparatus, a reference pattern, from said data, represented by one or both of (a) one or more line segments, and (b) one or more curves;
  generating, under control of said pattern inspection apparatus, said image of said pattern to-be-inspected;
  detecting, within said pattern inspection apparatus, an edge of said image of said pattern to-be-inspected;
  inspecting, within said pattern inspection apparatus, said pattern to-be-inspected by comparing said detected edge of said image with said line segment or said curve of said reference pattern; and
  recognizing repeated defects from defect information obtained from the same inspection area with respect to a plurality of semiconductor devices fabricated based on the same data.

30. A method of inspecting a pattern to-be-inspected by using an image of said pattern to-be-inspected and data for fabricating said pattern to-be-inspected, said pattern inspection method comprising:
  generating, within a pattern inspection apparatus, a reference pattern, from said data, represented by one or both of (a) one or more line segments, and (b) one or more curves;
  generating, under control of said pattern inspection apparatus, said image of said pattern to-be-inspected;
  detecting, within said pattern inspection apparatus, an edge of said image of said pattern to-be-inspected;
  inspecting, within said pattern inspection apparatus, said pattern to-be-inspected by comparing said detected edge of said image with said line segment or said curve of said reference pattern; and
  determining defect-classes based on defect information obtained using at least one of geometrical information of said reference pattern, information of said data, and information of data related to said data.

31. A method of inspecting a pattern to-be-inspected by using an image of said pattern to-be-inspected and data for fabricating said pattern to-be-inspected, said pattern inspection method comprising:
  generating, within a pattern inspection apparatus, a reference pattern, from said data, represented by one or both of (a) one or more line segments, and (b) one or more curves;
  generating, under control of said pattern inspection apparatus, said image of said pattern to-be-inspected;
  detecting, within said pattern inspection apparatus, an edge of said image of said pattern to-be-inspected; and
  inspecting, within said pattern inspection apparatus, said pattern to-be-inspected by comparing said detected edge of said image with said line segment or said curve of said reference pattern;
  wherein defects detected by said inspecting are grouped based on a feature of said reference pattern corresponding to said defect and its neighborhood.

32. A method of inspecting a pattern to-be-inspected by using an image of said pattern to-be-inspected and data for fabricating said pattern to-be-inspected, said pattern inspection method comprising:
  generating, within a pattern inspection apparatus, a reference pattern, from said data, represented by one or both of (a) one or more line segments, and (b) one or more curves;
  generating, under control of said pattern inspection apparatus, said image of said pattern to-be-inspected;
  detecting, within said pattern inspection apparatus, an edge of said image of said pattern to-be-inspected;
  inspecting, within said pattern inspection apparatus, said pattern to-be-inspected by comparing said detected edge of said image with said line segment or said curve of said reference pattern; and
  outputting a result of said inspection of said pattern to-be-inspected;
  wherein as said result of said inspection, information of said data is attached, and correspondence between one of said data, said data to which correction patterns are added, patterns obtained from simulation using said data, another information related to said data, and said result of said inspection is established by using said information of said data.

* * * * *